US012728533B2

(12) United States Patent
Vanderheyden et al.

(10) Patent No.: US 12,728,533 B2
(45) Date of Patent: Sep. 8, 2026

(54) ROBOT WITH INTERCHANGEABLE DRIVE SYSTEM

(71) Applicant: Grain Weevil Corporation, Omaha, NE (US)

(72) Inventors: Travis Vanderheyden, Omaha, NE (US); Ian Kennedy, Chicago, IL (US); Zane Zents, Omaha, NE (US); Benjamin H. Johnson, Omaha, NE (US); Chad E. Johnson, Aurora, NE (US); Cole Oswald, Aurora, NE (US); Juan Manuel Bogado Torres, La Vista, NE (US)

(73) Assignee: Grain Weevil Corporation, La Vista, NE (US)

( * ) Notice: Subject to any disclaimer, the term of this patent is extended or adjusted under 35 U.S.C. 154(b) by 0 days.

(21) Appl. No.: 18/800,047

(22) Filed: Aug. 10, 2024

(65) Prior Publication Data

US 2024/0399576 A1 Dec. 5, 2024

Related U.S. Application Data

(63) Continuation-in-part of application No. 18/316,393, filed on May 12, 2023, now Pat. No. 12,576,374, (Continued)

(51) Int. Cl.
*B25J 9/16* (2006.01)
*B62D 55/084* (2006.01)
(Continued)

(52) U.S. Cl.
CPC .......... *B25J 9/1664* (2013.01); *B62D 55/084* (2013.01); *B62D 57/036* (2013.01); *B62D 55/04* (2013.01);
(Continued)

(58) Field of Classification Search
CPC ........ B25J 9/1664; B25J 9/161; B25J 13/006; B25J 13/087; B65D 88/08; B65D 88/66;
(Continued)

(56) References Cited

U.S. PATENT DOCUMENTS 1,400,747 A 12/1921 Hopwood
1,622,565 A 3/1927 Beaumont
(Continued)

FOREIGN PATENT DOCUMENTS

CN 202841952 U 4/2013
CN 106863316 A 6/2017
(Continued)

OTHER PUBLICATIONS

He, D., Long, L., "Design and analysis of a novel multifunctional screw-propelled vehicle", 2017, 2017 IEEE International Conference on Unmanned Systems (ICUS) pp. 324-330 (Year: 2017).*
(Continued)

*Primary Examiner* — Abby Lin
*Assistant Examiner* — Karston G. Evans
(74) *Attorney, Agent, or Firm* — Morris Patent Law, PC., L.L.O.

(57) ABSTRACT

A robot comprises a memory, a processor, a body and a drive system which are coupled. The drive system comprises one of auger-based surface interface portions and continuous tread surface interface portions. The auger-based surface interface portions and the continuous tread surface interface portions are interchangeable to adapt the robot to one of different operating conditions and different uses. The processor is configured to: control movement of the robot, via the drive system, to traverse across a first surface, wherein the first surface comprises piled granular material, in response to the drive system being configured with the auger-based surface interface portions; and control move-
(Continued)

2700

IN RESPONSE TO A DRIVE SYSTEM OF A ROBOT BEING CONFIGURED WITH AUGER BASED SURFACE INTERFACE PORTIONS, CONTROL MOVEMENT OF THE ROBOT, VIA THE DRIVE SYSTEM, TO TRAVERSE ABOUT ATOP A FIRST SURFACE, WHEREIN THE FIRST SURFACE IS A SURFACE OF A PILED GRANULAR MATERIAL IN A BULK STORE
2710

IN RESPONSE TO THE DRIVE SYSTEM BEING CONFIGURED WITH CONTINUOUS TREAD SURFACE INTERFACE PORTIONS, CONTROL MOVEMENT OF THE ROBOT VIA THE DRIVE SYSTEM TO TRAVERSE ACROSS A SECOND SURFACE, WHEREIN THE SECOND SURFACE IS ONE OF A SOLID OR SEMI-SOLID SURFACE OTHER THAN THE SURFACE OF THE PILED GRANULAR MATERIAL
2720 ment of the robot via the drive system to traverse across a second surface, which is a solid or semi-solid surface other than the piled granular material, in response to the drive system being configured with the continuous tread surface interface portions.

18 Claims, 66 Drawing Sheets

Related U.S. Application Data which is a continuation-in-part of application No. 17/195,021, filed on Mar. 8, 2021, now Pat. No. 12,037,185, and a continuation-in-part of application No. 17/982,590, filed on Nov. 8, 2022, now Pat. No. 11,858,145, application No. 18/800,047, filed on Aug. 10, 2024 is a continuation-in-part of application No. 18/317,072, filed on May 13, 2023, now Pat. No. 12,564,138, which is a continuation-in-part of application No. 17/195,021, filed on Mar. 8, 2021, now Pat. No. 12,037,185, and a continuation-in-part of application No. 17/982,590, filed on Nov. 8, 2022, now Pat. No. 11,858,145, application No. 18/800,047, filed on Aug. 10, 2024 is a continuation-in-part of application No. 18/317,074, filed on May 13, 2023, now Pat. No. 12,576,526, which is a continuation-in-part of application No. 17/195,021, filed on Mar. 8, 2021, now Pat. No. 12,037,185, and a continuation-in-part of application No. 17/982,590, filed on Nov. 8, 2022, now Pat. No. 11,858,145, application No. 18/800,047, filed on Aug. 10, 2024 is a continuation-in-part of application No. 18/317,998, filed on May 16, 2023, which is a continuation-in-part of application No. 17/195,021, filed on Mar. 8, 2021, now Pat. No. 12,037,185, and a continuation-in-part of application No. 17/982,590, filed on Nov. 8, 2022, now Pat. No. 11,858,145, application No. 18/800,047, filed on Aug. 10, 2024 is a continuation-in-part of application No. 17/983,505, filed on Nov. 9, 2022, which is a continuation-in-part of application No. 17/195,021, filed on Mar. 8, 2021, now Pat. No. 12,037,185, application No. 18/800,047, filed on Aug. 10, 2024 is a continuation-in-part of application No. 18/377,471, filed on Oct. 6, 2023, now Pat. No. 12,269,168, which is a continuation of application No. 17/982,590, filed on Nov. 8, 2022, now Pat. No. 11,858,145, application No. 18/800,047, filed on Aug. 10, 2024 is a continuation-in-part of application No. 18/377,414, filed on Oct. 6, 2023, now Pat. No. 12,269,167, which is a continuation-in-part of application No. 17/982,590, filed on Nov. 8, 2022, now Pat. No. 11,858,145, which is a continuation-in-part of application No. 17/195,021, filed on Mar. 8, 2021, now Pat. No. 12,037,185, application No. 18/800,047, filed on Aug. 10, 2024 is a continuation of application No. 18/650,523, filed on Apr. 30, 2024, now Pat. No. 12,566,457, which is a continuation of application No. 17/195,021, filed on Mar. 8, 2021, now Pat. No. 12,037,185, application No. 18/800,047, filed on Aug. 10, 2024 is a continuation-in-part of application No. 18/652,204, filed on May 1, 2024, which is a continuation of application No. 17/195,021, filed on Mar. 8, 2021, now Pat. No. 12,037,185.

(60) Provisional application No. 63/532,371, filed on Aug. 12, 2023, provisional application No. 63/343,141, filed on May 18, 2022, provisional application No. 63/277,232, filed on Nov. 9, 2021, provisional application No. 63/320,791, filed on Mar. 17, 2022, provisional application No. 62/987,311, filed on Mar. 9, 2020.

(51) Int. Cl.
*B62D 57/036* (2006.01)
*B62D 55/04* (2006.01)
*B65D 88/08* (2006.01)
*B65D 88/66* (2006.01)
*G05D 105/05* (2024.01)

(52) U.S. Cl.
CPC .............. *B65D 88/08* (2013.01); *B65D 88/66* (2013.01); *G05D 2105/05* (2024.01)

(58) Field of Classification Search
CPC .............. B65G 69/045; B65G 69/0433; G05D 2109/18; G05D 1/2235; G05D 2107/50; G05D 1/2465; G05D 1/648; G05D 2105/05; B62D 57/036; B62D 55/084; B62D 55/04; A01F 25/14
See application file for complete search history.

(56) References Cited

U.S. PATENT DOCUMENTS 2,174,348 A 9/1939 Emile
3,064,831 A 11/1962 Cook
3,124,170 A 3/1964 Cooper
3,366,283 A 1/1968 Newcomb
3,469,719 A 9/1969 Peterson
3,593,892 A 7/1971 Petit
3,949,888 A 4/1976 Gessler et al.
4,033,466 A 7/1977 Easton
4,077,526 A 3/1978 Gessler et al.
4,207,005 A 6/1980 Stanfield
4,411,578 A 10/1983 Morrow
4,601,414 A 7/1986 Lawson
4,720,025 A 1/1988 Tatevosian et al.
5,044,043 A 9/1991 Basham et al.
5,099,986 A 3/1992 Kuzub
5,472,117 A 12/1995 Geiser et al.
5,769,590 A * 6/1998 Weikel ................ B65G 65/466 414/326
6,266,014 B1 7/2001 Fattouche et al.
6,499,929 B1 12/2002 Salgado et al.
8,201,649 B2 6/2012 Andrus et al.
8,752,662 B1 * 6/2014 Mack ...................... E02F 9/205 172/811
9,270,319 B2 2/2016 Bietz et al.
9,469,472 B2 10/2016 Anderson
9,637,186 B1 * 5/2017 Goldenberg ........... B62D 55/02
10,011,016 B1 * 7/2018 Rembisz .............. B25J 11/0085
10,329,103 B1 6/2019 Moen
10,377,573 B2 8/2019 Olson et al.
10,814,474 B2 10/2020 Newman et al.
10,889,455 B1 1/2021 Agnew et al.
10,928,483 B1 2/2021 Heinen et al.
11,054,335 B2 7/2021 Santarone et al.
11,337,374 B2 5/2022 Olson et al.
11,608,236 B2 3/2023 Olson
12,037,185 B2 7/2024 Johnson et al.
12,269,167 B2 4/2025 Johnson et al.
12,269,168 B2 4/2025 Zents et al.
2003/0024945 A1 2/2003 Dasilva
2005/0118903 A1 * 6/2005 Leonov ................. B63H 21/17 440/98
2005/0136845 A1 6/2005 Masuoka et al.
2009/0087523 A1 4/2009 Freeman et al.
2010/0110181 A1 5/2010 Wang et al.
2012/0215348 A1 8/2012 Skrinde
2013/0216340 A1 8/2013 Luster et al.
2013/0216341 A1 8/2013 Luster et al.

(56) References Cited

U.S. PATENT DOCUMENTS

| | | | | |
|---|---|---|---|---|
| 2014/0158440 | A1* | 6/2014 | Haar | B62D 55/04 180/9.21 |
| 2014/0250717 | A1 | 9/2014 | Bloemendaal | |
| 2015/0142250 | A1 | 5/2015 | Cavender-Bares et al. | |
| 2015/0177114 | A1 | 6/2015 | Kapoor et al. | |
| 2017/0343695 | A1 | 11/2017 | Stetson et al. | |
| 2018/0348760 | A1* | 12/2018 | Peverill | G05D 1/0094 |
| 2019/0018378 | A1 | 1/2019 | Varikooty et al. | |
| 2019/0146426 | A1 | 5/2019 | Blank | |
| 2019/0193784 | A1* | 6/2019 | Wach | B60B 33/0049 |
| 2019/0200510 | A1 | 7/2019 | Chrysanthakopoulos et al. | |
| 2019/0219980 | A1 | 7/2019 | Dahlin | |
| 2019/0310611 | A1 | 10/2019 | Jain et al. | |
| 2019/0391018 | A1 | 12/2019 | Dann | |
| 2020/0048985 | A1 | 2/2020 | Oehler et al. | |
| 2020/0074023 | A1 | 3/2020 | Nizami et al. | |
| 2020/0104433 | A1 | 4/2020 | Santarone et al. | |
| 2020/0130965 | A1 | 4/2020 | Kibbe et al. | |
| 2020/0172159 | A1 | 6/2020 | Kuwabara et al. | |
| 2020/0198122 | A1 | 6/2020 | Newman et al. | |
| 2020/0242282 | A1 | 7/2020 | Santarone et al. | |
| 2020/0263923 | A1 | 8/2020 | Bloemendaal | |
| 2021/0000006 | A1 | 1/2021 | Ellaboudy et al. | |
| 2021/0033698 | A1 | 2/2021 | Heinen et al. | |
| 2021/0061549 | A1 | 3/2021 | Risser et al. | |
| 2021/0122563 | A1 | 4/2021 | Igarashi et al. | |
| 2021/0276794 | A1 | 9/2021 | Johnson et al. | |
| 2022/0004672 | A1 | 1/2022 | Santarone et al. | |
| 2022/0151135 | A1 | 5/2022 | Das et al. | |
| 2022/0170696 | A1 | 6/2022 | Rogoschewsky et al. | |
| 2022/0237965 | A1 | 7/2022 | Vaccariello et al. | |
| 2022/0363493 | A1 | 11/2022 | Bowlin et al. | |
| 2023/0000003 | A1 | 1/2023 | Chrysanthakopoulos et al. | |
| 2023/0061995 | A1 | 3/2023 | Johnson et al. | |
| 2023/0067298 | A1 | 3/2023 | Koch et al. | |
| 2023/0068940 | A1 | 3/2023 | Johnson et al. | |
| 2023/0172112 | A1 | 6/2023 | Olson | |
| 2023/0276739 | A1 | 9/2023 | Johnson et al. | |
| 2023/0277990 | A1 | 9/2023 | Johnson et al. | |
| 2023/0278215 | A1 | 9/2023 | Johnson et al. | |
| 2023/0284567 | A1 | 9/2023 | Johnson et al. | |
| 2024/0033918 | A1 | 2/2024 | Johnson et al. | |
| 2024/0033919 | A1 | 2/2024 | Zents et al. | |
| 2024/0278980 | A1 | 8/2024 | Johnson et al. | |
| 2024/0286827 | A1 | 8/2024 | Johnson et al. | |
| 2024/0408754 | A1 | 12/2024 | Bogado Torres et al. | |
| 2025/0042030 | A1 | 2/2025 | Vanderheyden et al. | |
| 2025/0060760 | A1 | 2/2025 | Bogado Torres et al. | |
| 2025/0178196 | A1 | 6/2025 | Johnson et al. | |
| 2025/0178197 | A1 | 6/2025 | Zents et al. | |
| 2025/0187189 | A1 | 6/2025 | Johnson et al. | |
| 2025/0205892 | A1 | 6/2025 | Vanderheyden et al. | |
| 2026/0153880 | A1 | 6/2026 | Johnson et al. | |

FOREIGN PATENT DOCUMENTS

| | | | |
|---|---|---|---|
| CN | 109132611 | A | 1/2019 |
| CN | 112590960 | A | 4/2021 |
| CN | 113682844 | A | 11/2021 |
| CN | 214878699 | U | 11/2021 |
| CN | 113696996 | B | 7/2022 |
| CN | 219669590 | U | 9/2023 |
| FR | 3105340 | A1 | 6/2021 |
| JP | H084685 | B2 * | 1/1996 |
| WO | 2022053810 | A1 | 3/2022 |
| WO | 2023086356 | A1 | 5/2023 |
| WO | 2023225535 | A1 | 11/2023 |
| WO | 2025038506 | A2 | 2/2025 |
| WO | 2025042776 | A2 | 2/2025 |
| WO | 2025090751 | A1 | 5/2025 |

OTHER PUBLICATIONS

Mack, J., "MackRobotics", 2020, Mack Robotics, Inc., https://www.mackrobotics.com (Year: 2020).*

Lugo, J., et al., "Conceptual Design Of Tetrad-Screw Propelled Omnidirectional All-Terrain Mobile Robot", 2017, IEEE, 2017 2nd International Conference on Control and Robotics Engineering, pp. 13-17 (Year: 2017).*

PCT Application No. PCT/US2023/067090; International Preliminary Report on Patentability, Nov. 28, 2024; 8 pages.

PCT Application No. PCT/US2022/049356; International Search Report and Written Opinion of the International Searching Authority, Feb. 17, 2023; 14 pages.

PCT Application No. PCT/US2023/067090; International Search Report and Written Opinion of the International Searching Authority, Sep. 21, 2023; 10 pages.

"Aglaunch Initiative", Grain Weevil Pitch Video. Youtube.com Video. Mar. 2, 2021 [retrieved on Jul. 28, 2023], Mar. 2, 2021, 16 pgs.

Bedford, "Grain Weevil Robot: Technology keeps farmers out of the grain bins", Successful Farming, Jan. 28, 2021, 1 pg. [retrieved on Jul. 28, 2023].

Bhadra, et al., "Field-Observed Angles of Repose for Stored Grain in the United States", Applied Engineering in Agriculture, 33(1) ISSN 0883-8542, pp. 131-137, American Society of Agricultural and Biological Engineers Jan. 30, 2017. [retrieved on Jul. 28, 2023].

Grain Weevil, "Grain Bin Management Robot", Grain Weevil Webpage, Apr. 20, 2021, 3 pgs. [retrieved on Jul. 28, 2023].

Jones, et al., "Aeration and Cooling of Stored Grain", Oklahoma State University, Oklahoma Cooperative Extension Service, BAE-1101, Feb. 2017, 5 pgs. [retrieved on Jul. 28, 2023].

Laws, "Robot Innovation Promises to Keep Farmers Out of Grain Bins", Farm Progress, Mar. 24, 2021, 13 pgs. [retrieved on Jul. 28, 2023].

PCT Application No. PCT/US2024/052795; International Search Report and Written Opinion, Mar. 7, 2025, 17 pgs.

PCT Application No. PCT/US2024/042787; International Search Report and Written Opinion, Nov. 20, 2024; 7 pgs.

PCT Application No. PCT/US2024/041852; International Search Report and Written Opinion, Nov. 11, 2024, 6 pgs.

European Patent Application No. 22 893 537.5; Extended European Search Report, Jun. 12, 2025, 8 pgs.

PCT Application No. PCT/US2024/041852; International Preliminary Report on Patentability, Feb. 14, 2026; 5 pgs.

He, D., "Design and Analysis of a Novel Multifunctional Screw-propelled Vehicle", IEEE International Conference on Unmanned Systems (ICUS), 2017, pp. 324-330.

Mack, "The Hydraulic Bin Bot", Mack Robotics, Inc., https://www.mackrobotics.com/?=bin_bot (Year:2020), 2020, 2 pgs.

Seo, et al., "Robust Design of a Crew-Based Crawling robot on a Granular Surface", IEEEAccess, vol. 9, 2021, Jul. 2021, Jul. 26, 2021, 8 pgs.

* cited by examiner

Figure 8A:
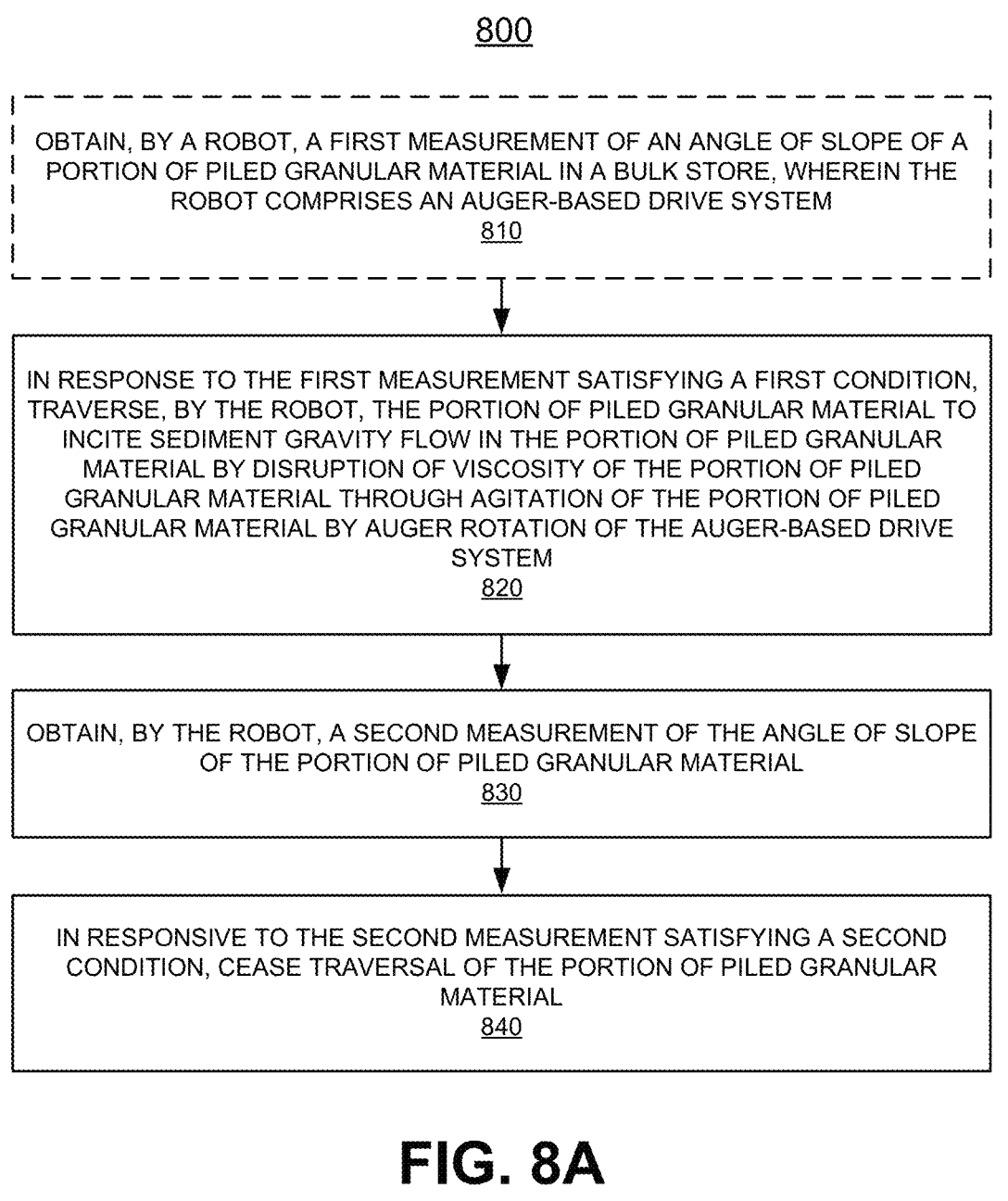

800

OBTAIN, BY A ROBOT, A FIRST MEASUREMENT OF AN ANGLE OF SLOPE OF A PORTION OF PILED GRANULAR MATERIAL IN A BULK STORE, WHEREIN THE ROBOT COMPRISES AN AUGER-BASED DRIVE SYSTEM
810

IN RESPONSE TO THE FIRST MEASUREMENT SATISFYING A FIRST CONDITION, TRAVERSE, BY THE ROBOT, THE PORTION OF PILED GRANULAR MATERIAL TO INCITE SEDIMENT GRAVITY FLOW IN THE PORTION OF PILED GRANULAR MATERIAL BY DISRUPTION OF VISCOSITY OF THE PORTION OF PILED GRANULAR MATERIAL THROUGH AGITATION OF THE PORTION OF PILED GRANULAR MATERIAL BY AUGER ROTATION OF THE AUGER-BASED DRIVE SYSTEM
820

OBTAIN, BY THE ROBOT, A SECOND MEASUREMENT OF THE ANGLE OF SLOPE OF THE PORTION OF PILED GRANULAR MATERIAL
830

IN RESPONSIVE TO THE SECOND MEASUREMENT SATISFYING A SECOND CONDITION, CEASE TRAVERSAL OF THE PORTION OF PILED GRANULAR MATERIAL
840

RESPONSIVE TO THE SECOND MEASUREMENT FAILING TO SATISFY THE SECOND CONDITION, CONTINUE THE TRAVERSAL, BY THE ROBOT, OF THE PORTION OF PILED GRANULAR MATERIAL
850

800 CONTINUED

CAPTURE, BY A SENSOR OF THE ROBOT, A MEASUREMENT OF A CHARACTERISTIC OF THE PORTION OF PILED GRANULAR MATERIAL DURING THE TRAVERSAL OF THE PORTION OF PILED GRANULAR MATERIAL
860

800 CONTINUED

CAPTURE, BY A SENSOR OF THE ROBOT, A TEMPERATURE MEASUREMENT OF THE PORTION OF PILED GRANULAR MATERIAL DURING THE TRAVERSAL OF THE PORTION OF PILED GRANULAR MATERIAL
870

800 CONTINUED

COLLECT, BY THE ROBOT, A SAMPLE FROM THE PORTION OF PILED GRANULAR MATERIAL DURING THE TRAVERSAL OF THE PORTION OF PILED GRANULAR MATERIAL
880

344

344

1101-2 1101-4 1101-6 1101-8
1101-1 1101-3 1101-5 1101-7 1101-9
344

344

1101-1
344
1110

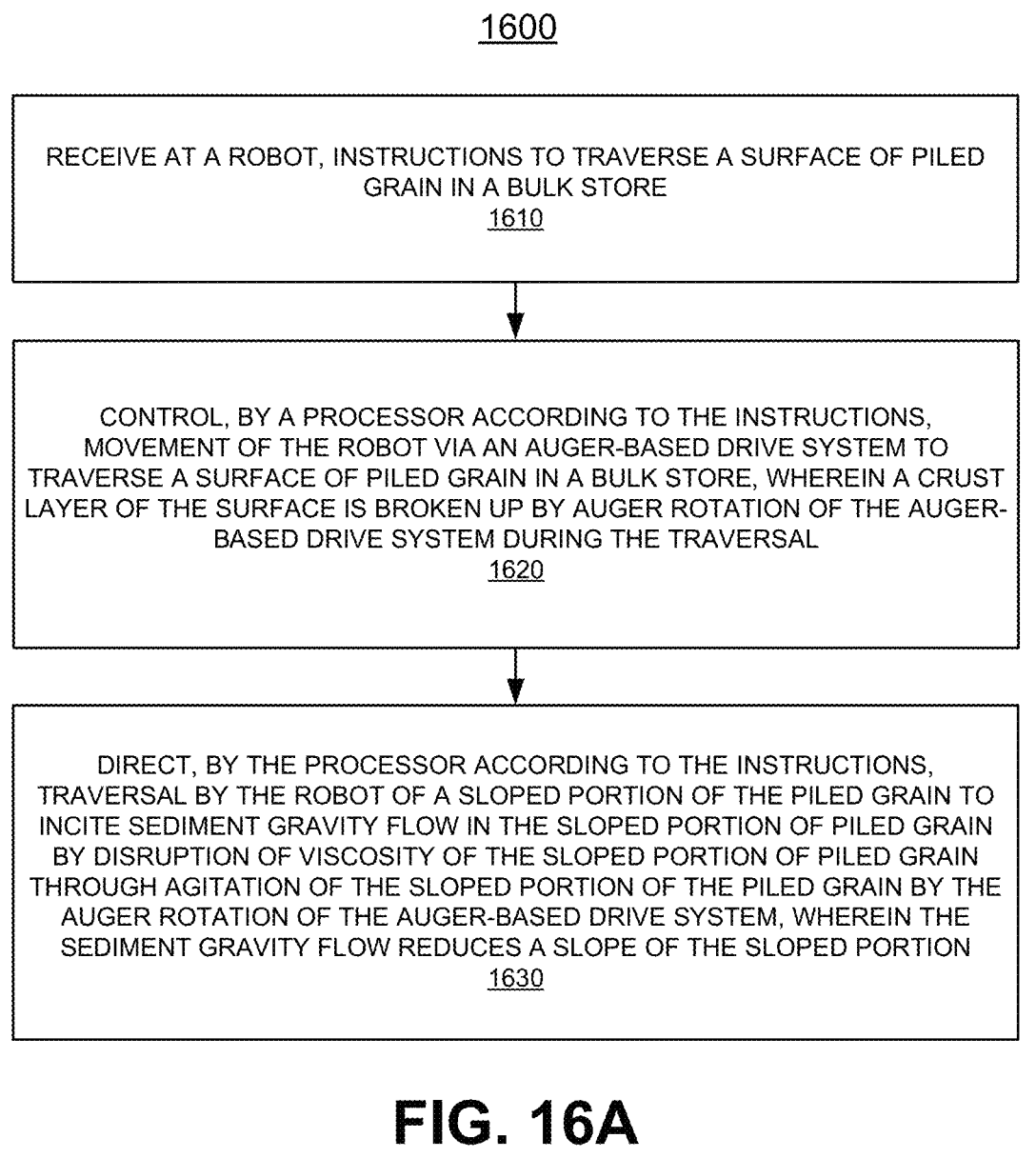

1600

RECEIVE AT A ROBOT, INSTRUCTIONS TO TRAVERSE A SURFACE OF PILED GRAIN IN A BULK STORE
1610

CONTROL, BY A PROCESSOR ACCORDING TO THE INSTRUCTIONS, MOVEMENT OF THE ROBOT VIA AN AUGER-BASED DRIVE SYSTEM TO TRAVERSE A SURFACE OF PILED GRAIN IN A BULK STORE, WHEREIN A CRUST LAYER OF THE SURFACE IS BROKEN UP BY AUGER ROTATION OF THE AUGER-BASED DRIVE SYSTEM DURING THE TRAVERSAL
1620

DIRECT, BY THE PROCESSOR ACCORDING TO THE INSTRUCTIONS, TRAVERSAL BY THE ROBOT OF A SLOPED PORTION OF THE PILED GRAIN TO INCITE SEDIMENT GRAVITY FLOW IN THE SLOPED PORTION OF PILED GRAIN BY DISRUPTION OF VISCOSITY OF THE SLOPED PORTION OF PILED GRAIN THROUGH AGITATION OF THE SLOPED PORTION OF THE PILED GRAIN BY THE AUGER ROTATION OF THE AUGER-BASED DRIVE SYSTEM, WHEREIN THE SEDIMENT GRAVITY FLOW REDUCES A SLOPE OF THE SLOPED PORTION
1630

FIG. 16A

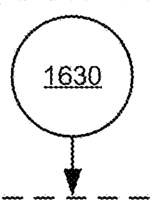

CAPTURE, BY A SENSOR OF THE ROBOT, A MEASUREMENT OF A CHARACTERISTIC OF A PORTION OF PILED GRAIN DURING THE TRAVERSAL OF THE PORTION OF PILED GRAIN
1640

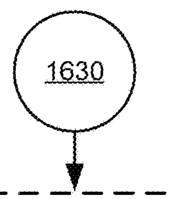

CAPTURE, BY A SENSOR OF THE ROBOT, A TEMPERATURE MEASUREMENT OF A PORTION OF PILED GRAIN DURING THE TRAVERSAL OF THE PORTION OF PILED GRAIN
1650

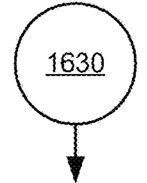

DELIVER A PROBE ONTO THE SURFACE OF THE PILED GRAIN DURING THE TRAVERSAL
1660

Figure 17A:
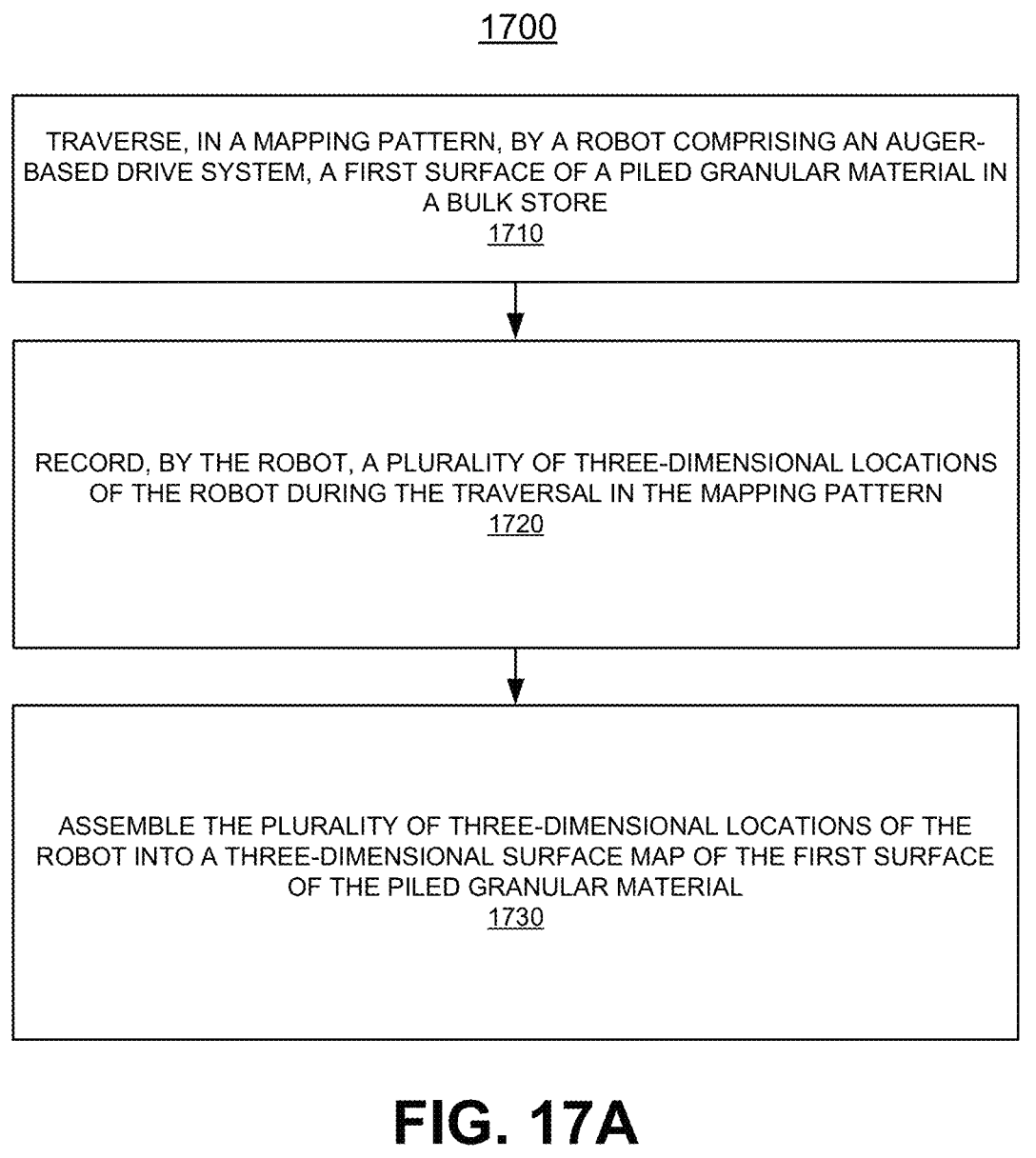

TRAVERSE, IN A MAPPING PATTERN, BY A ROBOT COMPRISING AN AUGER-BASED DRIVE SYSTEM, A FIRST SURFACE OF A PILED GRANULAR MATERIAL IN A BULK STORE
1710

RECORD, BY THE ROBOT, A PLURALITY OF THREE-DIMENSIONAL LOCATIONS OF THE ROBOT DURING THE TRAVERSAL IN THE MAPPING PATTERN
1720

ASSEMBLE THE PLURALITY OF THREE-DIMENSIONAL LOCATIONS OF THE ROBOT INTO A THREE-DIMENSIONAL SURFACE MAP OF THE FIRST SURFACE OF THE PILED GRANULAR MATERIAL
1730

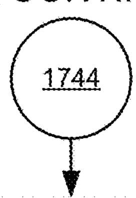

CAPTURE, BY A SENSOR OF THE ROBOT, A MEASUREMENT OF AN ENVIRONMENTAL CHARACTERISTIC AT EACH OF A PLURALITY OF THE PLURALITY OF THREE-DIMENSIONAL LOCATIONS AND THE PLURALITY OF SECOND THREE-DIMENSIONAL LOCATIONS TO ACHIEVE A PLURALITY OF MEASUREMENTS
1750

ASSEMBLE MEASUREMENTS OF THE PLURALITY OF MEASUREMENTS, BASED ON THEIR RESPECTIVE THREE-DIMENSIONAL LOCATIONS OF CAPTURE, INTO A THREE-DIMENSIONAL MAP OF THE ENVIRONMENTAL CHARACTERISTICS OF THE BULK STORE
1752

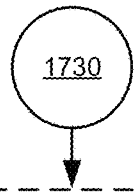

CAPTURE, BY A SENSOR OF THE ROBOT, A FIRST MEASUREMENT OF AN ENVIRONMENTAL CHARACTERISTIC AT EACH OF A PLURALITY OF THE THREE-DIMENSIONAL LOCATIONS TO ACHIEVE A PLURALITY OF MEASUREMENTS;
1760

ASSEMBLE, BY THE ROBOT, MEASUREMENTS OF THE PLURALITY OF MEASUREMENTS, BASED ON THEIR RESPECTIVE THREE-DIMENSIONAL LOCATIONS OF CAPTURE, INTO A THREE-DIMENSIONAL MAP OF THE ENVIRONMENTAL CHARACTERISTICS OF THE SURFACE OF THE PILED GRANULAR MATERIAL
1762

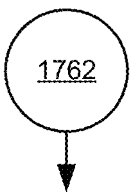

CAPTURE, BY A SECOND SENSOR OF THE ROBOT, A SECOND MEASUREMENT OF A SECOND ENVIRONMENTAL CHARACTERISTIC AT EACH OF A SECOND PLURALITY OF THE THREE-DIMENSIONAL LOCATIONS TO ACHIEVE A PLURALITY OF SECOND MEASUREMENTS
1770

ASSEMBLE MEASUREMENTS OF THE PLURALITY OF SECOND MEASUREMENTS, BASED ON THEIR RESPECTIVE THREE-DIMENSIONAL LOCATIONS OF CAPTURE, INTO THE THREE-DIMENSIONAL MAP OF THE ENVIRONMENTAL CHARACTERISTICS OF THE SURFACE OF THE PILED GRANULAR MATERIAL
1772

FIG. 17E

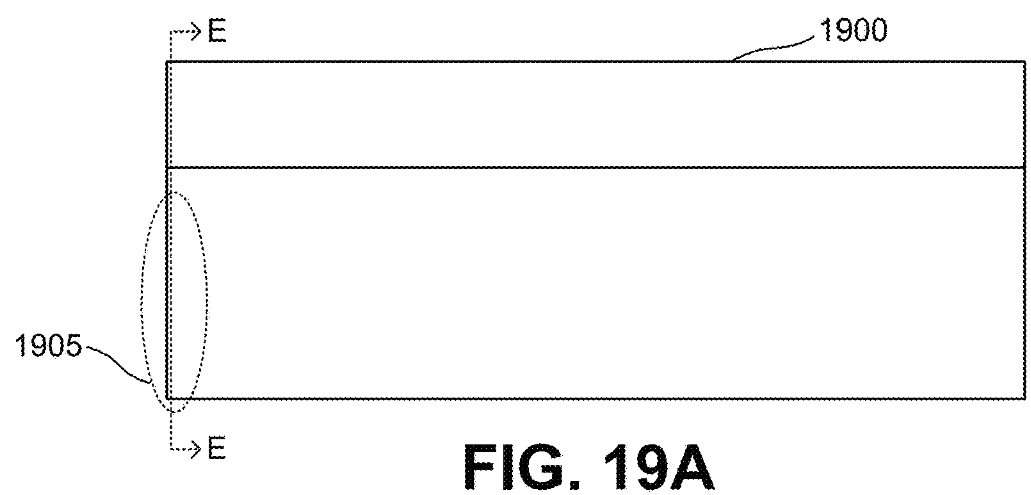
FIG. 19A
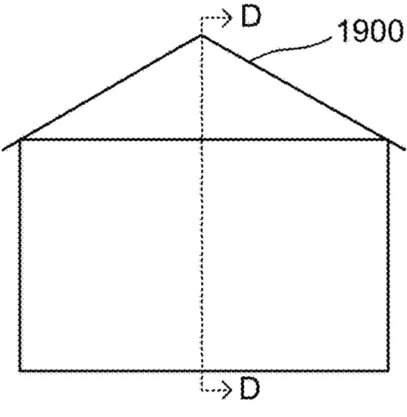
FIG. 19B
1900
SECTION
D - D
100
1911
1911'
1910
FIG. 19C

2000

RECEIVE, AT A ROBOT, INSTRUCTIONS TO TRAVERSE A SURFACE OF PILE OF GRAIN IN A GRAIN BIN
2010

CONTROL MOVEMENT OF THE ROBOT, ACCORDING TO THE INSTRUCTIONS, RELATIVE TO THE GRAIN IN THE GRAIN BIN VIA AN AUGER-BASED DRIVE SYSTEM
2020

TRAVERSE, BY THE ROBOT, A LANDING ZONE PORTION OF A SURFACE OF A PILE OF THE GRAIN DURING LOAD-IN OF THE GRAIN TO DISPERSE BROKEN GRAIN AND FOREIGN MATERIAL AWAY FROM THE LANDING ZONE PORTION, WHEREIN THE LANDING ZONE PORTION IS LOCATED IN A CENTER OF THE GRAIN BIN WHERE THE GRAIN LANDS AS IT IS AUGURED INTO THE GRAIN BIN DURING LOAD-IN, AND WHEREIN THE DISPERSAL IS EFFECTED IN PART BY ROTATION OF AUGERS OF THE AUGER BASED DRIVE SYSTEM
2030

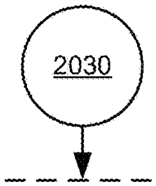

PERFORM ADDITIONAL TRAVERSAL BY THE ROBOT OF A SLOPED PORTION OF THE PILE OF GRAIN TO INCITE SEDIMENT GRAVITY FLOW IN THE SLOPED PORTION OF THE PILE OF GRAIN BY DISRUPTION OF VISCOSITY OF THE SLOPED PORTION OF THE PILE OF GRAIN THROUGH AGITATION OF THE SLOPED PORTION OF THE PILE OF GRAIN BY THE AUGER ROTATION OF THE AUGER-BASED DRIVE SYSTEM, WHEREIN THE SLOPED PORTION IS OUTSIDE OF THE LANDING ZONE PORTION, AND WHEREIN THE SEDIMENT GRAVITY FLOW REDUCES A SLOPE OF THE SLOPED PORTION AND FURTHER DISPERSES THE BROKEN GRAIN AND FOREIGN MATERIAL AWAY FROM THE LANDING ZONE PORTION
2040

FIG. 20B

2000 CONTINUED
2030
2000 CONTINUED
2030
2000 CONTINUED
2030
2000 CONTINUED
2040

CAPTURE, BY A SENSOR OF THE ROBOT, A MEASUREMENT OF A CHARACTERISTIC OF THE LANDING ZONE PORTION OF THE PILE OF GRAIN DURING THE TRAVERSAL OF THE LANDING ZONE PORTION OF THE PILE OF GRAIN
2050

FIG. 20C

CAPTURE, BY A SENSOR OF THE ROBOT, A TEMPERATURE MEASUREMENT OF THE LANDING ZONE PORTION OF THE PILE OF GRAIN DURING THE TRAVERSAL OF THE LANDING ZONE PORTION OF THE PILE OF GRAIN
2060

FIG. 20D

DELIVER A PROBE ONTO THE SURFACE OF THE PILE OF GRAIN DURING THE TRAVERSAL OF THE LANDING ZONE PORTION OF THE PILE OF GRAIN
2070

FIG. 20E

CAPTURE, BY A SENSOR OF THE ROBOT, A MEASUREMENT OF A CHARACTERISTIC OF THE SLOPED PORTION OF THE PILE OF GRAIN DURING THE TRAVERSAL OF THE SLOPED PORTION OF THE PILE OF GRAIN
2080

RECEIVE, AT A ROBOT, INSTRUCTIONS TO TRAVERSE A SURFACE OF PILE OF GRAIN IN A GRAIN BIN
2110

CONTROL MOVEMENT OF THE ROBOT, ACCORDING TO THE INSTRUCTIONS, RELATIVE TO THE GRAIN IN THE GRAIN BIN VIA AN AUGER-BASED DRIVE SYSTEM
2120

PERFORM A MAINTENANCE TRAVERSAL, BY THE ROBOT, OF THE SURFACE OF THE PILE OF THE GRAIN DURING A STORAGE PERIOD OF THE GRAIN TO DISPERSE A LAYER OF THE GRAIN ON AND NEAR THE SURFACE AND THUS PREVENT CRUST FORMATION ON THE SURFACE DURING THE STORAGE PERIOD, WHEREIN THE DISPERSAL IS EFFECTED BY ROTATION OF AUGERS OF THE AUGER-BASED DRIVE SYSTEM
2130

PERFORM, BY THE ROBOT, ONE OR MORE ADDITIONAL MAINTENANCE TRAVERSALS INTERMITTENTLY DURING THE STORAGE PERIOD
2140

CAPTURE, BY A SENSOR OF THE ROBOT, A MEASUREMENT OF A CHARACTERISTIC OF THE SURFACE OF THE PILE OF GRAIN DURING THE MAINTENANCE TRAVERSAL
2145

FIG. 21C

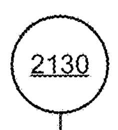

CAPTURE, BY A SENSOR OF THE ROBOT, A TEMPERATURE MEASUREMENT ASSOCIATED WITH A PORTION OF THE SURFACE OF THE PILE OF GRAIN DURING THE MAINTENANCE TRAVERSAL
2150

RESPONSIVE TO THE CAPTURED TEMPERATURE MEASUREMENT EXCEEDING A THRESHOLD ON THE PORTION OF THE SURFACE, TRAVERSE, BY THE ROBOT, THE PORTION TO FURTHER DISPERSE THE PORTION UNTIL MEASURED TEMPERATURE IN THE PORTION IS DECREASED TO A VALUE BELOW THE THRESHOLD
2151

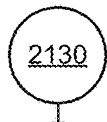

CAPTURE, BY A SENSOR OF THE ROBOT, AN AIR FLOW MEASUREMENT ASSOCIATED WITH A PORTION OF THE SURFACE OF THE PILE OF GRAIN DURING THE MAINTENANCE TRAVERSAL
2155

RESPONSIVE TO THE CAPTURED AIRFLOW MEASUREMENT BEING BELOW A THRESHOLD ON THE PORTION OF THE SURFACE, TRAVERSE, BY THE ROBOT, THE PORTION TO FURTHER DISPERSE THE PORTION UNTIL MEASURED AIRFLOW ON THE PORTION IS INCREASED TO A VALUE ABOVE THE THRESHOLD
2156

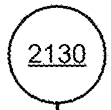

SPRAY, BY THE ROBOT, A SUBSTANCE ON THE SURFACE OF THE PILE OF GRAIN DURING THE MAINTENANCE TRAVERSAL
2160

FIG. 21F

DELIVER, BY THE ROBOT, A PROBE ONTO THE SURFACE OF THE PILE OF GRAIN DURING THE MAINTENANCE TRAVERSAL
2165

Figure 22A:
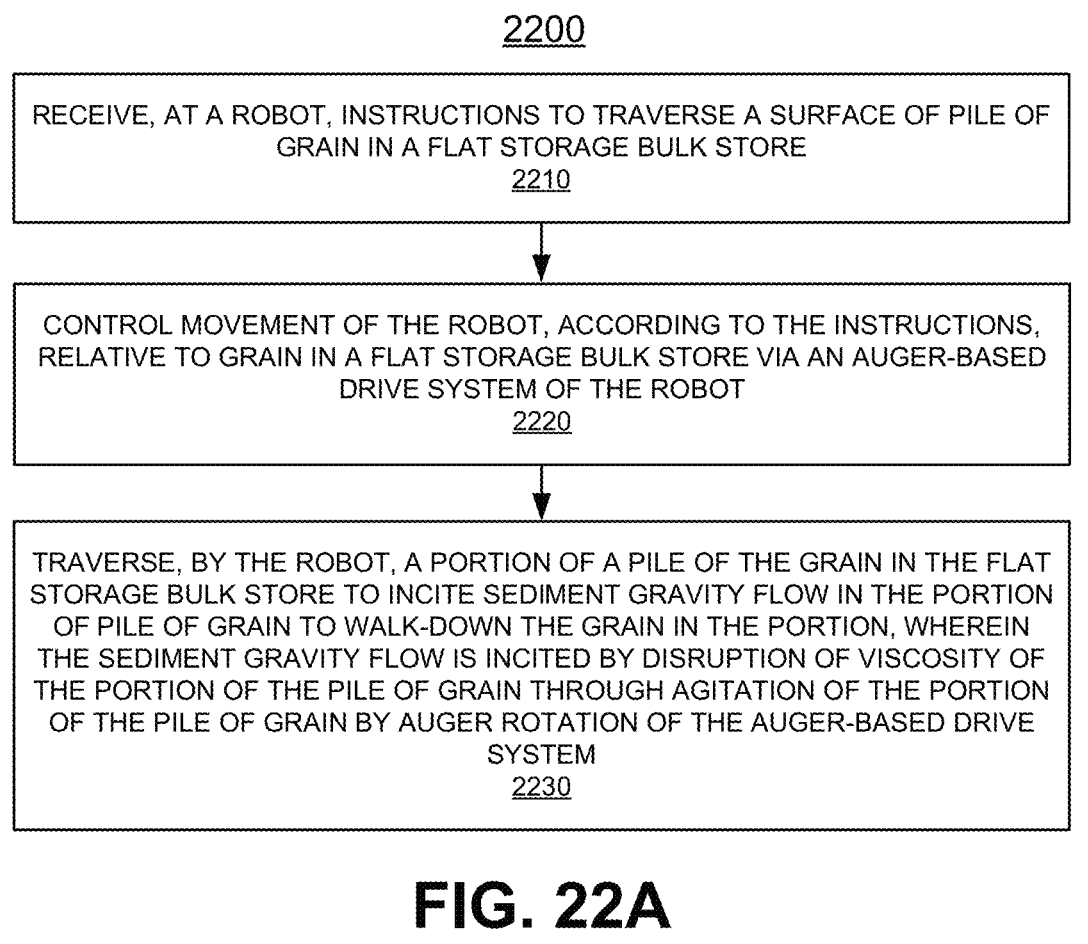

2200

RECEIVE, AT A ROBOT, INSTRUCTIONS TO TRAVERSE A SURFACE OF PILE OF GRAIN IN A FLAT STORAGE BULK STORE
2210

CONTROL MOVEMENT OF THE ROBOT, ACCORDING TO THE INSTRUCTIONS, RELATIVE TO GRAIN IN A FLAT STORAGE BULK STORE VIA AN AUGER-BASED DRIVE SYSTEM OF THE ROBOT
2220

TRAVERSE, BY THE ROBOT, A PORTION OF A PILE OF THE GRAIN IN THE FLAT STORAGE BULK STORE TO INCITE SEDIMENT GRAVITY FLOW IN THE PORTION OF PILE OF GRAIN TO WALK-DOWN THE GRAIN IN THE PORTION, WHEREIN THE SEDIMENT GRAVITY FLOW IS INCITED BY DISRUPTION OF VISCOSITY OF THE PORTION OF THE PILE OF GRAIN THROUGH AGITATION OF THE PORTION OF THE PILE OF GRAIN BY AUGER ROTATION OF THE AUGER-BASED DRIVE SYSTEM
2230

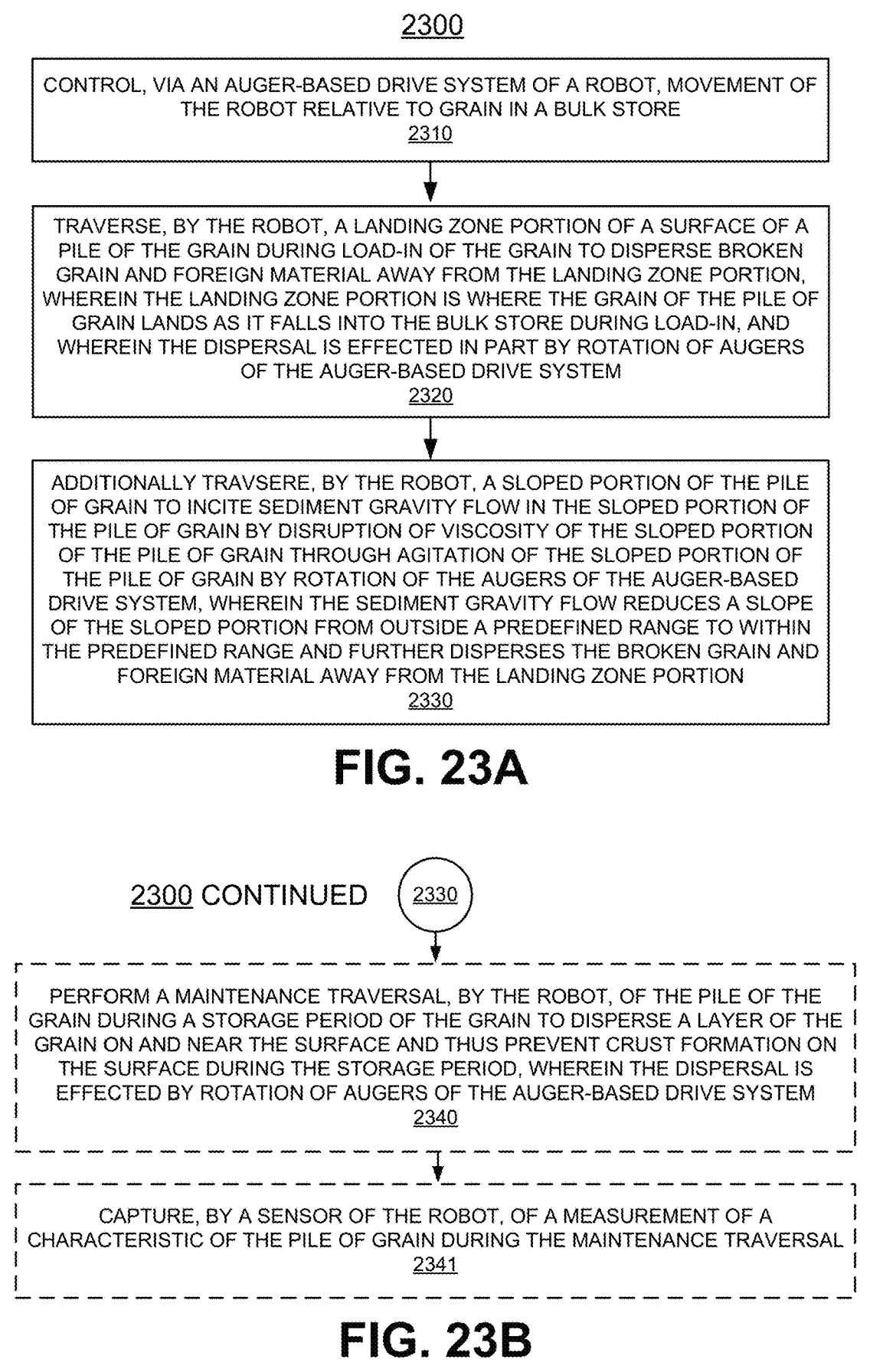

CONTROL, VIA AN AUGER-BASED DRIVE SYSTEM OF A ROBOT, MOVEMENT OF THE ROBOT RELATIVE TO GRAIN IN A BULK STORE
2310

TRAVERSE, BY THE ROBOT, A LANDING ZONE PORTION OF A SURFACE OF A PILE OF THE GRAIN DURING LOAD-IN OF THE GRAIN TO DISPERSE BROKEN GRAIN AND FOREIGN MATERIAL AWAY FROM THE LANDING ZONE PORTION, WHEREIN THE LANDING ZONE PORTION IS WHERE THE GRAIN OF THE PILE OF GRAIN LANDS AS IT FALLS INTO THE BULK STORE DURING LOAD-IN, AND WHEREIN THE DISPERSAL IS EFFECTED IN PART BY ROTATION OF AUGERS OF THE AUGER-BASED DRIVE SYSTEM
2320

ADDITIONALLY TRAVSERE, BY THE ROBOT, A SLOPED PORTION OF THE PILE OF GRAIN TO INCITE SEDIMENT GRAVITY FLOW IN THE SLOPED PORTION OF THE PILE OF GRAIN BY DISRUPTION OF VISCOSITY OF THE SLOPED PORTION OF THE PILE OF GRAIN THROUGH AGITATION OF THE SLOPED PORTION OF THE PILE OF GRAIN BY ROTATION OF THE AUGERS OF THE AUGER-BASED DRIVE SYSTEM, WHEREIN THE SEDIMENT GRAVITY FLOW REDUCES A SLOPE OF THE SLOPED PORTION FROM OUTSIDE A PREDEFINED RANGE TO WITHIN THE PREDEFINED RANGE AND FURTHER DISPERSES THE BROKEN GRAIN AND FOREIGN MATERIAL AWAY FROM THE LANDING ZONE PORTION
2330

PERFORM A MAINTENANCE TRAVERSAL, BY THE ROBOT, OF THE PILE OF THE GRAIN DURING A STORAGE PERIOD OF THE GRAIN TO DISPERSE A LAYER OF THE GRAIN ON AND NEAR THE SURFACE AND THUS PREVENT CRUST FORMATION ON THE SURFACE DURING THE STORAGE PERIOD, WHEREIN THE DISPERSAL IS EFFECTED BY ROTATION OF AUGERS OF THE AUGER-BASED DRIVE SYSTEM
2340

CAPTURE, BY A SENSOR OF THE ROBOT, OF A MEASUREMENT OF A CHARACTERISTIC OF THE PILE OF GRAIN DURING THE MAINTENANCE TRAVERSAL
2341

FIG. 23B

PERFORM REHYDRATION TRAVERSAL, BY THE ROBOT, OF THE PILE OF GRAIN IN CONCERT WITH A FAN OF THE BULK STORE DRAWING HUMID AIR ONTO A TOP SURFACE OF THE PILE, WHEREIN THE REHYDRATION TRAVERSAL MIXES GRAIN ON THE TOP SURFACE WITH GRAIN BELOW THE TOP SURFACE TO FACILITATE EVEN REHYDRATION OF A LAYER OF GRAIN NEAR THE TOP SURFACE BY THE HUMID AIR
2350

CAPTURE, BY A SENSOR OF THE ROBOT, OF A MEASUREMENT OF A CHARACTERISTIC OF THE PILE OF GRAIN DURING THE REHYDRATION TRAVERSAL
2351

FIG. 23C

PERFORM AN EXTRACTION TRAVERSAL, BY THE ROBOT, OF THE PILE OF THE GRAIN DURING A LOAD-OUT OF GRAIN FROM THE BULK STORE, WHEREIN THE EXTRACTION TRAVERSAL MOVES GRAIN OF THE PILE OF GRAIN TOWARD AN EXTRACTION POINT
2360

CAPTURE, BY A SENSOR OF THE ROBOT, OF A MEASUREMENT OF A CHARACTERISTIC OF THE PILE OF GRAIN DURING THE EXTRACTION TRAVERSAL
2361

FIG. 23D

CAPTURE, BY A SENSOR OF THE ROBOT, OF A MEASUREMENT OF A CHARACTERISTIC OF THE LANDING ZONE PORTION OF THE PILE OF GRAIN DURING THE TRAVERSAL OF THE LANDING ZONE PORTION OF THE PILE OF GRAIN
2370

WIRELESSLY COMMUNICATE THE MEASUREMENT OF THE CHARACTERISTIC TO A COMPUTER SYSTEM LOCATED REMOTELY FROM THE ROBOT ALONG WITH A POSITION OF THE ROBOT AT A TIME OF THE MEASUREMENT
2371

IN RESPONSE TO A DRIVE SYSTEM OF A ROBOT BEING CONFIGURED WITH AUGER BASED SURFACE INTERFACE PORTIONS, CONTROL MOVEMENT OF THE ROBOT, VIA THE DRIVE SYSTEM, TO TRAVERSE ABOUT ATOP A FIRST SURFACE, WHEREIN THE FIRST SURFACE IS A SURFACE OF A PILED GRANULAR MATERIAL IN A BULK STORE
2710

IN RESPONSE TO THE DRIVE SYSTEM BEING CONFIGURED WITH CONTINUOUS TREAD SURFACE INTERFACE PORTIONS, CONTROL MOVEMENT OF THE ROBOT VIA THE DRIVE SYSTEM TO TRAVERSE ACROSS A SECOND SURFACE, WHEREIN THE SECOND SURFACE IS ONE OF A SOLID OR SEMI-SOLID SURFACE OTHER THAN THE SURFACE OF THE PILED GRANULAR MATERIAL
2720

FIG. 27A

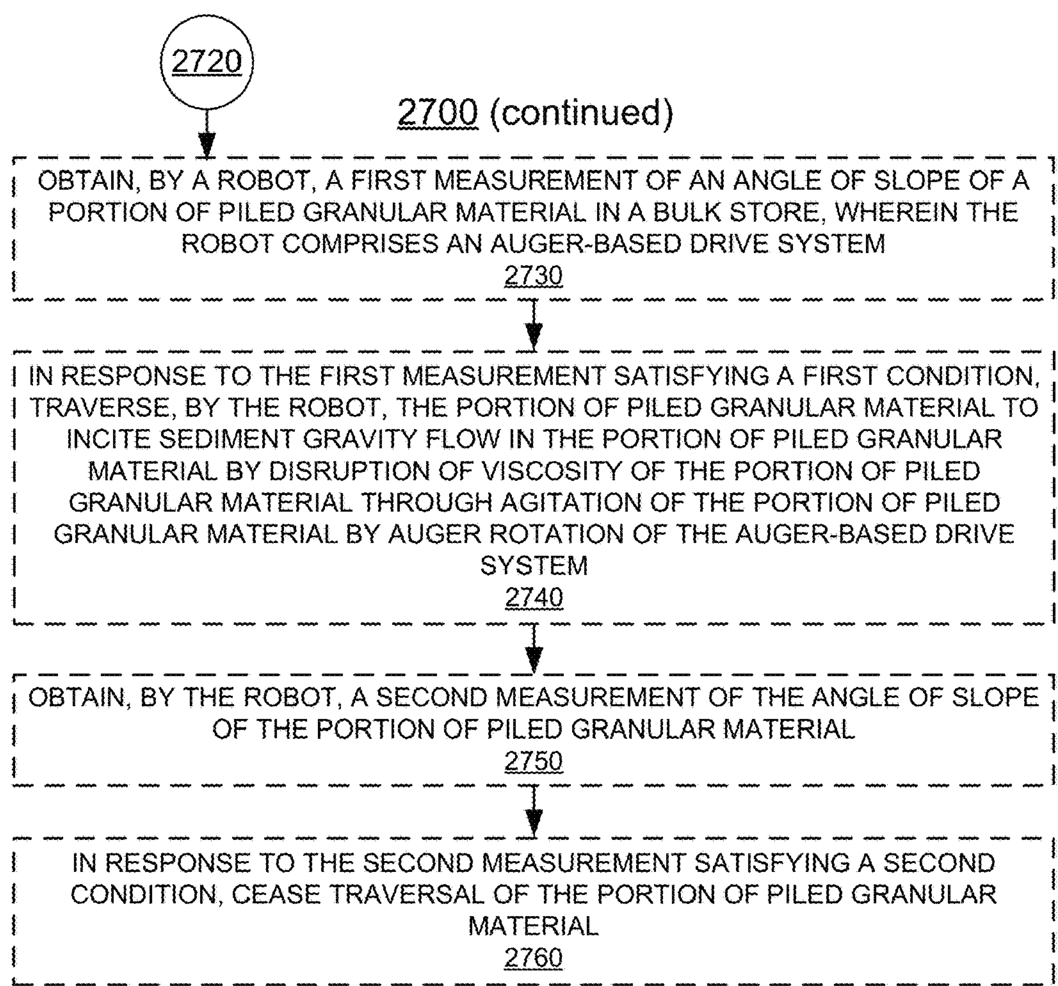

FIG. 27B 2700 (continued)

DIRECT THE ROBOT TO CONTINUE THE TRAVERSAL, BY THE ROBOT, ABOUT ATOP THE PORTION OF PILED GRANULAR MATERIAL IN RESPONSE TO THE SECOND MEASUREMENT FAILING TO SATISFY THE SECOND CONDITION
2770

2700 (continued)

CAPTURE, BY A SENSOR OF THE ROBOT, A MEASUREMENT OF A CHARACTERISTIC OF THE PILED GRANULAR MATERIAL DURING THE TRAVERSAL ABOUT ATOP THE FIRST SURFACE
2780

ROBOT WITH INTERCHANGEABLE DRIVE SYSTEM

REFERENCE TO RELATED APPLICATIONS

This application claims priority to and benefit of U.S. Provisional Patent Application No. 63/532,371 filed on Aug. 12, 2023 entitled "ROBOT WITH INTERCHANGEABLE DRIVE SYSTEM" by Juan Manuel Bogado Torres, et al., and assigned to the assignee of the present application, the disclosure of which is hereby incorporated herein by reference in its entirety.

This application is a continuation-in-part application of and claims priority to and benefit of co-pending U.S. patent application Ser. No. 18/316,393 filed on May 12, 2023 (now U.S. Pat. No. 12,576,374), entitled "GRAIN BIN MANAGEMENT DURING LOAD-IN" by Benjamin H. Johnson et al., and assigned to the assignee of the present application, the disclosure of which is hereby incorporated herein by reference in its entirety.

U.S. patent application Ser. No. 18/316,393 claims priority to and benefit of then U.S. Provisional Patent Application No. 63/343,141 filed on May 18, 2022 entitled "Grain Bin Management" by Benjamin H. Johnson et al., and assigned to the assignee of the present application, the disclosure of which is hereby incorporated herein by reference in its entirety.

U.S. patent application Ser. No. 18/316,393 is a continuation-in-part application of and claims priority to and benefit of then co-pending U.S. patent application Ser. No. 17/195,021 (now U.S. Pat. No. 12,037,185) filed on Mar. 8, 2021, entitled "Bulk Store Slope Adjustment" by Benjamin H. Johnson et al., and assigned to the assignee of the present application, the disclosure of which is hereby incorporated herein by reference in its entirety.

U.S. patent application Ser. No. 18/316,393 is a continuation-in-part application of and claims priority to and benefit of then co-pending U.S. patent application Ser. No. 17/982,590 (now U.S. Pat. No. 11,858,145) filed on Nov. 8, 2022, entitled "SURFACE MANAGEMENT OF PILED GRAIN" by Benjamin H. Johnson et al., and assigned to the assignee of the present application, the disclosure of which is hereby incorporated herein by reference in its entirety.

This application is a continuation-in-part application of and claims priority to and benefit of co-pending U.S. patent application Ser. No. 18/317,072 filed on May 13, 2023 (now U.S. Pat. No. 12,564,138), entitled "GRAIN BIN MANAGEMENT DURING GRAIN STORAGE" by Benjamin H. Johnson et al., and assigned to the assignee of the present application, the disclosure of which is hereby incorporated herein by reference in its entirety.

U.S. patent application Ser. No. 18/317,072 claims priority to and benefit of then U.S. Provisional Patent Application No. 63/343,141 filed on May 18, 2022 entitled "Grain Bin Management" by Benjamin H. Johnson et al., and assigned to the assignee of the present application, the disclosure of which is hereby incorporated herein by reference in its entirety.

U.S. patent application Ser. No. 18/317,072 is a continuation-in-part application of and claims priority to and benefit of then co-pending U.S. patent application Ser. No. 17/195,021 (now U.S. Pat. No. 12,037,185) filed on Mar. 8, 2021, entitled "Bulk Store Slope Adjustment" by Benjamin H. Johnson et al., and assigned to the assignee of the present application, the disclosure of which is hereby incorporated herein by reference in its entirety.

U.S. patent application Ser. No. 18/317,072 is a continuation-in-part application of and claims priority to and benefit of then co-pending U.S. patent application Ser. No. 17/982,590 (now U.S. Pat. No. 11,858,145) filed on Nov. 8, 2022, entitled "SURFACE MANAGEMENT OF PILED GRAIN" by Benjamin H. Johnson et al., and assigned to the assignee of the present application, the disclosure of which is hereby incorporated herein by reference in its entirety.

This application is a continuation-in-part application of and claims priority to and benefit of co-pending U.S. patent application Ser. No. 18/317,074 filed on May 13, 2023 (now U.S. Pat. No. 12,576,526), entitled "ROBOTIC GRAIN WALK DOWN IN A FLAT STORAGE BULK STORE" by Benjamin H. Johnson et al., and assigned to the assignee of the present application, the disclosure of which is hereby incorporated herein by reference in its entirety.

U.S. patent application Ser. No. 18/317,074 claims priority to and benefit of then U.S. Provisional Patent Application No. 63/343,141 filed on May 18, 2022 entitled "Grain Bin Management" by Benjamin H. Johnson et al., and assigned to the assignee of the present application, the disclosure of which is hereby incorporated herein by reference in its entirety.

U.S. patent application Ser. No. 18/317,074 is a continuation-in-part application of and claims priority to and benefit of then co-pending U.S. patent application Ser. No. 17/195,021 (now U.S. Pat. No. 12,037,185) filed on Mar. 8, 2021, entitled "Bulk Store Slope Adjustment" by Benjamin H. Johnson et al., and assigned to the assignee of the present application, the disclosure of which is hereby incorporated herein by reference in its entirety.

U.S. patent application Ser. No. 18/317,074 is a continuation-in-part application of and claims priority to and benefit of then co-pending U.S. patent application Ser. No. 17/982,590 (now U.S. Pat. No. 11,858,145) filed on Nov. 8, 2022, entitled "SURFACE MANAGEMENT OF PILED GRAIN" by Benjamin H. Johnson et al., and assigned to the assignee of the present application, the disclosure of which is hereby incorporated herein by reference in its entirety.

This application is a continuation-in-part application of and claims priority to and benefit of co-pending U.S. patent application Ser. No. 18/317,998 filed on May 16, 2023 (now U.S. Pat. No. 12,642,187), entitled "GRAIN MANAGEMENT IN A BULK STORE" by Benjamin H. Johnson et al., and assigned to the assignee of the present application, the disclosure of which is hereby incorporated herein by reference in its entirety.

U.S. patent application Ser. No. 18/317,998 claims priority to and benefit of then U.S. Provisional Patent Application No. 63/343,141 filed on May 18, 2022 entitled "Grain Bin Management" by Benjamin H. Johnson et al., and assigned to the assignee of the present application, the disclosure of which is hereby incorporated herein by reference in its entirety.

U.S. patent application Ser. No. 18/317,998 is a continuation-in-part application of and claims priority to and benefit of then co-pending U.S. patent application Ser. No. 17/195,021 (now U.S. Pat. No. 12,037,185) filed on Mar. 8, 2021, entitled "Bulk Store Slope Adjustment" by Benjamin H. Johnson et al., and assigned to the assignee of the present application, the disclosure of which is hereby incorporated herein by reference in its entirety.

U.S. patent application Ser. No. 18/317,998 is a continuation-in-part application of and claims priority to and benefit of then co-pending U.S. patent application Ser. No. 17/982,590 (now U.S. Pat. No. 11,858,145) filed on Nov. 8, 2022, entitled "SURFACE MANAGEMENT OF PILED GRAIN"

by Benjamin H. Johnson et al., and assigned to the assignee of the present application, the disclosure of which is hereby incorporated herein by reference in its entirety.

This application is a continuation-in-part application of and claims priority to and benefit of co-pending U.S. patent application Ser. No. 17/983,505 filed on Nov. 9, 2022, entitled "MAPPING PILED GRANULAR MATERIAL IN A BULK STORE" by Benjamin H. Johnson et al., and assigned to the assignee of the present application, the disclosure of which is hereby incorporated herein by reference in its entirety.

U.S. patent application Ser. No. 17/983,505 is a continuation-in-part application of and claims priority to and benefit of then co-pending U.S. patent application Ser. No. 17/195,021 (now U.S. Pat. No. 12,037,185) filed on Mar. 8, 2021, entitled "Bulk Store Slope Adjustment" by Benjamin H. Johnson et al., and assigned to the assignee of the present application, the disclosure of which is hereby incorporated herein by reference in its entirety.

U.S. patent application Ser. No. 17/983,505 claims priority to and benefit of then U.S. Provisional Patent Application No. 63/277,232 filed on Nov. 9, 2021, entitled "PRECISE PAYLOAD DELIVERY RELATIVE TO PILED GRANULAR MATERIAL" by Benjamin H. Johnson et al., and assigned to the assignee of the present application, the disclosure of which is hereby incorporated herein by reference in its entirety.

U.S. patent application Ser. No. 17/983,505 claims priority to and benefit of then U.S. Provisional Patent Application No. 63/320,791 filed on Mar. 17, 2022, entitled "MAPPING PILED GRANULAR MATERIAL IN A BULK STORE" by Benjamin H. Johnson et al., and assigned to the assignee of the present application, the disclosure of which is hereby incorporated herein by reference in its entirety.

This application is a continuation-in-part application of and claims priority to and benefit of co-pending U.S. patent application Ser. No. 18/377,471 filed on Oct. 6, 2023 (now U.S. Pat. No. 12,269,168), entitled "INCITING SEDIMENT GRAVITY FLOW IN PILED GRAIN" by Zane Zents et al., and assigned to the assignee of the present application, the disclosure of which is hereby incorporated herein by reference in its entirety.

U.S. patent application Ser. No. 18/377,471 is a continuation application of and claims priority to and benefit of then co-pending U.S. patent application Ser. No. 17/982,590 (now U.S. Pat. No. 11,858,145) filed on Nov. 8, 2022, entitled "SURFACE MANAGEMENT OF PILED GRAIN" by Benjamin H. Johnson et al., and assigned to the assignee of the present application, the disclosure of which is hereby incorporated herein by reference in its entirety.

This application is a continuation-in-part application of and claims priority to and benefit of co-pending U.S. patent application Ser. No. 18/377,414 filed on Oct. 6, 2023 (now U.S. Pat. No. 12,269,167), entitled "SURFACE MANAGEMENT OF PILED GRANULAR MATERIAL" by Benjamin H. Johnson et al., and assigned to the assignee of the present application, the disclosure of which is hereby incorporated herein by reference in its entirety.

U.S. patent application Ser. No. 18/377,414 is a continuation application of and claims priority to and benefit of then co-pending U.S. patent application Ser. No. 17/982,590 (now U.S. Pat. No. 11,858,145) filed on Nov. 8, 2022, entitled "SURFACE MANAGEMENT OF PILED GRAIN" by Benjamin H. Johnson et al., and assigned to the assignee of the present application, the disclosure of which is hereby incorporated herein by reference in its entirety.

U.S. patent application Ser. No. 17/982,590 claims priority to and benefit of then U.S. Provisional Patent Application No. 63/277,232 filed on Nov. 9, 2021, entitled "PRECISE PAYLOAD DELIVERY RELATIVE TO PILED GRANULAR MATERIAL" by Benjamin H. Johnson et al., and assigned to the assignee of the present application, the disclosure of which is hereby incorporated herein by reference in its entirety.

U.S. patent application Ser. No. 17/982,590 is a continuation-in-part application of and claims priority to and benefit of then co-pending U.S. patent application Ser. No. 17/195,021 (now U.S. Pat. No. 12,037,185) filed on Mar. 8, 2021, entitled "Bulk Store Slope Adjustment" by Benjamin H. Johnson et al., and assigned to the assignee of the present application, the disclosure of which is hereby incorporated herein by reference in its entirety.

This application is a continuation application of and claims priority to and benefit of co-pending U.S. patent application Ser. No. 18/650,523 filed on Apr. 30, 2024 (now U.S. Pat. No. 12,566,457), entitled "BULK STORE SLOPE ADJUSTMENT VIA TRAVERSAL INCITED SEDIMENT GRAVITY FLOW" by Benjamin H. Johnson et al., and assigned to the assignee of the present application, the disclosure of which is hereby incorporated herein by reference in its entirety.

U.S. patent application Ser. No. 18/650,523 is a continuation application of and claims priority to and benefit of then co-pending U.S. patent application Ser. No. 17/195,021 (now U.S. Pat. No. 12,037,185) filed on Mar. 8, 2021 entitled "BULK STORE SLOPE ADJUSTMENT" by Benjamin H. Johnson et al., and assigned to the assignee of the present application, the disclosure of which is hereby incorporated herein by reference in its entirety.

This application is a continuation application of and claims priority to and benefit of co-pending U.S. patent application Ser. No. 18/652,204 filed on May 1, 2024, entitled "TRAVERSAL BASED MIXTURE OF MOIST GRANULAR MATERIAL IN A BULK STORE" by Benjamin H. Johnson et al., and assigned to the assignee of the present application, the disclosure of which is hereby incorporated herein by reference in its entirety.

U.S. patent application Ser. No. 18/652,204 is a continuation application of and claims priority to and benefit of then co-pending U.S. patent application Ser. No. 17/195,021 (now U.S. Pat. No. 12,037,185) filed on Mar. 8, 2021 entitled "BULK STORE SLOPE ADJUSTMENT" by Benjamin H. Johnson et al., and assigned to the assignee of the present application, the disclosure of which is hereby incorporated herein by reference in its entirety.

U.S. patent application Ser. No. 17/195,021 claims priority to and benefit of then U.S. Provisional Patent Application No. 62/987,311 filed on Mar. 9, 2020, entitled "METHOD AND APPARATUS FOR SAFE GRAIN BIN/SILO GRAIN EXTRACTION ASSISTANCE" by Benjamin H. Johnson et al., and assigned to the assignee of the present application, the disclosure of which is hereby incorporated herein by reference in its entirety.

BACKGROUND

Some examples of granular material include, without limitation: grain (e.g., small hard and typically edible seeds or beans such as soybean seeds, peas, garbanzo beans, pinto beans, corn kernels, wheat, rice, etc.), non-grain plant seeds (e.g., flower seeds and grass seeds), nuts (e.g., shelled or unshelled tree nuts or ground nuts), sand, animal litter, concrete mix, cement, dry fertilizer, pelletized products (e.g., wood pellets, plastic pellets, hemp pellets, fish food pellets, etc.) and milled/ground products (e.g., flour, sugar, coffee, cocoa, guar, sodium bicarbonate, alumina, and mineral/rock aggregates, etc.). Granular material is often piled in a bulk store, either in the open or in a container such as a bin. Bulk stores, such as grain bins, are often hot, dirty, dusty, and dangerous workplaces. To adequately manage bulk stored granular materials farmers and/or other workers are required to enter bulk stores and/or climb about on the surface of a pile of the bulk stored granular material. Such interactions expose the farmer/worker to falls, entrapments, explosions, auger entanglements, heat stroke, and long-term conditions such as Farmer's Lung.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 4A-1, 4A-2, and 4A-3 illustrate front elevational views of the exterior of a device which moves about and/or operates in relation to a pile of granular material, in accordance with various embodiments.

FIGS. 4B-1 and 4B-2 illustrate rear elevational views of the exterior of a device which moves about and/or operates in relation to a pile of granular material, in accordance with various embodiments.

FIGS. 4C-1 and 4C-2 illustrate right elevational views of the exterior of a device which moves about and/or operates in relation to a pile of granular material, in accordance with various embodiments.

FIGS. 4D-1 and 4D-2 illustrate left elevational views of the exterior of a device which moves about and/or operates in relation to a pile of granular material, in accordance with various embodiments.

FIGS. 4E-1 and 4E-2 illustrate bottom plan views of the exterior of a device which moves about and/or operates in relation to a pile of granular material, in accordance with various embodiments.

FIGS. 8A-8E illustrate a flow diagram of an example method of bulk store slope adjustment, in accordance with various embodiments.

FIGS. 16A-16D illustrate a flow diagram of an example method of surface management of piled grain, in accordance with various embodiments.

FIGS. 17A-17E illustrate a flow diagram of an example method of mapping within a bulk store of granular material, in accordance with various embodiments.

FIGS. 19A-19E illustrate aspects of grain bin management via a device operating in a rectangular grain bin, in accordance with various embodiments.

FIGS. 20A-20F illustrate a flow diagram of an example method of grain bin management during load-in, in accordance with various embodiments.

FIGS. 21A-21I illustrate a flow diagram of an example method of grain bin management during grain storage, in accordance with various embodiments.

FIGS. 22A-22D illustrate a flow diagram of an example method of robotic grain walk down in a flat storage bulk store, in accordance with various embodiments.

FIGS. 23A-23E illustrate a flow diagram of an example method of grain management in a bulk store, in accordance with various embodiments.

FIGS. 27A-27D illustrate a flow diagram of an example method of operating a robot with an interchangeable drive system, in accordance with various embodiments.

DETAILED DESCRIPTION

Figure 1:
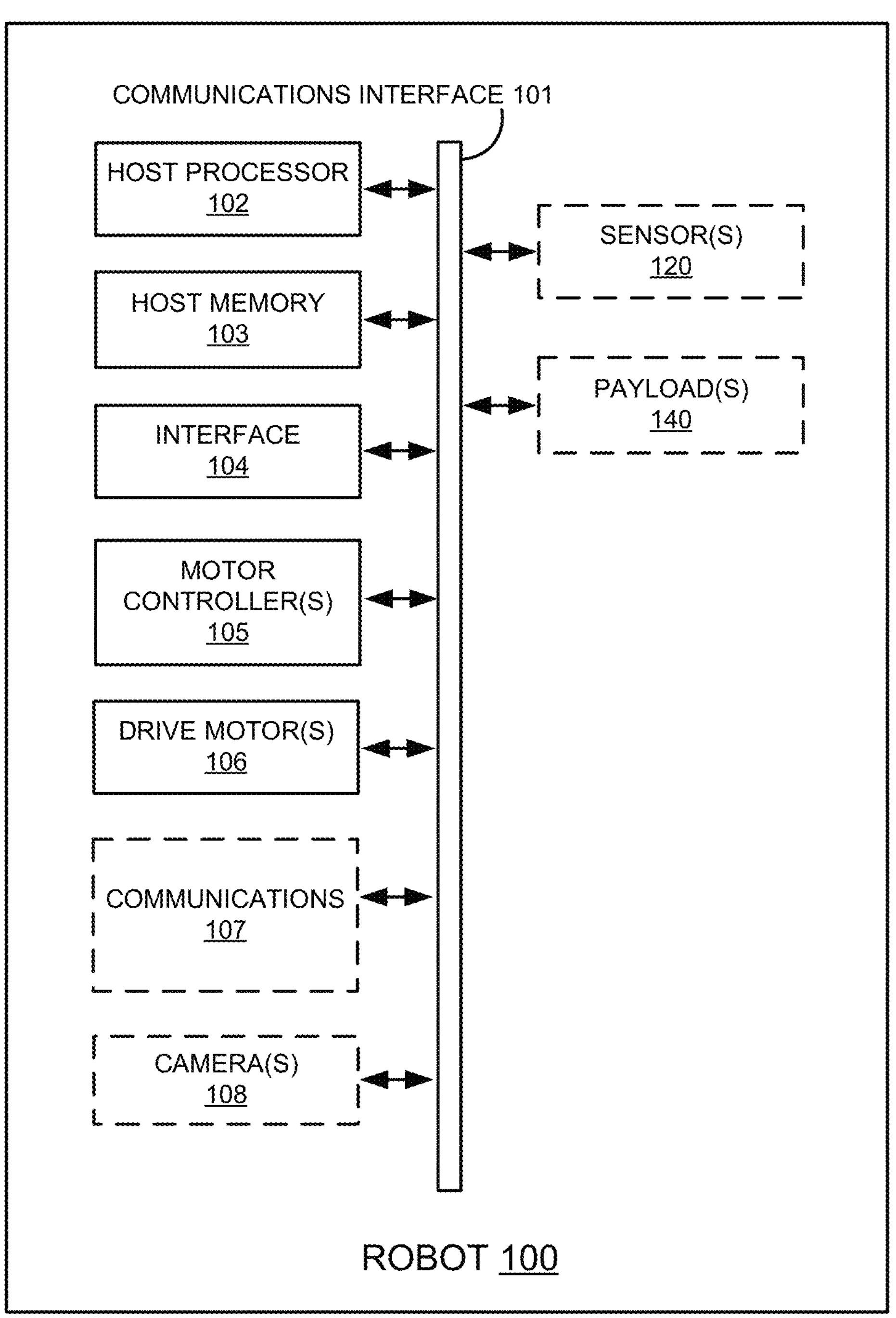
FIG. 1 shows an example block diagram of some aspects of a device which moves about and/or operates in relation to a pile of granular material, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

A device which can operate via remote controlled instruction, autonomously, or some combination thereof is described. The device is robotic and may be referred to herein as a "robot" or as a "robotic device," or the "device," and includes an auger-based drive system which facilitates the movement and/or operation of the device in relation to a portion of piled granular material in a bulk store, such as a grain bin. More particularly, because of the augers in the auger-based drive system, the device can operate and maneuver upon or beneath piled granular material. Additionally, and advantageously, augers of the auger-based drive system move, disrupt, agitate, and/or disperse piled granular material as a consequence of the movement of the device.

Although tracked and wheeled devices would seem to be alternatives to the auger-driven device described herein, both wheeled and tracked drive systems have been found ill-suited to operation on piled granular material. For example, wheeled and tracked devices are both easily bogged down when operating on piled granular material, such that they exhibit poor mobility in traversing atop/upon deeply piled granular material (e.g., over a foot deep, and sometimes not even that deep). In short, they get stuck and require human retrieval or intervention, which typically necessitates a human undesirably entering upon the pile of granular material such as grain.

Some examples of granular material include, without limitation: grain (e.g., small hard and typically edible seeds or beans such as soybean seeds, peas, garbanzo beans, pinto beans, corn kernels, wheat, rice, etc.), non-grain plant seeds (e.g., flower seeds and grass seeds), nuts (e.g., shelled or unshelled tree nuts or ground nuts), sand, animal litter, concrete mix, cement, dry fertilizer, pelletized products (e.g., wood pellets, plastic pellets, hemp pellets, fish food pellets, etc.) and milled/ground products (e.g., flour, sugar, coffee, cocoa, guar, sodium bicarbonate, alumina, and mineral/rock aggregates, etc.). Granular material is often piled (i.e., heaped up) in a bulk store.

A bulk store is the place where granular material is piled for bulk storage. Although a grain bin is frequently used herein as an example of a bulk store, nearly any bulk store which is large enough for a human to access and work inside or upon the stored granular material is a candidate for operation of the device described herein. Accordingly, it should be appreciated that other large bulk stores are also suitable bulk stores for use of the described device in relation to piled granular material in many of the manners described herein. Some examples of other large bulk stores include, but not limited to: containers (e.g., railcars, semi-trailers, barges, ships, and the like) for transport/storage of granular material, buildings (e.g., silos, bins, warehouses, flat storage, government grain storage, etc.) for storage of granular material, and open storage piles of granular material.

Bulk stored granular material can present many safety concerns for humans. For example, bulk stores are often hot, dusty, poorly lit, and generally inhospitable work environments for humans. Additionally, entrapments can take place when a farmer or worker is in a bin or other bulk store of granular material, such as grain, and the granular material slides onto or engulfs the person. Entrapments can happen because a slope angle of the piled granular material (e.g., grain) is at a critical angle which may slide when disturbed by the person or else when may slide when extraction augers or machinery disturb the bulk stored granular material. As one example, steep walls of grain can avalanche onto a farmer/worker trying to mitigate problems in a grain bin, inspect the stored grain, or agitate the grain to improve the outflow. Additionally, sometimes a bridge/crust layer can form over a void in a pile of grain and when a farmer/worker walks across it or tries to break it with force, the grain bridge can collapse and entrap the person. As this bridge/crust layer and/or the size of the void below it may be invisible to the human eye, it can present an unknown danger to a farmer/worker. As will be discussed, many of these and other safety concerns can be reduced or eliminated through use of the device and techniques/methods described herein.

Among other things, the device described herein can be used to address managing the quality of bulk stored granular material (e.g., grain in a bin) through tasks like, but not limited to: inspections of the bulk stored granular material, leveling of the bulk stored granular material, agitating of the bulk stored granular to prevent/reduce spoilage, dispersing of the bulk stored granular material while it is being loaded into the bulk store, assisting with rehydration of grain to a higher test weigh prior to extraction, assisting with extraction of grain, feeding a sweep auger or other collection device which removes the bulk stored granular material from the bulk store, and/or lowering the slope angles of the granular material in a partially emptied bulk store. In short, the device can accomplish numerous tasks which when done by the device preclude the need for humans to enter a bulk store, work on a pile of granular material, or else make it safer when it is necessary for humans to enter a bulk store or work on a pile of granular material. In various embodiments, these tasks may be carried out: by the device under remote-control of the device by an operator located outside the bulk store; by the device in an ad-hoc fashion; by the device in a partially automated fashion; and/or by the device in fully automated fashion. In short, employment of the device relative to a bulk stored granular material reduces or eliminates the requirement for a human to enter a bulk store or personally traverse the piled granular material. As a consequence, safety to humans is drastically improved with regard to tasks related to management of a bulk store. In an event where a human chooses to enter a bulk store, the device can manage/prepare the surface by removing crusts, grain bridges, and reducing slope so that the piled granular material is safer for human traversal.

Additionally, as an extension of the device traversing atop/upon the surface of piled granular material, the device can note and record its locations at a plurality of points on the surface such that a mapping of the three-dimensional contours of the upper surface of the piled granular material in the bulk store can be constructed of the points of location of the device. The mapping can further include environmental characteristics measured at respective locations upon the surface. Several surface maps can be sequentially captured during the fill of a bulk store such that when compiled a three-dimensional map is assembled which illustrates environmental characteristics not only on the surface of the piled granular material, but also beneath the existing surface at the levels of previous surfaces where mapping was accomplished prior to the filling of additional granular material. Such mappings have many beneficial uses. For example, a surface contour map can be combined with information regarding test weights (i.e., moisture levels) of piled grain and the location of the floor of the bulk store to estimate an amount of granular material (e.g., grain) stored in the bulk store (i.e., a number of bushels or other weight or volume). In another example, a surface contour map can be utilized to determine whether and where surface leveling should be performed by the device. In another example, an environmental characteristics map can indicate one or more areas of concern which may need to be cooled, dispersed, or otherwise attended to by the robotic device described herein. Put more generally, data collected by the device while traversing the surface of a piled granular material in a bulk store (e.g., a grain bin) is used to assist a human (e.g., a farmer, worker, etc.) in managing the bulk store and the piled granular material during loading, storage, and unloading of the piled granular material.

Additionally, as an extension of the device traversing atop/upon the surface of piled granular material and in some instances as a function of mapping as well, the device operates as a grain bin assistant in the management of the grain that is stored within a bulk store such as a grain bin. That is, the device may operate to assist with management a grain bin: prior to load-in of grain, during load-in of grain, after load-in, during storage, during extraction of grain, and/or during clean-out of grain from a bin. This may include one or more of: the device operating to level, map, acrate, and/or prepare the surface of any grain already in a grain bin to prepare the bin for load-in of additional grain; the device operating during load-in of a load of grain to disperse BGFM which typically accumulates in the landing zone of the loaded-in grain; the device operating during/after the load-in of a load of grain to level, map, remediate hot spots, and/or acrate the surface of grain; the device operating to prepare the upper surface of the loaded-in grain either for long term storage or load-in of an additional load; the device operating to maintain and/or inspect the surface of the grain during long term storage; the device operating to assist with rehydration of stored grain prior to extraction; the device operating to assist with extraction by leveling the surface, mapping the surface, and/or pushing grain to the center/extraction point through one or more of the action of the augers of the device and purposely inciting sediment gravity flow of grain; and/or the device operating with clean-out of the grain bin by running one or more patterns to move grain to a sweep auger or other extraction point/tool at the bottom of the bin through one or more of the action of the augers of the device and purposely inciting sediment gravity flow of grain.

Though a robot with an auger-based drive system is exceptionally suited to operation upon piled granular material (e.g., piled more than a few inches deep), other drive systems may be suitable for operation in bulk stores when the piled granular material is not piled to deeply (e.g., approximately a foot or less in depth); for example, a wheeled or continuous tread (i.e., tracked) robot may operate efficiently in such situations. Additionally, a robot which has a wheeled or continuous tread drive system may get greater traction/purchase in situations where granular material is very shallow (e.g., less than a few inches) or is scattered in small piles on a bare surface, or when performing tasks such as pushing a broom, blade, shovel, or blower to clean out remnants of granular material from a nearly empty bulk store. In some embodiments, as described herein, a robot may have an interchangeable drive system which allows swapping augers for either continuous treads or tracks, based upon the use of the robot/task being performed and/or the nature of the operating conditions such as the type of surface being traversed.

Discussion begins with a description of notation and nomenclature. Additional discussion is divided into sections. In Section 1, discussion is directed to description of some block diagrams of example components of some examples of a robotic auger-driven "device" which moves about and/or operates in relation to a bulk stored pile of granular material. A variety of sensors and payloads which may be included with and/or coupled with the device are described. Numerous example views of the exterior of a device are presented and described, to include description of the auger-based drive system of the device. Several systems for remote-controlled semi-autonomous, and autonomous operation of the device are described. Additionally, systems and techniques for storing information from the device and/or providing information and/or instructions to the device are described. In Section 2, an example bulk store for granular material is then depicted and described in conjunction with operation of the device in relation to piled granular material in the bulk store. Operation of the device and components thereof, to include some sensors of the device, are discussed in conjunction with a variety of methods/modes of operation. For example, operation of the device is discussed in conjunction with description of an example method of bulk store leveling. Additionally, operation of the device and system in which it is included are discussed in conjunction with example methods of mapping, by or with the device of piled granular material in a bulk store and/or in conjunction with positioning one or more probes onto the surface of the piled granular material. In Section 3, operation of the device and system in which it is included are discussed in conjunction with example methods and techniques for managing a grain bin/bulk store and the grain stored within it. In Section 4, an interchangeable drive system is described which has interchangeable surface interface portions which may be swapped based on operating conditions of the robot or a particular use of the robot.

Section 1

Notation and Nomenclature Enter Information Here

Some portions of the detailed descriptions which follow are presented in terms of procedures, logic blocks, processes, modules, and other symbolic representations of operations on data bits within a computer memory. These descriptions and representations are the means used by those skilled in the data processing arts to most effectively convey the substance of their work to others skilled in the art. In the present application, a procedure, logic block, process, module, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "additionally traversing," "assembling," "capturing," "ceasing," "ceasing traversal," "collecting," "communicating," "communicatively coupling," "continuing," "continuing traversal," "controlling," "coupling," "delivering," "depositing," "determining," "directing," "directing traversal," "failing to satisfy," "inciting," "instructing," "mapping," "measuring," "obtaining," "performing," "placing," "providing," "providing access," "receiving," "receiving data," "receiving instructions," "recording," "relaying," "responding," "satisfying," "sending," "sensing," "traversing," "using," and "utilizing," or the like, refer to the actions and processes of an electronic device or component such as (and not limited to): a host processor, a sensor processing unit, a sensor processor, a digital signal processor or other processor, a memory, a sensor (e.g., a temperature sensor, motion sensor, etc.), a computer, a remote controller, a device which moves about and/or operates in relation to a portion of piled granular material, some combination thereof, or the like. The electronic device/component manipulates and transforms data represented as physical (electronic and/or magnetic) quantities within the registers and/or memories into other data similarly represented as physical quantities within memories and/or registers or other such information storage, transmission, processing, and/or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory computer/processor-readable storage medium comprising computer/processor-readable instructions that, when executed, cause a processor and/or other components of a computer, computer system, or electronic device to perform one or more of the methods and/or actions of a method described herein. The non-transitory computer/processor-readable storage medium may form part of a computer program product, which may include packaging materials.

The non-transitory processor-readable storage medium (also referred to as a non-transitory computer-readable storage medium) may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a plurality of microprocessors, one or more microprocessors in conjunction with an ASIC or DSP, or any other such configuration or suitable combination of processors.

Example Block Diagrams of a Device which Moves about and/or Operates in Relation to a Pile of Granular Material FIG. 1 shows an example block diagram of some aspects of a device 100 which moves about and/or operates in relation to a pile of granular material, in accordance with various embodiments. As previously discussed, device 100 may be referred to as a robot and/or robotic device, and device 100 may carry out some or all of its functions and operations based on stored instructions.

As shown, example device 100 comprises a communications interface 101, a host processor 102, host memory 103, an interface 104, motor controllers 105, and drive motors 106. In some embodiments, device 100 may additionally include one or more of communications 107, a camera(s) 108, one or more sensors 120, and/or one or more payloads 140.

Communications interface 101 may be any suitable bus or interface which facilitates communications among/between components of device 100. Examples of communications interface 101 include a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces.

The host processor 102 may, for example, be configured to perform the various computations and operations involved with the general function of device 100 (e.g., sending commands to move, steer, avoid obstacles, and operate/control the operation of sensors and/or payloads). Host processor 102 can be one or more microprocessors, central processing units (CPUs), DSPs, general purpose microprocessors, ASICs, ASIPs, FPGAs or other processors which run software programs or applications, which may be stored in host memory 103, associated with the general functions and capabilities of device 100.

Host memory 103 may comprise programs, modules, applications, or other data for use by host processor 102. In some embodiments, host memory 103 may also hold information that that is received from or provided to interface 104, motor controller(s) 105, communications 107, camera(s) 108, sensors 120, and/or payloads 140. Host memory 103 can be any suitable type of memory, including but not limited to electronic memory (e.g., read only memory (ROM), random access memory (RAM), or other electronic memory).

Interface 104 is an external interface by which device 100 may receive input from an operator or instructions. Interface 104 is one or more of a wired or wireless transceiver which may provide connection to an external transmission source/recipient for receipt of instructions, data, or direction to device 100 or offload of data from device 100. One example of an external transmission source/external recipient may be a base station to which device 100 communicates collected data or from which device 100 receives instructions or direction. Another example of an external transmission source/recipient is a handholdable remote-controller to which device 100 communicates collected data or from which device 100 receives instructions or direction. By way of example, and not of limitation, in various embodiments, interface 104 may comprise one or more of: a cellular transceiver, a wireless local area network transceiver (e.g., a transceiver compliant with one or more Institute of Electrical and Electronics Engineers (IEEE) 802.11 specifications for wireless local area network communication (e.g., WiFi)), a wireless personal area network transceiver (e.g., a transceiver compliant with one or more IEEE 802.15 specifications (or the like) for wireless personal area network communication), and a wired a serial transceiver (e.g., a universal serial bus for wired communication).

Motor controller(s) 105 are mechanism(s), typically circuitry and/or logic, which operate under instruction from processor 102 to drive one or more drive motors 106 with electricity to govern/control the direction and/or speed of rotation of the drive motor(s) 106 and/or or other mechanism of movement to which the drive motor(s) 106 are coupled (such as augers). Motor controller(s) 105 may be integrated with or separate from drive motor(s) 106.

Drive motor(s) 106 are electric motors which receive electrical input from motor controller(s) 105 and turn a shaft in a direction and/or speed responsive to the electrical input. In some embodiments, drive motors 106 may be coupled directly to a mechanical means of drive motivation and steering—such as one or more augers. In some embodiments, drive motors 106 may be coupled indirectly, such as via a gearing or a transmission, to a mechanical means of drive motivation and steering—such as one or more augers.

Communications 107, when included, may comprise external interfaces in addition to those provided by interface 104. Communications 107 may facilitate wired and/or wireless communication with devices external to and in some instances remote (e.g., many feet or even many miles away) from device 100. Communications protocols may include those used by interface 104 as well as others. Some examples include, but are not limited to: WiFi, LoRaWAN (e.g., long range wireless area network communications on the license-free sub-gigahertz radio frequency bands), IEEE 802.15.4-2003 standard derived communications (e.g., xBee), IEEE 802.15.4 based or variant personal area network (e.g., Bluetooth, Bluetooth Low Energy, etc.), cellular, and connectionless wireless peer-to-peer communications (e.g., ESP-NOW). In various aspects, communications 107 may be used for data collection/transmission, reporting of autonomous interactions of device 100, and/or user interface and/or operator interface with device 100.

Camera(s) 108 may comprise, without limitation: any type of optical sensor or infrared image sensor for capturing still or moving images. Some examples of suitable cameras include charge-coupled device (CCD) sensor cameras, metal-oxide semiconductor (MOS) sensor cameras, and other digital electronic cameras. Captured images may be utilized by device 100 for purposes such as navigation and decision making, may be stored, and/or may be transmitted to devices external to device 100. In some embodiments, camera(s) 108 facilitate wayfinding for device 100 when operating autonomously or semi-autonomously. In some embodiments, camera(s) 108 facilitates a remote view for an operator when device 100 is manually driven by a human user via a remote controller or computer system communicatively coupled with device 100. In some embodiments, an infrared camera 108 is used to find hotspots of grain to mix or agitate with device 100 (to reduce the heat of the hotspot). In some embodiments, computer vision is used by device 100 to make autonomous decisions based on inputs to processor 102 from camera(s) 108.

Figure 2:
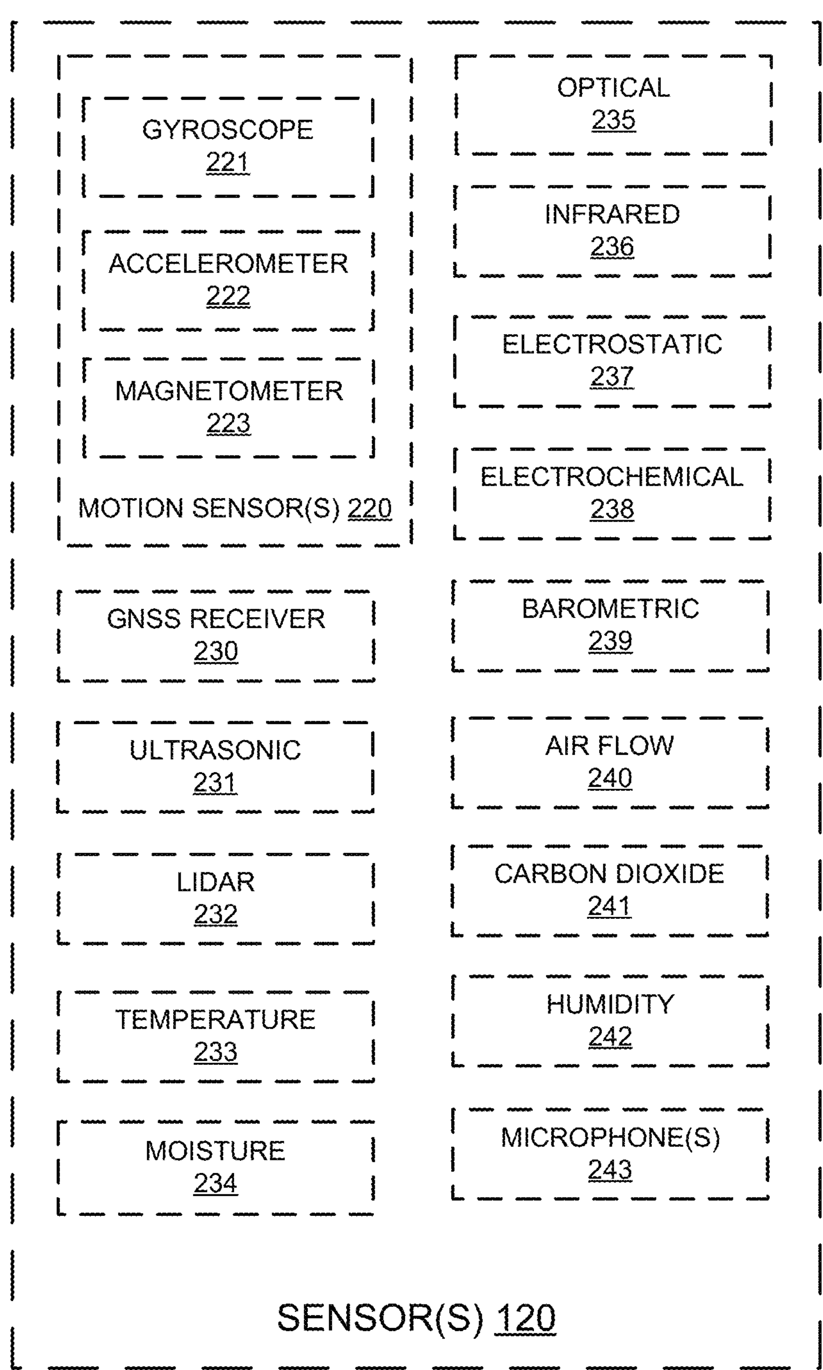
FIG. 2 shows a block diagram of a collection of sensors, any, or all of which may be incorporated into the device of FIG. 1, in accordance with various embodiments.

FIG. 2 shows block diagram of a collection of sensors 120, any or all of which may be incorporated device 100 of FIG. 1, in accordance with various embodiments. Sensors 120 illustrate a non-limiting selection of sensors, which include: motion sensor(s) 220, GNSS (Global Navigation Satellite System) receiver 230, ultrasonic transducer 231, LIDAR (light detection and ranging/laser imaging, detection, and ranging) 232, temperature sensor 233, moisture sensor 234, optical sensor 235, (e.g., an optical camera), infrared sensor 236 (which may be a receiver such as an infrared camera or an emitter/receiver), electrostatic sensor 237, electrochemical sensor 238, a barometric pressure sensor 239, an air flow sensor 240, a carbon dioxide sensor 241, and a humidity sensor.

It is appreciated that one or more sensors may be combined. For example, several sensors may be combined in a device such as the ICM-20789 microelectromechanical sensor (available from InvenSense, a TDK group company, of San Jose, CA) which provides 7-axis sensing (3-axis accelerometer, 3-axis gyroscope, and 1-axis barometric pressure (for measuring elevation changes to less than 8.5 cm accuracy)) along with an on-board digital motion processor. In other embodiments, separate sensors may be used; for example, a stand-alone pressure sensor 239 may measure elevation, via differential barometric pressure measurement, of as little as 5 cm (e.g., InvenSense sensor ICP-10101, as one example) while a motion sensor 220 includes an accelerometer 222 for measuring movement and a gyroscope 221 for measuring direction of movement). Other sensors may be additionally or alternatively included in some embodiments, for example a carbon dioxide sensor 241, and humidity 242. may be included to measure off-gassed carbon dioxide from piled grain, and/or an air flow sensor may be included to measure air flow through and around piled grain (air flow is used for drying the pile of grain but must be controlled to prevent over drying or undesired rehydration). In some embodiments, one or more microphones 243, may be included as sensors. For example, an array of microphones may be used with a beamforming technique to locate the directional source of a sound, such as falling granular material being poured, conveyed, streamed, or augured into a bulk store. Some embodiments may additionally, or alternatively, include other sensors not described.

In general, individual sensors 120 operate to detect motion, position, timing, and/or some aspect of environmental context (e.g., temperature, atmospheric humidity, moisture of a sample or probed portion of granular material, distance to an object, shape of an object, solidity of a material, light or acoustic reflectivity, ambient charge, atmospheric pressure, presence of certain chemical(s), noise/sound, etc.). For example, in an embodiment where the piled granular material is grain, many of sensors 120 are used to determine the state of the grain (e.g., temperature, moisture, electrostatic charge, etc.). In some embodiments, one or more sensors 120 are used for fall detection, orientation, and to aid in autonomous direction of movement of device 100. For example, by detecting temperature of grain, device 100 may determine hot spots which need to be mixed by traversal with device 100 or by other means. Similarly, by detecting moisture of grain, device 100 may determine moist spots which need to be mixed by traversal with device 100 or by other means. By detecting an electrostatic and/or electrochemical aspect of the atmosphere in a grain bin, a level of dust or other particulates and/or likelihood of an explosion may be detected in order to gauge safety for a human and/or safety for operating device 100.

Some embodiments may, for example, comprise one or more motion sensors 220. For example, an embodiment with a gyroscope 221, an accelerometer 222, and a magnetometer 223 or other compass technology, which each provide a measurement along three axes that are orthogonal relative to each other, may be referred to as a 9-axis device. In another embodiment three-axis accelerometer 222 and a three-axis gyroscope 221 may be used to form a 6-axis device. Other embodiments may, for example, comprise an accelerometer 222, gyroscope 221, compass, and pressure sensor, and may be referred to as a 10-axis device. Other embodiments may not include all these motions sensors or may provide measurements along one or more axes. In some embodiments, motion sensors 220 may be utilized to determine the orientation of device 100, the angle of slope or inclination of a surface upon which device 100 operates, the velocity of device 100, and/or the acceleration of device 100. In various embodiments, measurements from motion sensors 220 may be utilized by host processor 102 to measure direction and distance of travel and may operate as an inertial navigation system (INS) suitable for controlling and/or monitoring maneuvering of device 100 in a bulk store (e.g., within a grain bin). In some embodiments, motion sensors 220 may be used for fall detection. In some embodiments, motions sensor(s) 220 may be used to detect vibrations in the granular material proximate to device 100.

Figure 3:
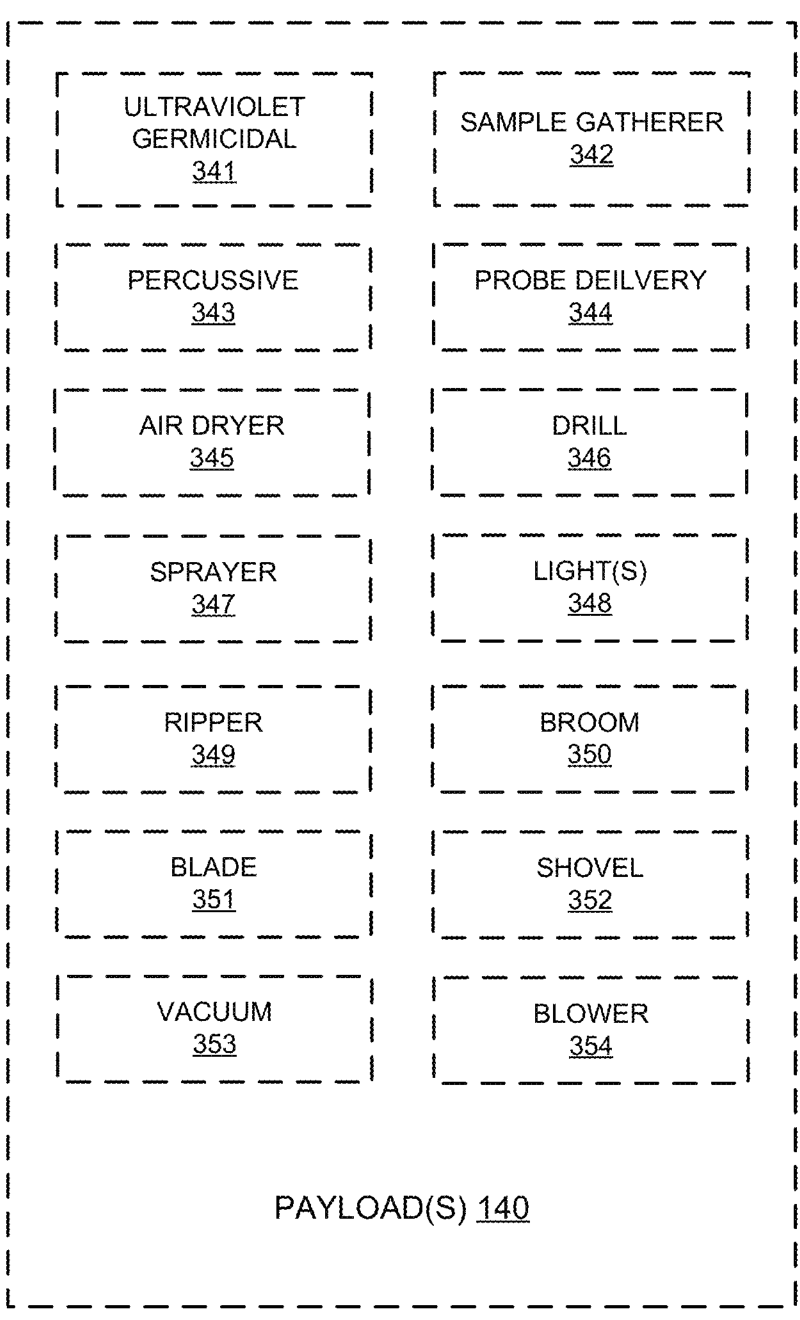
FIG. 3 shows a block diagram of a collection of payloads, any, or all of which may be incorporated into the device of FIG. 1, in accordance with various embodiments.

FIG. 3 shows a block diagram of a collection of payloads 140, any or all of which may be incorporated device 100 of FIG. 1, in accordance with various embodiments. Payloads 140 illustrate a non-limiting selection of payloads, which include: ultraviolet germicidal 341, sample gatherer 342, percussive payload 343, probe/sensor delivery 344, air dryer 345, drill 346, sprayer 347, lights 348, ripper 349, broom 350, blade 351, shovel 352, vacuum 353, and/or a blower 354.

Ultraviolet germicidal payload 341, when included, emits ultraviolet light to kill germs by irradiating in the proximity of device 100. Sample gatherer payload 342, when included, provides one or more containers or bays for gathering one or more samples of granular material from a pile of granular material upon which device 100 operates. Percussive payload 343, when included, operates to vibrate, or percussively impact piled granular material touching or in the proximity of device 100. Probe/sensor delivery payload 344, when included, operates to insert one or more probes or sensors into piled granular material upon which device 100 operates and/or to position one or more probes onto piled granular material upon which device 100 operates. Air dryer payload 345, when included, provides a fan and/or heater for drying piled granular material proximate to device 100. Drill payload 346, when included, operates to bore into and/or sample piled granular material and/or break up crusts or aggregations of piled granular material proximate to device 100. Sprayer payload 347, when included, operates to spray fungicide, insecticide, or other liquid or powdered treatments onto piled granular material proximate device 100. Lights payload 348, when included, emit optical and/or infrared illumination in proximity of device 100. Ripper payload 349, when included, comprises one or more blades, tines, or the like and is used to rip into, agitate, and/or break up crusts or chunks of aggregated granular material proximate device 100. Blade 351, when included, may be a fixed or movable blade (e.g., similar to a dozer blade) for pushing/sweeping granular material in the path of traversal of device 100. Shovel 352, when included, may be a fixed or movable shovel (e.g., similar in appearance/function to a show shovel) relative to device 100 and is used for pushing/scooping/shoveling granular material in the path of traversal of device 100. In some embodiments, blade 351 and shovel 352 may have some similarity and perform some functions which overlap, though a blade 351 is generally suited more toward pushing than scooping granular material, while and while a shovel 352 may push granular material it is generally better configured for scooping than blade 351. Vacuum 353, when included, may be a powered vacuum that is fixed or movable relative to device 100 and is used for sucking up and storing granular material in the path of traversal of device 100. Blower 354, when included, may be a powered air blower that is fixed or movable relative to device 100 and is used for blowing granular material in the path of traversal of device 100.

It should be appreciated that various payloads may be delivered, where delivery includes leaving or expelling the payload or a portion thereof at a designated location. For example, delivery can include leaving/installing a probe or sensor. Delivery may also include spraying or spreading a substance such as, but not limited to: a coolant, a flame retardant, an insecticide, a fungicide, or other liquid, gas, or powder.

In various embodiments, one or some combination of payloads 140 may be included in a payload bay of device 100. In some embodiments, the payload bay is fixed in place. In some embodiments, the payload bay may be removably coupled to device 100 to facilitate swapping it for another payload bay to quickly reconfigure device 100 with various different payloads.

Example External Views of a Device which Moves about and/or Operates in Relation to a Pile of Granular Material FIGS. 4A-1, 4A-2, and 4A-3 illustrate front elevational views of the exterior of a device 100 which moves about and/or operates in relation to a pile of granular material, in accordance with various embodiments.

Figures 1, 4A:
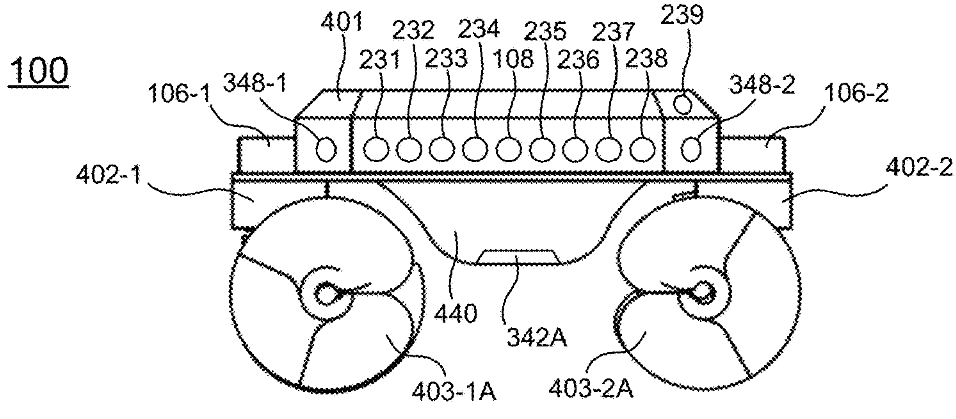
Figures 2, 4A:
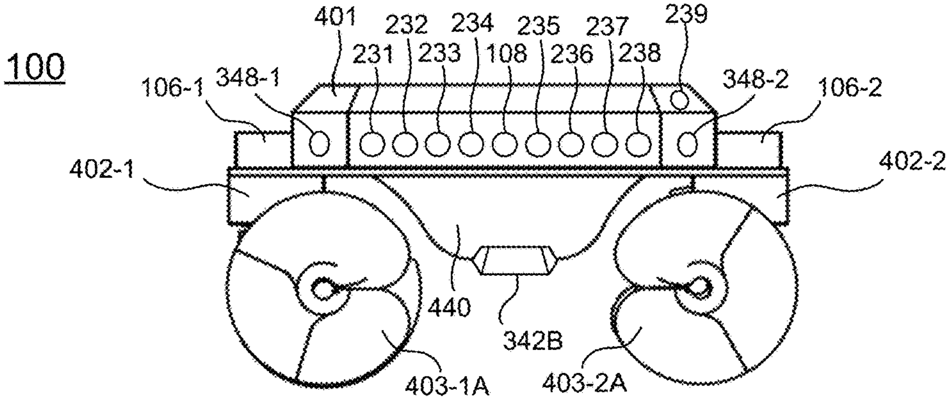
Figures 3, 4A:
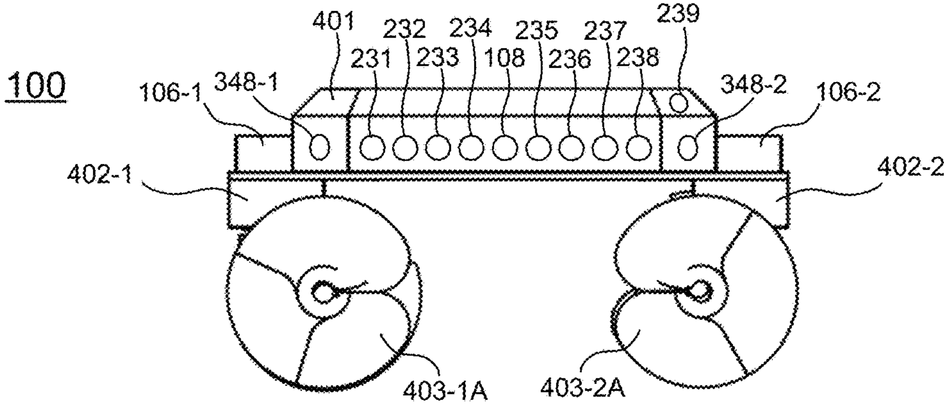

With reference to FIG. 4A-1, device 100 includes a body 401, motors 106 (106-1 and 106-2), transmissions 402 (402-1 and 402-2), and augers 403 (403-1 and 403-2). In the illustrated embodiment of device 100, a pair of bilateral augers 403 is utilized. In some embodiments, a drive motor 106 may be coupled to an auger 403 (such as to the end of an auger 403) in a manner that eliminates the need of a transmission 402 between the drive motor 106 and the auger 403. In the depicted embodiments, the transmission is located near the middle of each auger 403, thus bifurcating each auger into two portions. In FIG. 4A-1, the front portion 403-1A of auger 403-1 is visible, as is the front portion 403-2A of auger 403-2. In typical operation, augers 403 sink at least partially into the piled granular material and thrust against it as they rotate. The direction and speed of rotation of the augers 403 determines the movement fore, aft, left, right, turning left, and/or turning right of device 100. In this manner, in various embodiments, device 100 can move atop a pile of granular material, can move beneath a pile of granular material (i.e., submerged in it), and can move to the surface after being submerged in a pile of granular material.

In some embodiments, device 100 includes one or more payloads 140. For example, lights payloads 348 (348-1 and 348-2) are included to provide illumination. In some embodiments, device 100 may additionally or alternatively include a payload bay 440 which may be fixed to device 100 or removably couplable with device 100. The payload bay 440 may provide a housing for one or more of the payloads 140 discussed herein and/or for other payloads. As one example, payload bay 440 may include sample gatherer payload 342 (show in the closed, non-sample gathering position as 342A). In some embodiments, one or more cameras 108 are included and coupled with body 401. In some embodiments, one or more sensors 120 are included and coupled with body 401 in a manner which provides access to the external environment of device 100. For example, one or more of ultrasonic transducer 231, LIDAR 232, temperature sensor 233, moisture sensor 234, optical sensor 235, infrared sensor 236, electrostatic sensor 237, and electrochemical sensor 238 may be included in a manner which provides sensor access to the operating environment of device 100.

Referring now to FIG. 4A-2, device 100 is illustrated with sample gatherer payload 342 in an open, sample gathering position 342B, to scoop up a sample of granular material as device 100 moves forward with sample gatherer payload open and submerged into the piled granular material upon which device 100 operates.

Referring now to FIG. 4A-3, device 100 is illustrated without payload bay 440. This illustrates a configuration of device 100 in which payload bay 440 has been removed or else device 100 is not configured to support a payload bay 440.

Figures 1, 4B:
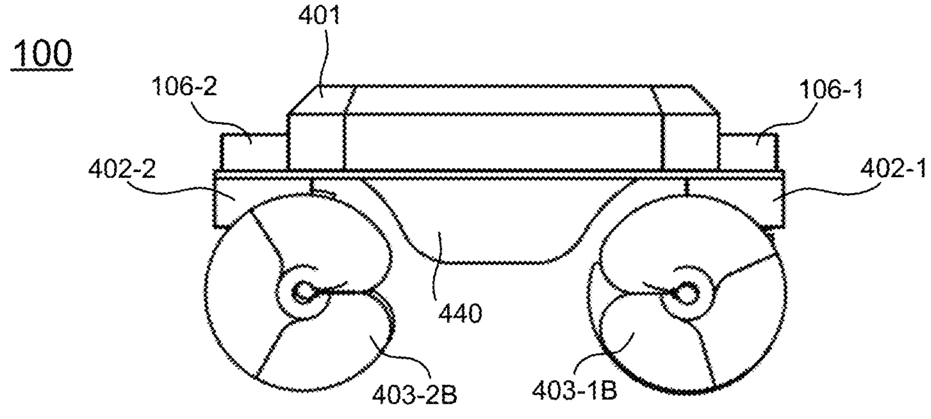
Figures 2, 4B:
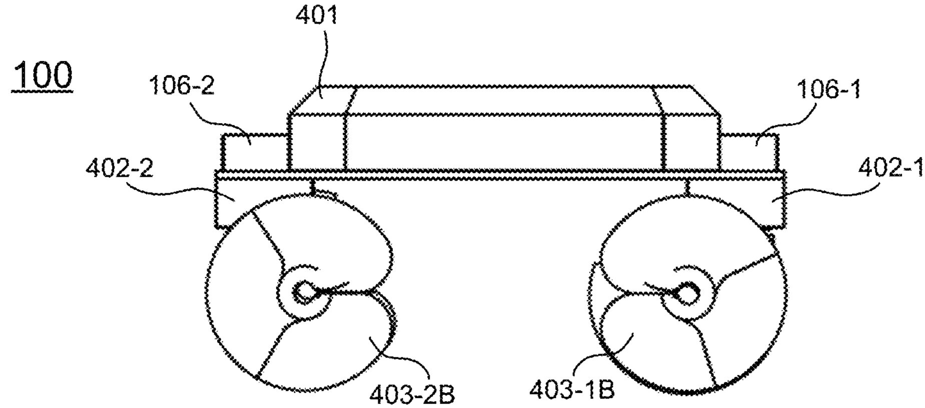

FIGS. 4B-1 and 4B-2 illustrate rear elevational views of the exterior of a device 100 which moves about and/or operates in relation to a pile of granular material, in accordance with various embodiments.

With reference to FIG. 4B-1, the rear portion 403-1B of auger 403-1 is visible, as is the rear portion 403-2B of auger 403-2.

With reference to FIG. 4B-2, device 100 is illustrated without payload bay 440. This illustrates a configuration of device 100 in which payload bay 440 has been removed or else device 100 is not configured to support a payload bay 440.

Figures 1, 4C:
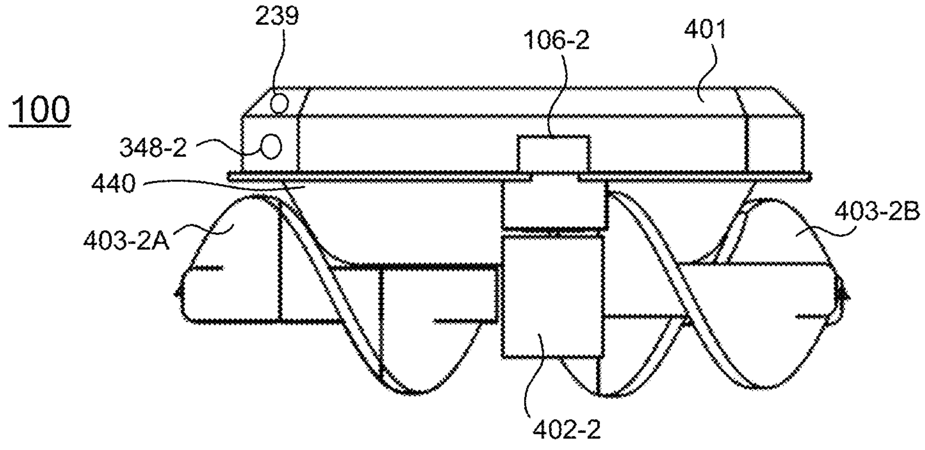
Figures 2, 4C:
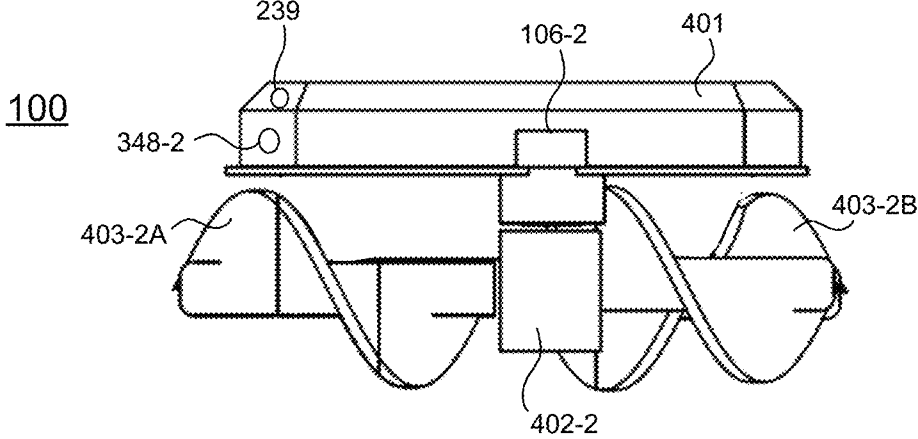

FIGS. 4C-1 and 4C-2 illustrate right elevational views of the exterior of a device 100 which moves about and/or operates in relation to a pile of granular material, in accordance with various embodiments.

With reference to FIG. 4C-1, the full span of auger 403-2 is visible, including front portion 403-2A and rear portion 403-2B, as is the drive motor 106-2 and transmission 402-2 which drive auger 403-2. An auger-based drive system includes, for example, drive motors 106, and augers 403, and may include transmissions 402. In some embodiments, motor controllers 105 may also be considered a portion of an auger-based drive system. This lateral side of the auger-based drive system of device 100 comprises drive motor 106-2, transmission 402-2, and auger 403-2. As has been discussed, other embodiments may directly drive the auger with the drive motor, thus eliminating the transmission from the auger-based drive system.

With reference to FIG. 4C-2, device 100 is illustrated without payload bay 440. This illustrates a configuration of device 100 in which payload bay 440 has been removed or else device 100 is not configured to support a payload bay 440.

Figures 1, 4D:
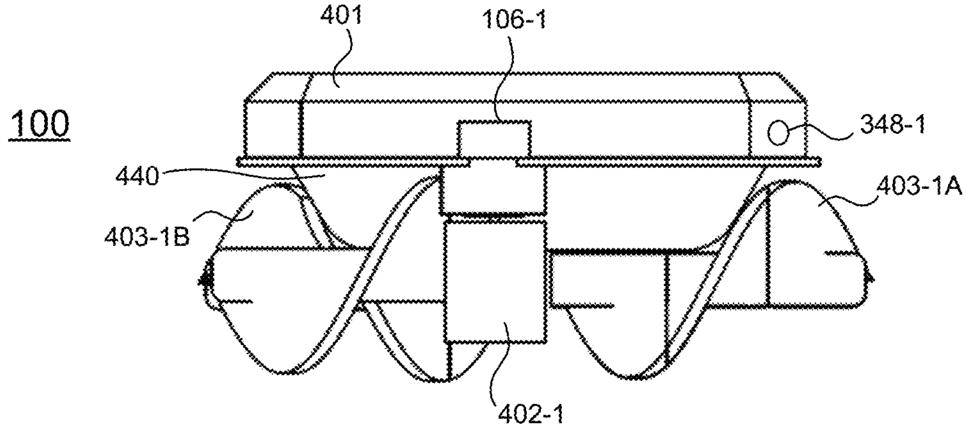
Figures 2, 4D:
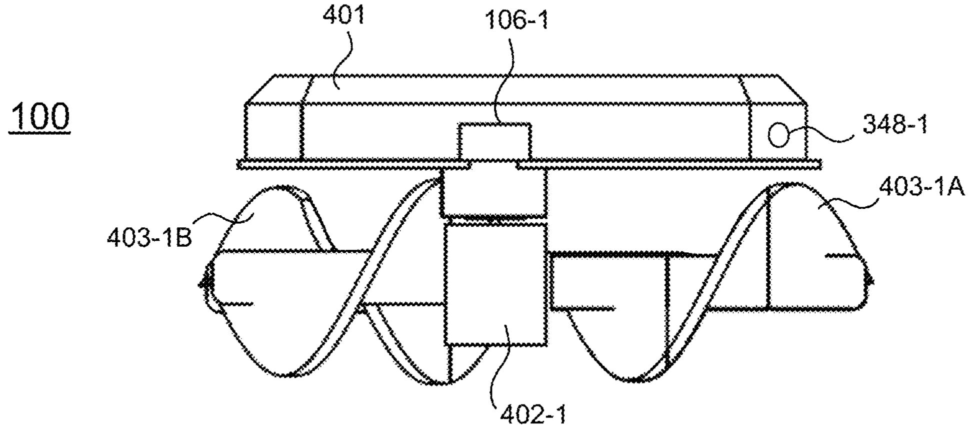

FIGS. 4D-1 and 4D-2 illustrate left elevational views of the exterior of a device 100 which moves about and/or operates in relation to a pile of granular material, in accordance with various embodiments.

With reference to FIG. 4D-1, the full span of auger 403-1 is visible, including front portion 403-1A and rear portion 403-1B, as is the drive motor 106-1 and transmission 402-1 which drives auger 403-1. This lateral side of the auger-based drive system of device 100 comprises drive motor 106-1, transmission 402-1, and auger 403-1. As has been discussed, other embodiments may directly drive the auger with the drive motor, thus eliminating the transmission from the auger-based drive system.

With reference to FIG. 4D-2, device 100 is illustrated without payload bay 440. This illustrates a configuration of device 100 in which payload bay 440 has been removed or else device 100 is not configured to support a payload bay 440.

Figures 1, 4E:
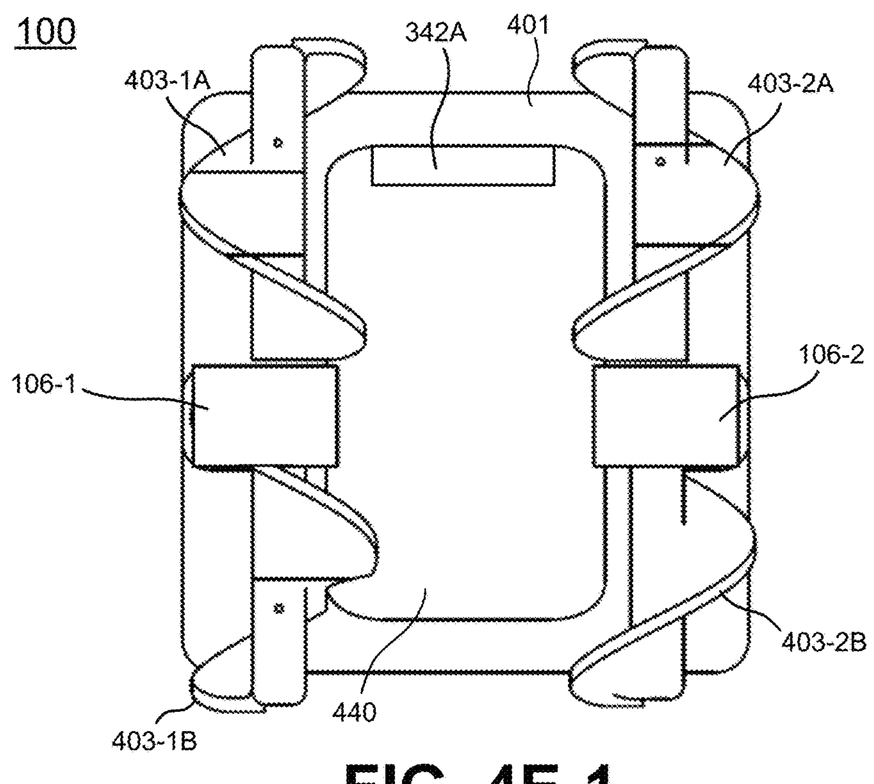
Figures 2, 4E:
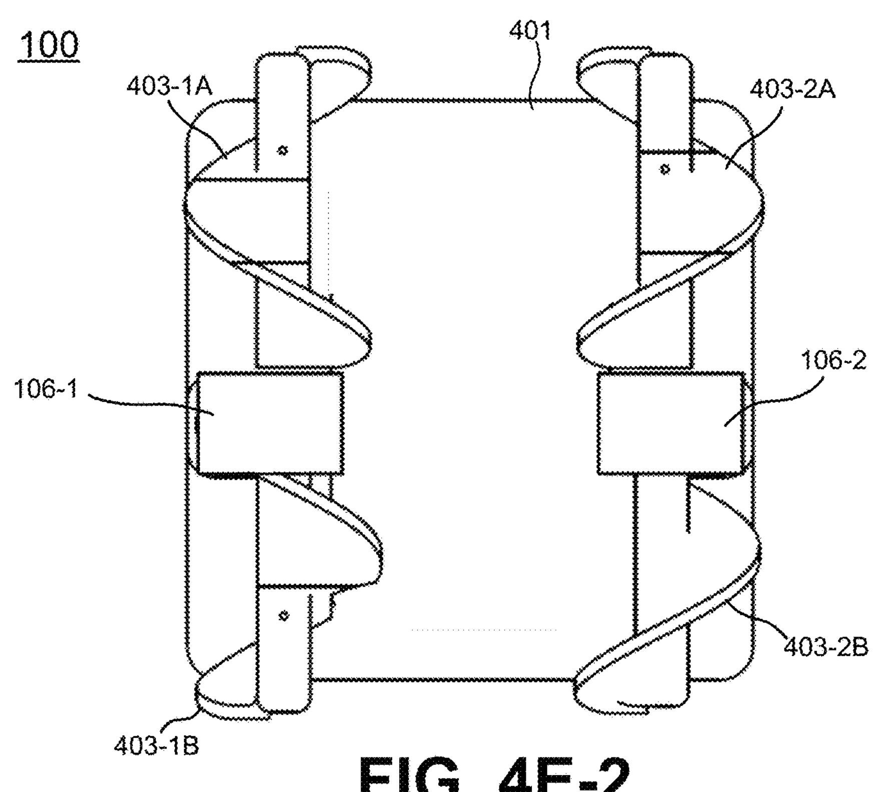

FIGS. 4E-1 and 4E-2 illustrate bottom plan views of the exterior of a device 100 which moves about and/or operates in relation to a pile of granular material, in accordance with various embodiments.

With reference to FIG. 4E-1 a bottom plan view of device 100 is shown with a payload bay 440 coupled with device 100. As can be seen in FIG. 4E-1, drive auger 403-1 and drive auger 403-2 are arranged in a bi-lateral fashion and have flighting wound in opposite directions from each other. Thus, the bi-lateral driver augers 403-1 and 403-2 may be referred to as "opposing screw" drive augers. Propulsion is through direct interaction with the granular material in which device 100 operates and can be forward, reverse, sideways, and turning.

With reference to FIG. 4E-2, device 100 is illustrated in bottom plan view without payload bay 440. This illustrates a configuration of device 100 in which payload bay 440 has been removed or else device 100 is not configured to support a payload bay 440.

Figure 4F:
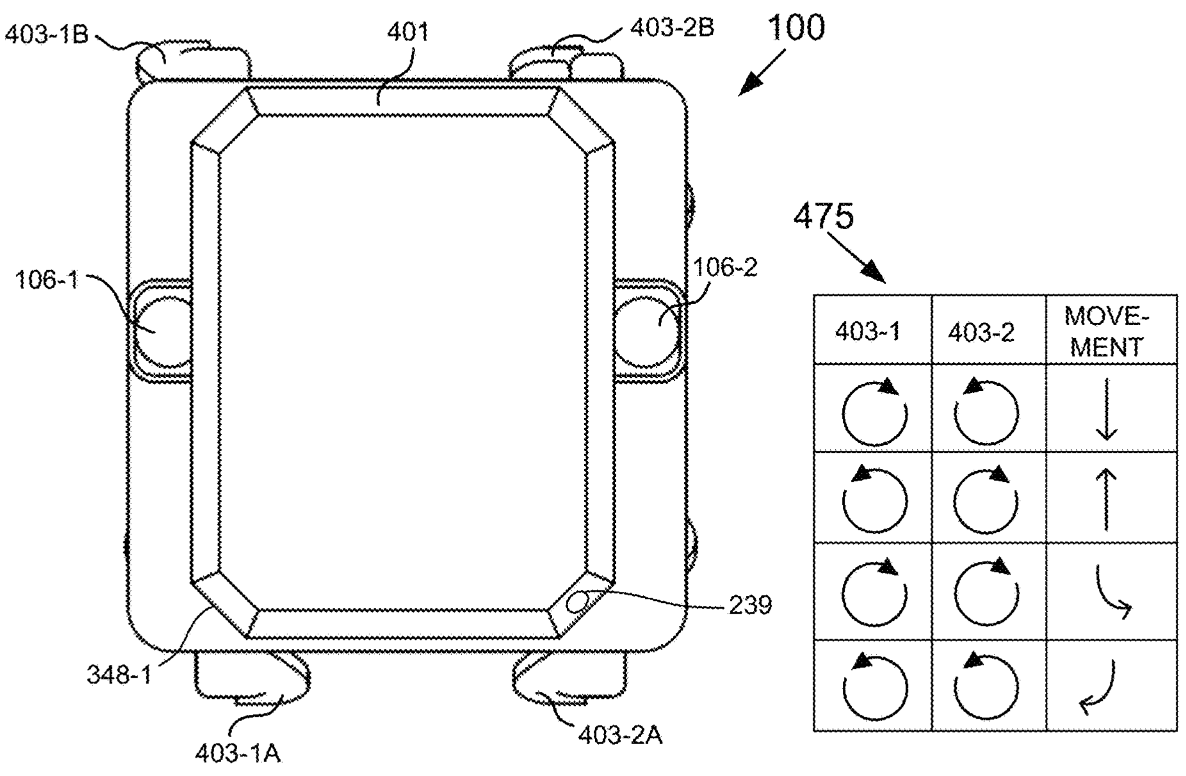
FIG. 4F illustrates a top plan view of the exterior of a device which moves about and/or operates in relation to a pile of granular material along with a chart illustrating directional movements, in accordance with various embodiments.

FIG. 4F illustrates a top plan view of the exterior of a device 100 which moves about and/or operates in relation to a pile of granular material along with a chart 475 illustrating directional movements, in accordance with various embodiments. Chart 475 shows some examples of rotations of augers 403-1 and 403-2 utilized to implement movement of device 100 in the directions indicated by the arrows in the chart. The rotations and movement directions in chart 475 are in relation to the view of device 100 shown in FIG. 4F. Although not depicted, in some embodiments, device 100 may be operated to move laterally to one side or the other.

Figure 4G:
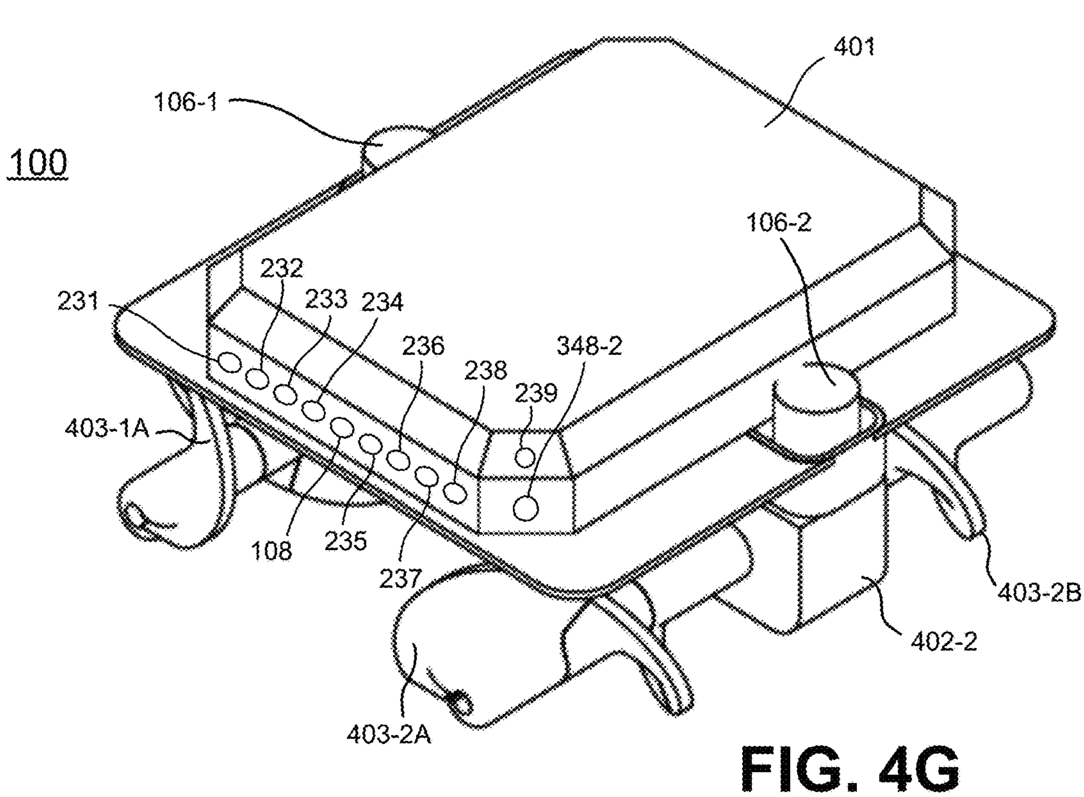
FIG. 4G illustrates an upper front right perspective view of the exterior of a device which moves about and/or operates in relation to a pile of granular material, in accordance with various embodiments.

FIG. 4G illustrates an upper front right perspective view of the exterior of a device 100 which moves about and/or operates in relation to a pile of granular material, in accordance with various embodiments.

Example Systems

Figure 5:
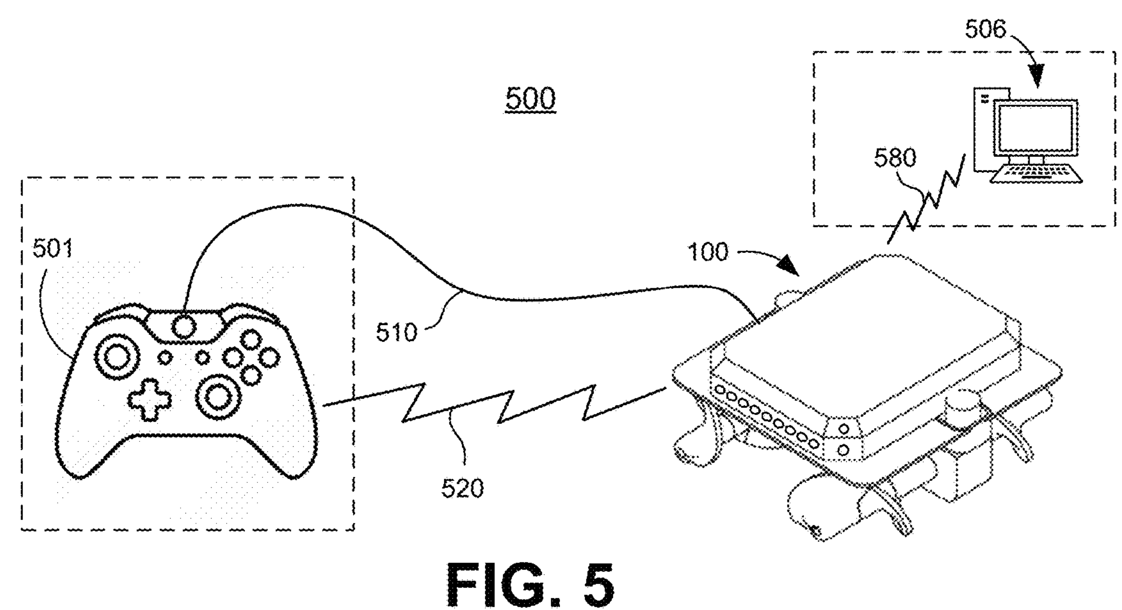
FIG. 5 illustrates some example embodiments of a bulk store slope adjustment system, in accordance with various embodiments.

FIG. 5 illustrates some example embodiments of a bulk store slope adjustment system 500, in accordance with various embodiments. System 500 includes at least device 100 when operating autonomously. In some embodiments, system 500 may include device 100 and a remotely located remote controller 501 which is communicatively coupled by wireline 510 or wirelessly 520 with device 100 (e.g., to interface 104) to send instructions or data and/or to receive information or data collected by device 100 (e.g., from operation of device 100 and/or from sensor(s) 120 and/or payload(s) 140). Remote controller 501 may be like a handholdable remote controller for a video game, or a remotely controlled model car or model airplane. In some embodiments, remote controller may have a display screen for visual display of textual information or still/video images received from device 100. In some embodiments, remote controller 501 is utilized by an operator to maneuver device 100 and/or to operate sensor(s) 120 and/or payload(s) 140. In some embodiments, system 500 may include device 100 and a remotely located computer system 506 which is communicatively coupled wirelessly 580 with device 100 to send instructions or data and/or to receive/access information or data collected by device 100 (e.g., from operation of device 100 and/or from sensor(s) 120 and/or payload(s) 140). In some embodiments, system 500 may include device 100 along with a communicatively coupled remote controller 501 and a communicatively coupled remotely located computer system 506. It should be appreciated that wireless communications 520 and 580 may be peer-to-peer, over a wide area network, or by other protocols.

Figure 6:
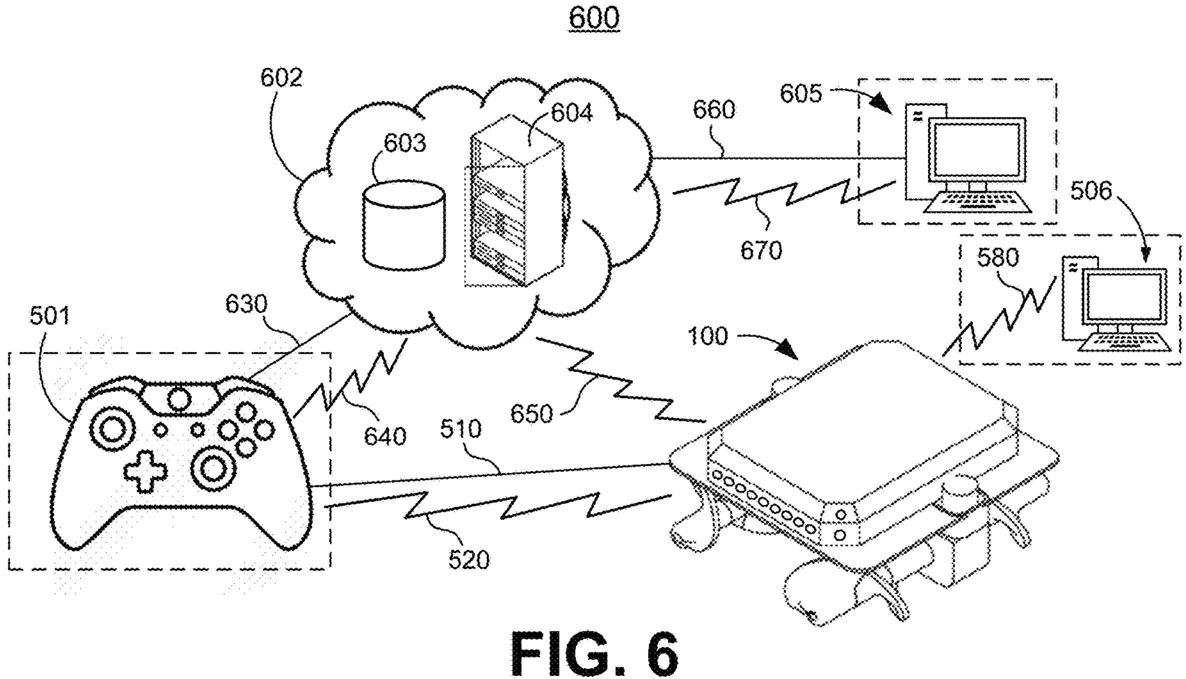
FIG. 6 illustrates some example embodiments of a bulk store slope adjustment system, in accordance with various embodiments.

FIG. 6 illustrates some example embodiments of a bulk store slope adjustment system 600, in accordance with various embodiments. In some embodiments, system 600 includes device 100 in wireless communicative coupling 650 (e.g., via the Internet) with one or more of cloud-based 602 storage 603 processing 604. In some embodiments, cloud-based 602 storage 603 is used to store data collected by device 100. In some embodiments, cloud-based processing 604 is used to process data collected by device 100 and/or to assist in autonomous decision making based on collected day. In some embodiments, system 600 additionally includes a remotely located computer 605, communicatively coupled to cloud 602 (e.g., via the internet) either wirelessly 670 or by wireline 660. In this fashion, remotely located computer 605 may access data from device 100 which has been uploaded to storage 603 and/or may communicate with or access device 100 by relay through processing/computer system 605 or cloud 602. In some embodiments, system 600 may additionally include one or more components (remote controller 501 and/or remotely located computer system 506) which were described in FIG. 5. In some embodiments, one or more of remote controller 501 and remote computer system 506 may be communicatively coupled (e.g., 630/640) with cloud 602 for transmission and/or receipt of information related to device 100.

Section 2

Figure 7A:
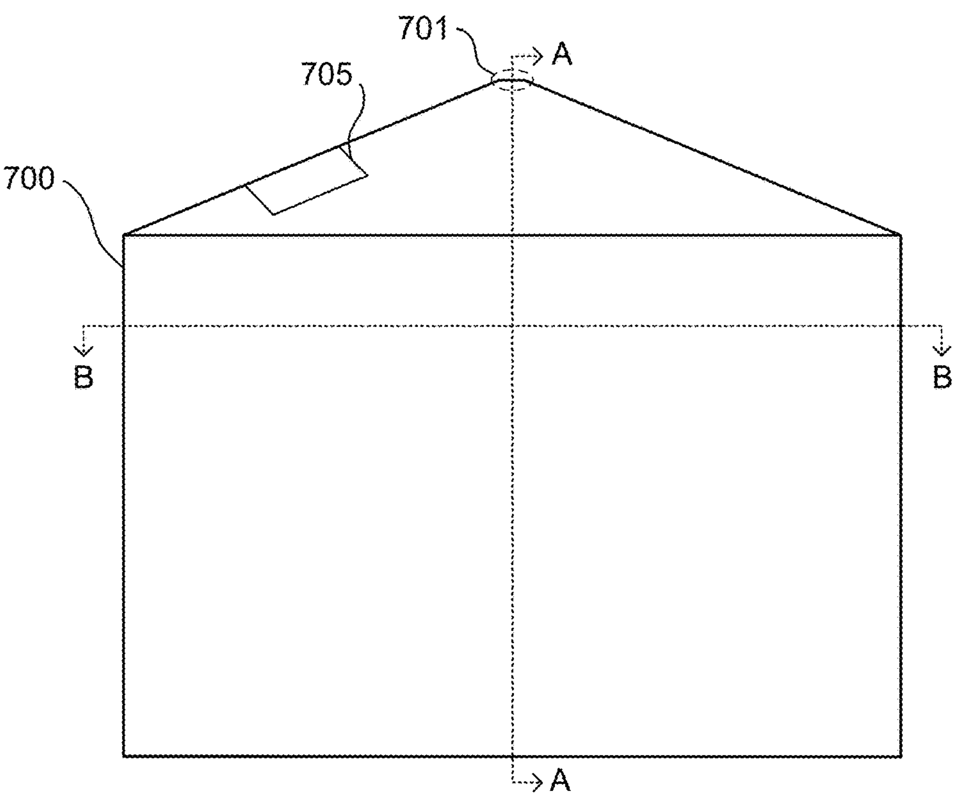
FIG. 7A illustrates an example bulk store for granular material, in accordance with various embodiments.

Example Bulk Store and Example Operations to Adjust Slope of a Portion of Piled Granular Material FIG. 7A illustrates an example bulk store 700 for granular material, in accordance with various embodiments. For purposes of example, and not limitation, bulk store 700 is depicted as a grain bin which is used to bulk store grain (e.g., edible seeds/beans such as corn, wheat, soybeans, peas, rice, beans, etc.). However, in other embodiments, bulk store 700 may store other granular materials. Bulk store 700 includes an access door 705 through which device 100 may be inserted into and/or removed from bulk store 700. Bulk store 700 also includes a top loading portal 701 through which bulk grain or other granular material may be filled into bulk store 700, by an auger or other filling system (not depicted in FIG. 7), and then fall into bulk store 700 to form a pile of granular material (e.g., grain 710 shown in FIG. 7B). Section lines depict a location and a direction of Section A-A and Section B-B which will be illustrated in other figures.

Figure 7B:
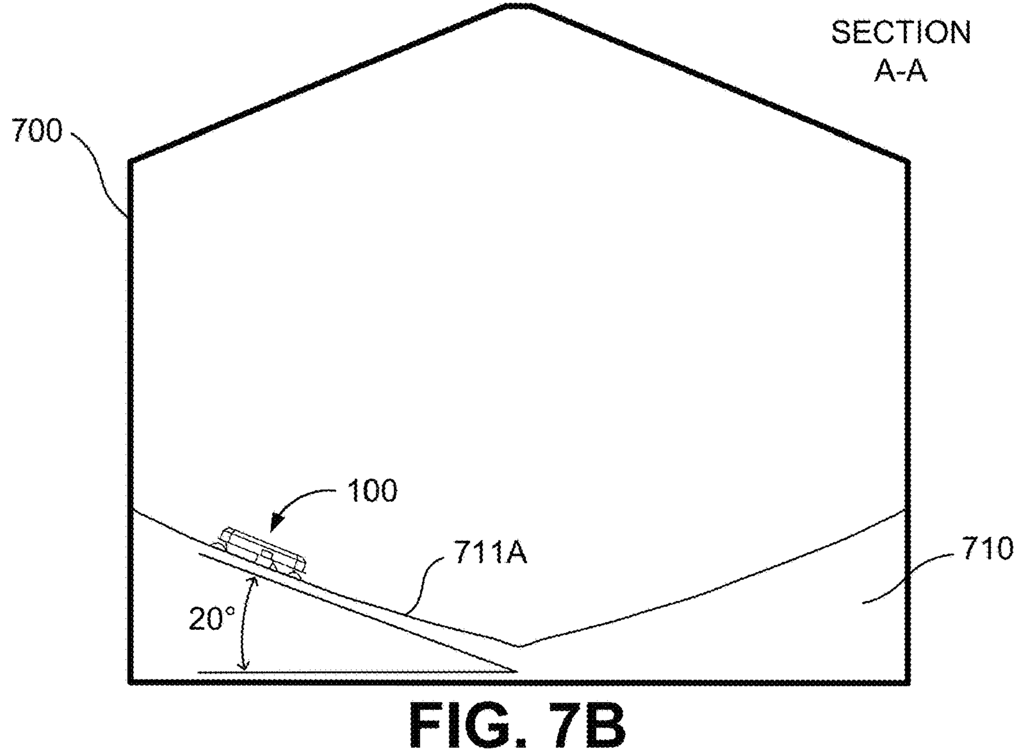
FIG. 7B illustrates a side sectional view A-A of an example bulk store for granular material which shows a device moving about and/or operating in relation to a portion of piled granular material in the bulk store, in accordance with various embodiments.
Figure 7C:
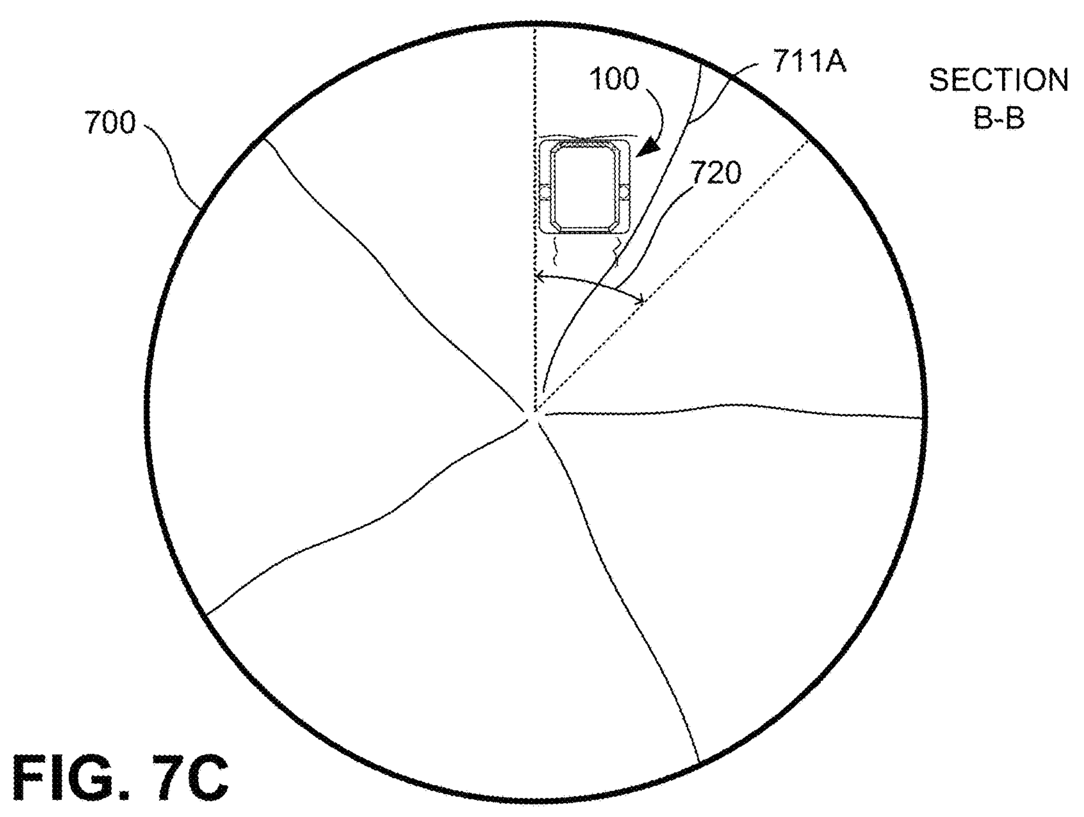
FIG. 7C illustrates a top sectional view B-B of an example bulk store for granular material which shows a device moving about and/or operating in relation to a portion of piled granular material in the bulk store, in accordance with various embodiments.

FIG. 7B illustrates a side sectional view A-A of an example bulk store 700 for granular material which shows a device 100 moving about and/or operating in relation to a portion (portion 720 as shown in FIG. 7C) of piled granular material (e.g., grain 710) in the bulk store 700, in accordance with various embodiments. Because some of grain 710 has been removed from the bottom of bulk store 700, a cone shaped concavity on surface 711A has been created with a slope of approximately 20 degrees down from the walls to the center of bulk store 700 in the portion of piled granular material where device 100 is operating. The slope of 20 degrees is used for example purposes only. The maximum angle of the downward slope from the sides to the middle (or from the middle to the sides) is dictated by the angle of repose, which differs for different granular materials and may differ for a particular granular material based on environmental physical characteristics (such as moisture) of the granular material. When a granular material is steeply sloped and near the angle of repose, it can be easily triggered to slide and cause entrapment of a person. When the slope of a granular material exceeds its angle of repose, it slides (like an avalanche). Additionally, when a surface 711A of grain 710 becomes steeply sloped toward the center (as illustrated) during removal of grain 710 from bulk store 700, it means that much of the removed grain is coming out from the center of the bin, rather than a mixture of grain from all areas of the bin. Leveling, or reduction of slope, of an inwardly sloped pile, reduces risk of a slide from a steeply sloped surface 711A and distributes grain from the high sloped edges to prevent/reduce spoilage of those portions of the grain.

Due to the friction of augers 403 against grain 710 and the agitation of augers 403 caused to grain 710 when device 100 traverses a portion of piled granular material (e.g., portion 720 of grain 710), viscosity of the piled granular material at or near surface 711A is disrupted. The disruption of viscosity lowers the angle of repose and, because of the slope being caused to exceed the angle of repose, incites sediment gravity flow in the portion of piled granular material down the slope. Additionally, rotational movement of the augers also displaces grain 710 and can be used to auger the grain in a desired direction or expel it such that gravity carries it down slope. Either or both of these actions can be used to disperse grain 710 and/or to adjust (reduce) the slope of the surface 711A of portion 720 and other similar portions.

FIG. 7C illustrates a top sectional view B-B of an example bulk store 700 for granular material which shows a device 100 moving about and/or operating on surface 711A in relation to a portion 720 of piled granular material 710 in the bulk store 700, in accordance with various embodiments.

Figure 7D:
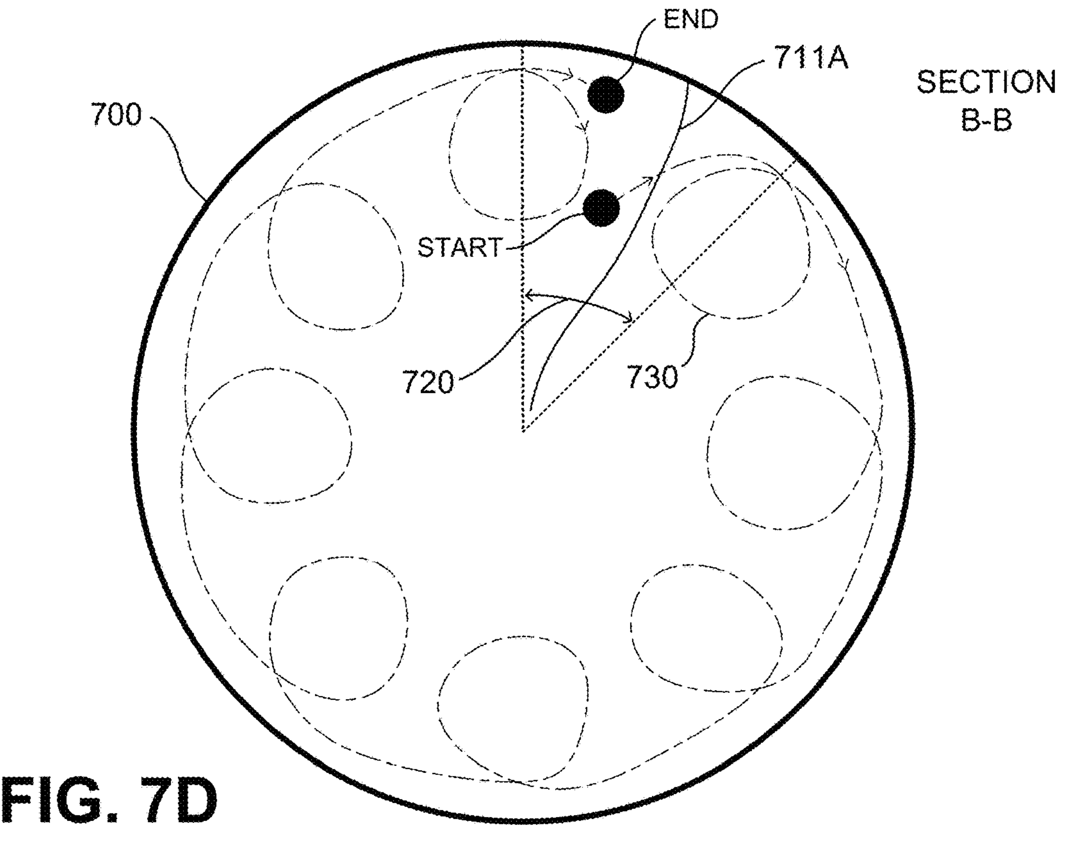
FIG. 7D illustrates a top sectional view B-B of an example bulk store for granular material which shows pattern for moving a device about and/or operating in relation to a portion of piled granular material in the bulk store, in accordance with various embodiments.

FIG. 7D illustrates a top sectional view B-B of an example bulk store 700 for granular material which shows pattern 730 for moving a device 100 about and/or operating on surface 711A in relation to surface a portion 720 of piled granular material 710 in the bulk store 700, in accordance with various embodiments. In some embodiments, pattern 730 may be manually driven by a remotely located operator via remote controller 501 (for example). In some embodiments, pattern 730 may be autonomously driven by device 100. In some embodiments, pattern 730 may be initiated due to a first measurement of the angle of slope of the surface 711A of grain 710 in portion 720 satisfying a first condition such as being beyond an acceptable threshold angle (e.g., 10 degrees of slope). Pattern 730 or other patterns of traversal of portion 720 may be repeatedly driven until a follow-on measurement of the angle of slope of grain 710 in portion 720 meets a second condition (e.g., falls below the threshold angle or falls below some other angle such as 7 degrees). In this manner a portion (e.g., portion 720) or all of the grain in bulk store 700 can have its slope adjusted downward, closer to level.

Figure 7E:
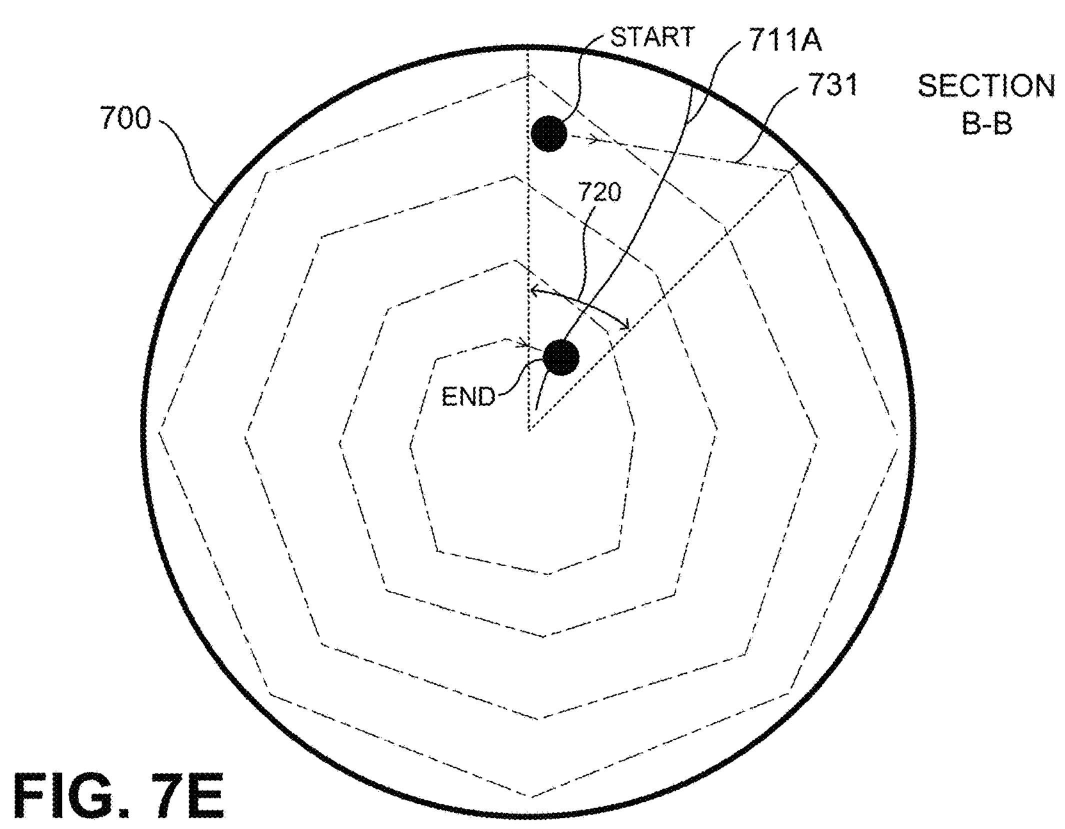
FIG. 7E illustrates a top sectional view B-B of an example bulk store for granular material which shows pattern for moving a device about and/or operating in relation to a portion of piled granular material in the bulk store, in accordance with various embodiments.

FIG. 7E illustrates a top sectional view B-B of an example bulk store 700 for granular material which shows pattern 731 for moving a device 100 about and/or operating on surface 711A in relation to a portion 720 of piled granular material 710 in the bulk store 700, in accordance with various embodiments. In some embodiments, pattern 731 may be manually driven by a remotely located operator via remote controller 501 (for example). In some embodiments, pattern 731 may be autonomously driven by device 100. In some embodiments, pattern 731 may be initiated due to a first measurement of the angle of slope of surface 711A of grain 710 in portion 720 satisfying a first condition such as being beyond an acceptable threshold angle (e.g., 10 degrees of slope). Pattern 731 or other pattern(s) of traversal of portion 720 may be repeatedly driven until a follow-on measurement of the angle of slope of surface 711A of grain 710 in portion 720 meets a second condition (e.g., falls below the threshold angle or falls below some other angle such as 7 degrees). In this manner a portion (e.g., portion 720) or all of the grain in bulk store 700 can have its surface slope adjusted downward, closer to level.

Figure 7F:
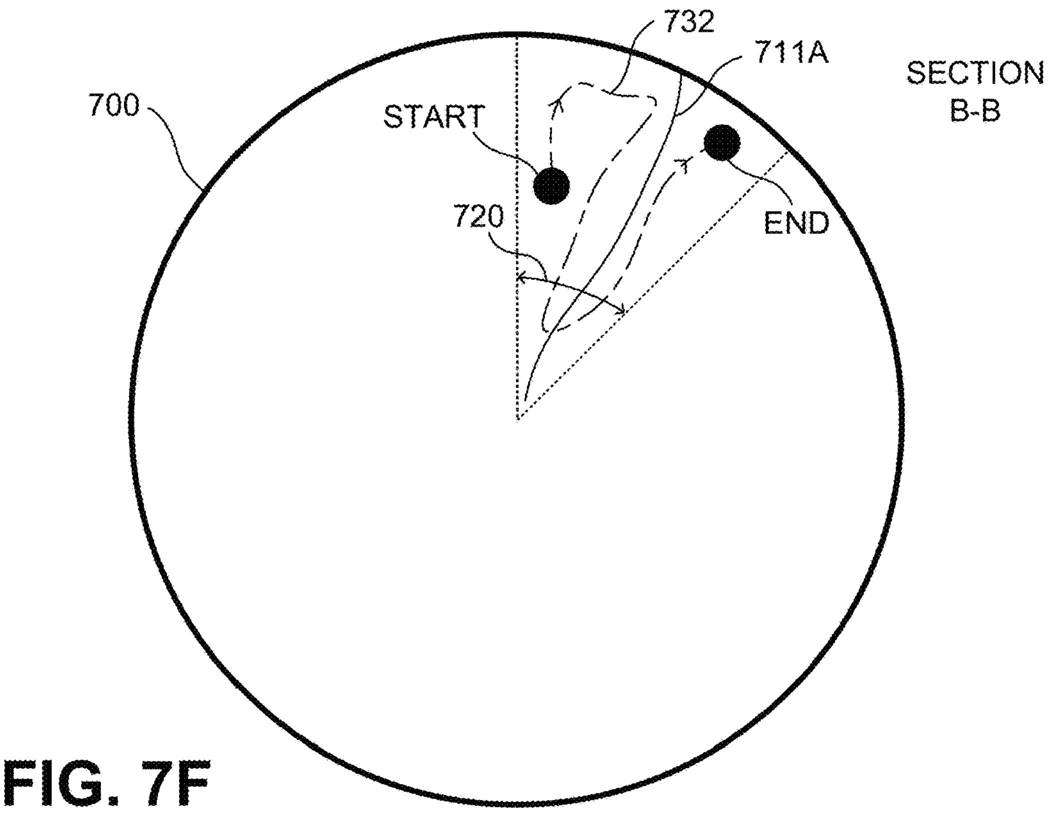
FIG. 7F illustrates a top sectional view B-B of an example bulk store for granular material which shows pattern for moving a device about and/or operating in relation to a portion of piled granular material in the bulk store, in accordance with various embodiments.

FIG. 7F illustrates a top sectional view B-B of an example bulk store 700 for granular material which shows pattern 732 for moving a device 100 about and/or operating on surface 711A in relation to a portion 720 of piled granular material 710 in the bulk store 700, in accordance with various embodiments. In some embodiments, pattern 732 may be manually driven by a remotely located operator via remote controller 501 (for example). In some embodiments, pattern 732 may be autonomously driven by device 100. In some embodiments, pattern 732 may be initiated due to a first measurement of the angle of slope of surface 711A of grain 710 in portion 720 satisfying a first condition such as being beyond an acceptable threshold angle (e.g., 10 degrees of slope). Pattern 732 or other pattern(s) of traversal of portion 720 may be repeatedly driven until a follow-on measurement of the angle of slope of surface 711A of grain 710 in portion 720 meets a second condition (e.g., falls below the threshold angle or falls below some other angle such as 7 degrees). In this manner a portion (e.g., portion 720) or all of the grain in bulk store 700 can have its surface slope adjusted downward, closer to level. In FIG. 7F, pattern 732 is confined to portion 720. In such an embodiment, only this portion may be leveled by device 100, or else device 100 may work its way around bulk store 700 portion by portion by portion, leveling surface 711A in each portion completely or incrementally before moving to the next portion.

FIGS. 7D-7F illustrate only three example patterns, many other patterns are possible and anticipated including, but not limited to: grid patterns, circular patterns, symmetric patterns, unsymmetrical patterns, spiral patterns, random/chaos motion (e.g., patternless), patterns/paths that are dynamically determined based on the slope and changes of the slope, and patterns which are cooperatively executed by two or more devices 100 working in communication with one another. Any of the patterns executed by device 100 may be stored in host memory 103 for automated execution by processor 102 controlling the movements of device 100 to traverse the pattern. Similarly, patternless or dynamic movement may be executed by processor 102 in an automated fashion by controlling the movements of device 100, such as to seek out portions with a slope which satisfies a first condition and traverse them until the slope satisfies the second condition.

In some embodiments, patterns or traversal operations may similarly be utilized to break up and distribute grain 710 to assist it in drying out, to prevent a crust from forming, to inspect grain, to push grain towards a sweep auger or other uptake, and/or to diminish spoilage.

In some embodiments, patterns or traversal operations may similarly be utilized to level peaks which form in grain or other piled granular material due to the method and/or location in which it is loaded into a bulk store. Such leveling better utilizes available storage space, reduces crusts or pipe formation, reduces hotspots, and/or more evenly distributes granular material of differing moisture contents.

Figure 7G:
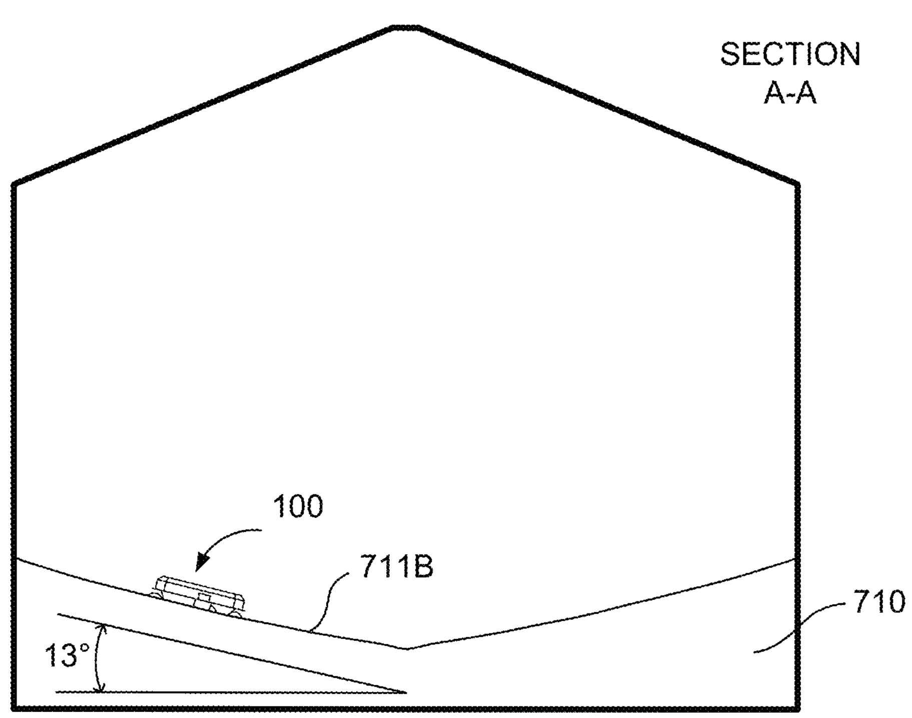
FIG. 7G illustrates a side sectional view A-A of an example bulk store for granular material which shows a device moving about and/or operating in relation to a portion of piled granular material in the bulk store, in accordance with various embodiments.

FIG. 7G illustrates a side sectional view A-A of an example bulk store 700 for granular material 710 which shows a device 100 moving about and/or operating in relation to one or more portions (e.g., portion 720 and the like) on the surface 711B of piled granular material 710 in the bulk store 700, in accordance with various embodiments. FIG. 7G is similar to FIG. 7B except that the slope of the upper surface 711B has been downwardly adjusted from 20 degrees of surface 711A to approximately 13 degrees (as measured by device 100 or other means) by traversal of the surface by device 100 in the manner previously described to effect surface leveling and slope adjustment (i.e., traversed in a "leveling traversal"). In an embodiment where this 13-degree slope is below a predetermined threshold, leveling and slope adjustment operations may cease. In an embodiment where this 13-degree slope is above a predetermined threshold, leveling and slope adjustment operations may continue toward achieving a slope threshold which is closer to 0 degrees.

Figure 7H:
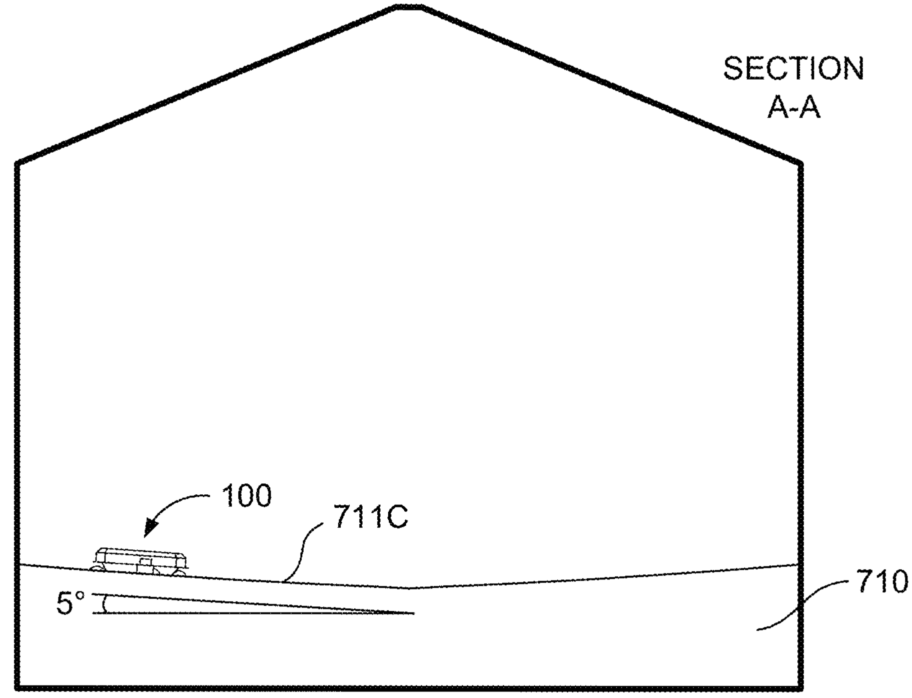
FIG. 7H illustrates a side sectional view A-A of an example bulk store for granular material which shows a device moving about and/or operating in relation to a portion of piled granular material in the bulk store, in accordance with various embodiments.

FIG. 7H illustrates a side sectional view A-A of an example bulk store 700 for granular material 710 which shows a device 100 moving about and/or operating in relation to a one or more portions (e.g., portion 720 and the like) on the surface 711C of piled granular material 710 in the bulk store 700, in accordance with various embodiments. FIG. 7H is similar to FIG. 7G except that the slope of the upper surface 711C has been further downwardly adjusted from 13 degrees of surface 711B to approximately 5 degrees (as measured by device 100 or other means) by traversal of the surface by device 100 in the manner previously described to effect surface leveling and slope adjustment (i.e., traversed in a "leveling traversal"). In an embodiment where this 5-degree slope is below a predetermined threshold, leveling and slope adjustment operations may cease. In an embodiment where this 5-degree slope is above a predetermined threshold, leveling operations may continue toward achieving a slope threshold which is closer to 0 degrees.

Figure 7I:
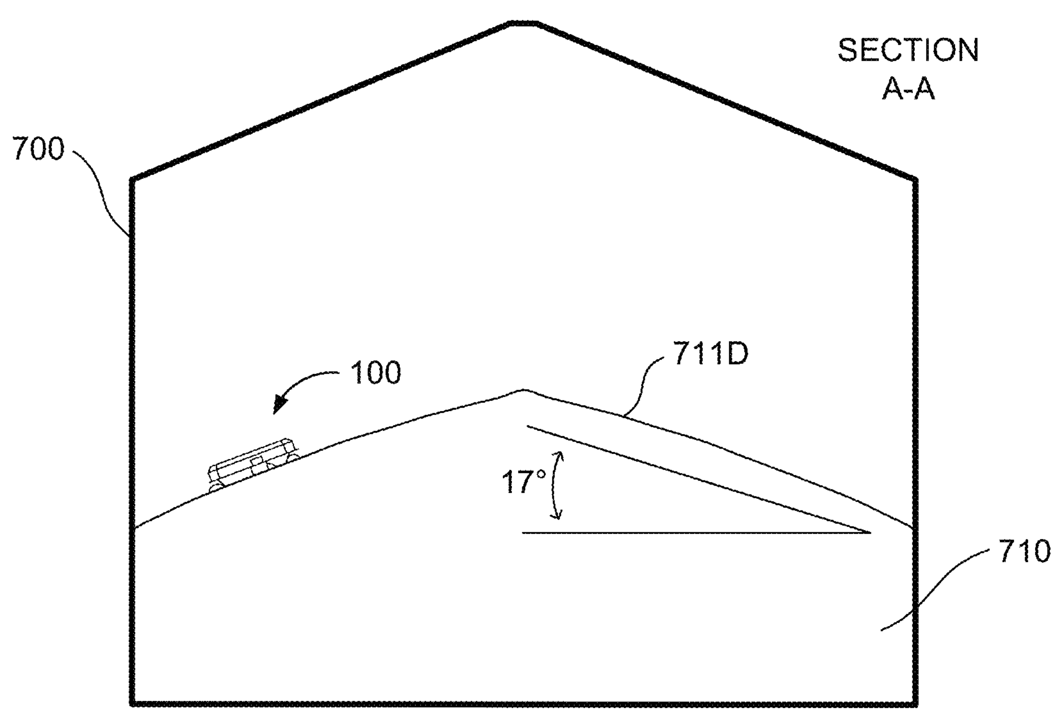
FIG. 7I illustrates a side sectional view A-A of an example bulk store for granular material which shows a device moving about and/or operating in relation to a portion of piled granular material in the bulk store, in accordance with various embodiments.

FIG. 7I illustrates a side sectional view A-A of an example bulk store 700 for granular material 710 which shows a device 100 moving about and/or operating in relation to one or more portions (e.g., portion 720 and the like) on the surface 711D of piled granular material 710 in the bulk store 700, in accordance with various embodiments. FIG. 7I differs from FIGS. 7B, 7G, and 7H, in that the slope of surface 711D of grain 710 is now peaked in the middle and low on the edges, sloping downward at about 17 degrees from the center due to filling of additional grain 710 atop surface 711C of FIG. 7H via centrally located top loading portal 701 (see e.g., FIG. 7A). In some embodiments, device 100 can operate in the same manner to level grain 710 during and/or after completion of the fill operation.

Figure 7J:
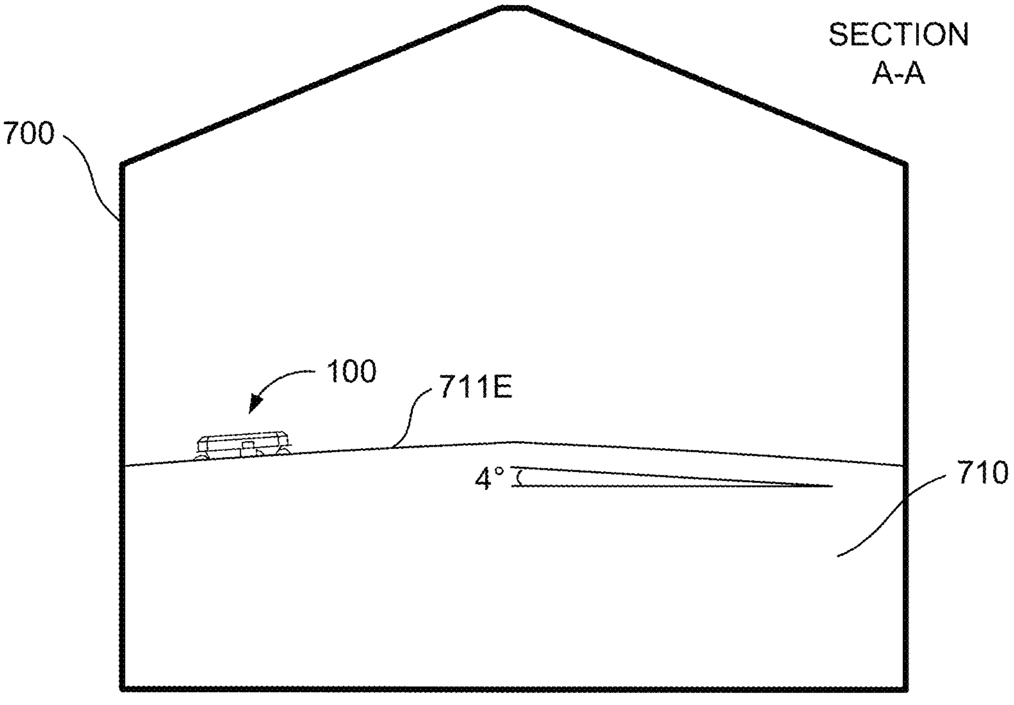
FIG. 7J illustrates a side sectional view A-A of an example bulk store for granular material which shows a device moving about and/or operating in relation to a portion of piled granular material in the bulk store, in accordance with various embodiments.

FIG. 7J illustrates a side sectional view A-A of an example bulk store 700 for granular material 710 which shows a device 100 moving about and/or operating in relation to a one or more portions (e.g., portion 720 and the like) on the surface 711E of piled granular material 710 in the bulk store 700, in accordance with various embodiments. FIG. 7J is similar to FIG. 7I except that the slope of the upper surface 711E has been downwardly adjusted from 17 degrees of surface 711D to approximately 4 degrees (as measured by device 100 or other means) by traversal of the surface by device 100 in the previously manner for surface leveling and slope adjustment (i.e., traversed in a "leveling traversal"). In an embodiment where this 4-degree slope is below a predetermined threshold, leveling and slope adjustment operations may cease. In an embodiment where this 4-degree slope is above a predetermined threshold, leveling operations may continue toward achieving a slope threshold which is closer to 0 degrees.

Figure 7K:
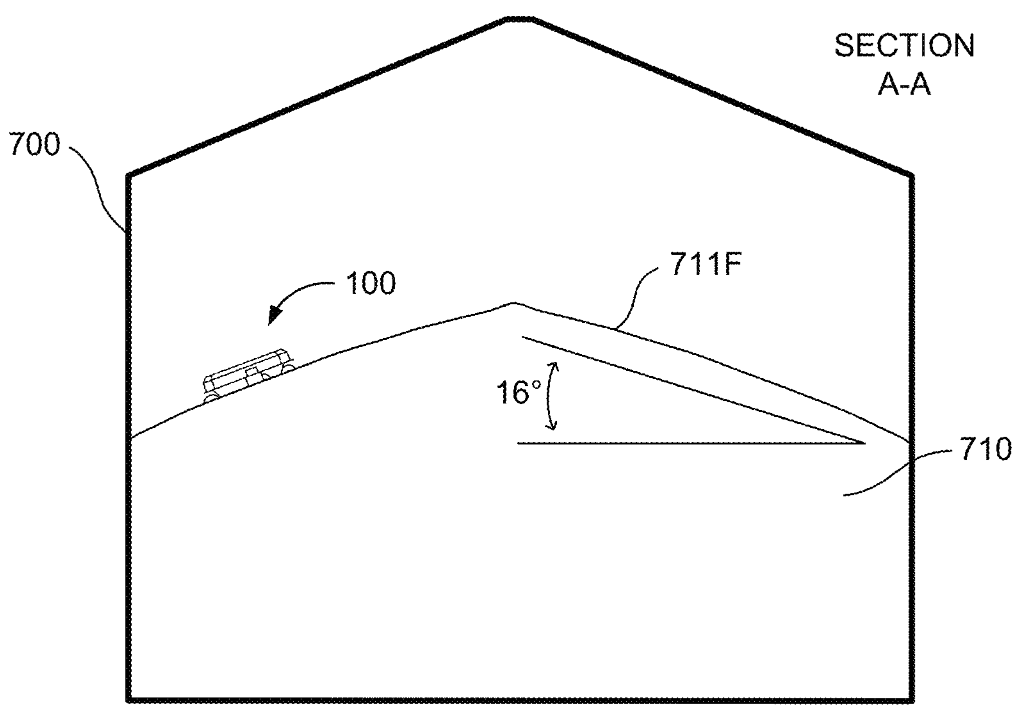
FIG. 7K illustrates a side sectional view A-A of an example bulk store for granular material which shows a device moving about and/or operating in relation to a portion of piled granular material in the bulk store, in accordance with various embodiments.

FIG. 7K illustrates a side sectional view A-A of an example bulk store 700 for granular material 710 which shows a device 100 moving about and/or operating in relation to one or more portions (e.g., portion 720 and the like) on the surface 711F of piled granular material 710 in the bulk store 700, in accordance with various embodiments. FIG. 7K illustrates an embodiment where additional grain 710 has been loaded atop the substantially leveled surface 711E of FIG. 7J and is now peaked in the middle and low on the edges, sloping downward at about 16 degrees from the center due to filling of additional grain 710 atop surface 711E of FIG. 7J via centrally located top loading portal 701

(see e.g., FIG. 7A). In some embodiments, device 100 can operate in the same manner to level grain 710 during and/or after completion of the fill operation.

Figure 7L:
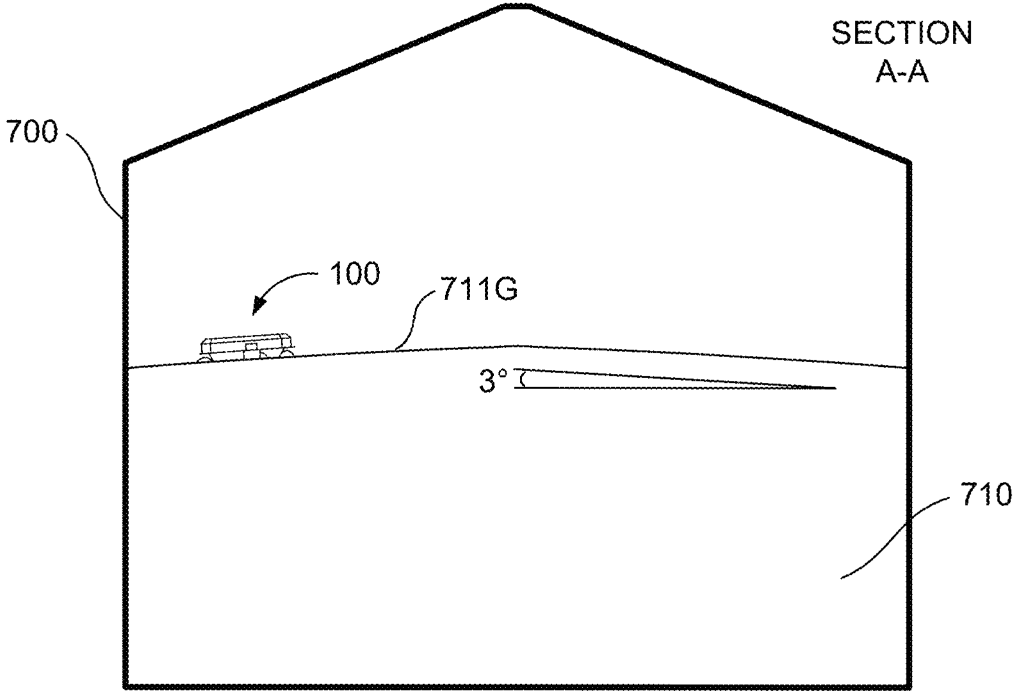
FIG. 7L illustrates a side sectional view A-A of an example bulk store for granular material which shows a device moving about and/or operating in relation to a portion of piled granular material in the bulk store, in accordance with various embodiments.

FIG. 7L illustrates a side sectional view A-A of an example bulk store 700 for granular material 710 which shows a device 100 moving about and/or operating in relation to a one or more portions (e.g., portion 720 and the like) on the surface 711G of piled granular material 710 in the bulk store 700, in accordance with various embodiments. FIG. 7L is similar to FIG. 7K except that the slope of the upper surface 711G has been downwardly adjusted from about 16 degrees of surface 711F to approximately 3 degrees (as measured by device 100 or other means) by traversal of the surface by device 100 in the previously manner for surface leveling and slope adjustment (i.e., traversed in a "leveling traversal"). In an embodiment where this 3-degree slope is below a predetermined threshold, leveling and slope adjustment operations may cease. In an embodiment where this 4-degree slope is above a predetermined threshold, leveling operations may continue toward achieving a slope threshold which is closer to 0 degrees.

Example Method(s) of Bulk Store Slope Adjustment

Procedures of the methods illustrated by flow diagram 800 of FIGS. 8A-8E will be described with reference to elements and/or components of one or more of FIGS. 1-7L. It is appreciated that in some embodiments, the procedures may be performed in a different order than described in a flow diagram, that some of the described procedures may not be performed, and/or that one or more additional procedures to those described may be performed. Flow diagram 800 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 800 may be implemented in hardware, or a combination of hardware with firmware and/or software.

For purposes of example only, device 100 of FIGS. 1-7L is a robotic device which utilizes augers (403) to move and maneuver with respect to piled granular material, such as, but not limited to grain. Robot 100 will be described as operating on or in relation to piled granular material in a bulk store, such as, but not limited to grain in a grain bin. In some embodiments, the robot 100 is free of mechanical coupling with a structure (e.g., the bulk store) in which the piled granular material is contained. For example, in some embodiments, there is no tether or safety harness coupling the robot 100 to the grain storage bin and it operates autonomously or under wireless remote control. In some embodiments, robot 100 performs the method of flow diagram 800 completely autonomously. In some embodiments, robot 100 performs the method of flow diagram 800 semi-autonomously such as by measuring a slope of grain, sending the slope to an external computer system which then determines a pattern for robot 100 to autonomously execute when traversing the piled grain. In some embodiments, robot 100 performs the method of flow diagram 800 semi-autonomously such as by receiving a remotely measured slope of grain, then autonomously determining a pattern for robot 100 to autonomously execute when traversing the piled grain.

FIGS. 8A-8E illustrate a flow diagram 800 of an example method of bulk store slope adjustment, in accordance with various embodiments.

With reference to FIG. 8A, at procedure 810 of flow diagram 800, in various embodiments, a robot 100 which includes a processor 102, a memory 103, and an auger-based drive system (e.g., augers 403), obtains a first measurement of an angle of slope of a portion of piled granular material in a bulk store, wherein the robot 100 comprises an auger-based drive system. With reference to FIGS. 7A-7L, this can comprise a measure of the angle of slope of the surface 711 of portion 720 of grain 710 in bin 700. The angle can be measured and obtained autonomously by robot 100 or can be measured by a device external to robot 100 and then obtained by being communicated to or accessed by robot 100. In an embodiment, where the angle of slope of surface 711 is measured by robot 100, motion sensor(s) 220 may be used to measure the angle of robot 100 on a slope of portion 720 to approximate the angle of the slope. In some embodiment, procedure 810 may be skipped and an operator may simply direct robot 100 to begin traversal of a portion (e.g., portion 720) of piled granular material.

With continued reference to FIG. 8A, at procedure 820 of flow diagram 800, in various embodiments, in response to the first measurement satisfying a first condition, the robot 100 traverses the portion of piled granular material to incite sediment gravity flow in the portion of piled granular material by disruption of viscosity of the portion of piled granular material through agitation of the portion of piled granular material by auger rotation of the auger-based drive system. The traversal may be controlled by host processor 102 via control of the direction of rotation and/or the speed of rotation of augers 403 of robot 100. Robot 100 may traverse the portion (e.g., portion 720) of the surface 711 of piled granular material (e.g., piled grain 710) in a predetermined pattern, which may be a predetermined pattern of movement stored in host memory 103 of robot 100. Robot 100 may traverse the portion (e.g., portion 720) of piled granular material (e.g., piled grain 710) in a patternless or random/chaos manner or by following dictates other than a pattern such as by dynamically seeking out areas of slope above a certain measure. In some embodiments, a pattern may be changed or altered based on information sensed by robot 100.

With continued reference to FIG. 8A, at procedure 830 of flow diagram 800, in various embodiments, robot 100 obtains a second measurement of the angle of slope of the portion of piled granular material. This second measurement is obtained after the robot has traversed the portion (e.g., portion 720) of surface 711 following a pattern, for a predetermined period of time, or based on other criteria for re-measurement of the slope. The second angle measurement can be measured and obtained autonomously by robot 100 or can be measured by a device external to robot 100 and then obtained by being communicated to or accessed by robot 100.

With continued reference to FIG. 8A, at procedure 840 of flow diagram 800, in various embodiments, in response to the second measurement satisfying a second condition, robot 100 ceases traversal of the portion of piled granular material. In some embodiments, the first condition is related to a first angle and the second condition is related to a second angle.

In some embodiments, where the first angle is the same as the second angle, the first condition may be met when the first measurement exceeds the angle, and the second measurement may be met when the second measurement falls below the angle. For example, the angle may be 10 degrees, and when the first measurement is 20 degrees, traversal will continue until the angle is adjusted to below 10 degrees.

In some embodiments, where the first angle and the second angle are different, the first angle is larger than the second angle. For example, the first angle may be 10 degrees while the second angle is 5 degrees. In such an embodiment, when the first measurement is 20 degrees, traversal will continue until the angle meets the second condition (e.g., drops below 5 degrees).

Figure 8B:
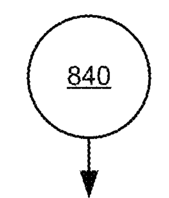

With reference to FIG. 8B, at procedure 850 of flow diagram 800, in various embodiments, in response to the second measurement failing to satisfy the second condition, robot 100 continues traversal of the portion of piled granular material. For example, if the second condition specifies that the measurement of slope needs to be reduced to below 5 degrees, the robot would continue traversal of the portion of piled granular material in response to the second measurement being 13 degrees.

Figure 8C:
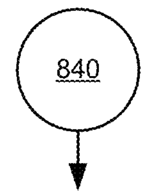

With reference to FIG. 8C, at procedure 860 of flow diagram 800, in various embodiments, during traversal of the portion (e.g., 720) of piled granular material by robot 100, a sensor 120 of robot 100 acts under instruction of host processor 102 to capture a measurement of a characteristic of the portion of piled grain. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled granular material which is traversed by robot 100.

In some embodiments, the captured measurement(s) of characteristic(s) may be transmitted to a base station (506, 605) communicatively coupled with robot 100. The base station (506, 605) is located remotely from the robot and may be configured to communicate with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled granular material. Additionally, or alternatively, via such communications, the base station (506, 605) may relay instructions to robot 100.

In some embodiments, the captured measurement(s) of characteristic(s) may be transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

Figure 8D:
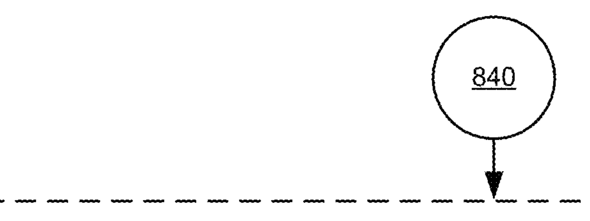

With reference to FIG. 8D, at procedure 870 of flow diagram 800, in various embodiments, a temperature sensor 233, infrared sensor 236, or infrared camera 108 of robot 100 is used to capture a temperature measurement of the portion of piled granular material during the traversal of the portion of piled granular material. In some embodiments, the captured measurement of a characteristic is paired with a location of robot 100 at the time of capture of the temperature measurement. Such paired data can be used to create a heat map of the piled granular material which is traversed by robot 100.

The heat map, when implemented, provides a data visualization that shows changes in temperature as changes in surface color or shading relative to the traversed surface or a depiction thereof. It should be appreciated that the heat map type visualization can similarly be used to show changes in other measured data relative to a traversed surface or depiction thereof. In other embodiments, the paired data may can be graphed or mapped spatially such as on a depiction of the traversed surface; and in some embodiments the spatially mapped/graphed data is interactive such that a user may click on a point of paired data to show a visualization of the underlying data associated with the paired data (e.g., the measured 3-D location and temperature). It should be such heat maps and spatially mapped/graphed data is formatted, in some embodiments, for display on a computer or monitor display (e.g., the display associated with a controller 501, a computer 506, a computer 605, or the like) to support management of the piled granular material and the bulk store during loading, storage, and/or unloading of the piled granular material. Among other management activities, the collected and visually displayed data may assist a human (e.g., a farmer, worker, bin manager) in controlling hot spots, controlling mold conditions, manipulating grain to reduce spoilage, manipulating grain to reduce formation of grain bridges, manipulating grain to reduce formation to disperse BGFM (e.g., small particles, broken grain, chaff, and the like), manipulating grain to unload grain with desired characteristics (e.g., desired moisture level and/or desired visual exterior surface characteristics such as low cracking), managing or having knowledge of a slope of the piled grain, etc.

Figure 8E:
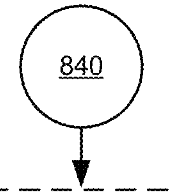

With reference to FIG. 8E, at procedure 880 of flow diagram 800, in various embodiments, robot 100 collects a sample from the portion of piled granular material during the traversal of the portion of piled granular material. For example, with reference to FIG. 4A-2, processor 102 or a remotely located operator may direct a sample collection device, such as gatherer payload 342, to open to collect a sample of grain at a particular location and to close after a sample is collected or a predetermined time period has elapsed.

Mapping Piled Granular Material in a Bulk Store

In various embodiments, for example, device 100 can operate via remote controlled instruction, autonomously, or some combination thereof. Although various embodiments of a device 100 are described herein (e.g., device 100, device 100B), it is referred to generically as device 100. Also, as discussed above, device 100 is robotic and may be referred to as a "robot" (e.g., "robot 100") or as a "robotic device," (e.g., "robotic device 100") or the like. Device 100 includes an auger-based drive system which facilitates the movement and/or operation of device 100 in relation to a portion of piled granular material (e.g., grain) in a bulk store 700, such as a grain bin.

Figure 9A:
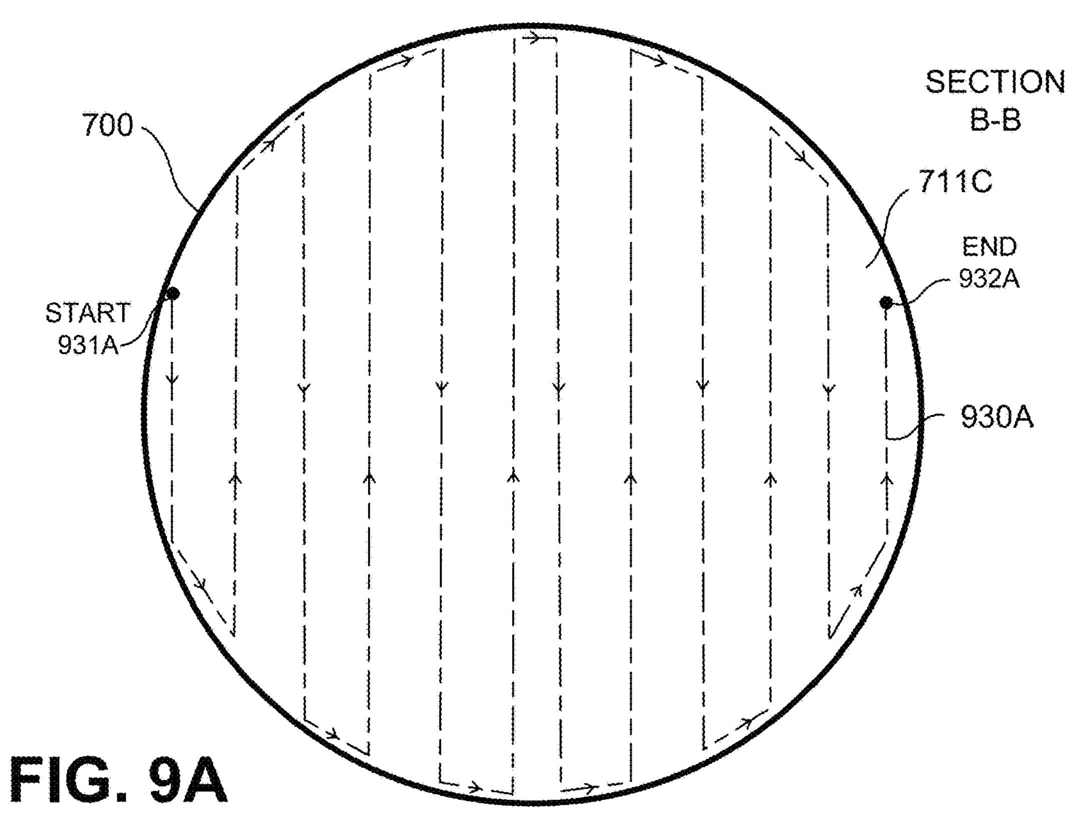
FIGS. 9A-9C illustrate a plurality of patterns for surface mapping and/or surface management, in accordance with some embodiments.
Figure 9B:
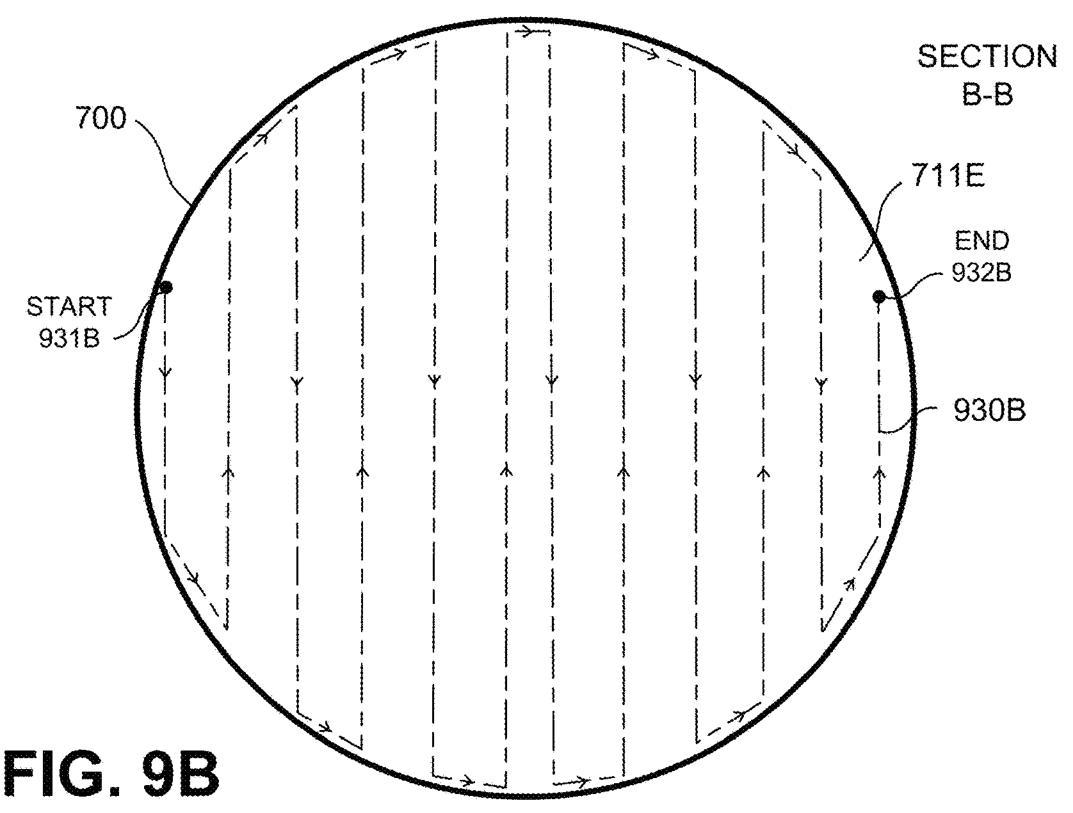
Figure 9C:
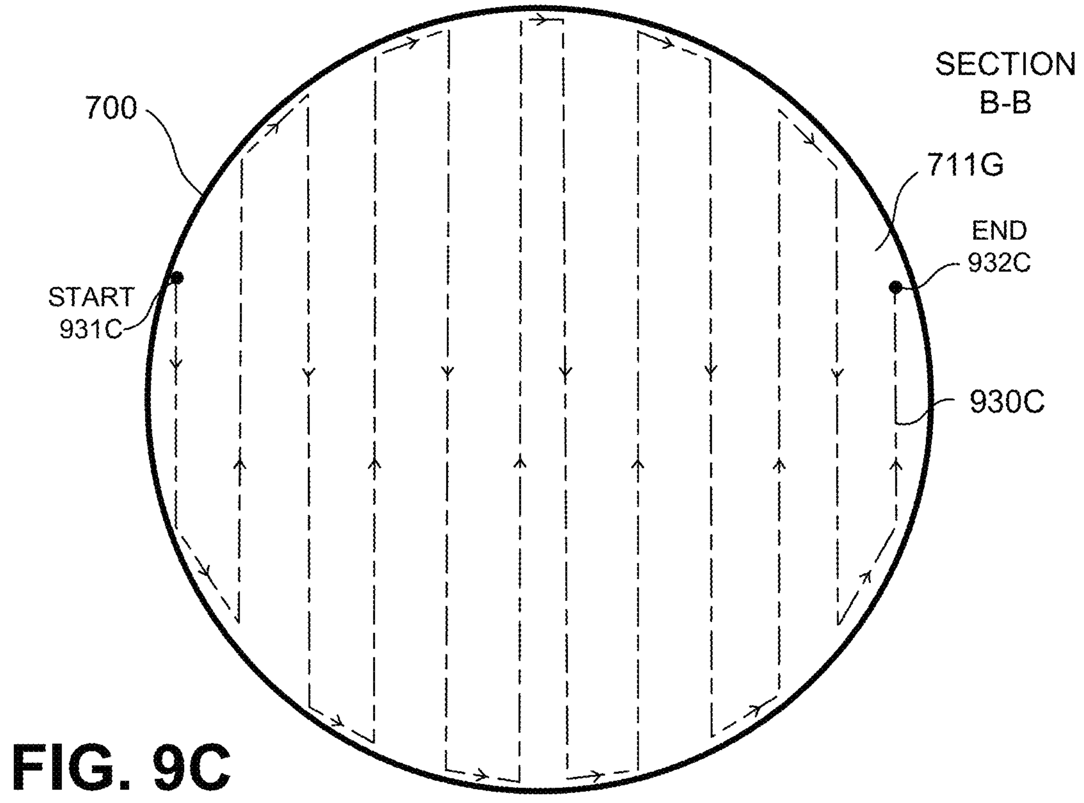

A device 100 may record its location in three dimensions as it traverses a surface 711 of a piled granular material 710 in a bulk store 700. For example, three-dimensional positions may be recorded during any traversal, such a random traversal, a traversal in a pattern such as the example patterns illustrated in FIGS. 7D-7F, or during a pattern executed purposefully for mapping or surface management as illustrated in FIG. 9A-9C. The positions may be stored and later or on-the-fly assembled into a three-dimensional map of the surface 711 of the piled granular material 710 (e.g., grain). The assembly of the map may be performed by device 100, or the positions may be communicatively coupled such as by wireless communication to an external computer system 506 located remotely from the device. The external computer system 506 may then assemble the recorded locations into a three-dimensional map of the surface 711 of the piled granular material 710 (e.g., grain).

Positions of device 100 may be acquired by any suitable means, including but not limited to: differential Global Navigation Satellite System (GNSS) positioning, real-time kinematic GNSS positioning, triangulation from at least two known points marked inside and/or outside the bulk store 710 (e.g., by optically, sonically, ultrasonically, or via radio signals measuring angle and distance to the known points); using motion sensors 220 and additionally a barometric sensor 239 (in some embodiments) as an internal inertial measurement unit (IMU) to navigate from a known starting location; and receiving a position communicated (wirelessly) from an external source such as a camera or laser measuring device mounted to the internal roof or upper wall of a bulk store (e.g., bulk store 700). In various embodiments, more than one positioning means may be used.

The three-dimensional map may be assembled by plotting the recorded locations, such as on a three-dimensional graph with X, Y, and Z axis. This three-dimensional map may be viewed in any desired orientation or view and may be overlaid on a depiction of the bulk store 700 in which the assembled positions were recorded. In some embodiments, the three-dimensional map may be used to determine how much, if any, leveling needs to be performed on a surface 711 of a piled granular material 710. In some embodiments, when coupled with a known location of a bottom surface of a bulk store 700 (such as a grain bin), the volume between the mapped three-dimensional surface 711 (e.g., a surface contour map) and the bottom of the bulk store 700 may be calculated by device 100 or the external computer system 506.

Additionally, during any traversal of piled granular material 710, device 100 may capture one or more environmental characteristics with its sensors (e.g., temperature (with temperature sensor 233), humidity (e.g., with humidity sensor 242), moisture (e.g., directly with moisture sensor 234 or indirectly via calculation from measured temperature and humidity), amount of carbon dioxide (e.g., with carbon dioxide sensor 241), a measurement of atmospheric pressure (e.g., with barometric sensor 239), an optical image (e.g., with optical sensor/camera 235) to record visible environmental conditions, and an infrared image (e.g., with infrared sensor/camera 236), among others. For example, one or more sensors 120 of device 100 may capture measurements of environmental characteristics relative to the piled granular material being traversed by device 100. In some embodiments, such measurements may be taken at locations that are specified by coordinates with respect to the bulk store 700. In some embodiments, such measurements may be taken at intervals of time passed and/or distance traveled. In an example of time separated measurement intervals, an environmental measurement may be taken by one or more of the sensors 120 every 5 seconds, every 10 seconds, or more than once per second (e.g., 2, 3, or 10 times per second) as device 100 traverses. In an example of distance separated measurement intervals, an environmental measurement may be taken by one or more of the sensors 120 each time device 100 has moved a specified distance from a previous location (e.g., every centimeter of travel, every 5 centimeters of travel, every 10 centimeters of travel, every meter of travel, etc.). In some embodiments, the time and/or three-dimensional location of an environmental measurement captured by a sensor 120 is/are noted and stored in conjunction with captured environmental characteristics.

In some embodiments, device 100 may assemble the captured environmental characteristic(s) onto the three-dimensional surface map of the surface 711 of a piled granular material 710. In other embodiments, device 100 may communicatively couple (e.g., by wireless communication) the environmental characteristics and their respective three-dimensional locations and/or times of capture to external computer system 506 which then assembles them onto the three-dimensional surface map of the surface 711 of a piled granular material 710.

In some embodiments, multiple three-dimensional maps may be made over time, such as during filling or withdrawal of piled granular material 710 from the bulk store 700. These maps may be combined to form a three-dimensional map of the captured environmental characteristics of the piled granular material 710. The assembly of multiple surface maps in this manner may be accomplished by device 100 or computer system 506, or other computing system which is supplied with the captured environmental characteristics and respective three-dimensional locations of capture.

Referring now to FIGS. 9A-9B, a plurality of patterns 930A, 930B, and 930B are illustrated, in accordance with some embodiments. The patterns may be used for surface mapping (measuring characteristics with sensors, delivering probes, etc.) and/or for surface/grain bin management (e.g., breaking up crusts and/or grain bridges, dispersing BGFM during load-in, leveling a surface, smoothing a surface, assisting with extraction or load-out, and/or assisting with final clean-out). For purposes of example, and not of limitation, with reference to FIG. 7H and FIG. 9A, device 100 may start at location 931A and follow pattern 930A as illustrated by the dashed lines and directional arrows until endpoint 932A is reached. As discussed previously, locations of device 100 may be recorded in three-dimensions during the traversal in the mapping pattern 930A upon surface 711C. In some embodiments, one or more types of environmental characteristics may be captured (and their respective three-dimensional locations recorded/noted) during the traversal of the mapping pattern 930A of surface 711C. It should be appreciated that the patterns illustrated in FIGS. 9A-9C are only examples and that other patterns including crossing patterns and ad-hoc and/or structured patterns which occur during surface leveling or other traversing of a surface of piled granular material may be employed for mapping and/or management of piled granular material.

With reference to FIG. 7J and FIG. 9B, device 100 may start at location 931B and follow the pattern 930B as illustrated by the dashed lines and directional arrows until endpoint 932B is reached. As discussed previously, locations of device 100 may be recorded in three dimensions during the traversal in the mapping pattern 930B upon surface 711E. In some embodiments, one or more types of environmental characteristics may be captured (and their respective three-dimensional locations noted) during the traversal of the mapping pattern 930B of surface 711E.

With reference to FIG. 7L and FIG. 9C, device 100 may start at location 931C and follow the pattern 930C as illustrated by the dashed lines and directional arrows until endpoint 932C is reached. As discussed previously, locations of device 100 may be recorded in three-dimensions during the traversal in the mapping pattern 930C upon surface 711G. In some embodiments, one or more types of environmental characteristics may be captured (and their respective three-dimensional locations noted) during the traversal of the mapping pattern 930C of surface 711G.

Maps and Data Visualization

In various embodiments, collected data may be formatted in any suitable manner for display to a human. In some embodiments, collected data is matched with locations of collection and formatted for display on a computer/monitor display (e.g., a display associated with a controller 501, a computer 506, a computer 605, or the like) to support management of the piled granular material from which the data was collected and the bulk store during loading, storage, and/or unloading of the piled granular material. Among other management activities, the collected and visually displayed data may assist a human (e.g., a farmer, worker, bin manager) in controlling hot spots, controlling mold conditions, manipulating grain to reduce spoilage, manipulating grain to reduce formation of grain bridges, manipulating grain to reduce formation to disperse fine materials (e.g., small particles and chaff), manipulating grain to unload grain with desired characteristics (e.g., desired moisture level and/or desired visual exterior surface characteristics such as low cracking), calculating/estimating the amount of piled granular material in the bulk store. FIGS. 10A-10G show some examples of maps/visualizations which may be mapped, graphed, or otherwise visualized from three-dimensional locations of device 100 recorded during traversal of a surface of piled granular material.

Figure 10A:
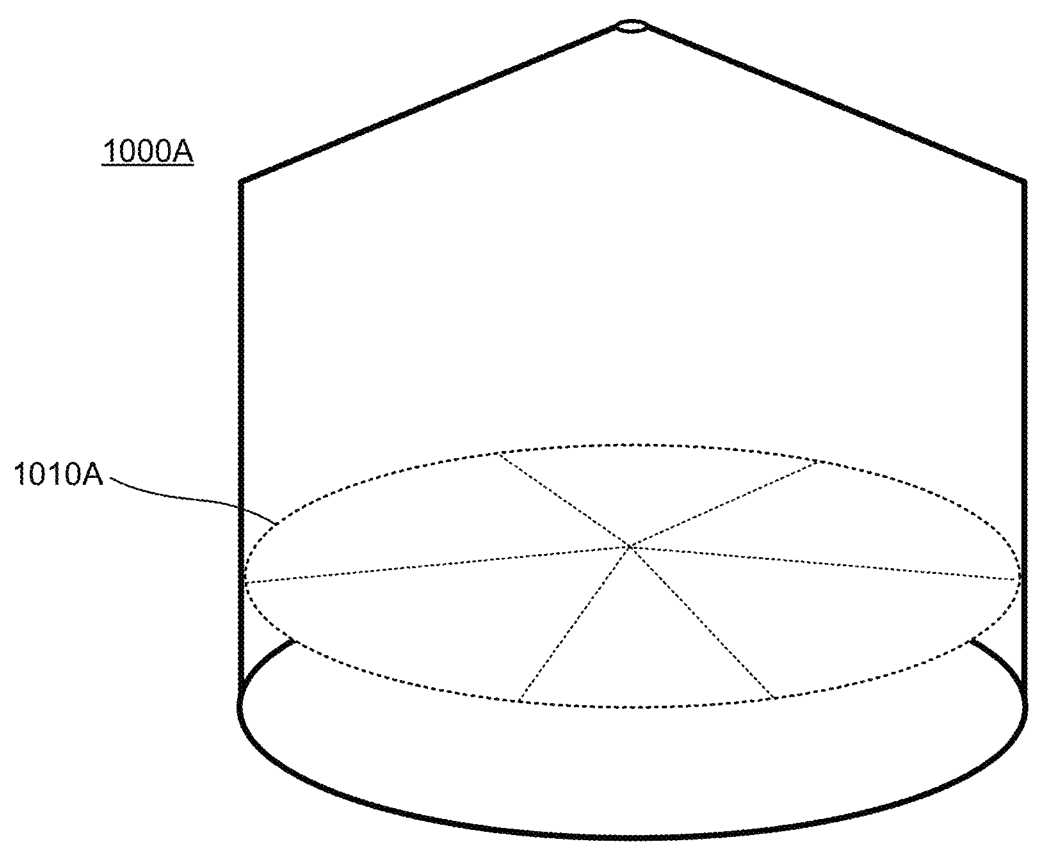
FIGS. 10A-10F illustrate some example three-dimensional maps of the surfaces of a piled granular material assembled from three-dimensional locations of a robotic device recorded during traversal of the surface in a mapping pattern, according to various embodiments.

FIG. 10A illustrates a three-dimensional map 1010A of the surface 711C of the piled granular material 710 of FIG. 7H assembled from three-dimensional locations of device 100 recorded during traversal of the surface 711C in a mapping pattern (e.g., mapping pattern 930A), according to an embodiment. It should be appreciated that surface shape of surface 711C may be approximated (as illustrated) from the three-dimensional points collected during traversal of surface 711C by the device in a mapping pattern, where a high point and a slope to the low points is illustrated. In other embodiments, the collected points may be coupled by lines to create a wireframe graph which provides a representational depiction of the topology of the surface 711C. In various embodiments, some or all of the recorded three-dimensional location data may not be associated with the mapping pattern. That is, two or more different mapping patterns may be employed and/or three-dimensional locations of device 100 recorded during other traversal of surface 711C (i.e., not as part of a mapping pattern) may be employed. For example, three-dimensional locations of device 100 recorded during traversal within a time delimited range (e.g., within a 15-minute period, a 30-minute period, a one-hour period, etc.). When a time delimited range is utilized, it may be set as a default parameter associated with mapping and/or it may be a user settable/adjustable range, according to an embodiment.

Figure 10B:
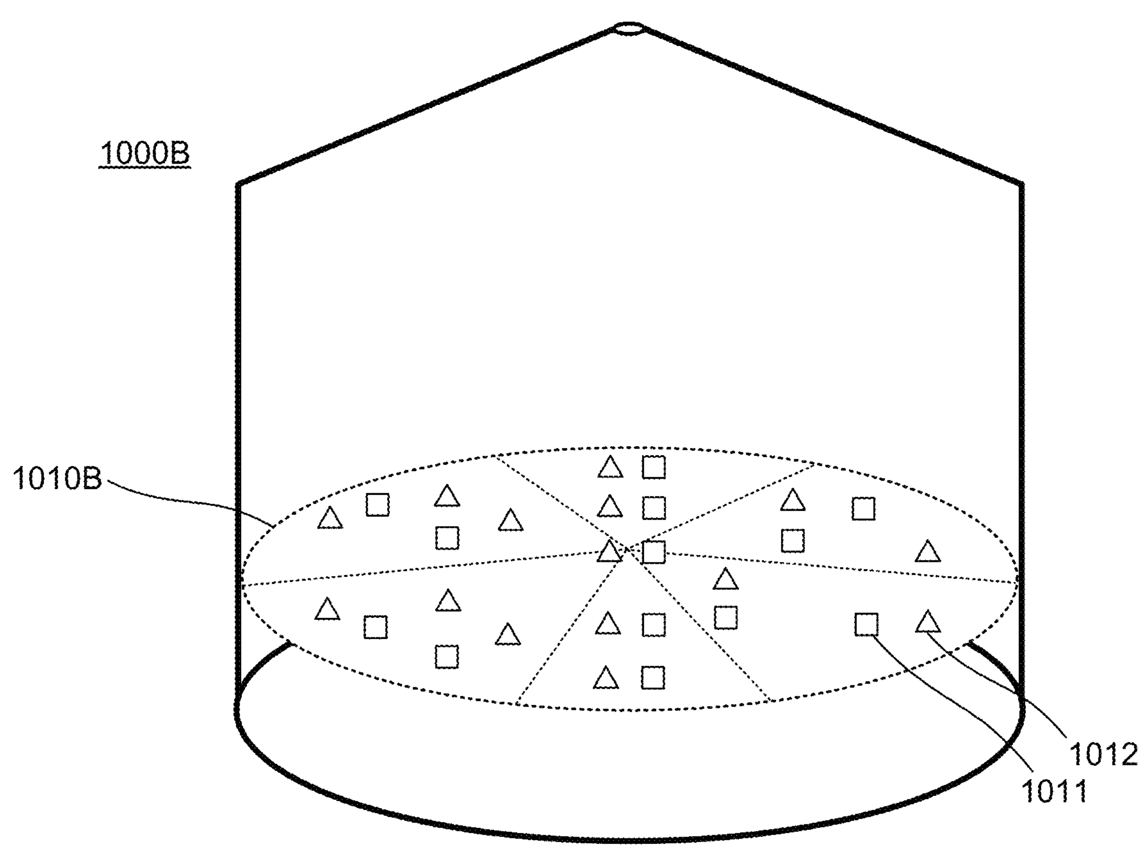

FIG. 10B illustrates a three-dimensional map 1010B of the surface 711C and two types of environmental characteristics of the piled granular material 710 of FIG. 7H assembled from three-dimensional locations of device 100 recorded during traversal of the surface 711C in a mapping pattern (e.g., pattern 930A), according to an embodiment. For example, squares 1011 represent captured temperature measurements and their respective locations of capture; while triangles 1012 represent captured relative humidity measurements and their respective locations of capture. It should be appreciated that the moisture content of a granular material (e.g., a grain) can be mathematically calculated from temperature and humidity measurements captured at approximately the same location, and in this manner, a three-dimensional map of grain moisture can be similarly assembled. Alternatively, in some embodiments triangles 1012 may represent moisture of a sample of granular material as measured by moisture sensor 234. In yet another embodiment, squares 1011 may represent measurements of temperature (e.g., measured by temperature sensor 233) and their respective locations of capture while triangles 1012 represent measurements of air flow (e.g., sensed by air flow sensor 240) and their respective locations of capture.

Figure 10C:
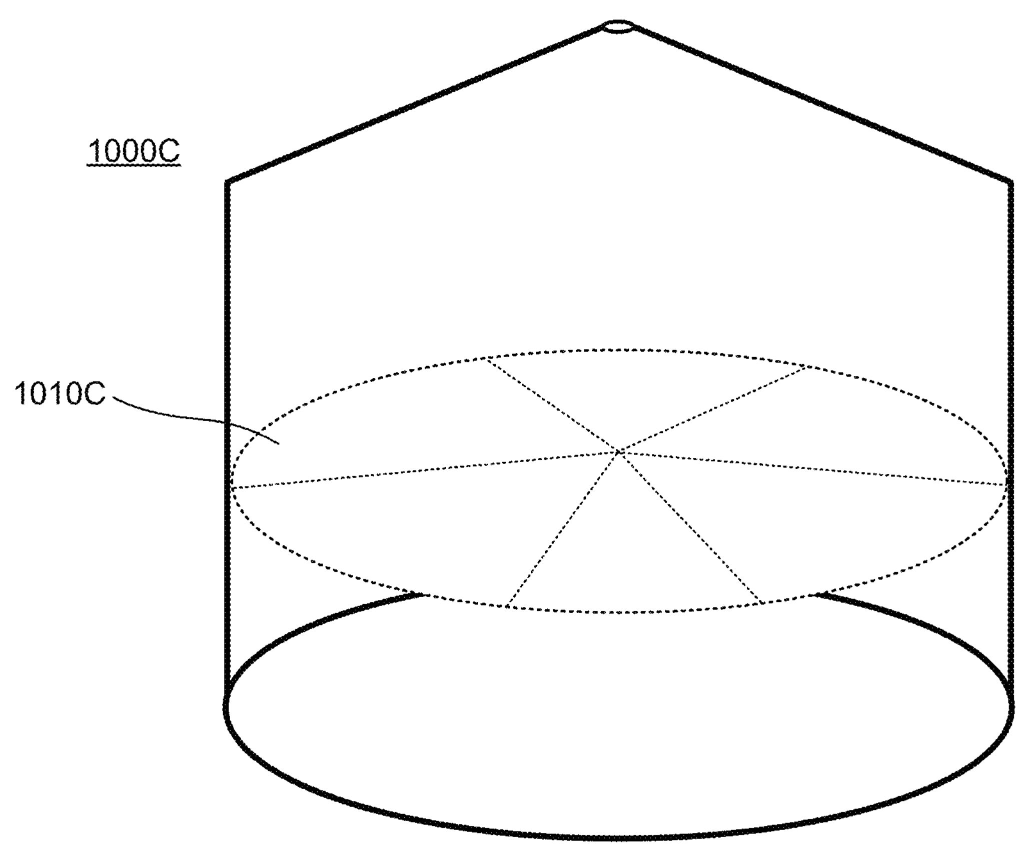

FIG. 10C illustrates a three-dimensional map 1010C of the surface 711E of the piled granular material 710 of FIG. 7J assembled from three-dimensional locations of device 100 recorded during traversal of the surface 711E in a mapping pattern (e.g., pattern 930B), according to an embodiment.

Figure 10D:
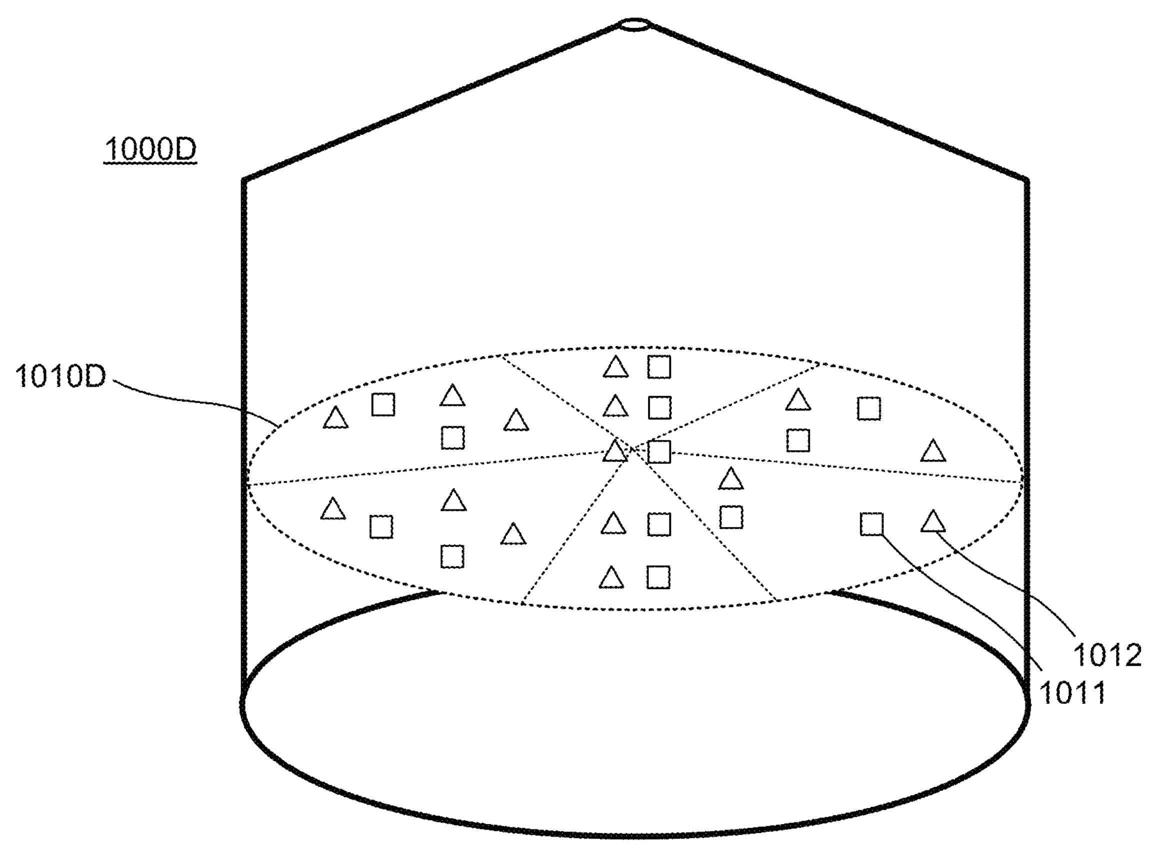

FIG. 10D illustrates a three-dimensional map 1010D of the surface 711E and two types of environmental characteristics of the piled granular material 710 of FIG. 7J assembled from three-dimensional locations of device 100 recorded during traversal of the surface 711E in a mapping pattern (e.g., pattern 930B), according to an embodiment. For example, squares 1011 represent captured temperature measurements and their respective locations of capture; while triangles 1012 represent captured relative humidity measurements and their respective locations of capture. It should be appreciated that the moisture content of a granular material (e.g., a grain) can be mathematically calculated from temperature and humidity measurements captured at approximately the same location, and in this manner, a three-dimensional map of grain moisture can be similarly assembled.

Figure 10E:
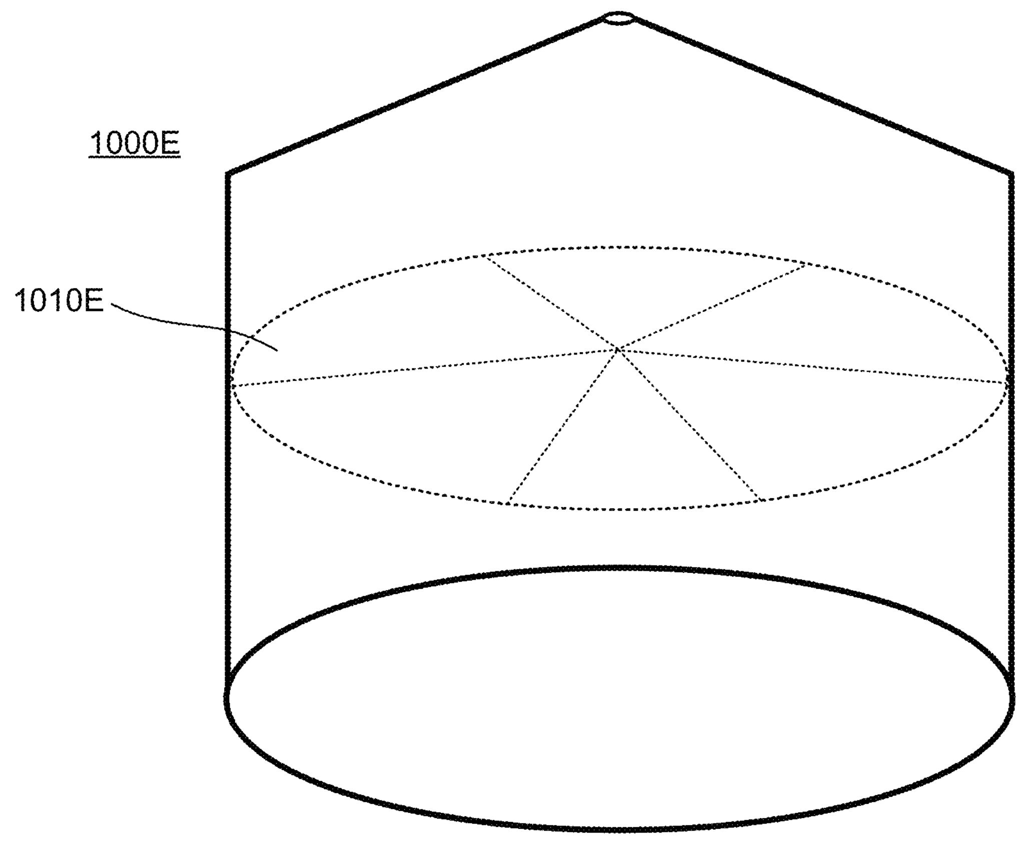

FIG. 10E illustrates a three-dimensional map 1010E of the surface 711G of the piled granular material 710 of FIG. 7L assembled from three-dimensional locations of device 100 recorded during traversal of the surface 711G in a mapping pattern (e.g., pattern 930C), according to an embodiment.

Figure 10F:
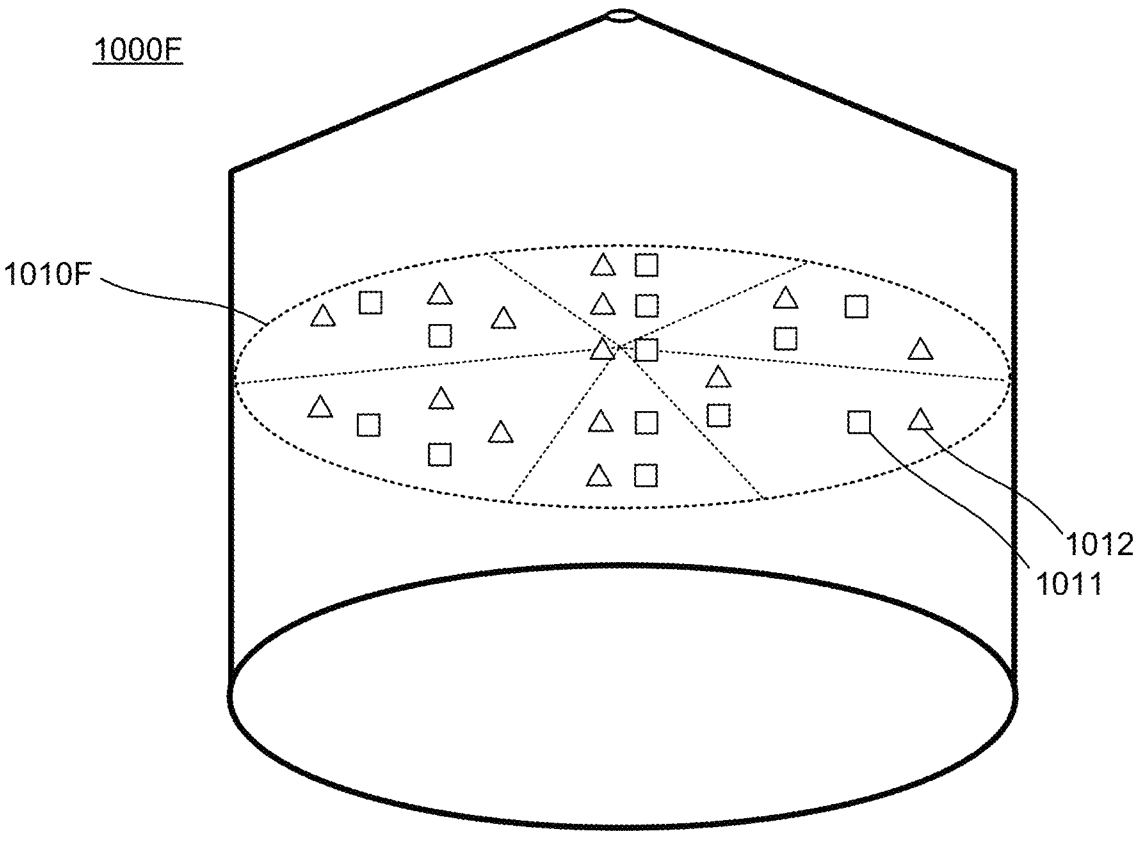

FIG. 10F illustrates a three-dimensional map 1010F of the surface 711G and two types of environmental characteristics of the piled granular material 710 of FIG. 7L assembled from three-dimensional locations of device 100 recorded during traversal of the surface 711G in a mapping pattern (e.g., pattern 930C), according to an embodiment. For example, squares 1011 represent captured temperature measurements and their respective locations of capture; while triangles 1012 represent captured relative humidity measurements and their respective locations of capture. It should be appreciated that the moisture content of a granular material (e.g., a grain) can be mathematically calculated from temperature and humidity measurements captured at approximately the same location, and in this manner, a three-dimensional map of grain moisture can be similarly assembled. A variety of such moisture calculations exist for different grains, and are known in the art.

Figure 10G:
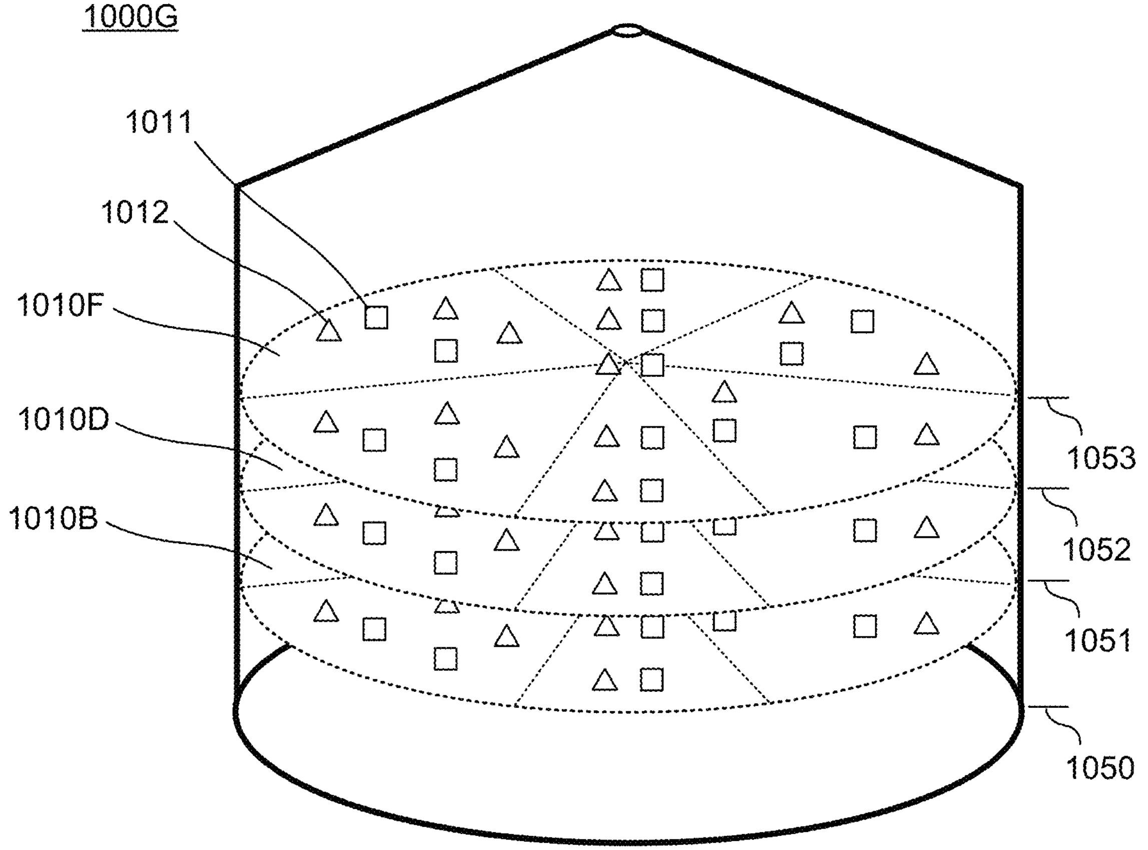
FIG. 10G illustrates an example three-dimensional map of the surface and the inside of a piled granular material assembled from a plurality of three-dimensional surface maps, according to various embodiments.

FIG. 10G illustrates a three-dimensional map 1010G of the surface 711G and the overall pile of piled granular material 710 made by mapping during the filling illustrated in FIGS. 7G-7L along with two types of environmental characteristics (1011 and 1012) of the piled granular material, according to an embodiment. For example, three-dimensional maps 1010B, 1010D, and 1010E can be combined to provide a mapping of environmental characteristics on the surface of and within piled granular material 710 of FIG. 7L.

Average elevations of the floor of the bulk store (elevation 1050) and elevations of surfaces (elevations 1051, 1052, and 1053) associated with various load-ins of grain are depicted. For example, the map of the first surface leveled load-in associated with surface 711C has an average elevation 1051; the map of the second surface leveled load-in of grain associated with surface 711E has an average elevation 1052; and the map of the third surface leveled load-in of grain associated with surface 711G has an average elevation 1053.

Although three three-dimensional maps have been illustrated as being recorded/captured/assembled in conjunction with piled granular material 710, it is appreciated that a greater or lesser number may be recorded/captured/assembled in other embodiments. For example, a three-dimensional map of environmental characteristics of granular material 710 may be made for every 1 cm, 5 cm, 10 cm, etc. change in height of granular material 710 such that one or more environmental characteristics of a pile of granular material 710 are mapped in a plurality of three-dimensional map slices.

Example Uses of Mapping

In some embodiments, a three-dimensional mapping of the surface 711 of a pile of granular material can be used in conjunction with information about the piled granular material (e.g., moisture profiles and/or estimates) and/or information about the bulk store (such as the elevation of the floor) to estimate a volume of piled granular material 710 between the surface 711 and the floor.

In some embodiments, one or more three-dimensional mapping of the surface 711 of may be created during the filling granular material, thus creating a plurality of slice type mappings of granular material within the pile. In an embodiment where one or more environmental characteristics are also captured in conjunction with the three-dimensional mapping, environmental characteristics are also mapped in slice maps which provide a three-dimensional mapping of the captured environmental characteristic(s) within the pile.

Using the three-dimensional surface mappings, a volume of granular material between two slice maps in a pile or associated with a single slice map in a pile can be accurately tracked as it is removed (and moves downward) in response to removing granular material from the top of the pile within the bulk store (when unloading from the bottom a funnel effect causes grain to funnel downward from the top surface, so unloading is typically last-in, first-out). In this manner, a particular volume of granular material associated with certain mapped environmental characteristics can be tracked so that it can be processed in a desired way. That is, because it is knowable and trackable when certain mapped granular material will be accessed and removed and how much granular material needs to be removed to access it, the mapped granular material may be set aside (upon removal) for disposal if it possesses undesirable environmental characteristics. Similarly, because it is knowable when mapped granular material will be accessed and removed, the mapped granular material may be: routed (upon removal) for sale to a particular client who desires the mapped environmental characteristics associated with the volume of granular material; sold for an increased price if it possesses desirable mapped environmental characteristics; and/or presold to a particular client based upon the mapped environmental characteristics. For example, and with reference to 1000G of FIG. 10G an overall volume of grain can be estimated by finding the volume of a cylinder with a radius of half the diameter of bulk store 700 and a height equivalent to the elevation 1053 minus elevation 1050. This works when the successive load-ins are leveled to within a few degrees of 0. Similarly, a volume for any of the load-ins can be calculated by finding the cylindrical volume between the surface of the last load-in and the surface of the load-in being estimated. When precise slopes are known of leveled surfaces of each load-in, those slopes can be incorporated to further refine the estimate, such as by calculating a cylindrical volume and adding on the volume of a shallow cone.

Delivery of Payloads in a Bulk Store

A device 100, such as a robot, may precisely deliver and retrieve payloads within a bulk store (e.g., bulk store 700) for granular material. The payload may be any desired payload which can be carried by device 100, numerous of which have been discussed previously, and may include a sensor (e.g., a temperature sensor, a humidity sensor, an elevation sensor, or some combination of sensors) or a probe which includes one or more of these sensors and is configured to record and/or wirelessly communicate information measured by the sensors. In various embodiments, a probe may collect information about the granular material (grain) which proximally surrounds it (e.g., the temperature local to the probe). In various embodiments, for example, device 100 can operate via remote controlled instruction, autonomously, or some combination thereof. As discussed above, device 100 is robotic and may be referred to as a "robot" or as a "robotic device," and includes an auger-based drive system which facilitates the movement and/or operation of the device in relation to a portion of piled granular material in a bulk store 700, such as a grain bin. The robotic device can be equipped with a payload delivery system allowing the precise placing of a payload such as a probe, including location coordinates within the bulk store. In some embodiments, this location is marked and stored in the payload during delivery and or in the robotic device 100 upon delivery of the payload. For example, the robot maneuvers on the granular material with its auger driven propulsion and using an adaptable tool or a probe delivery module which may be carried in payload bay 440 (e.g., probe delivery payload 344) or elsewhere on device 100, delivers the probe, and marks the probe's location upon delivery/deposition onto the granular material. An adaptable tool can deliver a variety of probes, while a probe delivery module may be configured for delivering and/or retrieving a specific type of probe.

One embodiment of a probe delivery payload 344 is illustrated in FIGS. 11A-11E, it is appreciated that any suitable probe delivery payload may be similarly utilized and that the embodiment of FIGS. 11A-11E is provided by way of example and not of limitation.

Figures 11A, 11B, 11C, 11D, 11E, 12:
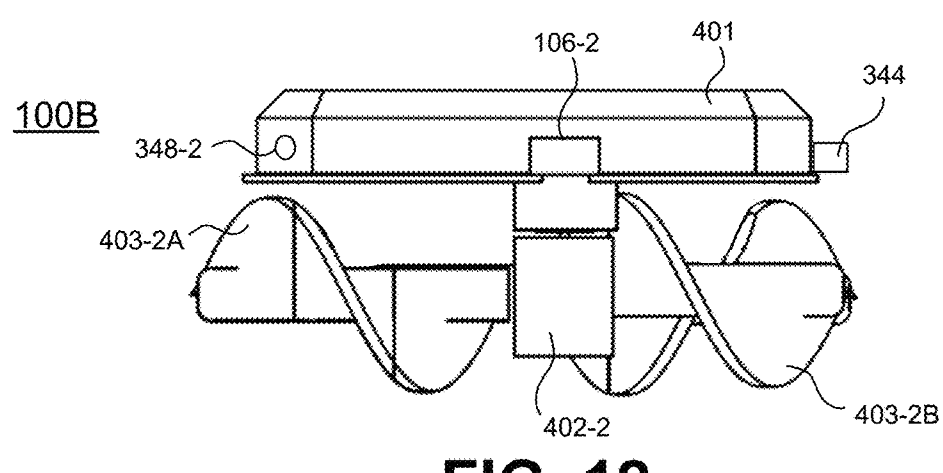
FIGS. 11A-11E illustrate various views of an example probe delivery payload which may be coupled to and controlled by a device which moves about and/or operates in relation to a pile of granular material, in accordance with various embodiments.
FIG. 12 illustrates a right elevational view of the exterior of a device which moves about and/or operates in relation to a pile of granular material and which includes a probe delivery payload, in accordance with various embodiments.

FIG. 11A illustrates a top view of an example probe delivery payload 344 which may be coupled to and controlled by a device 100 which moves about and/or operates in relation to a pile of granular material, in accordance with various embodiments.

FIG. 11B illustrates a front view of an example probe delivery payload 344 which may be coupled to and controlled by a device 100, in accordance with various embodiments. The rear view is substantially the same.

FIG. 11C illustrates a bottom view of an example probe delivery payload 344 which may be coupled to and controlled by device 100, in accordance with various embodiments. A plurality of doors 1101 (1101-1, 1101-2, 1101-3, 1101-4, 1101-5, 1101-6, 1101-7, 1101-8, 1101-9) are depicted, but a greater or lesser number may be used in various embodiments. Each of the doors 1101 may be independently opened by a device 100, or a processor thereof, such as by actuating a solenoid which holds a particular door in a closed position.

FIG. 11D illustrates a right side view of an example probe delivery payload 344 which may be coupled to and controlled by a device 100, in accordance with various embodiments. The left side view is a mirror image thereof.

FIG. 11E illustrates a right side view of an example probe delivery payload 344 which may be coupled to and controlled by a device 100, in accordance with various embodiments. In FIG. 11E, door 1101-1 has been opened by a device 100 (not depicted in FIG. 11E), freeing a payload 1110 to be dropped via gravity. Payload 1110 may be a probe which is left behind after it lands on a surface upon which a device 100 is operating.

FIG. 12 illustrates a right elevational view of the exterior of a device 100B which moves about and/or operates in relation to a pile of granular material 710, in accordance with various embodiments. Device 100B is similar to device 100 illustrated in FIG. 4C-2, except that probe delivery payload 344 has been coupled to its rear and communicatively coupled to a host processor 102 which exerts control over which doors 1101 to open and when to open them in order to precisely deliver a payload 1110.

Figure 13:
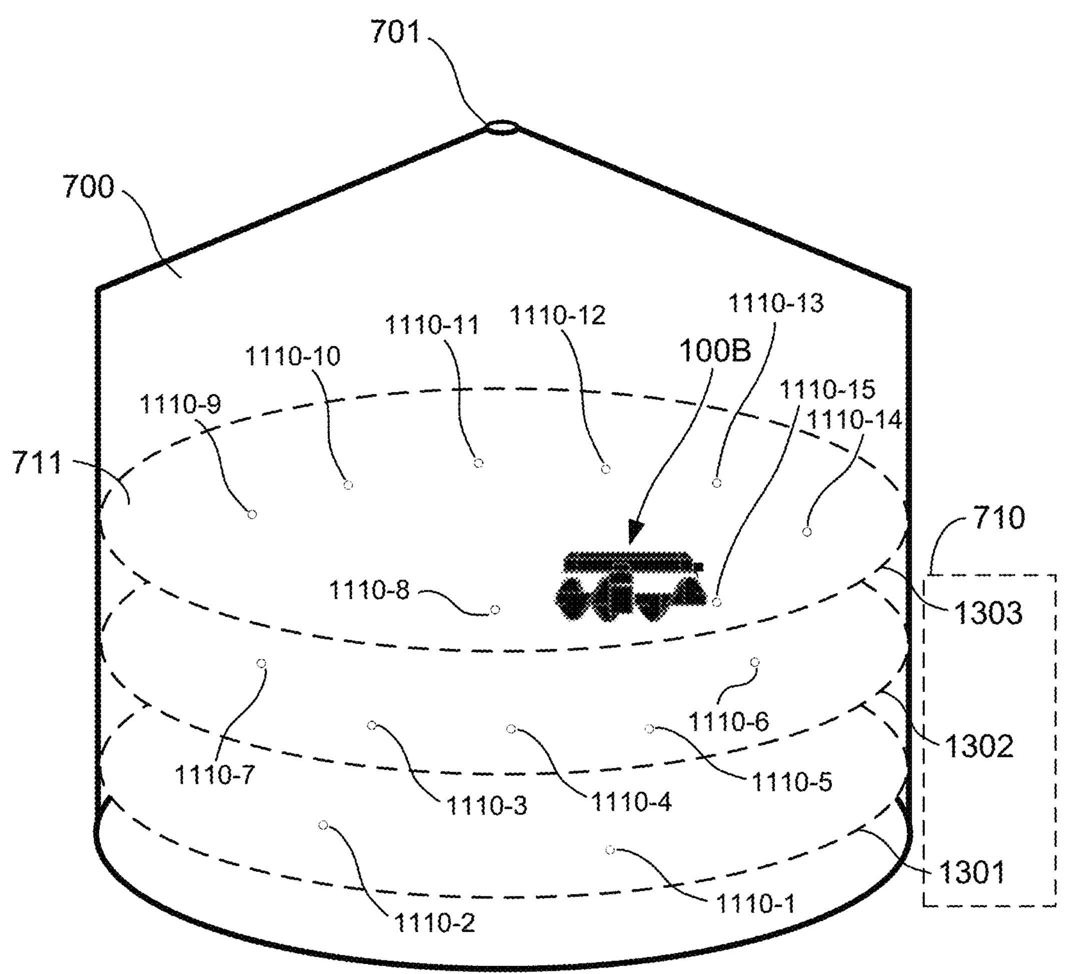
FIG. 13 illustrates robot delivery of a payload, which may be a probe or sensor, in a bulk store in a predetermined three-dimensional pattern as granular material such as grain is added to the bulk store, according to various embodiments.
Figure 14:
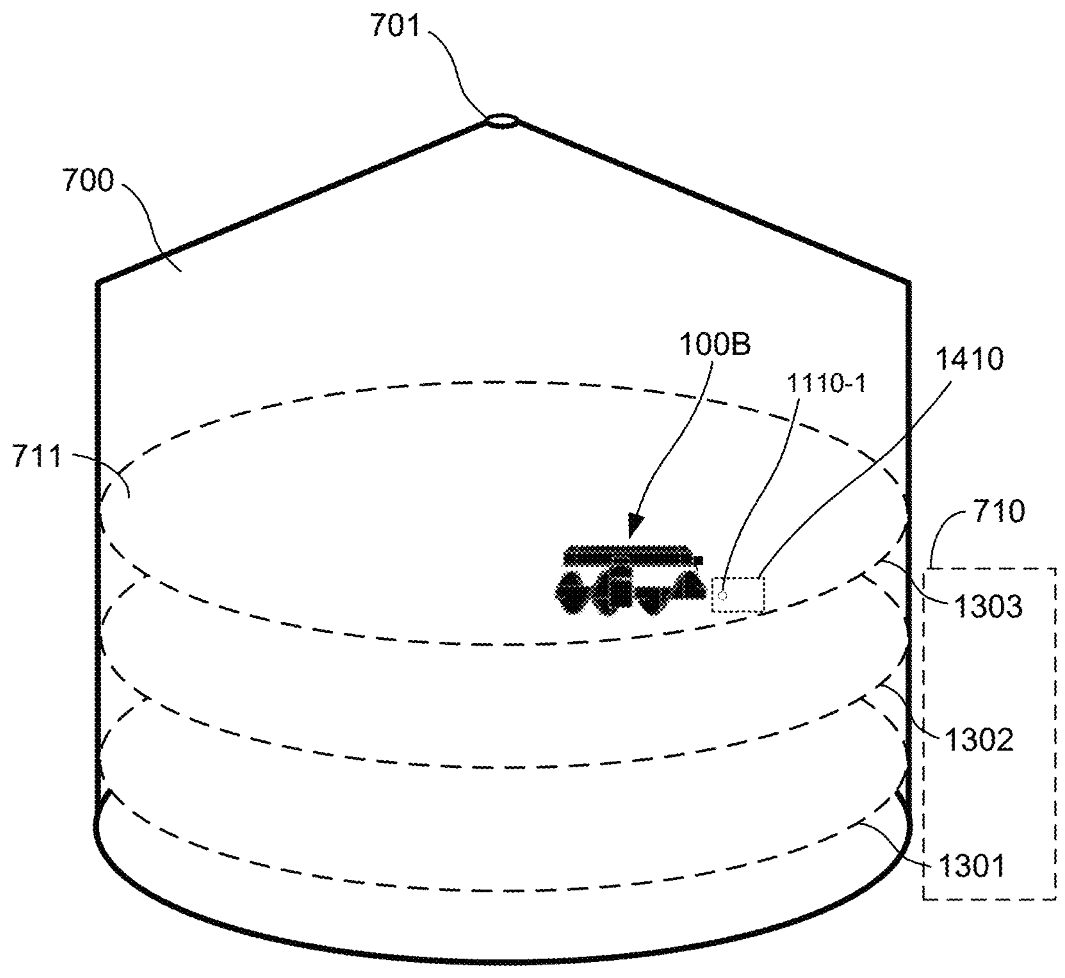
FIG. 14 illustrates robot delivery of a payload, which may be a probe or sensor, in a bulk store when triggered by detection of specified criteria, according to various embodiments.
Figure 15:
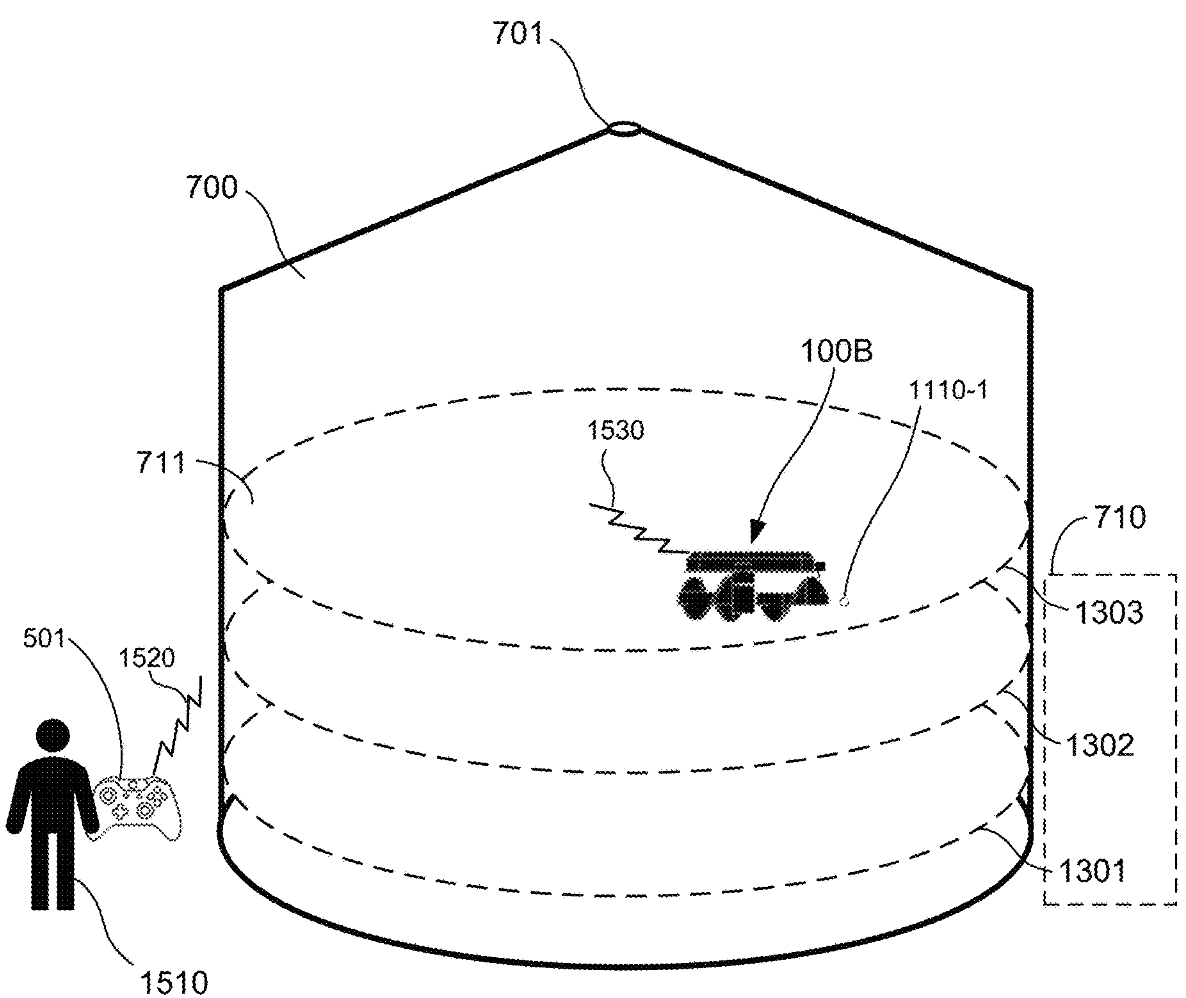
FIG. 15 illustrates robot delivery of a payload, which may be a probe or sensor, in a bulk store when triggered by human engagement, according to various embodiments.

Several methods of payload delivery are described in conjunction with the description of FIGS. 13, 14, and 15. It should be appreciated that although these methods are described in isolation for purposes of clarity, they may be used in various combinations with one another. For example, while probes are being delivered according to a predetermined pattern, a device 100 (e.g., device 100B) may deliver an individual probe in a place which is not specified by the pattern in response to receiving remote controlled instructions to do so and/or in response to sensing specified criteria which satisfy a requirement for delivery of a probe.

A pattern for probe delivery may be the same pattern (or a portion thereof) used to level a piled granular material in a bin or other store. For example, during the leveling probes may be dispensed at designated locations which may be manually selected, predetermined/preprogrammed, and/or in response to meeting of sensed criterial (e.g., one or some combination of location, temperature measured, air flow measured, moisture of granular material measured, etc.). That is, while leveling piled granular material, device 100B may encounter locations or criteria which dictate triggering of payload delivery. In this manner, payload delivery may, in some embodiments, occur coincident with other activities of device 100B.

FIG. 13 illustrates robot delivery of a payload 1110, which may be a probe, in a bulk store in a predetermined three-dimensional pattern as granular material such as grain is added to the bulk store 700, according to various embodiments. Bulk store is shown as a three-dimensional side section view, similar to section A-A of FIG. 7B. Dashed discs 1301, 1302, and 1303 (shown in FIGS. 13, 14, and 15) represent maps of surfaces at different levels within a pile of piled granular material 710.

In FIG. 13, device 100B is illustrated delivering a plurality of probes 1110 (e.g., 1110-1 through 1110-15) over a period of time as grain has been loaded through top loading portal 701 of bulk store 700 to form a pile 710 of granular material (e.g., a pile of grain). For example, at the level represented by disk 1301, at the beginning of the loading of grain, device 100B delivered probes 1110-1 and 1110-2 according to a specified and predetermined, spaced out pattern. At level represented by disk 1302, after more grain has been loaded atop the level represented by disk 1301 of piled granular material 710, device 100B delivered probes 1110-3 through 1110-7 according to a specified and predetermined, spaced out pattern (which may be the same or different than the pattern employed on the level represented by disk 1301). At level represented by disk 1303, after more grain has been loaded atop the level represented by disk 1302 of the piled granular material 710, device 100B delivered probes 1110-8 through 1110-15 according to a specified and predetermined, spaced out pattern (which may be the same or different than the pattern employed on the level represented by disk 1301 and/or on the level represented by disk 1302). In the illustrated embodiment, probe 1110-15 has just been delivered relative to a preprogramed position on piled granular material 710.

In some embodiments, a method of probe delivery in a predetermined pattern within a bulk store, such as a grain bin may include some of the following procedures. A probe 1110, or set of probes 1110, is loaded into the probe delivery payload 344 of device 100B. Device 100B is given instructions on where to deliver the probes via a pattern selection in its programmable memory 103. Device 100B is placed in the bulk store 700 facility (or on a pile of granular material 710). Granular material (e.g., grain) begins to be loaded into the bulk store 700 and/or onto the pile 710, in some embodiments. Device 100B performs a series of maneuvers on the surface of the granular material to position itself with respect to the pattern which it is executing by traversing the piled granular material 710 (which may be in the process of loading such as through a top loading portal 701). A probe 1110 is placed by device 100B (e.g., by controlling dispensation of the probe 1110 from the probe delivery payload 344) in the precise location when device 100B arrives through its maneuvering at a predetermined location in the programmed pattern. In some embodiments, the location is marked by device 100B with the probe identification (e.g., a serial number or other number assigned to the dispensed probe 1110) position coordinates at the time of the delivery. Inside of a bulk store 700, the position may be realized by triangulation to beacons or other suitable means such as overhead video tracking. As part of the marking, the probe identification and/or position may be stored in a memory of device 100B and or wirelessly transmitted by device 100B. In the same manner, according to the preprogrammed pattern, one or more additional probes 1110 may be placed and, in some embodiments, may have their probe identification and placed position coordinates marked (i.e., recorded by device 100B and/or wirelessly transmitted by device 100B).

FIG. 14 illustrates robot delivery of a payload 1110, which may be a probe, by a device 100B in a bulk store 700 when triggered by detection of specified criteria, according to various embodiments. In FIG. 12, device 100B is illustrated delivering a probe 1110-1 to a specific preprogrammed location 1410 which may be a two-dimensional location or a three-dimensional location (where the third dimension is elevation). The location may be specified as an exact set of coordinates or as a small geo-fence within which to deliver the probe 1110-1. A plurality of probes may be delivered in this manner to a plurality of preprogrammed locations. The specified criteria discussed above may be arrival of device 100B at the predetermined location 1410, however additional and/or different specified criteria may determine when/where a probe 1110-1 is delivered. For example, device 100B may deposit a temperature sensing probe 1110 upon device 100B sensing a temperature of grain in a locality of granular material it is traversing meeting a specific criterion (e.g., exceeding a threshold temperature).

In some embodiments, a method of probe delivery within a bulk store 700, such as a grain bin, in response to detection of specified criteria may include some of the following procedures. Probe 1110, or a set of probes, is loaded into the probe delivery payload 344 of device 100B. Device 100B is placed in the bulk store facility 700 (or on a pile of granular material 710). Granular material (e.g., grain) begins to be loaded into the bulk store 700 and/or onto the pile 710, in some embodiments. Device 100B performs a series of maneuvers on the surface of the piled granular material 710 to position itself, where the maneuvers may be automated, based on stored instructions (e.g., a pattern), based on human remote control, or some combination thereof. Device 100B performs a series of readings with on-board sensors. The probe 1110 is placed in the specific location when the sensor readings detect a predetermined condition (i.e., the specified criteria, such as grain temperature exceeding a preestablished threshold) and device 100B triggers the delivery instructions to effect dispensation of a probe from the probe delivery payload 344. In some embodiments, the location is marked by device 100B with the probe identification (e.g., a serial number or other number assigned to the dispensed probe 1110) position coordinates at the time of the delivery. Inside of a bulk store 700, the position may be realized by triangulation to beacons or other suitable means such as overhead video tracking. As part of the marking, the probe identification and/or position may be stored in a memory of device 100B and or wirelessly transmitted by device 100B. In the same manner, one or more additional probes 1110 may be placed and, in some embodiments, may have their probe identification and placed position coordinates marked (i.e., recorded by device 100B and/or wirelessly transmitted by device 100B).

FIG. 15 illustrates robot delivery of a payload 1110, which may be a probe, in a bulk store 700 when triggered by human engagement, according to various embodiments. For example, a human 1510 may utilize a remote controller 501 to send wireless signals 1520 to device 100B and receive signals 1530 from device 100B. In FIG. 13, device 100B is illustrated delivering a probe 1110-1 upon receiving instructions from human 1510 which are sent via remote controller 501 or by other suitable means. In some embodiments, a signal 1530 may be wirelessly sent to remote controller 501, or elsewhere, with the identification and marked location of a dispensed probe 1110-1.

In some embodiments, a method of probe delivery within a bulk store 700, such as a grain bin, in response to direction by human remote control may include some of the following procedures. Probe 1110, or a set of probes, is loaded into the probe delivery payload 344 of device 100B. Device 100B is placed in the bulk store facility 700 (or on a pile of granular material 710). Granular material (e.g., grain) begins to be loaded into the bulk store 700 and/or onto the pile 710, in some embodiments. Device 100B performs a series of maneuvers on the surface of the granular material to position itself, where the maneuvers may be automated, based on stored instructions (e.g., a pattern), based on human remote control, or some combination thereof. Device 100B is maneuvered by human remote control to a location where it is desired to place a probe 1110. Probe 1110 is placed in the specific location when the human remotely triggers device 100B to provide delivery instructions to effect dispensation of a probe 1110 from the probe delivery payload 344. In some embodiments, the location is marked by device 100B with the probe identification (e.g., a serial number or other number assigned to the dispensed probe 1110) position coordinates at the time of the delivery. Inside of a bulk store 700, the position may be realized by triangulation to beacons or other suitable means such as overhead video tracking. As part of the marking, the probe identification and/or position may be stored in a memory of device 100B and or wirelessly transmitted by device 100B. In the same manner, human remote instruction may be used to control device 100B to maneuver and place one or more additional probes and may have their probe identification and placed position coordinates marked (i.e., recorded by device 100B and/or wirelessly transmitted by device 100B).

Piled Grain Surface Management

FIGS. 16A-16D illustrate a flow diagram 1600 of an example method of surface management of piled grain, in accordance with various embodiments. Procedures of the methods illustrated by flow diagram 1600 of FIGS. 16A-16D will be described with reference to elements and/or components of one or more of FIGS. 1-15. It is appreciated that in some embodiments, the procedures may be performed in a different order than described in a flow diagram, that some of the described procedures may not be performed, and/or that one or more additional procedures to those described may be performed. Flow diagram 1600 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 1600 may be implemented in hardware, or a combination of hardware with firmware and/or software.

For purposes of example only, the devices 100 and 100B (generically referred to as "device 100" and/or "device 100") is a robotic device which utilizes augers (403) to move and maneuver with respect to piled granular material, such as, but not limited to piled grain. Robot 100 will be described as operating on or in relation to piled grain in a bulk store, such as, but not limited to grain in a grain bin. In some embodiments, robot 100 is free of mechanical coupling with a structure (e.g., the bulk store) in which the piled grain is contained. For example, in some embodiments, there is no tether or safety harness coupling the robot 100 to the grain storage bin and it operates autonomously or under wireless remote control. In some embodiments, robot 100 performs the method of flow diagram 1600 completely autonomously. In some embodiments, robot 100 performs the method of flow diagram 1600 semi-autonomously such as by measuring a slope of grain, sending the slope to an external computer system which then determines a pattern for robot 100 to autonomously execute when traversing the piled grain. In some embodiments, robot 100 performs the method of flow diagram 1600 semi-autonomously such as by receiving a remotely measured slope of grain, then autonomously determining a pattern for robot 100 to autonomously execute when traversing the piled grain.

With reference to FIG. 16A, at procedure 1610 of flow diagram 1600, in various embodiments, a robot 100 which includes a processor 102, a memory 103, and an auger-based drive system (e.g., augers 403) receives, instructions to traverse a surface of piled grain in a bulk store. In some embodiments, the instructions may be received wirelessly from a remotely located computer system (506, 605, 604, etc.) or wirelessly from a remote controller 501 operated by a human (i.e., a human may drive the robot 100 remotely). In some embodiments, the instructions may be preprogrammed into robot 100. In some embodiments, the instructions are for the robot 100 to follow a predetermined pattern of movement to traverse the surface of the piled grain.

With continued reference to FIG. 16A, at procedure 1620 of flow diagram 1600, in various embodiments, a processor (e.g., processor 102) of robot 100 controls movement of robot 100 according to the instructions. Via commands to motor controllers 105 and/or drive motors 106 of an auger-based drive system, the robot 100 is controlled to traverse a surface of piled grain 710 in a bulk store 700. As a result of the traversal, a crust layer of the surface is broken up by auger rotation of the auger-based drive system during the traversal. That is, the augers churn the surface of the piled grain 710 to a depth of one to several inches (e.g., 3-12 inches), thus breaking up surface crust and crust which may form a grain bridge over a void in the piled grain 710. Breaking the crust in this manner allows grain below the crust to dry more evenly and prevents spoilage that can result from the crust on the surface. Additionally, breaking up crusts which are part of a grain bridge assists in the flow of the grain when the grain is removed from the bulk store and improves human safety, should a human need to enter and walk upon the surface of the piled grain 710. The traversal may be according to a pattern, many of which have been depicted and described herein.

With continued reference to FIG. 16A, at procedure 1630 of flow diagram 1600, in various embodiments, the processor directs, according to the instructions, traversal by the robot of a sloped portion of the piled grain to incite sediment gravity flow in the sloped portion of piled grain by disruption of viscosity of the sloped portion of piled grain through agitation of the sloped portion of the piled grain by the auger rotation of the auger-based drive system, wherein the sediment gravity flow reduces a slope of the sloped portion. As described herein, the sediment gravity flow is, effectively, a purposely induced landslide. The sloped portion may be sought out by the robot 100, in some embodiments. In some embodiments, the traversal of one or more sloped portions is repeated to bring reduce the slope of the sloped portion more toward level, which may be realized by bringing the slope below a threshold slope such between +/−5 degrees, between +/−4 degrees, +/−2 degrees, or +/−1 degree. In some embodiments, the traversal of one or more sloped portions is repeated to bring reduce the slope of the sloped portion more toward level by reducing the slope by a predetermined amount such as 3 degrees, 5 degrees, 10 degrees, etc.

With reference to FIG. 16B, at procedure 1640 of flow diagram 1600, in various embodiments, during traversal of a portion (e.g., portion 720) of piled grain by robot 100, a sensor 120 of robot 100 acts under instruction of host processor 102 to capture a measurement of a characteristic of the portion of piled grain. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled grain which is traversed by robot 100.

In some embodiments, the captured measurement(s) of characteristic(s) may be transmitted to a base station (506, 605) that is/are communicatively coupled with robot 100. The base station (506, 605) is located remotely from the robot and may be configured to communicate with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled grain. Additionally, or alternatively, via such communications, the base station (506, 605) may relay instructions to robot 100.

In some embodiments, the captured measurement(s) of characteristic(s) may be transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

With reference to FIG. 16C, at procedure 1650 of flow diagram 1600, in various embodiments, a temperature sensor 233, infrared sensor 236, or infrared camera 108 of robot 100 is used to capture a temperature measurement of a portion (e.g., portion 720) of piled grain during the traversal of the portion of piled grain. In some embodiments, the captured measurement of a characteristic is paired with a location of robot 100 at the time of capture of the temperature measurement. Such paired data can be used to create a heat map of the piled grain which is traversed by robot 100. Additionally, temperature data can provide an operator of the bulk store information about the conditions of storage, quality of grain, and/or identify areas for additional traversal to prevent crust formation and ensure air circulation.

With reference to FIG. 16D, at procedure 1660 of flow diagram 1600, in various embodiments, a probe delivery payload 344 delivers a probe 1110 onto a surface of the piled grain 710. As described herein, the probe may have a sensor which measures and reports conditions of the grain. The probe may be delivered during load-in of grain, and thus become buried in grain. This may facilitate, over time, positioning of probes which provide measurements at different levels within a column of piled grain 710. Such delivery of probes may be based on preprogrammed positions in a pattern, coordinate locations, human direction, or automated response of robot 100B upon detecting a particular characteristic (e.g., grain temperature above a preset threshold).

Mapping within a Bulk Store of Granular Material

FIGS. 17A-17D illustrate a flow diagram 1700 of an example method of mapping within a bulk store (e.g., bulk store 700 or other bulk store) of granular material, in accordance with various embodiments. Procedures of the methods illustrated by flow diagram 1700 of FIGS. 17A-17D will be described with reference to elements and/or components of one or more of FIGS. 1-15. It is appreciated that in some embodiments, the procedures may be performed in a different order than described in a flow diagram, that some of the described procedures may not be performed, and/or that one or more additional procedures to those described may be performed. Flow diagram 1700 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 1700 may be implemented in hardware, or a combination of hardware with firmware and/or software.

For purposes of example only, the devices 100 and 100B (generically referred to as "device 100" and/or "device 100") is a robotic device which utilizes augers (403) to move and maneuver with respect to piled granular material, such as, but not limited to piled grain. Robot 100 will be described as operating on or in relation to piled grain in a bulk store, such as, but not limited to grain in a grain bin. In some embodiments, robot 100 is free of mechanical coupling with a structure (e.g., the bulk store) in which the piled grain is contained. For example, in some embodiments, there is no tether or safety harness coupling the robot 100 to the grain storage bin and it operates autonomously or under wireless remote control. In some embodiments, robot 100 performs the method of flow diagram 1700 completely autonomously. In some embodiments, robot 100 performs the method of flow diagram 1700 semi-autonomously such as by measuring a slope of grain, sending the slope to an external computer system which then determines a pattern for robot 100 to autonomously execute when traversing the piled grain. In some embodiments, robot 100 performs the method of flow diagram 1700 semi-autonomously such as by receiving a remotely measured slope of grain, then autonomously determining a pattern for robot 100 to autonomously execute when traversing the piled grain.

With reference to FIG. 17A, at procedure 1710 of flow diagram 1700, in various embodiments, a robot 100 which includes a processor 102, a memory 103, and an auger-based drive system (e.g., augers 403), the robot traverses, a first surface (e.g., 711B of FIG. 7G) of a piled granular material 710 in a bulk store (e.g., bulk store 700) in a mapping pattern (pattern 730, pattern 731, pattern 732, etc.). Numerous patterns which may be used for mapping are depicted and described herein, and reference is made to the patterns illustrated in FIGS. 7D, 7E, and 9A-9C which may be used for mapping as well as for other purposes.

In some embodiment, the traversing comprises robot 100 traversing a first surface of a piled granular material in a bulk store in the mapping pattern and inciting sediment gravity flow of a sloped portion that is traversed. That is, the traversal of the first surface of the piled granular material 710 in this mapping pattern intentionally incites sediment gravity flow in a sloped portion of the piled granular material by disrupting the viscosity of the sloped portion through agitation of the sloped portion of the piled granular material 710 by auger rotation of the auger-based drive system. Effectively, the augers dig several inches into the sloped surface and their agitation lowers the viscosity of the piled granular material 710 in traversed portions. In this manner, the incited sediment gravity flow causes a small avalanche/slide of the granular material in the sloped portion, which is traversed, resulting in a slightly less steep slope after the traversal and the resulting slide of granular material.

In some embodiments, the traversal of the first surface of the piled granular material in the bulk store occurs while the bulk store is being filled with additional granular material atop the first surface. For example, and with reference to FIG. 7A, while granular material (e.g., grain, etc.) is loaded into the top loading portal 701 of bulk store 700, robot 100 may be actively traversing a surface 711 on piled granular material 710 below. In some embodiments, the traversing may also take place while granular material (e.g., grain, etc.) is unloaded by a sump auger at the bottom of bulk store 700. In other embodiments, the traversing may take place between loading and unloading of granular material (e.g., grain, etc.).

With reference to FIG. 17A, at procedure 1720 of flow diagram 1700, in various embodiments, the robot (e.g., robot 100) records a plurality of three-dimensional locations of the robot 100 during the traversal in the mapping pattern. The three-dimensional locations may be recorded together with readings from one or more sensors 120 which are measured at one or more of the three-dimensional points. In this fashion, a three-dimensional location may be assigned to one or more measurements. For example, a plurality of three-dimensional location (and in some embodiments measurements too) may be recorded while traversing surface 711C in pattern 930A of FIG. 9A.

With reference to FIG. 17A, at procedure 1730 of flow diagram 1700, in various embodiments, the plurality of three-dimensional locations of the robot 100 are assembled into a three-dimensional surface map of the first surface of the piled granular material. In some embodiments, the robot may assemble the three-dimensional locations into the three-dimensional surface map, while in other locations, the three-dimensional locations are transmitted from the robot to an external computer system (e.g., 605, 506, etc.) which may perform the three-dimensional surface map assembly. FIGS. 10A-10G provide some examples of three-dimensional surface maps which may be assembled. For example, maps 1010A and 1010B may be assembled after traversal of surface 711G in pattern 930A. In some embodiments, the map(s) may be provided for viewing by a human user on a display.

Figure 17B:
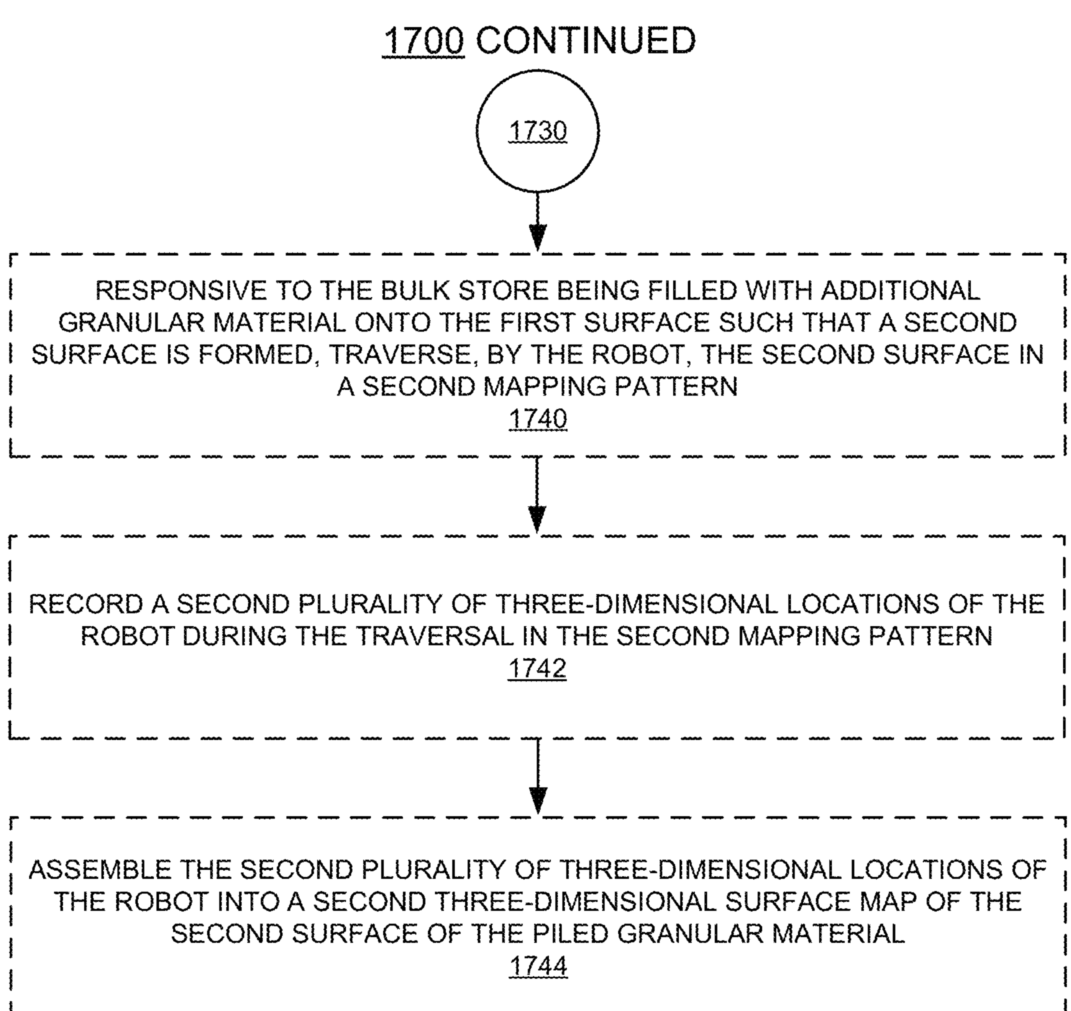

With reference to FIG. 17B, at procedure 1740 of flow diagram 1700, in various embodiments, the method as recited in 1710-1730 further includes: responsive to the bulk store being filled with additional granular material onto the first surface such that a second surface is formed, the robot 100 traverses the second surface in a second mapping pattern. For example, with reference to FIG. 9A, a first surface 711C is traversed with a first pattern 930A and then a second surface 711E is traversed with a second pattern 930B. It should be appreciated that other patterns may be utilized for such traversals and that these are referenced by way of example and not of limitation.

With reference to FIG. 17B, at procedure 1742 of flow diagram 1700, in various embodiments, a second plurality of three-dimensional locations of the robot 100 are recorded during the traversal in the second mapping pattern. With reference to FIG. 9B, in one embodiment, this comprises robot 100 recording a second plurality of three-dimensional locations while traversing surface 711E in pattern 930B.

With reference to FIG. 17B, at procedure 1744 of flow diagram 1700, in various embodiments the second plurality of three-dimensional locations of the robot 100 are assembled into a second three-dimensional surface map of the second surface of the piled granular material. In some embodiments, the robot may assemble the three-dimensional locations into the three-dimensional surface map, while in other locations, the three-dimensional locations are transmitted from the robot to an external computer system (e.g., 605, 506, etc.) which may perform the three-dimensional surface map assembly. For example, maps 1010C and 1010D may be assembled after traversal in pattern 930B. The map(s) are depicted with respect to a notional side sectional view of a bulk store. In some embodiments, the map(s) may be provided for viewing by a human user on a display.

With reference to FIG. 17C, at procedure 1750 of flow diagram 1700, in various embodiments, the method as recited in 1710-1744 further includes: capturing, by a sensor 120 of the robot 100, a measurement of an environmental characteristic at each of a plurality of the plurality of three-dimensional locations and the plurality of second three-dimensional locations to achieve a plurality of measurements. In some embodiments, this may include capturing one of a temperature measurement (e.g., with temperature sensor 233), a humidity measurement (e.g., with moisture sensor 234), an air flow measurement (e.g., with an air flow sensor), a barometric pressure measurement (e.g., with a barometric sensor 239), a carbon dioxide measurement (e.g., with a carbon dioxide sensor), an optical image (e.g., with optical sensor 235), and an infrared image (e.g., with infrared sensor 236).

With reference to FIG. 17C, at procedure 1752 of flow diagram 1700, in various embodiments one or more measurements of the plurality of measurements are assembled, based on their respective three-dimensional locations of capture, into a three-dimensional map of the environmental characteristics of the bulk store. The assembling may be accomplished by robot 100 or by a computer (e.g., 506, 605, 602) to which robot 100 transmits the plurality of measurements. FIG. 10D illustrates a three-dimensional map 1010D with a second plurality of measurements depicted. The map is depicted with respect to a notional side sectional view of a bulk store. In some embodiments, the map may be provided for viewing by a user on a display.

With reference to FIG. 17D, at procedure 1760 of flow diagram 1700, in various embodiments, the method as recited in 1710-1730 further includes: capture, by a sensor 120 of the robot 100, a first measurement of an environmental characteristic at each of a plurality of the three-dimensional locations to achieve a plurality of measurements. In some embodiments, this may include capturing one of a temperature measurement, a humidity measurement, an air flow measurement, a barometric pressure measurement, a carbon dioxide measurement, an optical image, and an infrared image. In some embodiments, this comprises capturing one of a temperature measurement and a humidity measurement, either and both of which can be used to assess condition of grain when the piled granular material is grain.

With reference to FIG. 17D, at procedure 1762 of flow diagram 1700, in various embodiments one or more measurements of the plurality of measurements are assembled, based on their respective three-dimensional locations of capture, into a three-dimensional map of the environmental characteristics of the bulk store. The assembling may be accomplished by robot 100 or by a computer (e.g., 506, 605, 602) to which robot 100 transmits the plurality of measurements. FIG. 10B illustrates a three-dimensional map 1010B with a first plurality of measurements 1011 depicted. The map 1010B is depicted with respect to a side sectional view of a bulk store. In some embodiments, the map may be provided for viewing by a user on a display.

With reference to FIG. 17E, at procedure 1770 of flow diagram 1700, in various embodiments, the method as recited in 1762 further includes: capture, by a second sensor 120 of the robot 100, a second measurement of a second environmental characteristic at each of a second plurality of the three-dimensional locations to achieve a plurality of second measurements. Where the sensor was one of a temperature sensor 233 and a moisture sensor 234, in some embodiments the second sensor is the other of those two. For example, in an embodiment where the first sensor measures one of temperature and humidity, the second sensor measures the other of temperature and humidity that was not measured by the sensor.

With reference to FIG. 17E, at procedure 1772 of flow diagram 1700, in various embodiments one or more measurements of the plurality of second measurements are assembled, based on their respective three-dimensional locations of capture, into a three-dimensional map of the environmental characteristics of the bulk store. The assembling may be accomplished by robot 100 or by a computer (e.g., 506, 605, 602) to which robot 100 transmits the plurality of measurements. FIG. 10B illustrates a three-dimensional map 1010B with a first plurality of measurements 1011 and a second plurality of measurements 1012 depicted. The map is depicted with respect to a notional side sectional view of a bulk store. In some embodiments, the map may be provided for viewing by a user on a display.

Section 3

Grain Bin and Bulk Store Management

A device 100 may operate as an assistant in the management of grain that is stored in a bulk store. By way of example, and not of limitation, the grain may be stored within a grain bin and the device 100 may operate to assist with management a grain bin: prior to load-in of grain, during load-in of grain, after load-in of grain, during long term storage of grain, during extraction of grain, and/or during final clean-out of grain from a bin. The management may be a primary role of device 100 or as an extension of a device 100 traversing the surface of piled granular material for leveling, mapping, or other reasons. The device 100 may similarly assist with management of grain stored in other bulk stores, many types of which have been described herein.

Figure 18A:
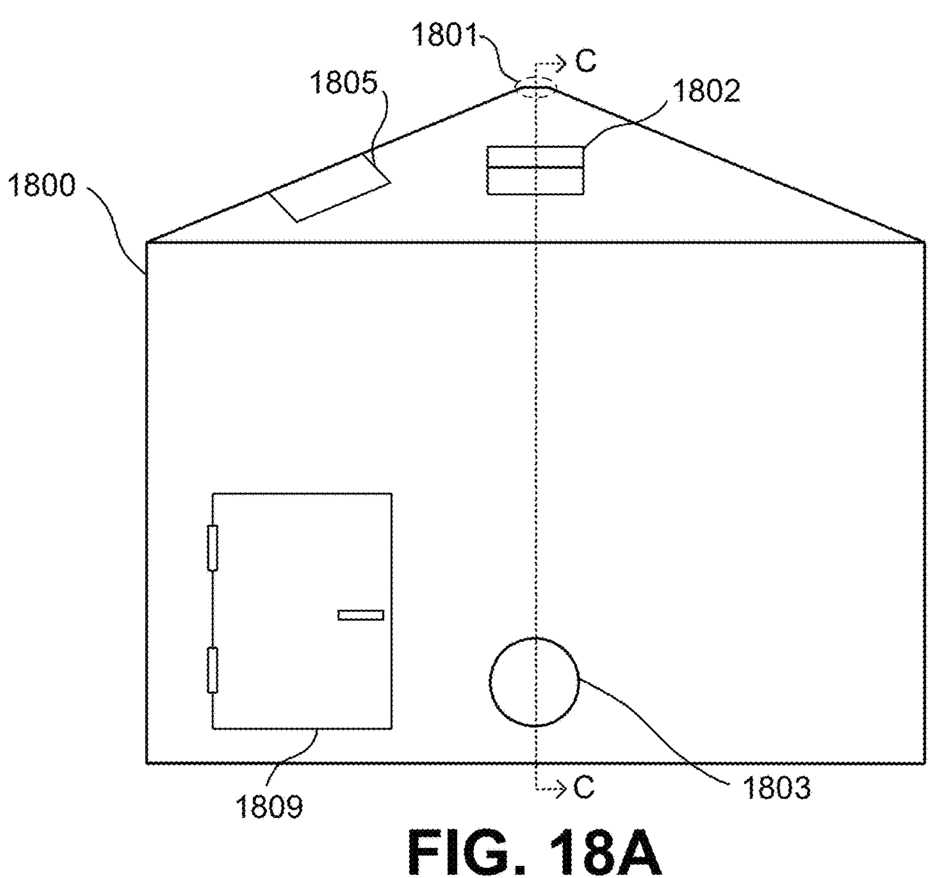
FIGS. 18A-18N illustrate aspects of grain bin management via a device operating in a circular/cylindrical grain bin, in accordance with various embodiments.
Figure 18B:
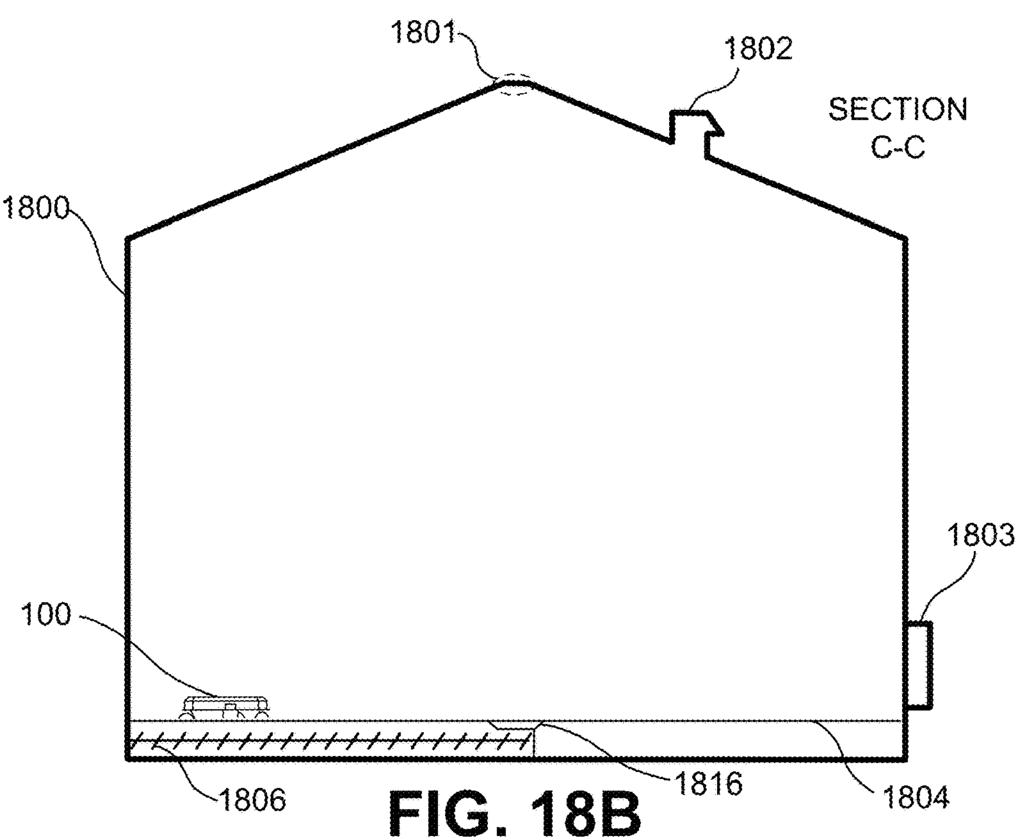
Figure 18C:
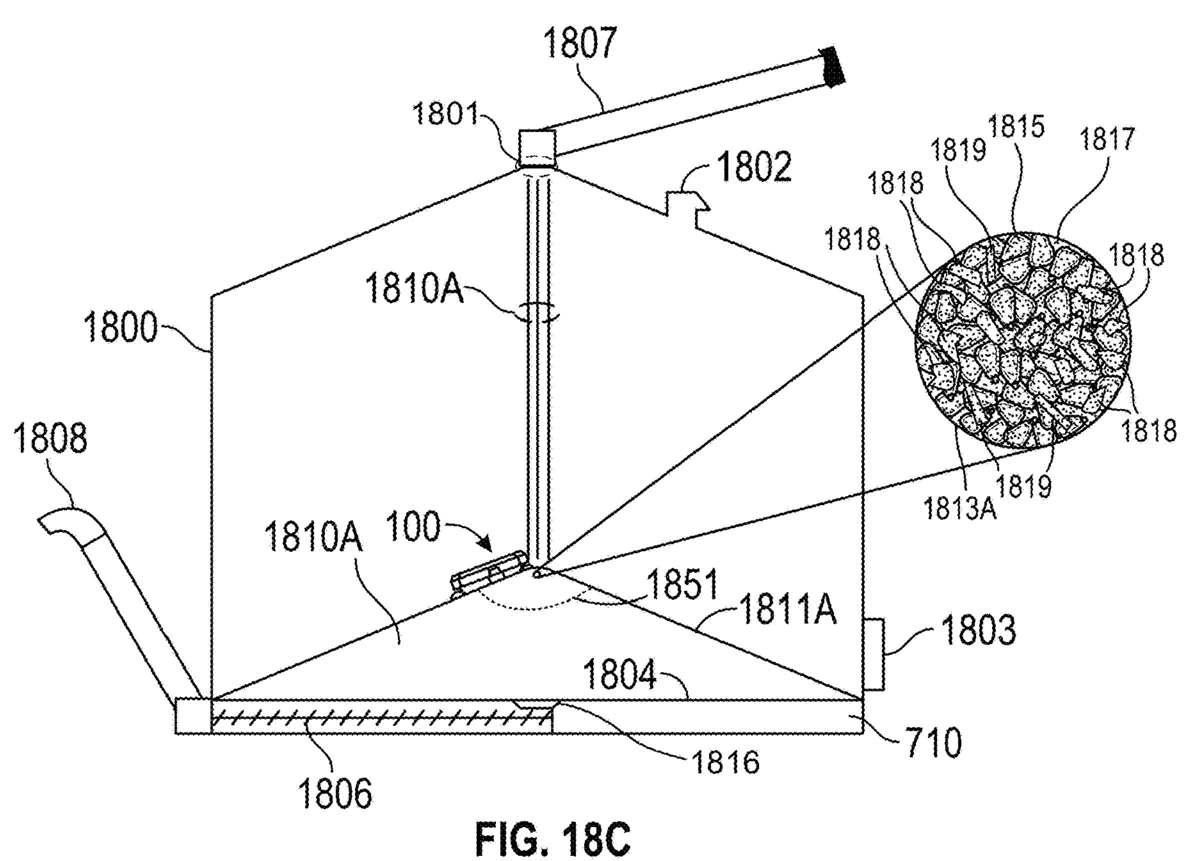
Figure 18D:
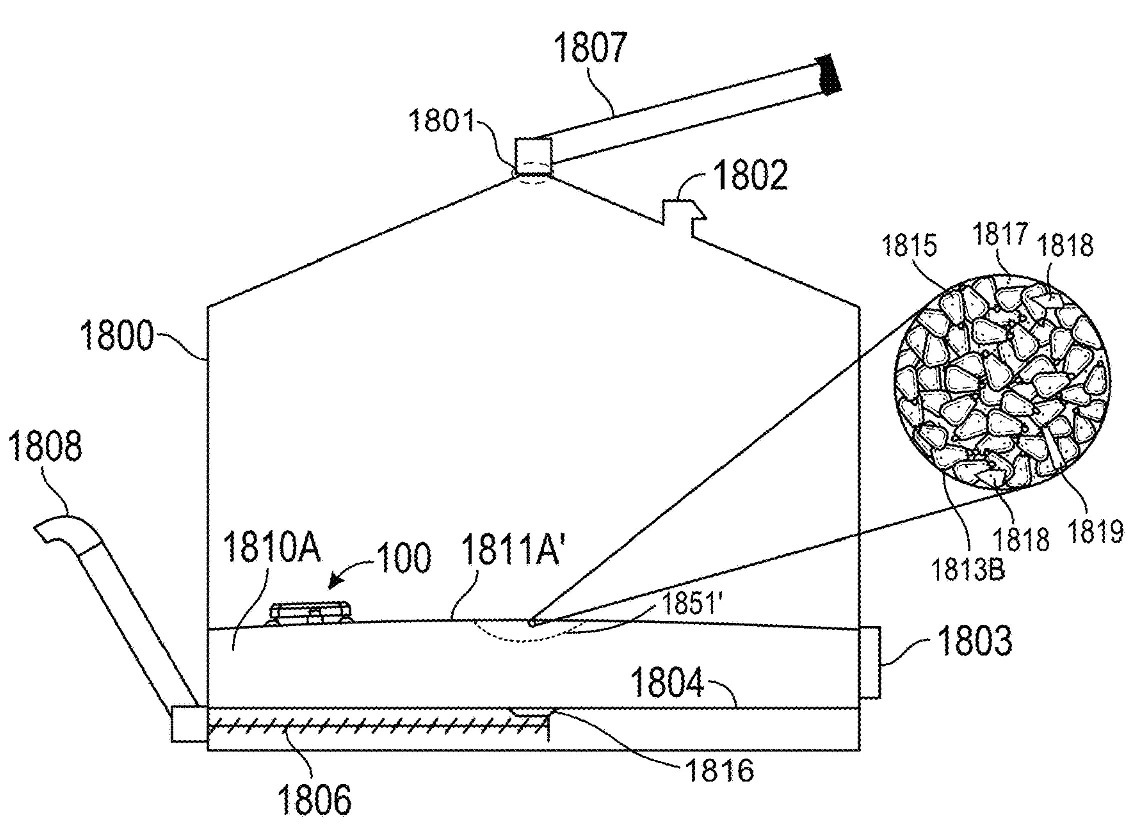
Figure 18E:
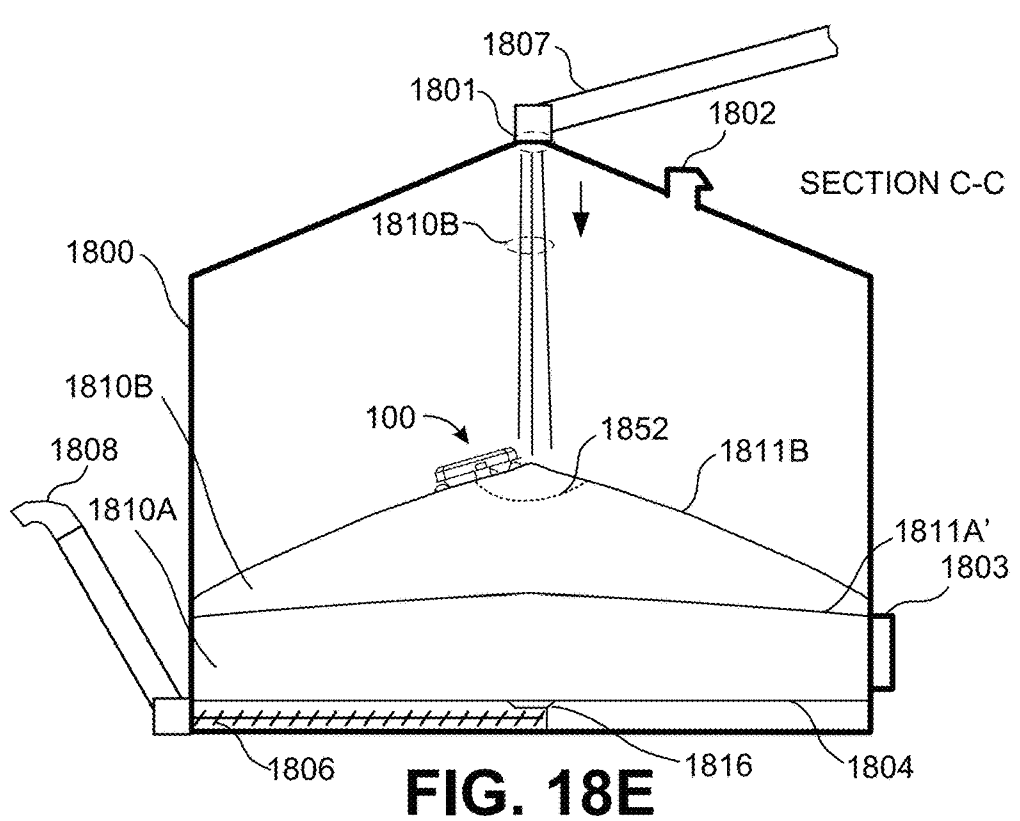
Figure 18F:
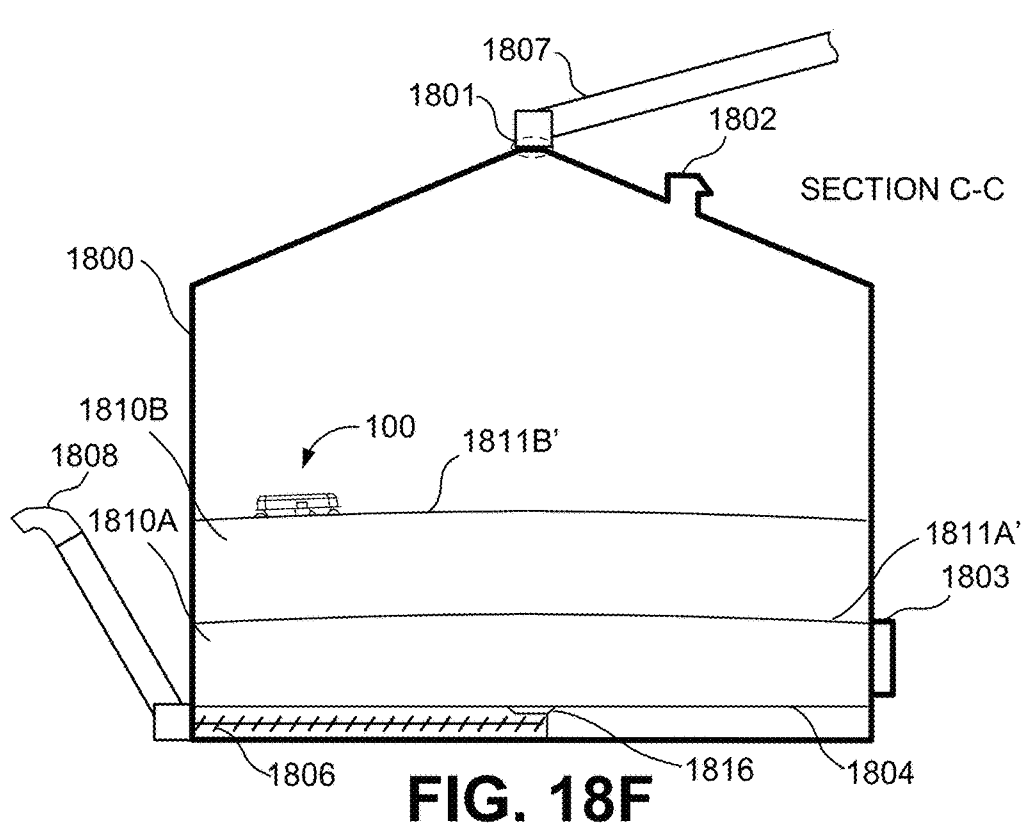
Figure 18G:
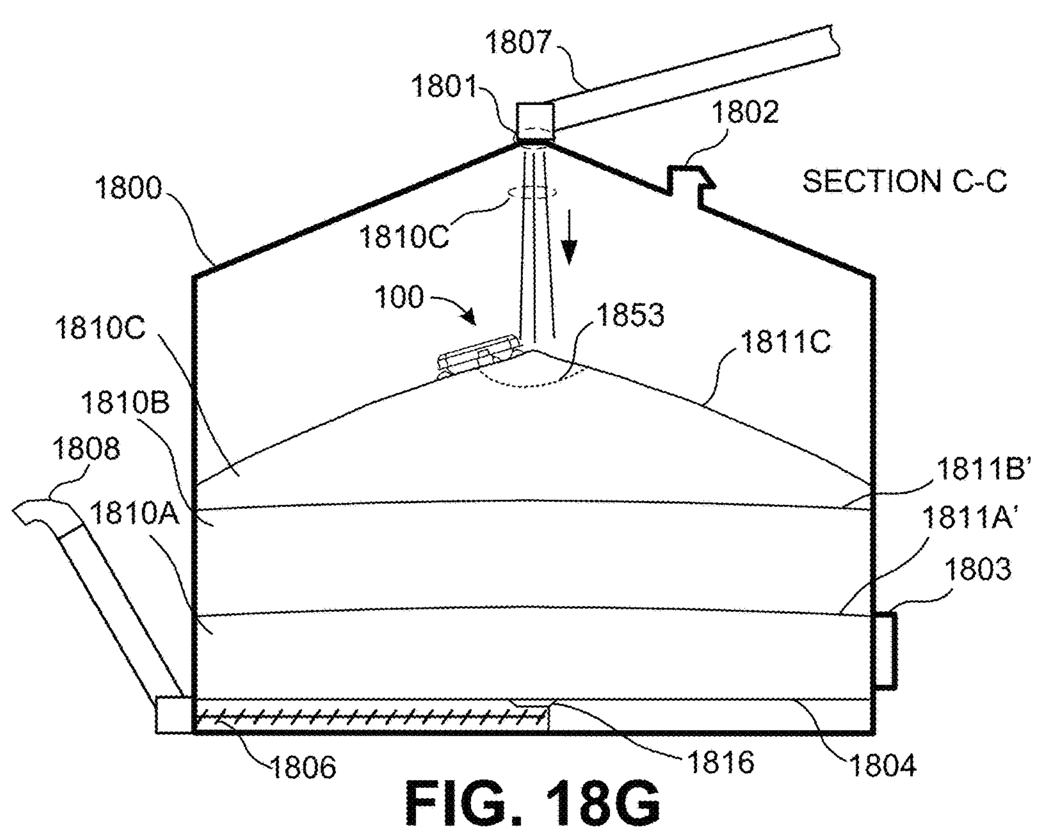
Figure 18H:
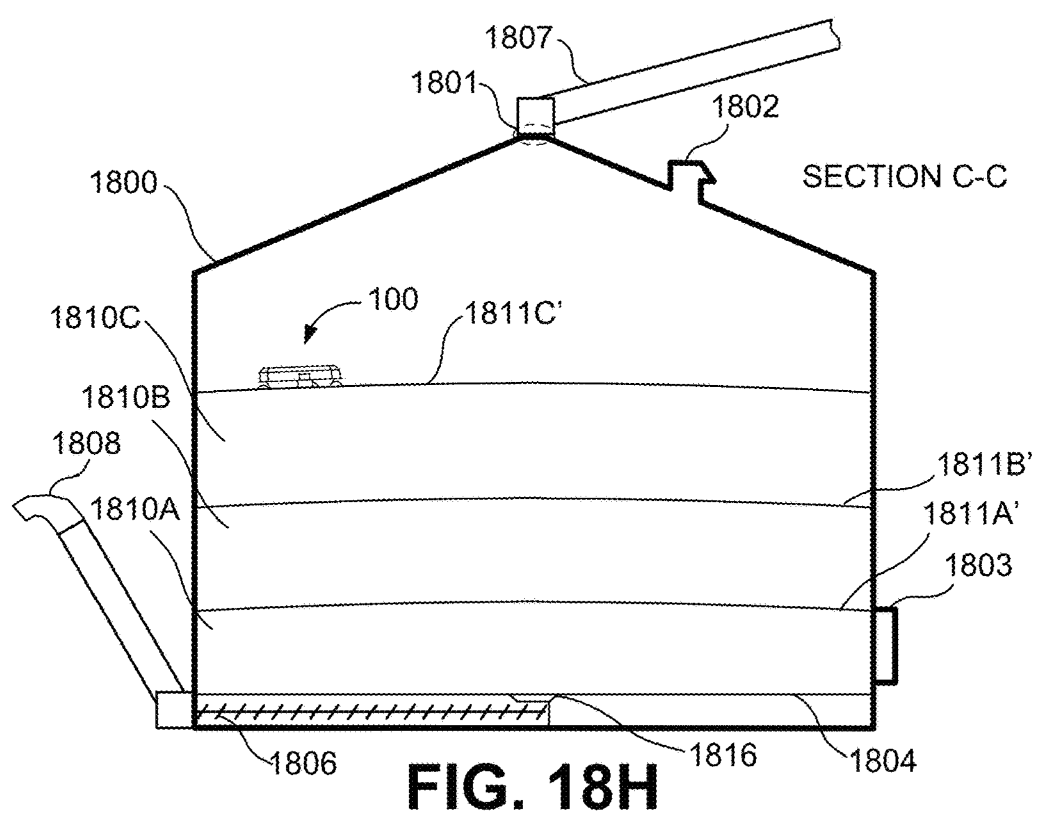
Figure 18I:
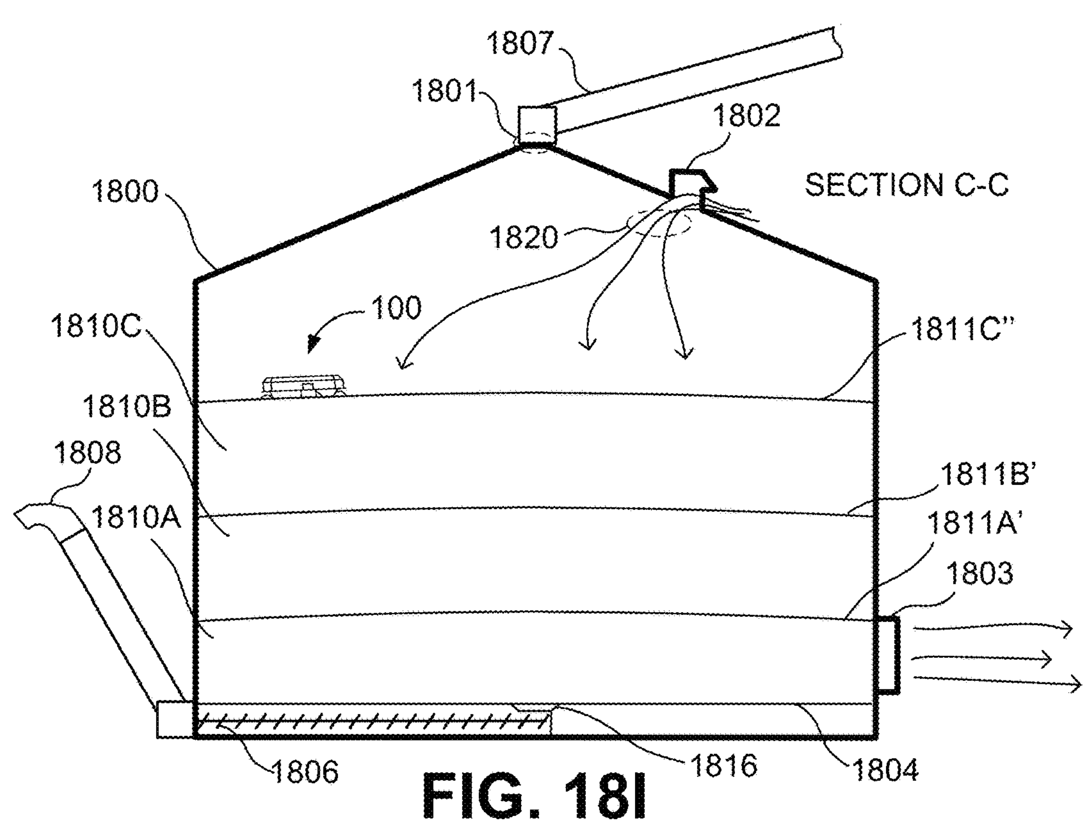
Figure 18J:
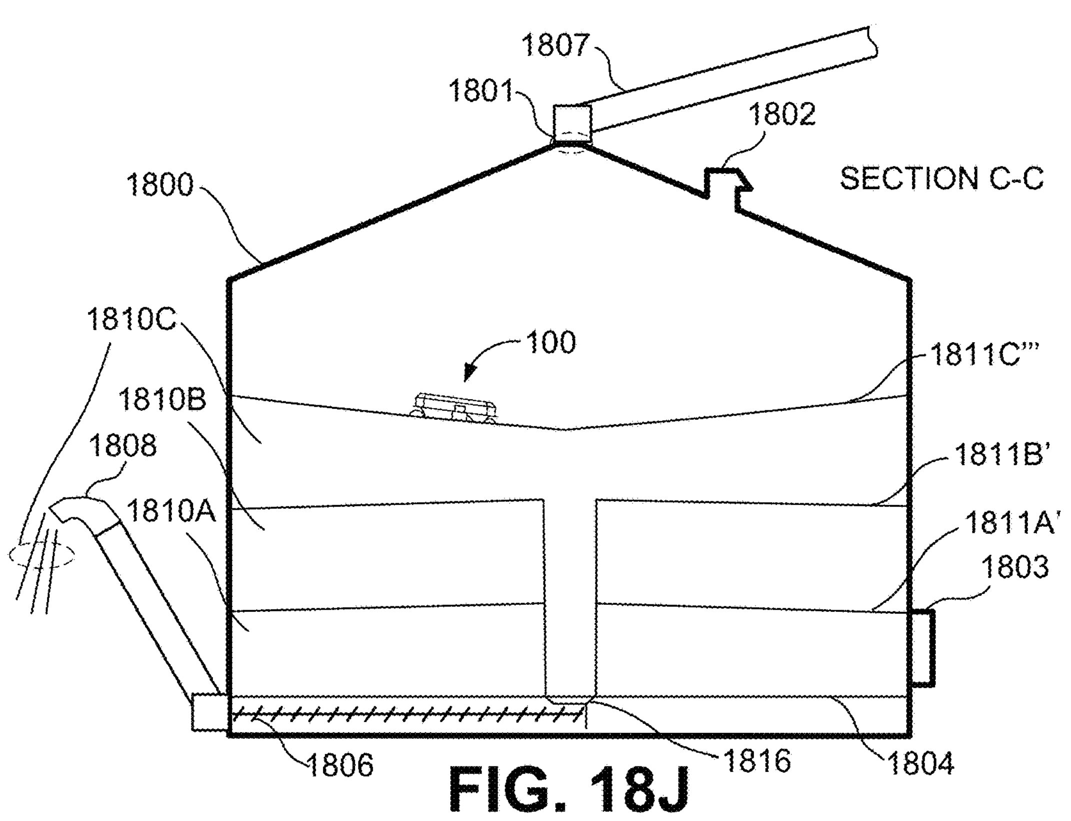
Figure 18K:
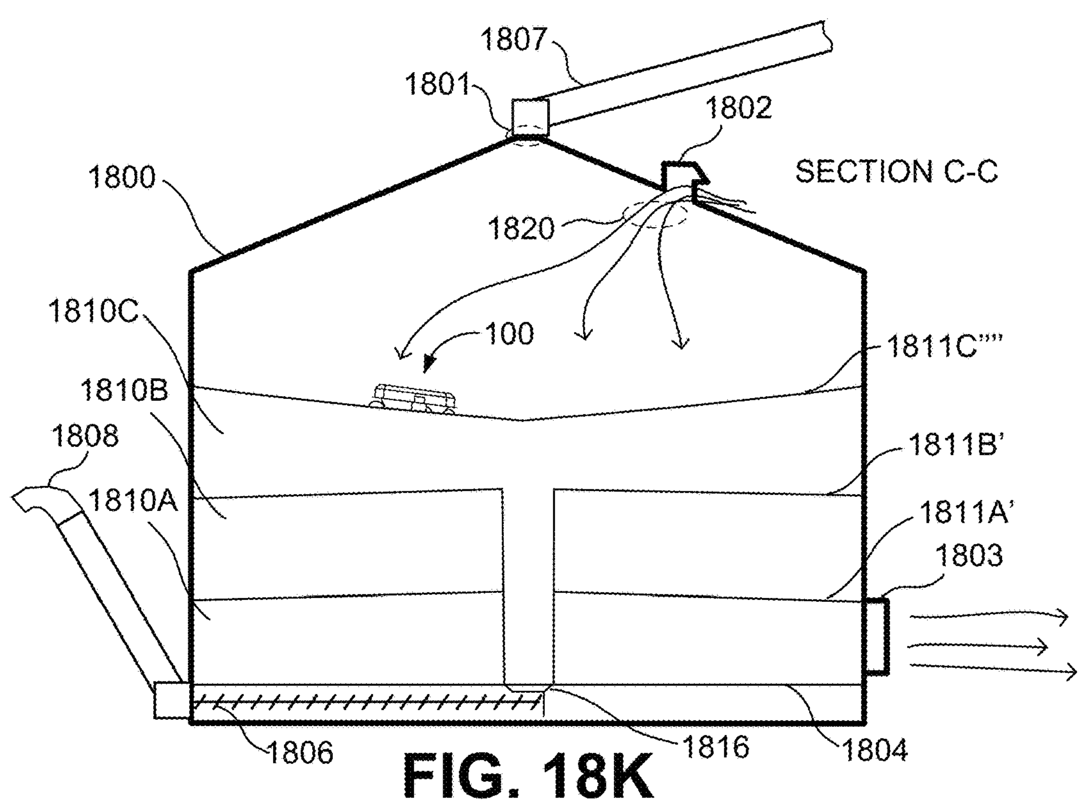
Figure 18L:
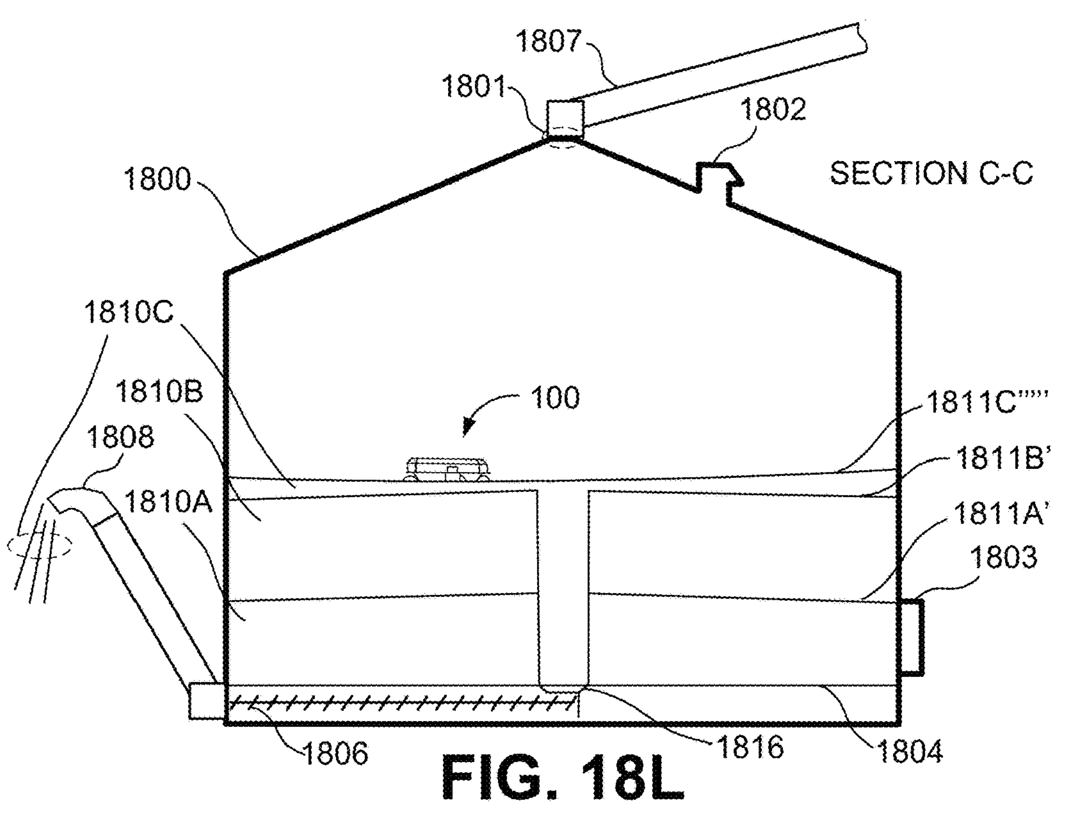
Figure 18M:
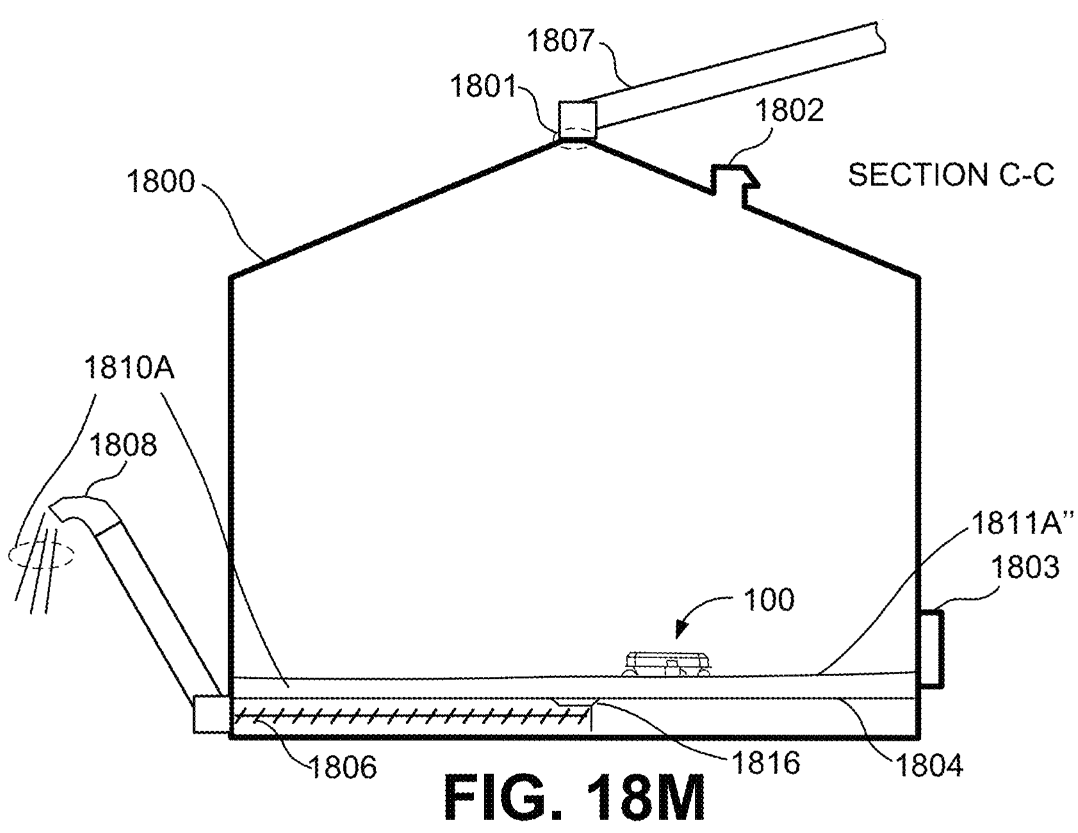
Figure 18N:
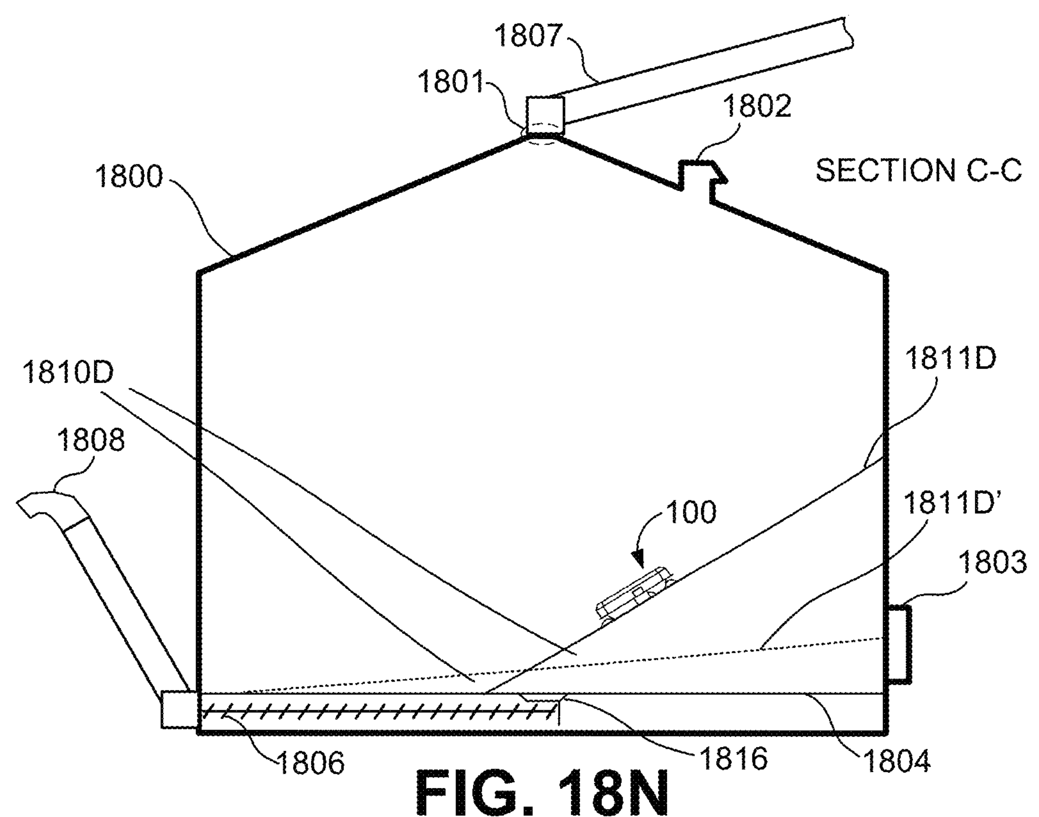

FIGS. 18A-18N illustrate aspects of grain bin management via operation of device 100 in accordance with various embodiments.

FIG. 18A illustrates a side elevational view of a grain bin 1800 which is very similar to grain bin 700 of FIG. 7 except for the inclusion of a roof vent 1802 and a fan 1803. Bin 1800 includes a top-loading portal 1801 through which grain may be loaded via an auger or other grain transport means. Bin 1800 also includes a side door 1809 which may be opened for access and or manual cleanout/manipulation of grain within bin 1800. Dotted section lines indicate the direction of a side sectional view C-C.

FIG. 18B shows the side section view C-C of grain bin 1800 prior to the loading of any grain. Robotic device 100 is on floor 1804, and floor 1804 includes a drain type hole 1816 which facilitates funneling of the grain to an unloading auger 1806 during load out of the grain. Device 100 may determine an elevation of floor 1804 prior to the loading of any grain, in other embodiments, this elevation may be supplied as an input to device 100 or any computer system (e.g., 604, 605, 506, etc.) which operates with data collected by device 100.

FIG. 18C shows a side section view C-C of bin 1800 during an initial load of grain 1810A being loaded in by auger 1807. Also illustrated is an external unloading auger 1808 coupled with auger 1806, neither of which is in operation. During load-in of grain 1810A, device 100 traverses surface sloped surface 1811A and landing zone 1851 to disperse BGFM (broken grain and foreign material) which would normally pile up/accumulate in the center of bin 1800 in the landing zone 1851 of the stream of grain 1810A falling from the top-loading portal 1801. This may be referred to as a "load-in traversal" or a "BGFM dispersal traversal." The landing zone is the area beneath stream of grain 1810A where it lands after falling from an auger (e.g., auger 1807) which is used for load-in. In a round grain bin, like bin 1800, the landing zone portion of the pile of grain 1810A being loaded-in is typically in the center of the bin on the surface 1811A of the grain 1810A as the grain piles up. BGFM is sometimes referred to as "fines" or "fines material." In various embodiments, the traversing may be one or more of: random, manually controlled by a remote operator, following a predetermined pattern, following a set of rules or requirements with respect to grain slope or other measured environmental characteristics, and/or ad-hoc/as-required under dynamic control of device 100. The traversing may take device 100 through the stream of grain 1810A falling from top-loading portal 1801 into landing zone 1851. When a pattern or patterns is/are utilized, they may be similar to any of the patterns previously disclosed herein or other patterns may be used. In some embodiments, a grid pattern is used, a spiral pattern is used, a crossing pattern is used, an ad hoc pattern is used, etc. BGFM differs by grain type but is smaller than an unbroken piece of the grain being stored (e.g., an unbroken kernel of corn or unbroken soybean). For example, for corn, the USDA defines BGFM as "All matter that passes readily through a 12/64-inch round hole sieve and all matter other than corn that remains in the sieved sample after sieving." Similar definitions exist for other cereal grains to indicate that BGFM is the less-than-ideal material that is smaller than the grain being stored, which often limits airflow piled stored grain, which may accrete into a larger mass, which encourages faster deterioration of the piled stored grain, and/or which often causes augers to become plugged during extraction if it accretes into a larger mass. Accretion is a particular problem in a bin with a central landing zone that extracts grain centrally from the bottom of the bin, as undispersed BGFM conventionally land in the center and form a column which contains a large concentration of BGFM. Conventionally, this column can accrete into large chunks or even a somewhat cylindrical plug in the center zone where grain flows downward during extraction. Dispersal of the BGFM by a device 100, as described herein, reduces or eliminates the formation of a column and the large concentrations which can accrete into chunks or plugs.

The dispersal of BGFM from the landing zone portion 1851 of the pile of grain is effected or carried out in part by the rotation of the augers 403 of the auger-based drive system of robot 100. That is, the augers 403 of the auger-based drive system mix, move and disperse grain and BGFM as they rotate to propel robot 100 across and through a pile of grain. In addition to dispersing BGFM, device 100 operates to level the pile of grain as it is being loaded into bin 1800. This leveling is accomplished via the purposeful disruption of viscosity by the agitation of augers 403 as they rotate during traversal of sloped portions of the pile of grain. This disruption of viscosity incites sediment gravity flow in the sloped portion, causing grain to slide away from the center landing zone and further disperse the BGFM away from landing zone 1851. By repeatedly traversing the landing zone 1851 during load-in and repeatedly inciting sediment gravity flow during of the sloped surface 1811A the load-in of load 1810A, BGFM is continuously dispersed during load-in without building up into a roughly vertical column or other heavy concentration either in the loading zone or elsewhere. Preventions of columnar and other build-ups of BGFM through such dispersal reduce or eliminate the ability of the BGFM to accrete/harden into chunks or a plug which may clog a flow of grain or an auger during later extraction operations. Additionally, preventions of columnar and other buildups of BGFM through such dispersal increase the uniformity of airflow throughout the pile of grain in a bulk store, which reduces crust formation, reduces accretion of BGFM, reduces hotspot formation, and improves uniformity of grain drying throughout the pile of grain in the bulk store.

In FIG. 18C, detail 1813A illustrates some grain 1815 (whole corn kernels in this example) and BGFM (grain dust/particles 1817 shown as small black dots, broken grain 1818, and chaff pieces 1819 such as parts of corn husks) in landing zone 1851 prior to dispersal operations by robot 100.

FIG. 18D shows side section view C-C of bin 1800 with device 100 operating on piled grain 1810A to further level surface 1811A to achieve substantially level surface 1811A', according to various embodiments. By leveling the surface 1811A', the first load of grain 1810A is at a fairly uniform depth which may be mapped by device 100 to determine its elevation above floor 1804. The volume and or number of bushels of load of grain 1810A may be determined by this mapping in the manner previously described. Additionally, grain quality metrics may be measured/mapped such as grain moisture content and/or temperature of grain on surface 1811A'. In some embodiments, device 100 may capture other data such as images of grain so that shell cracking and other visual characteristics of the grain 1810A' may be observed/stored.

In FIG. 18D, detail 1813B is shown in a similar area of the landing zone 1851' as was depicted in detail 1813A, the contrast between the detail views shows an example of how BGFM in the form grain dust/particles 1817, broken grain 1818, and chaff pieces 1819 is significantly diminished in landing zone 1851' by the dispersal activities of robot 100.

FIG. 18E shows a side section view C-C bin 1800 during a second load of grain 1810B being loaded in, by auger 1807, atop surface 1811A'. During load-in of grain 1810B, device 100 traverses surface 1811B and landing zone 1852 to disperse BGFM which would normally pile up/accumulate in the middle of bin 1800 in the landing zone 1852 of the stream of grain 1810B falling from the top-loading portal 1801. In various embodiments, the traversing may be one or more of: random, manually controlled by a remote operator, following a predetermined pattern, following a set of rules or requirements with respect to grain slope or other measured environmental characteristics, and/or ad-hoc/as-required under dynamic control of device 100. The traversing may take device 100 through the stream of grain 1810B falling from top-loading portal 1801. When a pattern or patterns is/are utilized, they may be similar to any of the patterns previously disclosed herein or other patterns may be used.

FIG. 18F shows a side section view C-C of bin 1800 with device 100 operating on piled grain 1810B to further level surface 1811B to achieve substantially level surface 1811B'. By leveling surface 1811B', the second load of grain 1810B is at a fairly uniform depth which may be mapped by device 100 to determine its elevation above surface 1811A' and/or floor 1804. The volume and or number of bushels of load of grain 1810B or the total of loads 1810A+1810B may be determined by this mapping in the manner previously described. Additionally, grain quality metrics may be measured/mapped such as grain moisture content and/or temperature of grain on surface 1811B'. In some embodiments, device 100 may capture other data such as images of grain so that shell cracking and other visual characteristics of the grain 1810B' may be observed/stored.

FIG. 18G shows a side section view C-C of bin 1800 during a third load of grain 1810C being loaded in by auger 1807, atop surface 1811B'. During load-in of grain 1810C, device 100 traverses surface 1811C and landing zone 1853 to disperse BGFM which would normally pile up/accumulate in the middle of bin 1800 in the landing zone 1853 of the stream of grain 1810C falling from the top-loading portal 1801. In various embodiments, the traversing may be one or more of: random, manually controlled by a remote operator, following a predetermined pattern, following a set of rules or requirements with respect to grain slope or other measured environmental characteristics, and/or ad-hoc/as-required under dynamic control of device 100. The traversing may take device 100 through the stream of grain 1810C falling from top-loading portal 1801. When a pattern or patterns is/are utilized, they may be similar to any of the patterns previously disclosed herein or other patterns may be used.

FIG. 18H shows a side section view C-C of bin 1800 with device 100 operating on piled grain 1810C to further level surface 1811C to achieve substantially level surface 1811C'. By leveling the surface 1811C', the second load of grain 1810C is at a fairly uniform depth which may be mapped by device 100 to determine its elevation above surface 1811B' and/or floor 1804. The volume and or number of bushels of load of grain 1810C or the total of loads 1810A+1810B+1810C may be determined by this mapping in the manner previously described. Additionally, grain quality metrics may be measured/mapped such as grain moisture content and/or temperature of grain on surface 1811C'. In some embodiments, device 100 may capture other data such as images of grain so that shell cracking and other visual characteristics of the grain 1810C' may be observed/stored.

In some embodiments, if grain 1810C is the final load of grain loaded into grain bin 1800, device 100 may prepare it for long term storage by aerating surface 1811C' via a maintenance traversal pattern which agitates surface 1811C' with the augers of device 100. Such a maintenance traversal pattern may be traversed periodically (e.g., once a day, twice per day, etc.) to prevent crust formation and thus increase air flow uniformity. Long term storage may be storage for weeks but is typically months or longer. Additionally, traversal may be performed to periodically inspect grain 1810C. As previously indicated mapping and/or sensing may occur during any traversal, and when problem areas such as hot spots are noted device 100 may traverse these problem areas to disperse hot grain or spray the hot grain with a cooling agent (e.g., compressed air, nitrogen, CO2, water, etc.). Similarly, when other problems areas are noted by device 100 during traversal, the location(s) may be mapped and stored so that device 100 can take other remedial action (e.g., spraying of a fungicide) with respect to the problem area. Via mapping and sensing during periodic traversal, changes may be noted over time (e.g., changes in temperature, moisture, airflow, etc.) and a variety of undesired changes may be addressed via traversal and/or through an employment of a payload carried by device 100. In this manner, grain which may have crusted or spoiled on the top surface 1811C' is preserved for sale, thus increasing grain in the food supply, and increasing profit to the storer of the grain due to loss reduction.

Prior to unloading grain 1810 from bin 1800, device 100 may run a pre-extraction pattern to ensure that any crust on surface 1811C' is broken up and any grain bridges that may have formed are broken up. This may be the same or similar to a maintenance pattern.

FIG. 18I shows a side section view C-C of bin 1800 illustrating a reconditioning of stored grain in bin 1800, according to various embodiments. In some embodiments, prior to extraction, grain may be re-conditioned to a higher moisture content using device 100. For example, soybeans may be advantageously taken to market at a higher moisture content than they may be stored (long term storage at the optimal market moisture content may encourage mold). Accordingly, when this is the case, the fan 1803 may be used to draw moist air 1820 in through roof vent 1802 during a suitably humid day. Normally such action would cause crust formation on surface 1811C'. However, by traversing surface 1811C' in a pattern to aerate the top several inches of grain 1810C during the intake of moist air for a specified and suitable period of time a new surface 1811C" is achieved which has a raised moisture content (having been slightly rehydrated along with the top several inches of grain 1810C). Such a traversal and the process for rehydrating grain that is associated with it can be referred to as a "rehydration traversal." This rehydrated grain may then be extracted and taken to market where it will be sold at a higher test weight and for more money than it would have garnered absent the rehydration. A process for rehydrating grain to a higher test weight prior to extraction may include engaging a fan 1803 to pull humid air (e.g., above 80% humidity, or above 90% humidity, or above some other humidity threshold) onto the surface of a pile of stored grain; coordinating with robot 100 to traverse a surface of the pile of grain before, during, and or after the fan is engaged to pull in the humid air; and traversing the rehydrated grain by the robot 100 to assist with rehydration and then extraction of a rehydrated layer of the grain; and repeating the process until a desired volume of grain has been rehydrated and extracted. That is, the rehydration traversal and extraction may be repeated as required to rehydrate a desired volume of grain for extraction.

FIG. 18J shows a side section view C-C of bin 1800 during extraction of a portion of stored grain 1810C from bin 1800, according to various embodiments. During extraction, extraction/sump auger 1806 pulls grain downward in the center of bin 1800 like of funnel or venturi from surface 1811C" and external unloading auger 1808 expels the grain 1810C such as into a rail car or semi-trailer. During this extraction device 100 performs an extraction and/or leveling pattern (e.g., an extraction traversal or a leveling traversal) to achieve surface 1811C'" and to pull grain away from the walls of bin 1800 by use of its augers and/or sediment gravity flow. This may be referred to as an "extraction traversal." In this manner grain is pulled from the outer edges inward to the center of bin 1800 through assistance of device 100, thus keeping a consistent mixture of grain and BGFM (rather than a slug of mostly BGFM which could clog auger 1806). Such extraction patterns (which may be similar to or different from patterns disclosed herein) may be used whether or not reconditioning of grain has been accomplished. In this manner, grain may be unloaded fairly consistently in the reverse order from its loading (last in, first out). By mapping while running extraction patterns, extraction can be stopped when an elevation associated with surface 1811B' is reached. Sensing for grain moisture while device 100 traverses during extraction allows for a determination of when the reconditioned grain of surface 1811C"

has be extracted, thus allowing extraction to be paused and reconditioning to be recommenced.

FIG. 18K shows a side section view C-C of bin 1800 illustrating a second incremental reconditioning of stored grain in bin 1800, according to various embodiments. Fan 1803 is again used to draw moist air 1820 in through roof vent 1802 during a suitably humid day. Device 100 traverses surface 1811C''' (of FIG. 18J) in a pattern (e.g., a rehydration traversal) to aerate the top several inches of grain 1810C during the intake of moist air for a specified and suitable period of time a new surface 1811C''''' is achieved which has a raised moisture content (having been slightly rehydrated along with the top several inches of grain 1810C). As before, this rehydrated grain may then be extracted and taken to market where it will be sold at a higher test weight and for more money than it would have garnered absent the rehydration. Reconditioning may be continued in this incremental fashion.

It should be appreciated that grain drying and/or cooling may be conducted in in a similar manner to rehydration by performing similar traversals in coordination with the operation of fan 100 to either force air into pile from the bottom or draw it in from the top. The difference being that such activities take place when the air moved by fan 1803 is not very humid (e.g., below 10% humidity or below some other humidity threshold) and/or the air is cool (e.g., the air is cooler than the temperature of the stored grain).

FIG. 18L shows a side section view C-C of bin 1800 during extraction of a portion of stored grain 1810C from bin 1800, according to various embodiments. During extraction, extraction/sump auger 1806 pulls grain downward in the center of bin 1800 like a funnel or venturi from surface 1811C'' and external unloading auger 1808 expels the grain 1810C such as into a rail car or semi-trailer. During this extraction device 100 performs an extraction pattern and/or a leveling pattern (e.g., an extraction traversal or a leveling traversal) to achieve surface 1811C''''' and to pull grain away from the walls of bin 1800 and toward the center by use of its augers and/or sediment gravity flow. In this manner grain is pulled from the outer edges inward to the center of bin 1800 through assistance of device 100, thus keeping a consistent mixture of grain and BGFM (rather than a slug of mostly BGFM which could clog auger 1806). Such extraction patterns (which may be similar to or different from patterns disclosed herein) may be used whether or not reconditioning of grain has been accomplished. In this manner, grain may be unloaded fairly consistently in the reverse order from its loading (i.e., last in, first out). By mapping while running extraction patterns, extraction can be stopped when an elevation associated with surface 1811B' is reached. Sensing for grain moisture while device 100 traverses during extraction allows for a determination of when the reconditioned grain of surface 1811C''' has be extracted, thus allowing extraction to be paused and reconditioning to be recommenced.

After extracting all or most of grain 1810C, device 100 can prepare the remaining grain 1810 for long term storage and can perform maintenance, aeration, leveling, and/or traversals and/or inspections during the storage in the manner previously described.

Final Extraction and Clean-Out

FIG. 18M shows a side section view C-C of bin 1800 during extraction of a portion of stored grain 1810C from bin 1800, according to various embodiments. After most of the grain 1810 has been extracted from grain bin 1800, device 100 may be utilized to assist in extracting the last bits of grain during a clean-out of grain bin 1800. For example, a clean-out pattern (e.g., a "cleanout traversal") may be run by device 100 to level the remaining grain to a uniform depth (e.g., two feet) within bin 1800. Additionally, or alternatively, a pushing pattern may be run across/through remaining grain 1810A with device 100 to push grain, that will not naturally flow, toward the center sump auger 1806.

If being used, a sweep auger may draw down a small section of the remaining grain 1810A before device 100 runs a sweep auger pattern parallel and/or perpendicular to the sweeping auger to use the augers 403 of device 100 and/or sediment gravity flow to push the remaining grain toward the sweep auger (so that a human does not have to shovel grain near the operating sweep auger).

If sweep auger is not being used, device 100 may run a low depth operation pattern to move grain to centrally located intake for the center auger 1806 or to intakes for secondary sump augers.

In some embodiments, device 100 may use optional accessories, which may include one or more of a fixed or rotating sweeping broom 350, a fixed or movable blade 351, a shovel 352, a vacuum 353, and/or a blower 354 to assist in the final clean out tasks such as sweeping up or otherwise gathering residual grain when cleaning out grain bin 1800.

FIG. 18N shows a side section view C-C of bin 1800 during extraction of a portion of stored grain 1810D from bin 1800, according to various embodiments. Grain 1810D may be a mixture of various loads of grain 1810 (e.g., grain 1810A, grain 1810B, and/or grain 1810C). After most of the grain 1810D has been extracted from grain bin 1800, central auger 1806 has become non-functional and side door 1809 (not visible in this view) has been opened so that bin 1800 can be unloaded manually, for example, by hand (with shovels), by use of a portable auger, a large vacuum hose of an industrial grain vacuum, and/or by a machine such as a skid-steer or front-end loader if bin 1800 is large enough. Such manual unloading techniques often result in one side of the bin being unloaded first. Conventionally, this can leave grain piled against one side but not the opposing side of bin 1800 which creates an asymmetric load on the vertical wall structure of bin 1800. This is represented by the piled grain 1810D with surface 1811D, where the right side of bin 1800 (as viewed) has a heavy load leaning on it and the opposite side (left side as viewed) has little or no load on it (no load as depicted). Such asymmetric loading of bin 1800 can cause structural damage which reduces the lifespan of the bin 1800 or in extreme instances causes it to collapse. In some embodiments, robot 100 can traverse a portion of a pile of grain which is placing an asymmetric load on a wall of the flat storage (as shown with robot 100 of surface 1811D) and lower the slope of the pile in this portion so the asymmetric load is reduced below a threshold (e.g., an asymmetric load up to ten feet high against a wall may be fine, but twenty feet is not). The pile of grain 1810D with surface 1811D' (shown by the dashed line) illustrates lowering of the height of the asymmetric load. Additionally, or alternatively, robot 100 can traverse a pile of grain near an extraction point (e.g., near door 1809 or near the input of a portable auger or vacuum hose nozzle) to direct or push grain from the pile toward the extraction point. This is another form of an extraction traversal and can reduce the frequency with which a portable auger or vacuum hose nozzle needs to be moved and/or it can reduce the distance required to be traveled by a front-end loader or skid loader.

Other Bin or Bulk Store Shapes

FIGS. 19A-19E illustrate a rectangular bin/building 1900 as opposed to the cylindrical bins illustrated in FIGS.

18A-18N. A rectangular grain bin of this floor shape is sometimes referred to as "flat storage." It should be appreciated that flat storage may take other shapes besides rectangular. Such a flat storage 1900 may have a central underfloor auger and/or sump augers for unloading, but often does not include such features.

FIG. 19A is a right side elevational view of a rectangular grain bin 1900, according to various embodiments. Although this bin is illustrated with a shorter length, similar bins may span hundreds of meters in length. Dotted section lines indicate the direction of a side sectional view E-E. Dotted circle 1905 shows a corner of flat storage 1900, the internal portion of which is largely visible in side sectional view E-E.

FIG. 19B is a front elevational view of rectangular bin 1900, according to various embodiments. Although this bin is illustrated with a shorter length, similar bins may span hundreds of meters in length. Dotted section lines indicate the direction of a side sectional view D-D.

FIG. 19C shows the side section view D-D of grain bin 1900 with a load of piled grain 1910 present within. Robotic device 100 is shown operating on the surface 1911 of the grain 1910. It should be appreciated that many or all of the techniques illustrated and described in conjunction with FIGS. 18A-18N can be similarly employed within grain bins of different shapes such as rectangular grain bin 1900. The multiple peaks of surface 1911 may be due to multiple piles of grain being deposited side-by-side to form grain pile 1910. Accordingly, leveling patterns performed by device 100 (e.g., a leveling traversal) on surface 1911 can distribute grain more evenly by smoothing the multiple peaks and performing leveling in general, and thus increase the effective storage capacity of rectangular grain bin 1900.

Figure 19D:
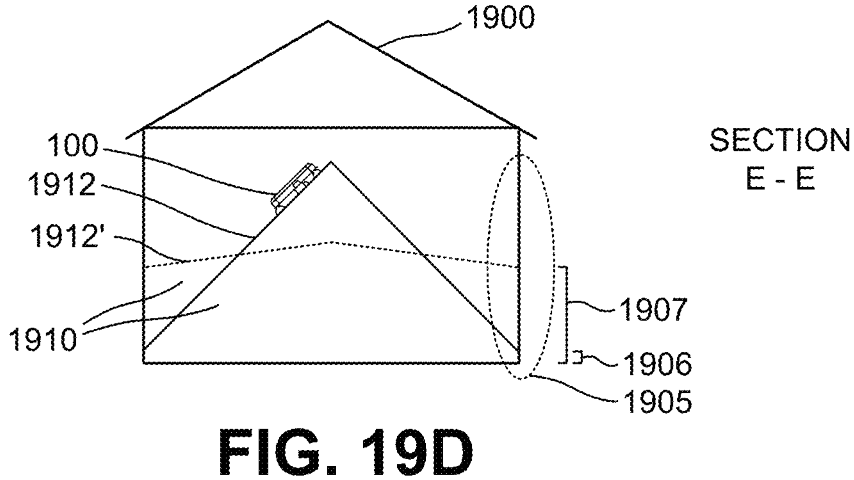

FIG. 19D shows the side section view E-E of grain bin 1900 with a load of piled grain 1910 present within. Robotic device 100 is shown operating on the surface 1912 of the grain 1910. As illustrated, a problem that can occur when loading a flat storage is the difficulty in getting grain to fill in the sides and particularly the corners such as corner 1905, as the peak of the pile may reach to near a ceiling mounted load-in point without the overall pile progressing into the corners or very far up the sides of the bulk store. For example, as depicted the peak of a pile of grain 1910 may be near the ceiling of a flat storage bulk store 1900 while edges of the pile of grain 1910 are not near the tops of side wall of the bulk store. In the past, teams of workers walked on the surface 1912 of grain 1910 and raked it to the sides and into the corners (e.g., corner 1905) so that more grain could then be loaded and so that the interior volume of the flat storage was more fully utilized. This practice was called "walking down" the grain. However, walking down the grain is exceptionally dangerous and because of this is now illegal in many regions of the world. As illustrated, robot 100 may traverse surface 1912 of the pile of grain 1910 utilizing slope reduction and leveling techniques/patterns, which were previously described herein. In this manner, in specific locations (e.g., corners, sides, and other desired areas of a flat storage), robot 100 performs a robotic walk down of the grain 1910 (e.g., a walk-down traversal) which does not utilize or endanger humans. The dashed line of surface 1912' of grain 1910 represents the shape of the pile of grain after the robotic walk down. As can be seen, the peak from surface 1912 has been lowered and some of the empty volume on the sides and in particular in the corners of flat storage 1900 has been filled. For example, prior to the walk down, the surface 1912 of grain 1910 only reach a height 1906 (e.g., 2 feet) relative to the bottom of flat storage 1900. However, after the robotic walk down, corners and sides are filled to a height 1907 (e.g., 20 feet), thus filling a great deal of unutilized empty space in the corners and along the sides of flat storage 1900 and enabling a greater volume of grain 1910 to be loaded-in than without the robotic walk down. It should be appreciated that these techniques can similarly be employed on other granular material stored in a flat storage bulk store and/or with respect to any bulk store with walls. It should be appreciated that this robotic walking down of grain is one of many facets of managing stored grain and managing a bulk store where the grain is stored.

Figure 19E:
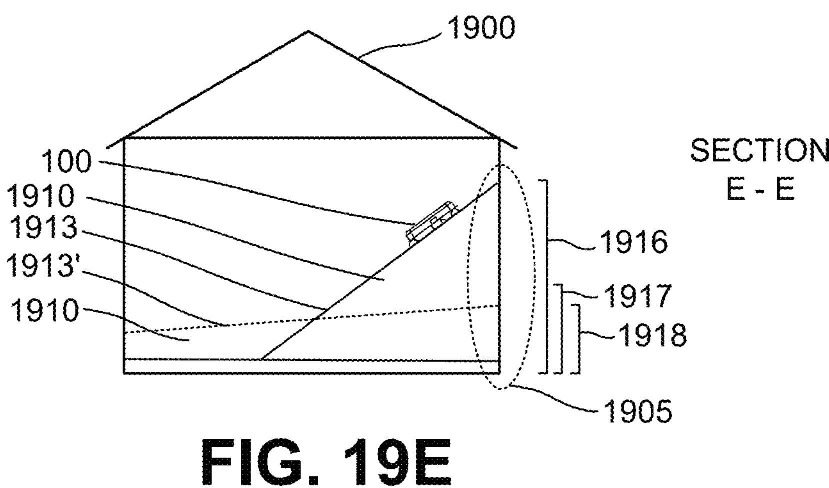

FIG. 19E shows the side section view E-E of grain bin 1900 with a load of piled grain 1910 present within. Robotic device 100 is shown operating on the surface 1913 of the grain 1910. In some circumstances a flat storage bulk store may be unloaded by other means rather than a central floor auger. For example, a large flat storage may be unloaded by a portable auger, a large vacuum hose of an industrial grain vacuum, a front-end loader, or a skid steer machine. This may be the routine manner of unloading, may be done in addition to the use an under-floor auger, and/or may be a workaround when an under-floor auger is non-functional. Unloading in such manners, rather than centrally with an under-floor auger, can create asymmetric loads on the vertical sides of the flat storage 1900 where one side wall has a heavy load leaning on it and the one or more other side walls have little or no grain induced load. Pile 1910 with surface 1913 illustrates such an asymmetric load being place on the right side wall (as viewed) of flat storage 1900 with grain 1910 at a height 1916 (e.g., 50 feet) relative to the floor of flat store 1900 and the opposite/left side wall (as viewed) having no grain load being placed on it. Such asymmetric loading of flat storage 1900 can cause structural damage which reduces the lifespan of the building or in extreme instances causes it to collapse. In some embodiments, robot 100 can traverse a portion of the surface 1913 of the pile of grain 1910 which is placing an asymmetric load on a wall of the flat storage 1900 in a walk-down traversal and lower the slope of the pile in this portion so the asymmetric load is reduced below a threshold height 1917 (e.g., 18 feet). This type of walk down traversal is very similar to a leveling traversal, just performed in a different situation. For example, an asymmetric load below 18 feet higher relative to an opposing wall's load may be fine, but above that may be either dangerous to humans or the building structure. As can be seen, the height of surface 1913 has been lowered by the robotic walk down performed by robot 100. For example, prior to the walk down of the asymmetric load, the surface 1913 of grain 1910 a height 1916 (e.g., 50 feet) relative to the bottom of flat storage 1900.

However, after the walk down, surface 1913' shows that a lowered height 1918 (e.g., 15 feet) against the right side wall has been achieved. This lowered height 1918 is below the threshold height 1917 (e.g., 18 feet) of asymmetry. In addition to reducing asymmetric structural stress, safety may be improved by utilizing the robot 100 to reduce the height of an asymmetric portion of the pile of grain to below a height associated with avalanche and/or entrapment risk so there is less of a likelihood that a person or machine will get engulfed because of the steep slope and high peaks collapsing or sluffing. It should be appreciated that these techniques can similarly be employed on other granular material stored in a flat storage bulk store and/or with respect to any bulk store with walls.

Additionally, or alternatively, robot 100 can similarly traverse a pile of grain near an extraction point in an extraction traversal to direct, push, or robotically walk down grain from the pile toward the extraction point. This can reduce the frequency with which a portable auger or vacuum hose needs to be moved and/or it can reduce the distance required to be traveled by a front-end loader or skid loader.

Example Methods of Grain Bin Management

FIGS. 20A-20F illustrate a flow diagram 2000 of an example method of grain bin management during load-in, in accordance with various embodiments. Procedures of the methods illustrated by flow diagram 2000 of FIGS. 20A-20F will be described with reference to elements and/or components of one or more of FIGS. 1-19E. It is appreciated that in some embodiments, the procedures may be performed in a different order than described in a flow diagram, that some of the described procedures may not be performed, and/or that one or more additional procedures to those described may be performed. Flow diagram 2000 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 2000 may be implemented in hardware, or a combination of hardware with firmware and/or software.

For purposes of example only, the devices 100 and 100B (generically referred to as "device 100" and/or "device 100") is a robotic device which utilizes augers (403) to move and maneuver with respect to piled granular material, such as, but not limited to piled grain. The augers 403 also agitate and disperse the piled grain and BGFM in the piled grain as a by-product of traversing the piled grain. Robot 100 will be described as operating on or in relation to piled grain in a bulk store, such as, but not limited to grain in a grain bin. In some embodiments, robot 100 is free of mechanical coupling with a structure (e.g., the bulk store) in which the piled grain is contained.

With reference to FIG. 20A, at procedure 2010 of flow diagram 2000, in various embodiments, a robot 100 which includes a processor 102, a memory 103, and an auger-based drive system (which includes, for example, drive motors 106 and augers 403) receives, instructions to traverse a surface of piled grain in a bulk store. In some embodiments, the instructions are for robot 100 to follow a pattern of movement to traverse the surface of the piled grain. The pattern may be a grid pattern, a spiral pattern, a crossing pattern, or any of the patterns described herein, among others. The pattern may be predetermined, in some embodiments. For example, in some embodiments, the instructions may be preprogrammed into robot 100 (e.g., stored in memory 103). In some embodiments, the instructions may be remote control instructions. For example, remote control instructions may be received wirelessly from a remotely located computer system (506, 605, 604, etc.) or wirelessly from a remote controller 501 operated by a human (i.e., a human may drive the robot 100 remotely). In some embodiments, the pattern is determined ad hoc by robot 100 in an autonomous or semi-autonomous fashion as has been described herein.

With continued reference to FIG. 20A, at procedure 2020 of flow diagram 2000, in various embodiments, a processor (e.g., processor 102) of robot 100 controls movement of robot 100 according to the instructions. Via commands to motor controllers 105 and/or drive motors 106 of the auger-based drive system of robot 100, robot 100 is controlled relative to the grain in the grain bin, such as to traverse a surface of piled grain in the grain bin during load-in of the grain.

With continued reference to FIG. 20A, at procedure 2030 of flow diagram 2000, the processor directs traversal, by the robot 100, of a landing zone portion of a surface of a pile of the grain during load-in of the grain to disperse broken grain and foreign material away from the landing zone portion. In response to the direction, the robot performs the traversal of the landing zone. In a round grain bin, such grain bin 1800 of FIG. 18C, the landing zone portion is located in a center (of the circular circumference) of the grain bin where the grain lands as it is augured into the grain bin during load-in. In other embodiments, the landing zone portion is under the area where grain is falling onto the pile, and this area may not be in the center of the bin or bulk store. The dispersal is effected or carried out in part by rotation of augers of the auger-based drive system. For example, with reference to FIGS. 18C, 18E, and 18G and their respective description, this can comprise robot 100 traversing a landing zone portion such as 1851, 1852, and/or 1853 during load-in to disperse the BGFM that would otherwise accumulate in the landing zone beneath the stream of grain falling from auger 1807 during the respective load-ins.

With reference to FIG. 20B, at procedure 2040 of flow diagram 2000, in various embodiments the method as described in 2010-2030 may further comprise, the processor (e.g., processor 102) directing additional traversal by the robot 100 of a sloped portion of the pile of grain (e.g., the sloped portion of surface 1811A below landing zone 1851 in FIG. 18C) to incite sediment gravity flow in the sloped portion of the pile of grain by disruption of viscosity of the sloped portion of the pile of grain through agitation of the sloped portion of the pile of grain by the auger rotation of the auger-based drive system. Under direction by the processor, the robot performs this additional traversal. The additional traversal may be according to a pattern which may be a grid pattern, a spiral pattern, a crossing pattern, or any of the patterns described herein, among others. The sloped portion being referred to is outside and typically below the landing zone portion. The sediment gravity flow reduces a slope of the sloped portion and of the landing zone portion and further disperses the broken grain and foreign material away from the landing zone portion. As described herein, the sediment gravity flow is, effectively, a purposely induced landslide. The sloped portion may be sought out by the robot 100, in some embodiments. In some embodiments, the traversal of one or more sloped portions and the landing zone portion is repeated to bring reduce the slope of the sloped portion more toward level, which may be realized by bringing the slope below a threshold slope such between +/−5 degrees, between +/−4 degrees, +/−2 degrees, or +/−1 degree. In some embodiments, the traversal of one or more sloped portions is repeated to bring reduce the slope of the sloped portion more toward level by reducing the slope by a predetermined amount such as 3 degrees, 5 degrees, 10 degrees, etc.

With reference to FIG. 20C, at procedure 2050 of flow diagram 2000, in various embodiments the method as described in 2010-2030 may further comprise, during traversal of a landing zone portion (e.g., portion 1851 in FIG. 18C) of piled grain by robot 100, a sensor 120 of robot 100 acting under instruction/direction of host processor 102 to capture a measurement of a characteristic of the landing zone portion of piled grain. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled grain which is traversed by robot 100.

In some embodiments, the captured measurement(s) of characteristic(s) may be transmitted to a base station (506, 605) that is/are communicatively coupled with robot 100. The base station (506, 605) is located remotely from the robot and may be configured to communicate with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled grain. Additionally, or alternatively, via such communications, the base station (506, 605) may relay instructions to robot 100.

In some embodiments, the captured measurement(s) of characteristic(s) may be transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

With reference to FIG. 20D, at procedure 2060 of flow diagram 2000, in various embodiments the method as described in 2010-2030 may further comprise, during traversal of a landing zone portion (e.g., portion 1851 in FIG. 18C) of piled grain by robot 100, a sensor 120 of robot 100 acting under instruction/direction of host processor 102 to capture a measurement of a temperature of the landing zone portion of piled grain (i.e., a temperature of the grain landing in the landing zone). For example, in some embodiments, temperature sensor 233, infrared sensor 236, or infrared camera 108 of robot 100 is used to capture a temperature measurement of a grain of piled grain during the traversal of the landing zone portion of the pile of grain. In some embodiments, the captured temperature measurement is paired with a location of robot 100 at the time of capture of the temperature measurement. Such paired data can be used to create a heat map of the piled grain which is traversed by robot 100. Additionally, temperature data can provide an operator of the bulk store information about the conditions of storage, quality of grain, and/or identify areas for additional traversal to prevent crust formation, disrupt a hotspot, and/or ensure air circulation.

With reference to FIG. 20E, at procedure 2070 of flow diagram 2000, in various embodiments the method as described in 2010-2030 may further comprise a probe delivery payload 344 delivering a probe 1110 onto a surface of the piled grain in the landing zone portion (e.g., 1851 of FIG. 18C) or elsewhere on surface 1811A during load-in. For example, probe delivery payload 344 may take action under instruction/direction of host processor 102 to deliver one or more probes 1110. As described herein, the probe may have a sensor which measures and reports the conditions of the grain. The probe may be delivered during load-in of grain, and thus become buried in grain. This may facilitate, over time, positioning of probes which provide measurements at different levels within a column of piled grain. Such delivery of probes may be based on preprogrammed positions in a pattern, coordinate locations, human direction, or automated response of robot 100B upon detecting a particular characteristic (e.g., grain temperature above a preset threshold).

With reference to FIG. 20F, at procedure 2080 of flow diagram 2000, in various embodiments the method as described in 2010-2030 may further comprise, during traversal of a sloped portion, outside of the landing zone, of the pile of grain by robot 100, a sensor 120 of robot 100 acting under instruction/direction of host processor 102 to capture a measurement of a characteristic of the sloped portion of the pile of grain. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled grain which is traversed by robot 100.

FIGS. 21A-21I illustrate a flow diagram 2100 of an example method of grain bin management during grain storage, in accordance with various embodiments. Procedures of the methods illustrated by flow diagram 2100 of FIGS. 21A-21I will be described with reference to elements and/or components of one or more of FIGS. 1-20F. It is appreciated that in some embodiments, the procedures may be performed in a different order than described in a flow diagram, that some of the described procedures may not be performed, and/or that one or more additional procedures to those described may be performed. Flow diagram 2100 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 2100 may be implemented in hardware, or a combination of hardware with firmware and/or software.

For purposes of example only, the devices 100 and 100B (generically referred to as "device 100" and/or "device 100") is a robotic device which utilizes augers (403) to move and maneuver with respect to piled granular material, such as, but not limited to piled grain. The augers 403 also agitate and disperse the piled grain as a by-product of traversing the piled grain. Robot 100 will be described as operating on or in relation to piled grain in a bulk store, such as, but not limited to grain in a grain bin. In some embodiments, robot 100 is free of mechanical coupling with a structure (e.g., the bulk store) in which the piled grain is contained.

With reference to FIG. 21A, at procedure 2110 of flow diagram 2100, in various embodiments, a robot 100 which includes a processor 102, a memory 103, and an auger-based drive system (which includes, for example, drive motors 106 and augers 403) receives, instructions to traverse a surface of piled grain in a bulk store. In some embodiments, the instructions are for robot 100 to follow a pattern of movement to traverse the surface of the piled grain. The pattern may be a grid pattern, a spiral pattern, a crossing pattern, or any of the patterns described herein, among others. The pattern may be predetermined, in some embodiments. For example, in some embodiments, the instructions may be preprogrammed into robot 100 (e.g., stored in memory 103). In some embodiments, the instructions may be remote control instructions. For example, remote control instructions may be received wirelessly from a remotely located computer system (506, 605, 604, etc.) or wirelessly from a remote controller 501 operated by a human (i.e., a human may drive the robot 100 remotely). In some embodiments, the pattern is determined ad hoc by robot 100 in an autonomous or semi-autonomous fashion as has been described herein.

With continued reference to FIG. 21A, at procedure 2120 of flow diagram 2100, in various embodiments, a processor (e.g., processor 102) of robot 100 controls movement of robot 100 according to the instructions. Via commands to motor controllers 105 and/or drive motors 106 of the auger-based drive system of robot 100, robot 100 is controlled relative to the grain in the flat storage bulk store, such as to traverse a surface of piled grain.

With continued reference to FIG. 21A, at procedure 2130 of flow diagram 2100, the processor directs a maintenance traversal, by the robot 100, of a surface of the pile of the grain during storage period of the grain to disperse a layer of the grain on and near the surface and thus prevent crust formation on the surface during the storage period. In response to the direction, the robot performs the traversal of the surface of the pile of grain. The dispersal is effected or carried out by rotation of augers of the auger-based drive system, which churn through roughly the upper one to six inches of the surface of the pile of grain. For example, with reference to FIG. 18H, consider an example where load 1810C is the last load to be placed into bin 1800 before a storage period which is several days, several months, or even longer than a year. In such an example, robot 100 may traverse surface 1811C' in a maintenance pattern to prevent a crust from forming, hinder/deter a crust from forming, and/or counteract any crust that does form by breaking it up. The maintenance traversal may be according to a pattern, which may be predetermined and stored within a memory (e.g., memory 103) of robot 100. It is appreciated that robot 100 may be operated at different speeds of movement to vary the depth of penetration of the augers 403 into the surface (e.g., surface 1811C') of the pile of grain. Typically, a crust may be several inches to a foot thick, but forms from the top downward, thus by performing repeated maintenance patterns at intervals a crust can be prevented from forming or disrupted and dispersed before it extends to a depth greater than may be reached by the augers 403 of robot 100. By virtue of preventing crust formation and/or disrupting it, airflow through the pile of grain is also well regulated by as there are no crusted sections to block airflow.

With reference to FIG. 21B, at procedure 2140 of flow diagram 2100, in various embodiments the method as described in 2110-2130 may further comprise, the processor (e.g., processor 102) directing direct one or more additional maintenance traversals intermittently during the storage period. Such additional maintenance patterns may be performed in the same fashion as discussed in procedure 2130. Under direction by the processor, the robot performs this/these additional maintenance traversal(s). Intermittent maintenance traversal(s) may occur at intervals which may be regular, irregular, or ad hoc. For example, a maintenance traversal may be directed and performed twice a day (e.g., morning and evening); on set intervals (e.g., 2-hour intervals, 6-hour intervals, 12-hour intervals, 24-hour intervals, or some other intervals). Ad hoc direction and performance of a maintenance traversal may be based on one or more measurements of environmental conditions (such as temperature, humidity, or moisture) or other factors. In some embodiments, a maintenance traversal may be directed by external or remote instruction from a computer system or a human operated remote controller.

With reference to FIG. 21C, at procedure 2145 of flow diagram 2100, in various embodiments the method as described in 2110-2130 may further comprise, during a maintenance traversal of a surface (e.g., portion 1811C' in FIG. 18H) of piled grain by robot 100, a sensor 120 of robot 100 acting under instruction/direction of host processor 102 to capture a measurement of a characteristic of the surface of piled grain during the maintenance traversal. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled grain which is traversed by robot 100. In a like fashion, the recorded positions of a robot 100 during one or more maintenance traversals may be utilized to create a three-dimensional map of the surface (e.g., surface 1811C') in the manner described herein. This surface mapping may be referred to as a contour map and may include elevations of the contours.

In some embodiments, the captured measurement(s) of characteristic(s) may be transmitted to a base station (506, 605) that is/are communicatively coupled with robot 100. The base station (506, 605) is located remotely from the robot and may be configured to communicate with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled grain. Additionally, or alternatively, via such communications, the base station (506, 605) may relay instructions to robot 100.

In some embodiments, the captured measurement(s) of characteristic(s) may be transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

With reference to FIG. 21D, at procedure 2150 of flow diagram 2100, in various embodiments the method as described in 2110-2130 may further comprise, during a maintenance traversal of a surface (e.g., surface 1811C' in FIG. 18H) of piled grain by robot 100, a sensor 120 of robot 100 acting under instruction/direction of host processor 102 to capture a measurement of a temperature of a portion of the surface of piled grain. For example, in some embodiments, temperature sensor 233, infrared sensor 236, or infrared camera 108 of robot 100 is used to capture a temperature measurement of the piled grain during the maintenance traversal. In some embodiments, the captured temperature measurement is paired with a location of robot 100 at the time of capture of the temperature measurement. Such paired data can be used to create a heat map of the piled grain which is traversed by robot 100. Additionally, temperature data can provide an operator of the bulk store information about the conditions of storage, quality of grain, and/or identify areas for additional traversal to prevent crust formation, disrupt a hot spot, and/or ensure air circulation.

For example, with reference to procedure 2151 in FIG. 21D, in some embodiments, in response to the captured temperature measurement exceeding a threshold (e.g., being above 100 degrees fahrenheit, or some other predetermined temperature value) on the portion of the surface, the processor directs robot 100, to repeatedly traverse the portion to further disperse the portion until measured temperature in the portion is decreased to a value below the threshold. The repeated traversal may be in a pattern, such as a spiral pattern, and may go on for a specified period (such as 3 minutes) or until the temperature is remeasured at the portion and found to be below the threshold. For example, by traversing the robot 100 in a tight spiral pattern it can create a small crater (e.g., 3 to 6 feet across) with a depth of 1 to 2 feet. In some embodiments, this may disperse grain that exceeded the temperature threshold and mix it with adjacent cooler grain to lower the temperature to an acceptable value. The robot may then leave the crater open or fill it with adjacent grain. It is appreciated that other actions can be taken such as directing the robot employ sprayer 347 to spray a coolant on/around the hot spot which exceeds the temperature threshold. In some embodiments, the robot may send an external report of the temperature measurement which exceeded the threshold.

With reference to FIG. 21E, at procedure 2155 of flow diagram 2100, in various embodiments the method as described in 2110-2130 may further comprise, during a maintenance traversal of a surface (e.g., surface 1811C' in FIG. 18H) of piled grain by robot 100, a sensor 120 of robot 100 acting under instruction/direction of host processor 102 to capture a measurement of an air flow measurement of a portion of the surface of piled grain. For example, in some embodiments, air flow sensor 240 of robot 100 is used to capture an airflow measurement of the piled grain during the maintenance traversal. In some embodiments, the captured airflow measurement is paired with a location of robot 100 at the time of capture of the airflow measurement. Such paired data can be used to create an airflow map of the piled grain which is traversed by robot 100. Additionally, airflow data can provide an operator of the bulk store information about the conditions of storage, quality of grain, and/or identify areas for additional traversal to prevent crust formation and/or ensure air circulation.

For example, with reference to procedure 2156 in FIG. 21E, in some embodiments, in response to the captured airflow measurement below a threshold (e.g., below 0.5 meters/second or some other predetermined value while a fan (e.g., fan 1803) is blowing air into the bin 1800) on the portion of the surface, the processor directs robot 100 to repeatedly traverse the portion to further disperse the portion until measured airflow in the portion is increased to a value above the threshold. The repeated traversal may be in a pattern, such as a spiral pattern, and may go on for a specified period (such as 3 minutes) or until the airflow is remeasured at the portion of the surface and found to exceed the threshold. For example, by traversing the robot 100 in a tight spiral pattern it can create a small crater (e.g., 3 to 6 feet across) with a depth of 1 to 2 feet. In some embodiments, creation of such a crater may remove a blockage of the airflow. The robot may then leave the crater open or fill it with adjacent grain. It is appreciated that other actions can be taken such as directing the robot to deploy a ripper 349 to break up the portion. In some embodiments, the robot may send an external report of the airflow measurement which was below the threshold.

With reference to FIG. 21F, at procedure 2160 of flow diagram 2100, in various embodiments the method as described in 2110-2130 may further comprise a sprayer payload 347 spraying a substance onto the surface of the piled grain during performance of a maintenance pattern. The spray may be a coolant, a flame retardant, an insecticide, a fungicide, or other liquid, gas, or powder. For example, the spray may be a coolant for a sprayed on a hotspot where a temperature has been measured above a threshold. In other embodiments, the spray may be a fungicide to prevent the growth of mold or to stop the growth of mold detected in an image captured during a maintenance traversal.

Figure 21G:

With reference to FIG. 21G, at procedure 2165 of flow diagram 2100, in various embodiments the method as described in 2110-2130 may further comprise a probe delivery payload 344 delivering a probe 1110 onto a surface of the piled grain during performance of a maintenance pattern. For example, probe delivery payload 344 may take action under instruction/direction of host processor 102 to deliver one or more probes 1110. As described herein, the probe may have a sensor which measures and reports the conditions of the grain. Such delivery of probes may be based on preprogrammed positions in a pattern, coordinate locations, human direction, or automated response of robot 100B upon detecting a particular characteristic (e.g., grain temperature above a preset threshold).

Figure 21H:
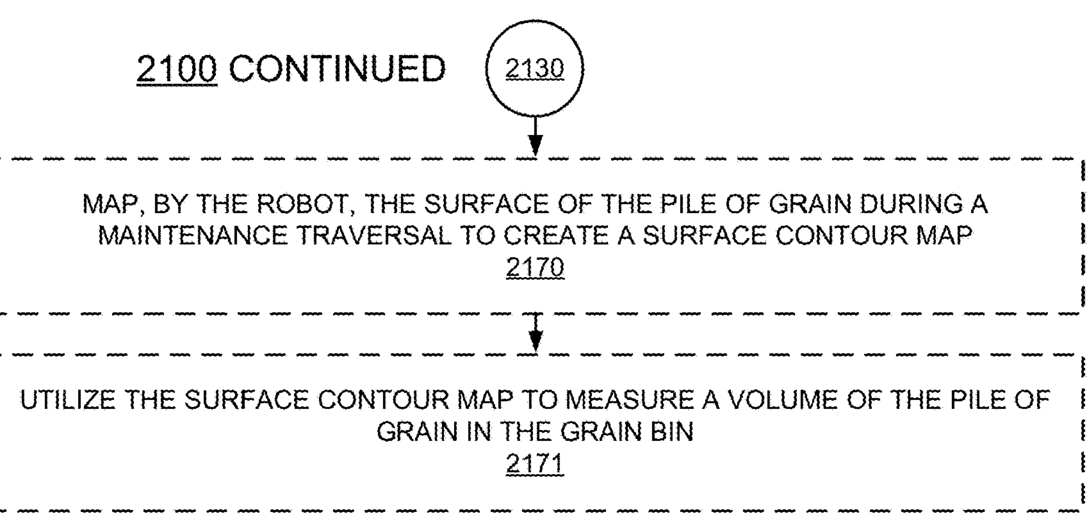

With reference to FIG. 21H, at procedure 2170 of flow diagram 2100, in various embodiments the method as described in 2110-2130 may further comprise, during a maintenance traversal of a pile of grain by robot 100, and under direction of host processor 102, mapping the surface of the pile of grain to create a three-dimensional surface contour map of the surface which may include surface elevations. This mapping may be conducted in the fashion described previously in conjunction with FIGS. 9A-9C. The surface contour map may be produced by robot 100 or by an external computer from measurements provided from robot 100.

At procedure 2171 of flow diagram 2100, in some embodiments, the surface contour map is utilized to measure a volume of the pile of grain in the grain bin. For example, the surface contour map can be combined with information regarding test weights (i.e., moisture levels) of piled grain and the location of the floor of the bulk store to estimate an amount of granular material (e.g., grain) stored in the bulk store (i.e., a number of bushels or other weight or volume). For example, and with respect to a circular bin, an overall volume of grain can be estimated by finding the volume of a cylinder with a radius of half the diameter of the bin and a height equivalent to the lowest elevation in the surface contour may minus the known elevation of the bottom internal surface of the bin and then adding on the volume estimate of the grain between the top of the cylinder and the three-dimensional shape of the surface contour map. In some embodiments, the volume of this three-dimensional shape may be approximated. This measured estimate of the volume of grain may be useful to the operator of the bin, to a government agency, to a commodities trader, to a bank or other financer of a farming operation related to the grain stored in the grain bin, etc. This volume measurement may be produced by robot 100 or by an external computer from measurements provided from robot 100.

Figure 21I:
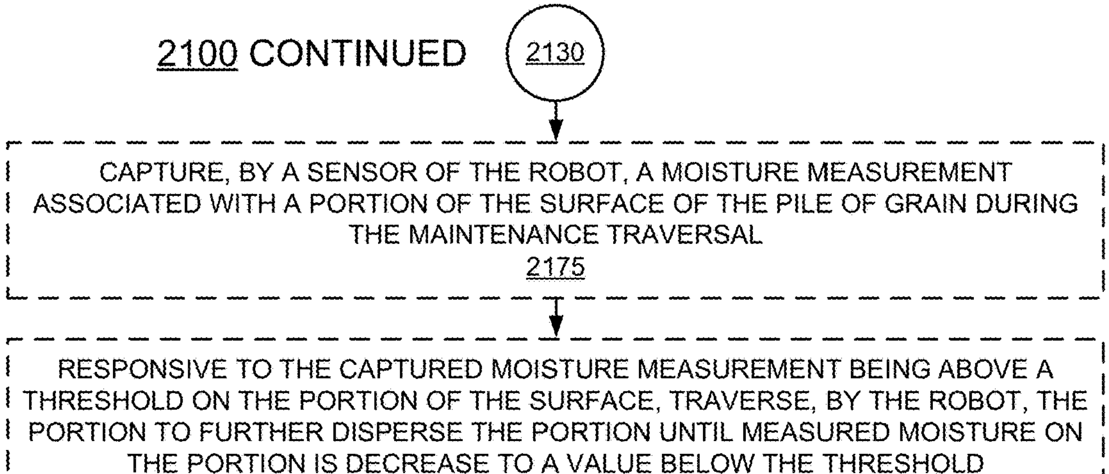

With reference to FIG. 21I, at procedure 2175 of flow diagram 2100, in various embodiments the method as described in 2110-2130 may further comprise, during a maintenance traversal of a surface (e.g., surface 1811C' in FIG. 18H) of piled grain by robot 100, a sensor 120 of robot 100 acting under instruction/direction of host processor 102 to capture a measurement of a moisture of a portion of the surface of piled grain. For example, in some embodiments, moisture sensor 234 or another sensor or sensors of robot 100 is used to capture a moisture measurement of the piled grain during the maintenance traversal. In some embodiments, the captured moisture measurement is paired with a location of robot 100 at the time of capture of the moisture measurement. Such paired data can be used to create a moisture map of the piled grain which is traversed by robot 100. Additionally, moisture data can provide an operator of the bulk store information about the conditions of storage, quality of grain, and/or identify areas for additional traversal to prevent crust formation or mix the grain to even out and a higher than desired are of moisture.

For example, with reference to procedure 2176 in FIG. 21I, in some embodiments, in response to the captured moisture measurement exceeding a threshold (e.g., being above 20% moisture or some other predetermined value) on the portion of the surface, the processor directs robot 100 to repeatedly traverse the portion to further disperse the portion until measured moisture in the portion is decreased to a value below the threshold. The moisture threshold may be exceeded due to grain not being dried to a desired moisture content or possibly due to moisture incursion (e.g., a leaky roof during a rainstorm). The repeated traversal may be in a pattern, such as a spiral pattern, and may go on for a specified period (such as 3 minutes) or until the moisture is remeasured at the portion and found to be below the threshold. For example, by traversing robot 100 in a tight spiral pattern it can create a small crater (e.g., 3 to 6 feet across) with a depth of 1 to 2 feet. In some embodiments, this disperses the overly moist grain and mixes it with nearby drier grain, thus bringing the average moisture down to a desired/acceptable value. The robot may then leave the crater open or fill it with adjacent grain. It is appreciated that other actions can be taken such as directing the robot employ sprayer 347 to spray a powdered absorbent on/around the portion which exceeds the moisture threshold. In some embodiments, the robot may send an external report of the moisture measurement which exceeded the threshold.

FIGS. 22A-22D illustrate a flow diagram 2200 of an example method of robotic walk down in a flat storage bulk store, in accordance with various embodiments. Procedures of the methods illustrated by flow diagram 2200 of FIGS. 22A-22D will be described with reference to elements and/or components of one or more of FIGS. 1-21I. It is appreciated that in some embodiments, the procedures may be performed in a different order than described in a flow diagram, that some of the described procedures may not be performed, and/or that one or more additional procedures to those described may be performed. Flow diagram 2200 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 2200 may be implemented in hardware, or a combination of hardware with firmware and/or software.

For purposes of example only, the devices 100 and 100B (generically referred to as "device 100" and/or "device 100") is a robotic device which utilizes augers (403) to move and maneuver with respect to piled granular material, such as, but not limited to piled grain. The augers 403 also agitate and disperse the piled grain as a by-product of traversing the piled grain. Robot 100 will be described as operating on or in relation to piled grain in a bulk store, such as, but not limited to grain in a grain bin. In some embodiments, robot 100 is free of mechanical coupling with a structure (e.g., the bulk store) in which the piled grain is contained.

With reference to FIG. 22A, at procedure 2210 of flow diagram 2200, in various embodiments, a robot 100 which includes a processor 102, a memory 103, and an auger-based drive system (which includes, for example, drive motors 106 and augers 403) receives, instructions to traverse a surface of piled grain in a flat storage bulk store. In some embodiments, the instructions are for robot 100 to follow a pattern of movement to traverse the surface of the piled grain. The pattern may be a grid pattern, a spiral pattern, a crossing pattern, or any of the patterns described herein, among others. The pattern may be predetermined, in some embodiments. For example, in some embodiments, the instructions may be preprogrammed into robot 100 (e.g., stored in memory 103). In some embodiments, the instructions may be remote control instructions. For example, remote control instructions may be received wirelessly from a remotely located computer system (506, 605, 604, etc.) or wirelessly from a remote controller 501 operated by a human (i.e., a human may drive the robot 100 remotely). In some embodiments, the pattern is determined ad hoc by robot 100 in an autonomous or semi-autonomous fashion as has been described herein.

With continued reference to FIG. 22A, at procedure 2220 of flow diagram 2200, in various embodiments, a processor (e.g., processor 102) of robot 100 controls movement of robot 100 according to the instructions. Via commands to motor controllers 105 and/or drive motors 106 of the auger-based drive system of robot 100, robot 100 is controlled relative to the grain in the flat storage bulk store, such as to traverse a surface of piled grain.

With continued reference to FIG. 22A, at procedure 2230 of flow diagram 2200, the processor directs traversal, by the robot 100, of a portion of a pile of the grain in the flat storage bulk store to incite sediment gravity flow in the portion of pile of grain to walk-down the grain in the portion. The walk down is a robotic walk down which moves grain from higher elevations to lower elevations within the flat storage. It should be appreciated that this robotic walking down of grain is one of many facets of managing stored grain and managing a bulk store where the grain is stored. The sediment gravity flow is incited by disruption of viscosity of the portion of the pile of grain through agitation of the portion of the pile of grain by auger rotation of the auger-based drive system. Incitement of sediment gravity flow for various purposes has been previously described herein (see e.g., FIGS. 7A-7L and their description; FIGS. 8A-8E and their description; and FIGS. 19A-19D and their description). The traversal may be remotely controlled or directed, in some embodiments. In other embodiments, the traversal may be carried out by robot 100 in an automated, semi-automated, or ad hoc manner. For example, robot 100 may measure characteristics of the grain, such as slope or height of a portion which triggers it to begin the traversal.

In some embodiments, the portion being traversed is a portion which is piled in an asymmetric fashion against a wall of the flat storge. That is, the traversed portion is grain which is piled in a fashion that is generating an asymmetric load against a wall of the flat storage bulk store, and the traversal walks down the grain in the portion to lower an angle of a slope of the portion to below a predetermined angle to reduce the asymmetric load against the wall.

In some embodiments, the portion being traversed is adjacent or in to an underfilled corner region or side region of the flat storage. That is, a corner region of the flat storage bulk store may be traversed to walk-down the grain into the corner region until an elevation of the grain in the corner region reaches a predetermined higher elevation than its starting elevation.

In some embodiments, the portion being traversed is adjacent a location of manual extraction within the flat storage (e.g., near where humans are shoveling, near where a portable auger is deployed, where the nozzle of a vacuum hose can easily access grain, and/or near where a skid steer or front-end loader is gathering buckets of grain).

The traversal of procedure 2230 may be performed in response to receipt by robot 100 of an instruction from an external source. For example, instructions may be received wirelessly from a remotely located computer system (506, 605, 604, etc.) or wirelessly from a remote controller 501 operated by a human (i.e., a human may drive the robot 100 remotely for some or all of the traversal, in some embodiments). In some embodiments, the traversal may be performed according to a predetermined pattern that may be stored in memory 103 of robot 100.

Figure 22B:
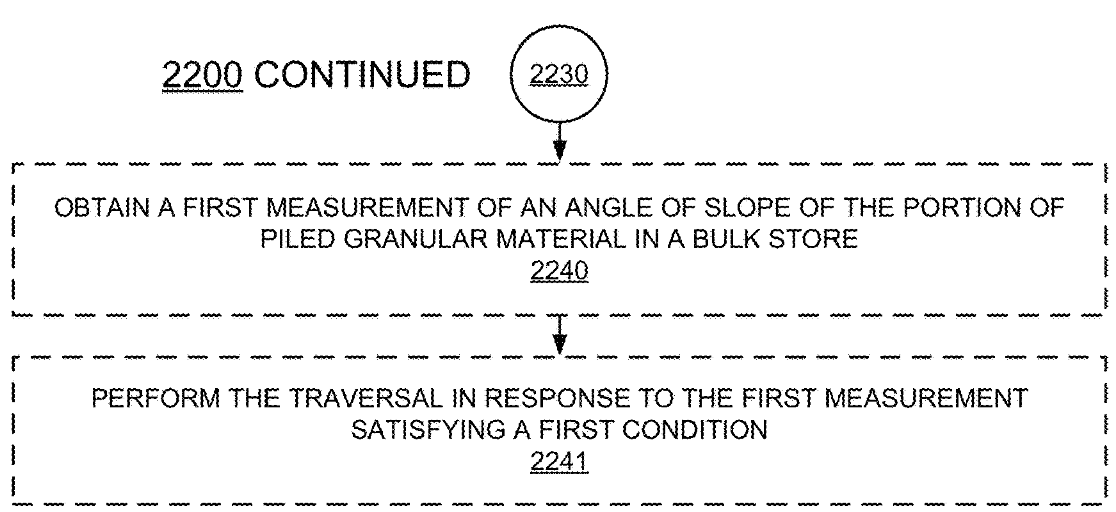

With reference to FIG. 22B, at procedure 2240 of flow diagram 2200, in various embodiments the method as described in 2210-2230 may further comprise, the processor (e.g., processor 102) directing one or more sensors of robot 100 to obtain a first measurement of an angle of slope of the portion of piled granular material in a bulk store. With reference to FIGS. 19D and 19E, this can comprise a measure of the angle of slope of the surface 1912 (Figure D) or the surface 1913 (FIG. 19E) of the grain 1910 which is piled in flat storage 1900. The angle can be measured and obtained autonomously by robot 100 or can be measured by a device external to robot 100 and then obtained by being communicated to or accessed by robot 100. In an embodiment, where the angle of slope of surface 1912 or surface 1913 is measured by robot 100, motion sensor(s) 220 may be used to measure the angle of robot 100 on a slope to approximate the angle of the slope (e.g., within a tolerance such as, for example, +/−1 degree). In some embodiment, procedure 2240 may be skipped and an operator may simply direct robot 100 to begin traversal of a portion of piled grain at an operator designated location.

With continued reference to FIG. 22B, at procedure 2241 of flow diagram 2200, in various embodiments the method as described in 2210-2240 may further comprise, robot 100 performing the traversal in response to the first measurement satisfying a first condition. The first condition may be that the first measure of slope is beyond an acceptable threshold angle (e.g., beyond 10 degrees of slope). One or more patterns of traversal or even random traversal may be conducted on the surface in response to meeting the condition.

Figure 22C:
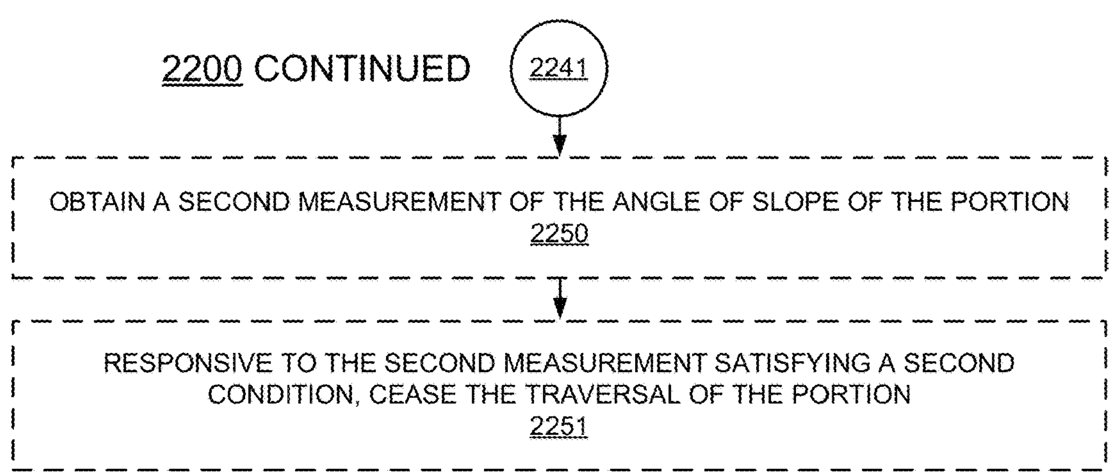

With reference to FIG. 22C at procedure 2250 of flow diagram 2200, in various embodiments the method as described in 2210-2230 may further comprise, robot 100 obtaining a second measurement of the angle of slope of the portion. The second measure may take place during the traversal and may be acquired in the same fashion as the first measurement of the angle of slope (e.g., motion sensor(s) 220 may be used to measure the angle of robot 100 on a slope to approximate the angle of the slope (e.g., within a tolerance such as, for example, +/−1 degree).

With continued reference to FIG. 22C, at procedure 2251 of flow diagram 2200, in various embodiments the method as described in 2250 may further comprise, responsive to the second measurement satisfying a second condition, robot 100 ceases the traversal of the portion. In some embodiments, the first condition is related to a first angle and the second condition is related to a second angle. In some embodiments, where the first angle is the same as the second angle, the first condition may be met when the first measurement exceeds the angle, and the second measurement may be met when the second measurement falls below the angle. For example, the angle may be 10 degrees, and when the first measurement is 20 degrees, traversal will continue until the angle is adjusted to below 10 degrees. In some embodiments, where the first angle and the second angle are different, the first angle is larger than the second angle. For example, the first angle may be 10 degrees while the second angle is 5 degrees. In such an embodiment, when the first measurement is 20 degrees, traversal will continue until the angle meets the second condition (e.g., drops below 5 degrees). Put differently, the traversal may continue until a specified time has passed and/or until a follow-on measurement of the angle of slope of the surface in the portion meets a second condition (e.g., falls below the threshold angle or falls below some other designated angle). Alternatively, a user may intervene to stop the traversal. In this manner a portion may be walked down into a corner, walked down to a lower height leaning asymmetrically against a wall, walked down to an extraction point, or just generally have its surface slope adjusted downward to closer to level.

Figure 22D:
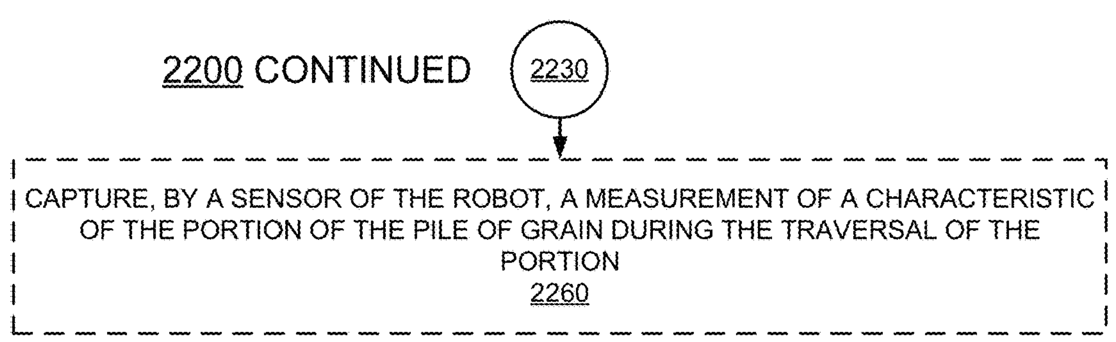

With reference to FIG. 22D, at procedure 2260 of flow diagram 2200, in various embodiments the method as described in 2210-2230 may further comprise, during a traversal of a portion (e.g., a portion of surface 1912 in FIG. 19D, or a portion of surface 1913 in FIG. 19E) of piled grain by robot 100, a sensor 120 of robot 100 acting under instruction/direction of host processor 102 to capture a measurement of a characteristic of the surface of piled grain during the traversal. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled grain which is traversed by robot 100. In a like fashion, the recorded positions of a robot 100 during one or more maintenance traversals may be utilized to create a three-dimensional map of the surface in the manner previously described herein. This surface mapping may be referred to as a contour map and may include elevations of the contours.

In some embodiments, the captured measurement(s) of characteristic(s) may be transmitted to a base station (506, 605) that is/are communicatively coupled with robot 100. The base station (506, 605) is located remotely from the robot and may be configured to communicate with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled grain.

Additionally, or alternatively, via such communications, the base station (506, 605) may relay instructions to robot 100.

In some embodiments, the captured measurement(s) of characteristic(s) may be transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

FIGS. 23A-23E illustrate a flow diagram 2300 of an example method of grain management in a bulk store, in accordance with various embodiments. Procedures of the methods illustrated by flow diagram 2300 of FIGS. 23A-23E will be described with reference to elements and/or components of one or more of FIGS. 1-22D. It is appreciated that in some embodiments, the procedures may be performed in a different order than described in a flow diagram, that some of the described procedures may not be performed, and/or that one or more additional procedures to those described may be performed. Flow diagram 2300 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 2300 may be implemented in hardware, or a combination of hardware with firmware and/or software.

For purposes of example only, the devices 100 and 100B (generically referred to as "device 100" and/or "device 100") is a robotic device which utilizes augers (403) to move and maneuver with respect to piled granular material, such as, but not limited to piled grain. The augers 403 also agitate and disperse the piled grain as a by-product of traversing the piled grain. Robot 100 will be described as operating on or in relation to piled grain in a bulk store, such as, but not limited to grain in a grain bin. In some embodiments, robot 100 is free of mechanical coupling with a structure (e.g., the bulk store) in which the piled grain is contained.

With reference to FIG. 23A, at procedure 2310 of flow diagram 2300, in various embodiments, movement of a robot is controlled relative to grain in a bulk store. For example, a robot 100 which includes a processor 102, a memory 103, and an auger-based drive system (which includes, for example, drive motors 106 and augers 403) is controlled via the auger-based drive system relative to grain stored in a bin or other bulk store (see e.g., bin 1800 of FIGS. 18A-18M and/or flat storage bulk store 1900 of FIG. 19A-19D and the like herein). Various techniques for control of such a robot 100 have been described herein, such as with respect to FIG. 4F. For example, processor 102 may provide commands to motor controllers 105 and/or drive motors 106 of the auger-based drive system of robot 100, to control robot 100 is controlled relative to the grain in a bulk store, such as to traverse a surface of grain in the bulk store in one or more of the manners of traversal described herein.

With continued reference to FIG. 23A, at procedure 2320 of flow diagram 2300, the processor directs traversal, by the robot 100, of a landing zone portion of a surface of a pile of the grain during load-in of the grain to disperse broken grain and foreign material away from the landing zone portion. In response to the direction, the robot performs the traversal of the landing zone. In a round grain bin, such grain bin 1800 of FIG. 18C, the landing zone portion is located in a center (of the circular circumference) of the grain bin where the grain lands as it is augured into the grain bin during load-in. In other embodiments, the landing zone portion is under the area where grain is falling onto the pile, and this area may not be in the center of the bin or bulk store. In some embodiments, the traversal of the landing zone occurs while grain is falling. The dispersal is effected or carried out in part by rotation of augers of the auger-based drive system. For example, with reference to FIGS. 18C, 18E, and 18G and their respective description, this can comprise robot 100 traversing a landing zone portion such as 1851, 1852, and/or 1853 during load-in to disperse the BGFM that would otherwise accumulate in the landing zone beneath the stream of grain falling from auger 1807 during the respective load-ins. Various characteristics may be measured by sensors 120 of robot 100 and in this manner, the measured characteristics may be mapped with respect to their loads within an overall pile. For example, in this manner, a pile may have characteristics mapped with respect to each truck load of grain added to a pile.

With continued reference to FIG. 23A, at procedure 2330 of flow diagram 2300, in various embodiments, the robot performs an additional traversal of a sloped portion of the pile of grain to further effect the dispersal of BGFM. This can comprise the processor (e.g., processor 102) directing the additional traversal by the robot 100 of a sloped portion of the pile of grain (e.g., the sloped portion of surface 1811A below landing zone 1851 in FIG. 18C or a similar sloped portion of a pile in another bulk store) to incite sediment gravity flow in the sloped portion of the pile of grain by disruption of viscosity of the sloped portion of the pile of grain through agitation of the sloped portion of the pile of grain by the auger rotation of the auger-based drive system. Under direction by the processor, the robot performs this additional traversal. The additional traversal may be according to a pattern which may be a grid pattern, a spiral pattern, a crossing pattern, or any of the patterns described herein, among others. The sloped portion being referred to is outside and typically below the landing zone portion. The sediment gravity flow reduces a slope of the sloped portion and of the landing zone portion and further disperses the broken grain and foreign material away from the landing zone portion. As described herein, the sediment gravity flow is, effectively, a purposely induced landslide. The sloped portion may be sought out by the robot 100, in some embodiments. In some embodiments, the traversal of one or more sloped portions and the landing zone portion is repeated to bring reduce the slope of the sloped portion more toward level, which may be realized by bringing the slope below a threshold slope such between +/−5 degrees, between +/−4 degrees, +/−2 degrees, or +/−1 degree when the initial slope is above the threshold slope. In some embodiments, the traversal of one or more sloped portions is repeated to bring reduce the slope of the sloped portion more toward level by reducing the slope by a predetermined amount such as 3 degrees, 5 degrees, 10 degrees, etc.

With reference to FIG. 23B, at procedure 2340 of flow diagram 2300, the robot 100 performs a maintenance traversal of the surface of the pile of grain. For example, this can comprise the processor (e.g., processor 102) directing a maintenance traversal, by the robot 100, of a surface of the pile of the grain during storage period of the grain to disperse a layer of the grain on and near the surface and thus prevent crust formation on the surface during the storage period. In response to the direction, the robot performs the maintenance traversal of the surface of the pile of grain. The maintenance traversal may be according to a pattern which may be a grid pattern, a spiral pattern, a crossing pattern, or any of the patterns described herein, among others. The dispersal is effected or carried out by rotation of augers of the auger-based drive system, which churn through and disrupt roughly the upper one to six inches of the surface of the pile of grain in some embodiments. In other embodiments, the maintenance traversal may disrupt the surface layer to a greater depth, for example to 8 inches, 12 inches, and/or 18 inches, depending on the configuration of the robot 100 and the type and duration of the maintenance traversal. With reference to FIG. 18H, consider an example maintenance traversal where load 1810C is the last load to be placed into bin 1800 before a storage period which is several days, several months, or even longer than a year (e.g., two years). In such an example, robot 100 may traverse surface 1811C' in a maintenance pattern to prevent a crust from forming, hinder/deter a crust from forming, and/or counteract any crust that does form by breaking it up. The maintenance traversal may be according to a pattern, which may be predetermined and stored within a memory (e.g., memory 103) of robot 100. It is appreciated that robot 100 may be operated at different speeds of movement to vary the depth of penetration of the augers 403 into the surface (e.g., surface 1811C') of the pile of grain. Typically, a crust may be several inches to a foot thick, but forms from the top downward. Thus, by performing repeated maintenance patterns at intervals a crust can be prevented from forming or disrupted and dispersed before it extends to a depth greater than may be reached by the augers 403 of robot 100. By virtue of preventing crust formation and/or disrupting it, airflow through the pile of grain is also well regulated by as there are no crusted sections to block airflow.

In a similar fashion, a maintenance traversal may be performed during the fan assisted fumigation of a pile of grain to ensure that a fumigation gas which is forced into the pile of grain or drawn into the pile of grain by a fan (e.g., fan 1803) is able to travel uniformly through the pile without disruption due to crusted areas of the surface blocking air flow. In such a traversal, robot 100 may operate in concert with the operation of fan 1803 and may perform the maintenance traversal under control of remote instruction such as from a remote controller or a remote computer system which directs robot 100 to perform a maintenance traversal while fan 1803 is in operation for fumigation or for other reasons. For example, instructions to perform a maintenance traversal may be received wirelessly from a remotely located computer system (506, 605, 604, etc.) or wirelessly from a remote controller 501 operated by a human (i.e., a human may drive the robot 100 remotely for some or all of the traversal, in some embodiments). In some embodiments, the maintenance traversal may be performed according to a predetermined pattern that may be stored in memory 103 of robot 100.

With continued reference to FIG. 23B, at procedure 2341 of flow diagram 2300, in various embodiments, a sensor of the robot captures a measurement of a characteristic of the pile of grain during the maintenance traversal. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled grain which is traversed by robot 100. In a like fashion, the recorded positions of a robot 100 during one or more maintenance traversals may be utilized to create a three-dimensional map of the surface in the manner previously described herein. This surface mapping may be referred to as a contour map and may include elevations of the contours.

In some embodiments, the captured measurement(s) of characteristic(s) may be wirelessly transmitted to a base station (506, 605) that is/are communicatively coupled with robot 100. The base station (506, 605) is a computer located remotely from the robot and may be configured to communicate with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled grain. Additionally, or alternatively, via such communications, the base station (506, 605) may relay instructions to robot 100.

In some embodiments, the captured measurement(s) of characteristic(s) may be wirelessly transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

With reference to FIG. 23C, at procedure 2350 of flow diagram 2300, the robot 100 performs a rehydration traversal of the surface of the pile of grain. For example, this can comprise the processor (e.g., processor 102) directing a rehydration traversal, by the robot 100, of a surface of the pile of the grain to rehydrate grain to a higher/desired moisture content prior to extraction and shipment/sale. In response to the direction, the robot performs the rehydration traversal of the surface of the pile of grain. The rehydration traversal may be according to a pattern which may be a grid pattern, a spiral pattern, a crossing pattern, or any of the patterns described herein, among others. The rehydration traversal is performed by the robot on the surface of the pile of grain in concert with operation of a fan (e.g., fan 1803), of the bulk store, drawing humid air onto a top surface of the pile of grain (e.g., before, during, and/or after operation of the fan). The rehydration traversal mixes grain on the top surface with grain below the top surface to facilitate even rehydration of a layer of grain near the top surface by the humid air, to prevent a crust from forming due to the humid air's interaction with the top surface of the grain, and to prevent blockages of airflow because of crusting. An example rehydration traversal and follow-on extraction has been previously described in conjunction with FIGS. 18I and 18J.

With continued reference to FIG. 23C, at procedure 2351 of flow diagram 2300, in various embodiments, a sensor of the robot captures a measurement of a characteristic of the pile of grain during the rehydration traversal. This can be performed in a similar or same manner as described in procedure 2341 and the captured measurement may be locally stored in a memory of robot 100 and/or wirelessly transmitted to a computer or cloud storage located remotely from robot 100. The captured data may be used to form a map of the measured characteristic and/or other measured characteristics with respect to the pile of grain.

With reference to FIG. 23D, at procedure 2360 of flow diagram 2300, the robot 100 performs an extraction traversal of the surface of the pile of grain during load-out of grain from the bulk store. For example, this can comprise the processor (e.g., processor 102) directing an extraction traversal, by the robot 100, of a surface of the pile of the grain during load-out of grain from the bulk store. The extraction traversal moves grain of the pile of grain toward an extraction point which may be associated with a sump auger, a portable auger, or vacuum hose, a skid loader, or a human with a shovel. Extraction traversals have been described herein with reference to FIGS. 18J, 18L, and among others and may be similarly performed in any bulk store to assist with extraction of grain. The extraction traversal may be according to a pattern which may be a grid pattern, a spiral pattern, a crossing pattern, or any of the patterns described herein, among others.

With continued reference to FIG. 23D, at procedure 2361 of flow diagram 2300, in various embodiments, a sensor of the robot captures a measurement of a characteristic of the pile of grain during the extraction traversal. This measurement of a characteristic be performed in a similar or same manner as described in procedure 2341 and the measured characteristic may be stored in robot 100 or wirelessly transmitted to a remote external computer 506, 605 alone or paired with a location of the robot of the time of capture of the measurement.

With reference to FIG. 23E, at procedure 2370 of flow diagram 2300, in various embodiments the method as described in 2310-2330 may further comprise, during a traversal of a landing zone portion of piled grain by robot 100, a sensor 120 of robot 100 captures a characteristic of the landing zone portion of the piled grain. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled grain which is traversed by robot 100. In a like fashion, the recorded positions of a robot 100 during one or more maintenance traversals may be utilized to create a three-dimensional map of the surface in the manner previously described herein. This surface mapping may be referred to as a contour map and may include elevations of the contours.

With continued reference to FIG. 23E, at procedure 2371 of flow diagram 2300, in some embodiments, the captured measurement(s) of characteristic(s) may be wirelessly transmitted to a base station (506, 605) that is/are communicatively coupled with robot 100. The base station (506, 605) is a computer located remotely from the robot and may be configured to communicate with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled grain. Additionally, or alternatively, via such communications, the base station (506, 605) may relay instructions to robot 100.

In some embodiments, the captured measurement(s) of characteristic(s) may be transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

Additional Embodiments

Herein, robotic traversals and operations have been depicted and described in relation to operations of a single robot 100. However, in a bulk store and in particular in a very large bulk store, multiple robots can operate in a similar fashion independently, in direct collaboration/communication with one another, and/or in collaboration via instruction from a remotely located computer system to accomplish tasks and traversals more quickly and efficiently than may be accomplished a single robot operating alone.

Moreover, as discussed below in Section 4, in some embodiments a robot with an interchangeable drive system, while equipped with an auger-based drive system, may be utilized to perform certain grain management tasks such as leveling, mixing fine material, breaking crusts, measuring data, dropping probes, and/or mapping or the like, which require operating upon grain piled more than about a foot deep. The auger-based drive system may then be interchanged for a different drive system such as wheels or a continuous tracks to perform certain other grain management tasks, such as final extraction or load out (e.g., sweeping granular material, pushing granular material with a blade, or the like), which involve operating the robot either upon a mostly bare floor/lower surface of a bulk store or else upon grain or other granular material which is piled less than about a foot deep.

Section 4

Granular Material Management Robot with Interchangeable Drive System

FIGS. 24A-24J illustrate diagrams of a granular material management robot 2400 with an interchangeable drive system, in accordance with various embodiments. That is, one or more portions of the drive system/drive train may be swapped out to change the type of drive system used by robot 2400. For example, the portion that interfaces with the surface upon which the robot operates may be referred to as the "surface interacting portion," and one or more aspects of this surface interacting portion may be swapped out to, for example, change the robot from an auger-drive to a continuous tread drive (which may also be referred to as a continuous track drive), or to a wheel drive.

With respect to robot 2400, it operates in the same manner as previously described in conjunction with device 100. Although a slightly different external form factor exists between body 401 (of robot 100) and body 2401 (of robot 2400) such as the inclusion of handle 2402, the two robots (when utilizing an auger-based drive system) operate in the same manner. Additionally, robot 2400 may utilize any of the sensors 120 or payloads 140 that have been previously described with respect to robot 100.

FIGS. 24A-24H show the process of interchanging the components to change the type of the drive system from auger-based to continuous tread-based drive. The procedures shown in these figures may be similarly followed to change from auger-based to wheel-based drive. Similarly, the procedures may be reversed to change back from continuous tread to auger-based drive system. This interchangeability allows the robot or a user of the robot to adapt to robot to different terrain, different operating environments, and/or to different tasks. This allows the core of the robot 2400, which includes the body 2401 and any sensors, power supplies, and processing enclosed therein, to be reused in a variety of situations by adapting one or more components of the drive system. A variety of drive systems may be adapted to the robot 2400 in this manner, including: continuous treads/tracks, wheels, magnetic assisted traction (e.g., wheels or tracks/treads with magnets for improved purchase on ferrous metal surfaces), augers, floatation screws, walking legs, and/or snow machine treads/tracks.

Figure 24A:
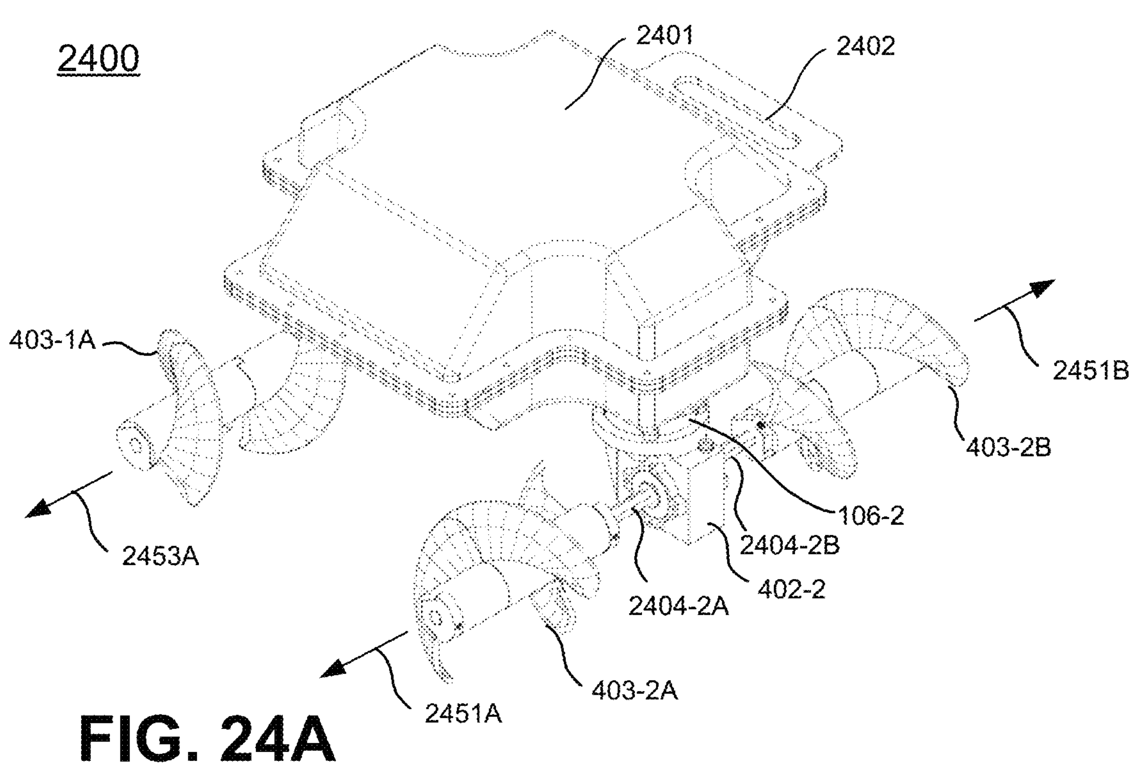
FIGS. 24A-24J illustrate diagrams of a granular material management robot with an interchangeable drive system, in accordance with various embodiments.

FIG. 24A illustrates an upper front right perspective view of the exterior of a device 2400 with an interchangeable drive system depicted with auger-based surface interface portions 403 (403-1A, 403-2A, 403-1B, 403-2B) installed on its drive system, in accordance with various embodiments. In the depicted embodiments, the drive train of robot 2400 comprises: an electric drive motor 106 (106-1, 106-2) which is coupled with a respective transmission 402 (402-1, 402-2), which spins one or more shafts 2404 which are then coupled with a selected and interchangeable surface interface portion. Interchanging the surface interface portions of the drive system along with, in some embodiments, reconfiguring the transmission 402 facilitates having a core robot with an interchangeable drive system. Some examples of surface interface portions include: auger-based surface interface portions 403 (403-1A, 403-2A, 403-1B, 403-2B), continuous tread surface interface portions 2405 (2405-1, 2405-2), and wheels (not depicted). In some embodiments, there may be a variety of auger sizes with different pitches and floats that may be selectively interchanged. Likewise, in a continuous tread version, there may be different tread patterns (smooth, cleated, incorporating paddles, etc.), or tread materials (e.g., rubber, metal, magnetic), or treads adapted for certain surfaces (e.g., metal, dirt, intermittently scattered granular material, mud, snow, etc.). Similarly, in a wheeled version, different wheels may be selected for size, tread, material of construction, or the like.

Figure 24B:
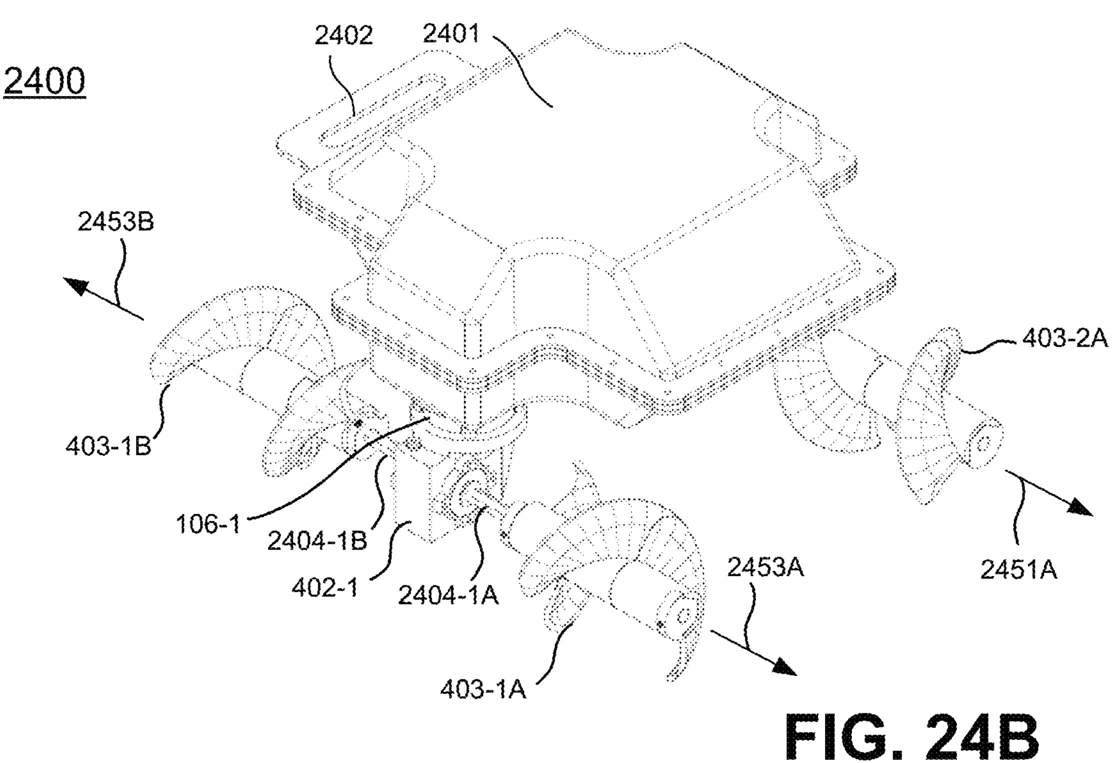

FIG. 24B illustrates an upper left perspective view of the exterior of a device 2400 with an interchangeable drive system depicted with auger-based surface interface portions 403 (403-1A, 403-2A, 403-1B, 403-2B) installed on its drive system, in accordance with various embodiments.

With reference to FIGS. 24A and 24B, device 2400, except for the shape of body 2401 as compared to body 401, is similar to device 100 and may incorporate any of the features and/or components previously described and attributed to device 100. Like device 100, device 2400 may also be referred to as a "robot" or a "device" or a "robotic device" or a "granular material management robot" or a "grain management robot" and, when equipped with auger-based surface interface portions 403 (403-1A, 403-2A, 403-1B, 403-2B), is configured to traverse across, move about/upon, and/or operate in relation to a pile of granular material, in accordance with various embodiments.

As depicted, the drive system of device 2400 includes, for example, drive motors 106 (106-1, 106-2), transmissions 402 (402-1, 402-2), and auger-based surface interface portions 403 (403-1A, 403-2A, 403-1B, 403-2B). The drive motors 106 are electric. In some embodiments the electric drive motors may be directly coupled, such as via their output shaft, to turn surface interface portions; while in other embodiments (as depicted) a transmission 402 is interposed between a drive motor 106 and a surface interface portion. In an identical manner to the previously illustrated embodiments of device 100, a pair of bilateral augers 403 may be utilized as surface interface portions of the drive system. However, as will be discussed, the type of surface interface portion (e.g., augers) may be interchanged/swapped for a different type of surface interface portion (e.g., continuous tracks, wheels, etc.).

In the depicted embodiments, the transmission 402 is located near the middle of each auger 403, thus bifurcating each auger into two portions. Transmissions 402, in the depicted embodiment, comprise a worm drive which couples with an output shaft of a vertically oriented electric motor 106. Because a worm drive is used, the orientation of the output shafts 2404 of a transmission 402 can thus be changed by rotating the transmission. Accordingly, as depicted herein, in some embodiments a transmission 402 may be turned 90 degrees such that shafts 2404 are changed in orientation from fore/aft relative to the body 2401 to being laterally oriented with respect to body 2401. In this manner, both the transmission 402 and the shafts 2404 may be rotated laterally by 90 degrees with respect to body 2401. When transmissions 402 are bolted to their respective electric motors 106, this involves unbolting them, turning them, and re-bolting them in the new orientation. It is appreciated, that in various embodiments, securing mechanisms, other than bolts, may be employed to couple a transmission 402 with an electric motor 106. Some non-limiting examples of other securing mechanisms include: cotter pins, clevis pins, magnets, and quick release pins.

In some embodiments, a drive motor 106 may be coupled to an auger 403 (such as to the end of an auger 403) in a manner that eliminates the need of a transmission 402 between the drive motor 106 and the auger 403. In some embodiments, a drive motor 106 may drive a belt which rotates a shaft that is coupled with an auger 403, also eliminating the need of a transmission 402. In either of these alternative embodiments, the surface interface portions of the overall drive system may be similarly switched out (e.g., from augers to wheels or continuous treads).

In FIG. 24A, the front portion 403-1A of auger 403-1 is visible, as are the front portion 403-2A and rear portion 403-2B of auger 403-2. In typical operation, augers 403 sink at least partially into the piled granular material and thrust against it as they rotate. The direction and speed of rotation of the augers 403 determines the movement fore, aft, left, right, turning left, and/or turning right of robot 2400 when augers 403 are installed, in the manner as previously described with device 100. In this manner, in various embodiments with an auger-based drive system installed, robot 2400 (in an identical manner to device 100) can move atop a pile of granular material, can move beneath a pile of granular material (i.e., submerged in it), can move to the surface after being submerged in a pile of granular material, and can level, disperse, and/or manage piled granular material in the manner previous described in conjunction with device 100 and FIGS. 1-23E.

With continued reference to FIG. 24A and FIG. 24B, in some embodiments, auger-based surface interface portions 403 (403-1A, 403-2A, 403-1B, 403-2B) may be removably coupled with the shafts 2404 (2404-1A, 2404-2A 2404-1B, 2404-2B) which extend from transmissions 402 (402-1, 402-2). As depicted, the auger-based surface interface portions 403 have been decoupled from their respective shafts 2404 and are removed from their respective shafts such as by removing set screws or other securing mechanisms and by sliding in the directions shown by the arrows (2451A, 2451B, 2453A, and 2453B). In some embodiments, at this point, different types of augers (e.g., different pitch, different diameter, different float, etc.) may be installed by reversing the process if it is not desired to change the drive system to a completely different manner of interfacing with the surfaces upon which the robot 2400 operates.

Figure 24C:
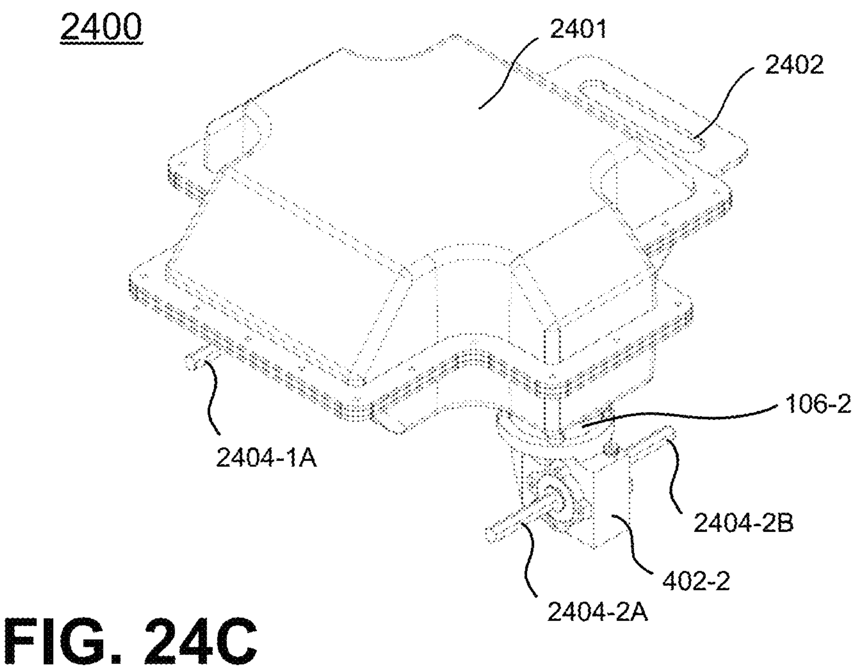

FIG. 24C illustrates an upper front right perspective view of the exterior of a device 2400 with an interchangeable drive system depicted after auger-based surface interface portions 403 (403-1A, 403-2A, 403-1B, 403-2B) have been removed from its drive system, in accordance with various embodiments.

Figure 24D:
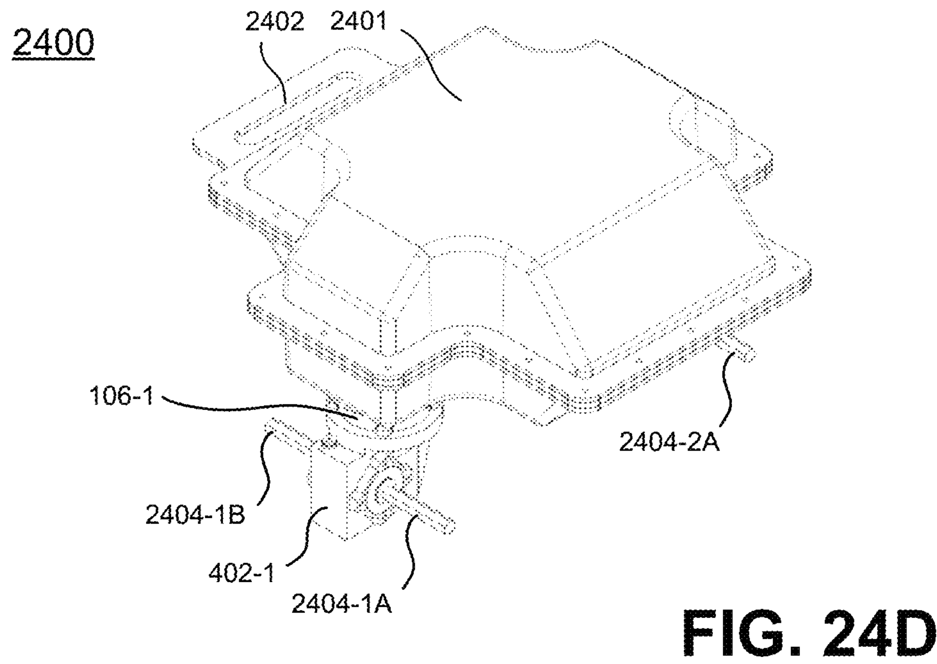

FIG. 24D illustrates an upper front left perspective view of the exterior of a device 2400 with an interchangeable drive system depicted after auger-based surface interface portions 403 (403-1A, 403-2A, 403-1B, 403-2B) have removed from its drive system, in accordance with various embodiments.

Figure 24E:
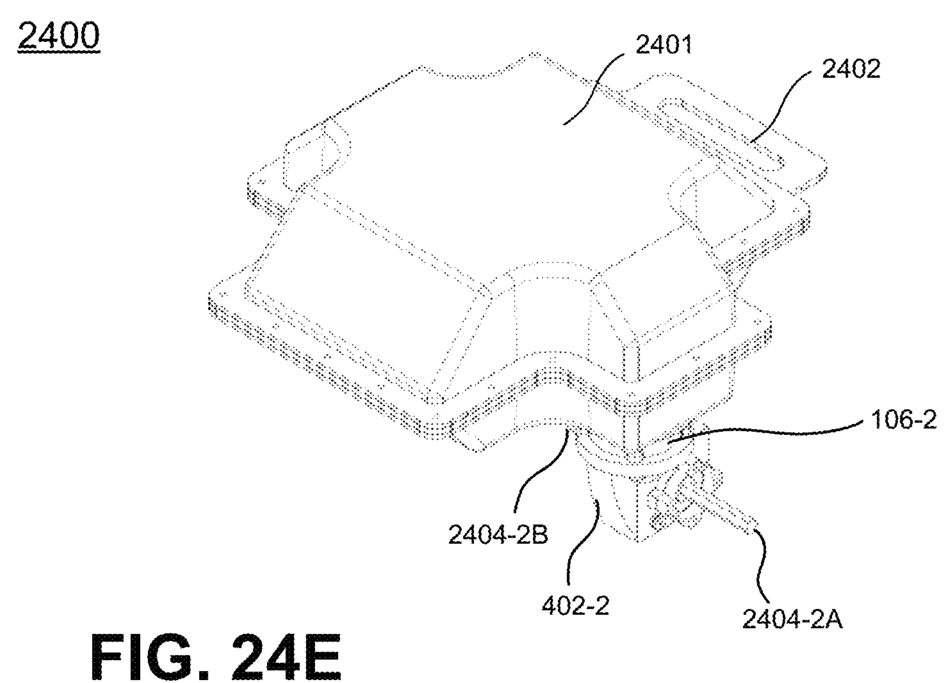

FIG. 24E illustrates an upper front right perspective view of the exterior of a device 2400 with an interchangeable drive system depicted after auger-based surface interface portions 403 (403-1A, 403-2A, 403-1B, 403-2B) have removed from its drive system and transmission 402-2 has been rotated 90 degrees such that shafts 2404-2A and 2404-2B are perpendicular to the front/rear axis of body 2401, in accordance with various embodiments.

Figure 24F:
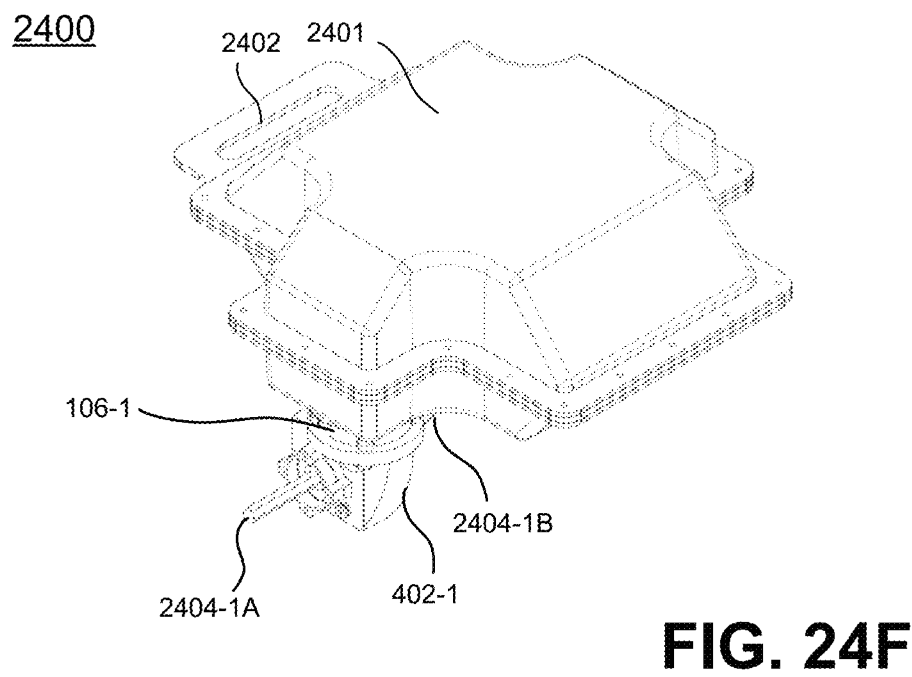

FIG. 24F illustrates an upper front left perspective view of the exterior of a device 2400 with an interchangeable drive system depicted after auger-based surface interface portions 403 (403-1A, 403-2A, 403-1B, 403-2B) have removed from its drive system and transmission 402-1 has been rotated 90 degrees such that shafts 2404-1A and 2404-1B are perpendicular to the front/rear axis of body 2401, in accordance with various embodiments.

Figure 24G:
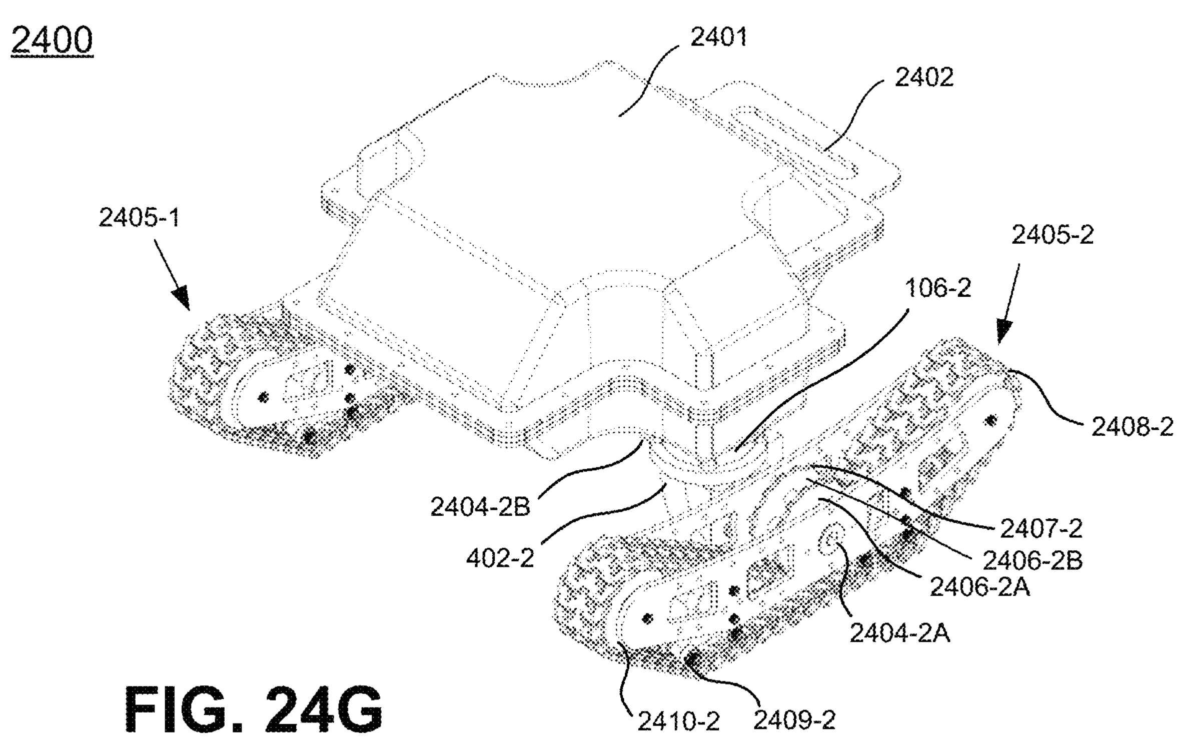

FIG. 24G illustrates an upper front right perspective view of the exterior of a device 2400 with an interchangeable drive system depicted after continuous tread surface interface portions 2405 (2405-1, 2405-2), such as tank or Caterpillar continuous treads, have secured to their respective shafts 2404 (2404-2A, 2404-2B) to become a portion of the drive system which also includes drive motors 106-2 and transmissions 402-2, in accordance with various embodiments.

Figure 24H:
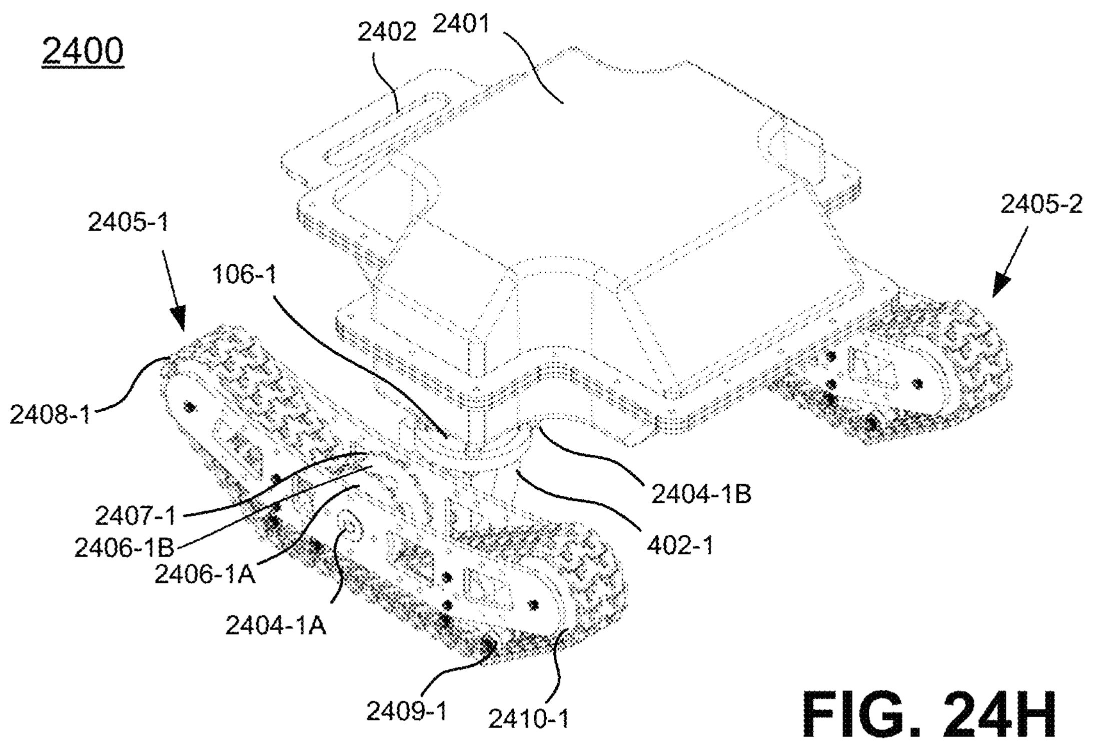

FIG. 24H illustrates an upper front left perspective view of the exterior of a device 2400 with an interchangeable drive system depicted after continuous tread surface interface portions 2405 (2405-1, 2405-2) have secured to their respective shafts 2404 (2404-1A, 2404-1B) to become a portion of the drive system which also includes drive motors 106-1 and 106-2 and transmissions 402-1 and 402-2, in accordance with various embodiments.

As depicted, each continuous tread surface interface portion 2405 may include one or more drive sprockets 2406 (e.g., 2406-1A, 2406-1B, 2406-2A, and 2406-2B) coupled with a shaft 2404, individual treads 2408 that are coupled into a continuous loop, road wheels 2409, and/or guide wheels 2410. When the shafts 2404 rotate the sprockets 2406, cog teeth 2407 (e.g., 2407-1, 2407-2, etc.) of the sprockets 2406 engage with gaps/sockets in the coupled respective individual treads 2408 (e.g., 2408-1 or 2408-2) of each respective continuous tread surface interface portion 2405 (2405-1, 2405-2), to rotate the individual treads 2408 in a loop around respective road wheels 2409 (e.g., 2409-1, 2409-2) and/or respective guide wheels 2410 (2410-1, 2410-2) that define the shape of the continuous tread surface interface portions 2405. The direction and speed of rotation of the bilateral continuous tread surface interface portions 2405-1 and 2405-2 determines the movement fore, aft, left, right, turning left, and/or turning right of device 2400 of FIGS. 24G, 24H, 24I, and 24J. In this manner device 2400, in various embodiments that are configured with continuous tread surface interface portions 2405, can move atop and traverse across and about a surface that is solid, packed, or semi-solid (e.g., not deeply piled granular material that can shift, slide, or move much beneath the continuous tread surface interfaces 2405). In some embodiments, a semi-solid surface may be a floor of a bulk store covered by a layer of granular material less than one foot deep. In some embodiments, a semi-solid surface may be a floor of a bulk store covered by a layer of granular material less than three inches deep. In some embodiments, a semi-solid surface may be a wet mud surface. A solid surface is hard or hard packed, such as metal, dirt, plastic, a gravel road, or poured concrete. Some examples of the types of surface that may be traversed by the continuous tread surface interface portions 2405 include, without limitation: the bottom of a grain bin or other bulk store, a metal surface, a dirt surface, a gravel surface, a concrete surface, a muddy surface, a gravel road, a dirt road, a sand road, a beach, a plowed field, grass, a cover crop planted field, water, a bog, a rice field, a snow covered surface, a manure pit, and a solid surface such as a floor of a granular material bulk store which has some scattered granular material on it to include areas where the granular material being traversed may be a thin layer of a few inches or less deep in some embodiments or up to about a foot deep in some embodiments. In some embodiments, auger-based surface interface portions 403 may be used when managing a pile of granular material that is more than a foot deep and may be swapped for continuous tread surface interface portions 2405 to provide better mobility and purchase on the floor of a granular material bulk store during final clean out of the granular material from the bulk store.

In some embodiments, wheel-based surface interface portions may be installed similarly to the installation of the sprockets 2406 which are attached to shafts 2404. By exchanging treaded wheels for the sprockets 2406, the robot is equipped with drive wheels. Additional wheels may be added for stability and the additional wheels may or may not be coupled with the drive wheels.

In particular the tread surface interface portions 2405 are well-suited to operating in the "final foot" of grain where the auger-based drive is no longer needed or where bare bin floor is visible in some areas. Besides sweeping, the robot 2400 may be configured with other payload implements and used to scoop granular material from the floor of a bulk store, scrape the floor of a bulk store, spray the floor, and/or perform bin maintenance tasks.

Other uses of a continuous tread surface interface equipped robot 2400 may be outside of a grain bulk store such as a grain bin. Some example uses may include, but are not limited to: cleaning or operating in an non-grain bulk store for granular material; transporting loads; precise robotic in-row irrigation including robot assisted furrow irrigation; robotic in-row weed removal by individually digging, cutting, spraying herbicide upon, or burning of weeds; robotic management of waste pits and ponds, management of manure and/or manure piles; precise payload delivery in multiple operating environments; rice paddy management; animal management (e.g., cows, pigs, chickens) in harsh conditions (winter, mud) and/or in confinement facilities. Such tasks may be performed in an automated fashion (either by the robot acting alone or via remote computer control), via human remote control, or some combination.

It should be appreciated that the interchange of surface interface portions such as the change from auger-based surface interface portions 403 to continuous tread surface interface portions 2405, may be performed manually by a human or in an automated or semi-automated fashion when robot 2400 is in a docking station, such as for charging.

Figure 24I:
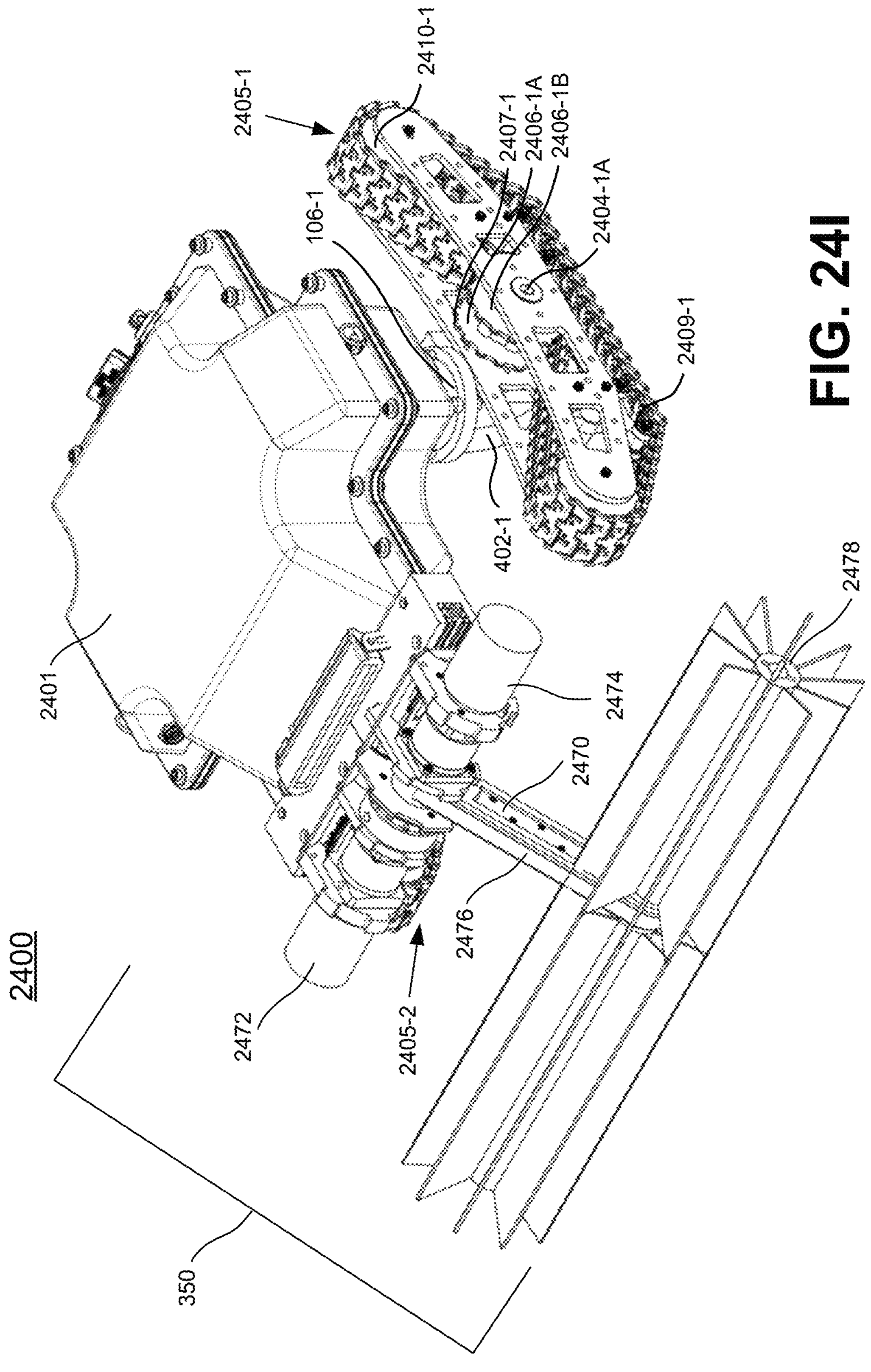

FIG. 24I illustrates an upper right rear perspective view of the exterior of a device 2400 with an interchangeable drive system depicted after continuous tread surface interface portions 2405 (2405-1, 2405-2) have been installed and after a payload implement 140, such as broom 350 has been attached, in accordance with various embodiments. In the illustrated embodiment, implement 350 is a rotary broom that is mounted to the handle 2402 of robot 2400. In other embodiments, broom 350 may be configured to be fixed in place rather than to rotate and/or articulate. In some embodiments, an electrical and/or communicative coupling may conduct electrical power and/or control signals from within body 2401 to power and/or control operation/movement of an attached payload implement 140 such as a broom 350, a blade 351, a shovel 352, a vacuum 353, and/or a blower 354.

Broom 350 may be employed for tasks such as sweeping material in the path of traversal of robot 2400. For example, robot 2400 may utilize a fixed or rotating broom 350 to sweep a floor of a shop, a sidewalk, or the floor of a granular material bulk store. For example, robot 2400 may use a broom 350 to sweep or push granular material in a traversal path of the robot, and in such a manner may be utilized in the final clean out of granular material in a bulk store by sweeping/pushing granular material toward an extraction point such as a door, or a sump auger entry, or a sweep auger. In another example, robot 2400 may use a blade 351 for pushing/sweeping/clearing material in a path of traversal of the robot, and in such a manner may be utilized to assist with the final cleanout of granular material in a bulk store, by pushing the granular along the floor of a bulk store toward an extraction point such as a door, or a sump auger entry, or a sweep auger. In another example, robot 2400 may use a shovel 352 for pushing and/or scooping and moving material in a path of traversal of the robot, and in such a manner may be utilized to assist with the final cleanout of granular material in a bulk store, by scooping the granular piled on the floor of a bulk store and depositing it at an extraction point such as a door, or a sump auger entry, or a sweep auger. In another example, robot 2400 may use a vacuum 353 for sucking up granular material in a path of traversal of the robot, and in such a manner may be utilized to assist with the final cleanout of granular material in a bulk store, by vacuuming up the granular along the floor of a bulk store. In another example, robot 2400 may use a blower 354 for blowing air to push/clear material in a path of traversal of the robot, and in such a manner may be utilized to assist with the final cleanout of granular material in a bulk store, by blowing the granular along the floor of a bulk store toward an extraction point such as a door, or a sump auger entry, or a sweep auger. Broom 350 is secured to the handle 2402 of robot 2400 (causing the handle to no longer be visible). Broom 350 coupled to and powered by batteries which are internal to body 2401 and likewise may be controlled by signals provided by host processor 102.

Broom 350, as depicted in FIG. 24I, is a rotating broom which may also be raised or lowered with lift arm 2470. Lift arm 2470 is actuated in a rotating up/down path by electric motor 2472, while electric motor 2474 spins a pully attached to a belt 2476 disposed along the outside edge of lift arm 2470. Belt 2476 spins the shaft 2478 of rotating broom 350, which is coupled with lift arm 2470.

In other embodiments, other payloads 140 such as a drill for making holes and probing, a shovel or bucket for digging, basket/bed for carrying a payload, a ripper, a sprayer/spray tank, a water tank, a scoop, a cultivator, or a blade, a flame torch, among others, may be coupled to robot 2400 in a similar manner. For example, robot 2400 may use a blade for pushing material in a path of traversal of the robot and in such a manner may be utilized to assist with the final cleanout of grain in a grain bin or other bulk store, by pushing grain toward a sweep auger.

Figure 24J:
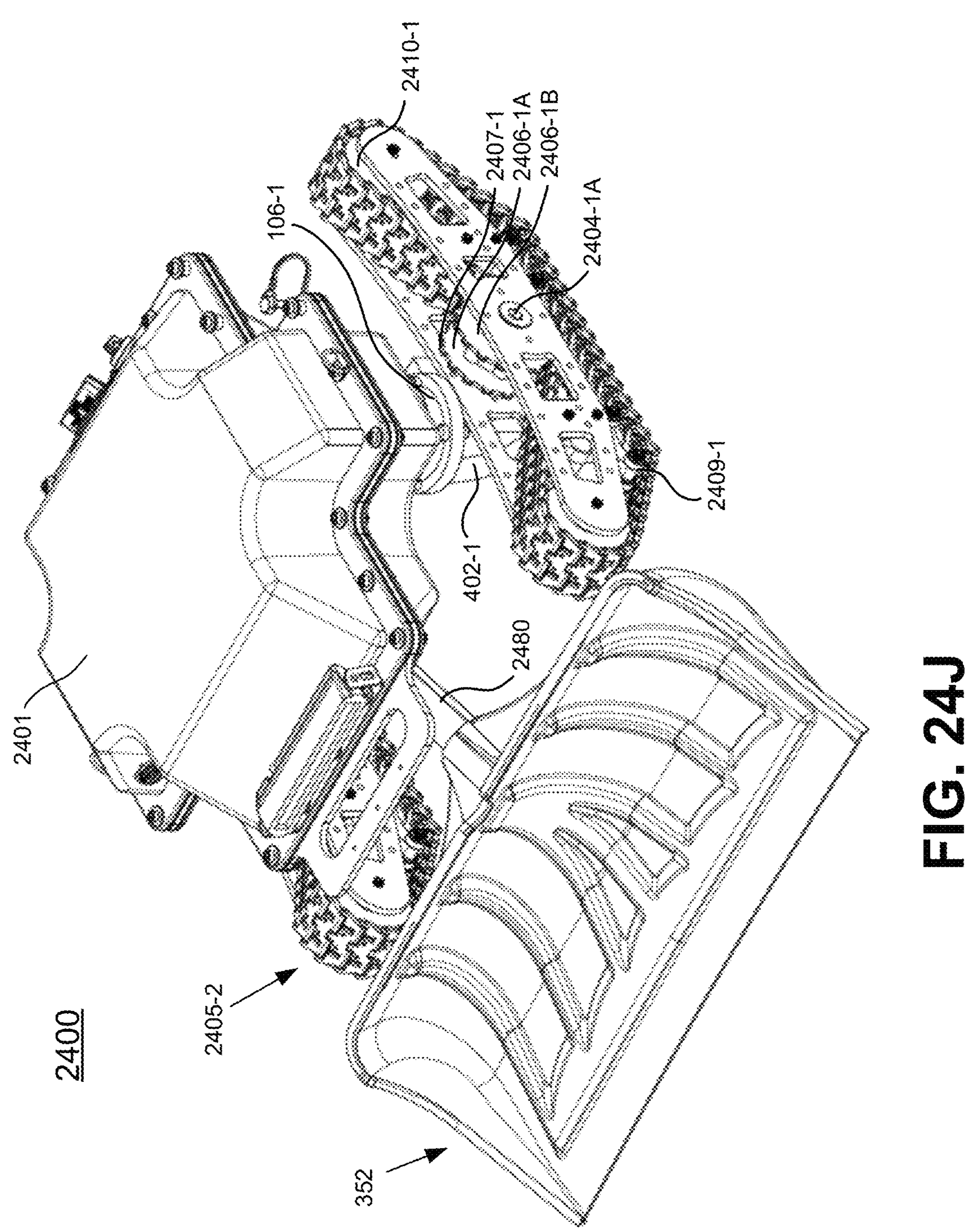

FIG. 24J illustrates an upper right rear perspective view of the exterior of a device 2400 with an interchangeable drive system depicted after continuous tread surface interface portions 2405 (2405-1, 2405-2) have been installed and after a payload implement 140, such as shovel 352 has been attached, in accordance with various embodiments. In the illustrated embodiment, scoop shovel 352 is mounted to the underside of body 2401 in by an arm 2480 which is in a fixed angle/position with respect to body 2401. Robot 2400 may use a shovel 352 for pushing and/or scooping and moving material in a path of traversal of the robot, and in such a manner may be utilized to assist with the final cleanout of granular material in a bulk store, by scooping the granular piled on the floor of a bulk store and depositing it at an extraction point such as a door, or a sump auger entry, or a sweep auger.

Figure 25:
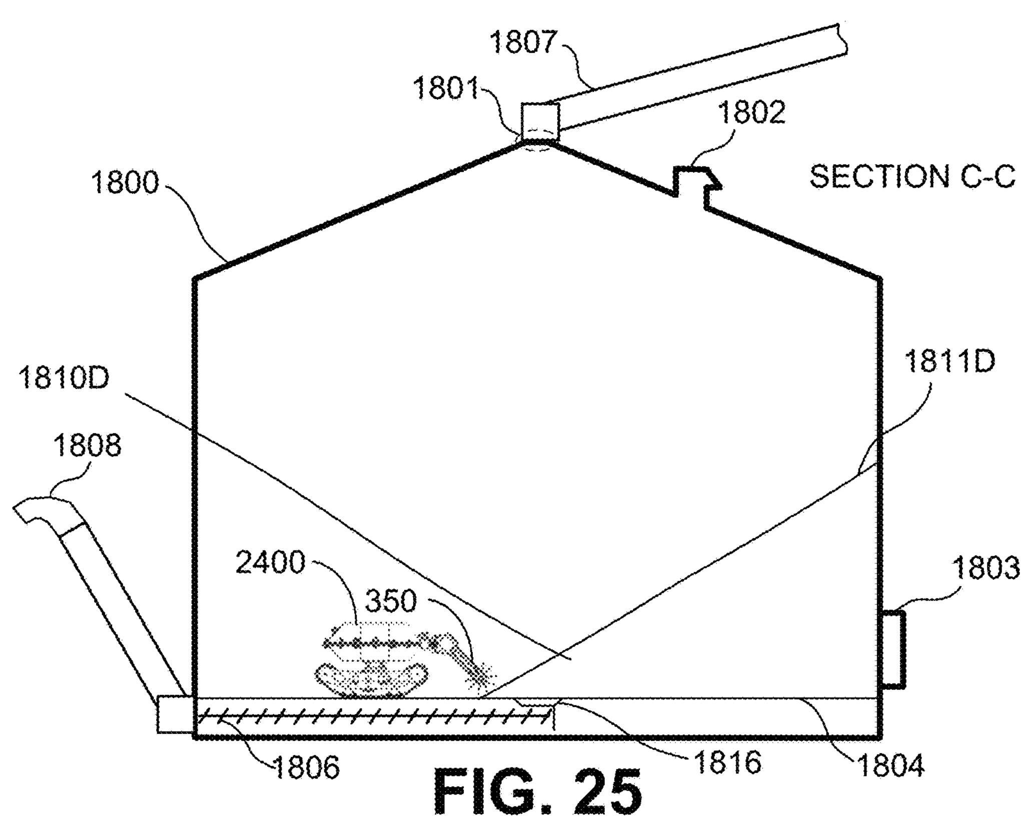
FIG. 25 illustrates a side-sectional view of a bulk store, in which a robot 2400 with an interchangeable drive system is operating to perform final clean out of granular material.

FIG. 25 illustrates a side-sectional view of a bulk store 1800, in which a robot 2400 with an interchangeable drive system is operating to perform final clean out of granular material 1810D. The granular material 1810D is piled grain but may be any granular material. As can be seen, robot 2400 is identical to the robot 2400 depicted in FIG. 24I and is equipped with a rotating broom 350 and with a drive system that includes continuous treads. Robot 2400 is depicted operating upon and sweeping loose granular material on the floor 1804 of bulk store 1800. Robot 2400 may operated on the floor surface according to a predetermined pattern of movement stored in the memory 103, in a patternless manner, in a dynamically determined manner, or under wireless remote control of an operator located external to the bulk store 1800 or a computing system located external to the bulk store 1800. In some embodiments, a camera 108 of robot 2400 may be used to spot granular material to which robot 2400 self directs itself and then sweeps the granular material with broom 350 to a predetermined location.

Figure 26:
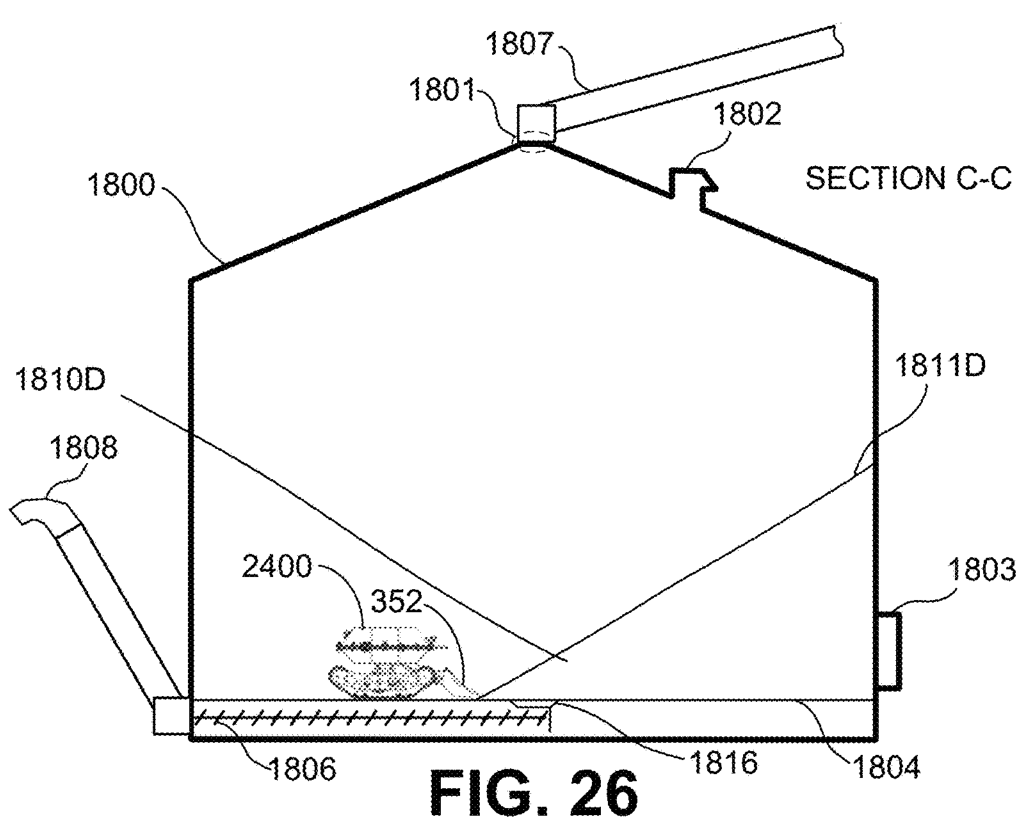
FIG. 26 illustrates a side-sectional view of a bulk store, in which a robot 2400 with an interchangeable drive system is operating to perform final clean out of granular material.

FIG. 26 illustrates a side-sectional view of a bulk store 1800, in which a robot 2400 with an interchangeable drive system is operating to perform final clean out of granular material 1810D. The granular material 1810D is piled grain but may be any granular material. As can be seen, robot 2400 is identical to the robot 2400 depicted in FIG. 24J and is equipped with a scoop shovel 352 and with a drive system that includes continuous treads. Robot 2400 is depicted operating upon and scooping loose granular material on the floor 1804 of bulk store 1800 and on the edge of the sloped pile of granular material 1810D. Robot 2400 may operated on the floor surface 1804 according to a predetermined pattern of movement stored in the memory 103, in a patternless manner, in a dynamically determined manner, or under wireless remote control of an operator located external to the bulk store 1800 or a computing system located external to the bulk store 1800. In some embodiments, a camera 108 of robot 2400 may be used to spot granular material to which robot 2400 self directs itself and then scoops with shovel 352 and moves it to a predetermined location.

Additional Embodiments

Additional embodiments may include: 1. Physical combination of independent robots to form one larger robot to accomplish specific tasks; 2. Virtual combination of independent robots to form one larger machine to accomplish specific tasks; 3. Methods by which individual robots 2400 are identified and therefore assigned roles while within the larger combination; 4. Methods of seamless control of a combination robot via remote control and/or autonomous functions; and/or 5. Methods of data collection either purposefully or during routine operation of device(s) 2400, without regard to the type of surface interface portions installed (e.g., augers, continuous treads, floats, wheels, etc.).

In some embodiments, hazard/obstacle avoidance methods including preprogrammed hazards and in-situ sensory input include avoidance of working extraction equipment including sweep augers, sump augers, and external tools such as granular material vacuums, sweep augers, and heavy equipment (front-end loaders, Bobcats, skid steer loaders, etc.). Sensing capabilities may be included and used to address, operate, and navigate in relation to hazards/obstacles and complicated environments. In some embodiments, robots may automatically cooperatively operate together (in a swarm of two or more robots) to perform tasks and/or couple with one another to form a larger machine to accomplish a task.

Through use of precise positioning, one or more robots 2400 are: 1. Capable of operating in harsh environments including confined spaces, under water, in organic waste materials, under poor weather conditions (blizzard, rain, sleet, hail, high wind, etc.); and 2. Capable of operating in a self-defined perimeter with Global Navigation Satellite System (GNSS) assisted positioning and/or with non-GNSS positioning capabilities.

In various embodiments, interchangeable drive aspects may include different interchangeable drive chain/tread/track options based on terrain, conditions, and tasks which can be either manually exchanged or autonomously selected via docking station.

In various embodiments, a unified intelligence protocol may provide a method by which: 1. Third party accessories, implements, and automation systems can communicate with the robot core (e.g., with power, control, and communications located within or coupled to the body of the robot); 2. Accessories designed around hardware compatibility not data aggregation can be coupled with the robot core; 3. Standardized connection requirements and wireless communications can be incorporated or coupled with the robot core; and/or 4. Robot deployment via external inputs.

Example Method of Operating a Robot with an Interchangeable Drive System

FIGS. 27A-27D illustrate a flow diagram 2700 of an example method of operating a robot with an interchangeable drive system, in accordance with various embodiments. Procedures of the methods illustrated by flow diagram 2700 of FIGS. 27A-27D will be described with reference to elements and/or components of one or more of FIGS. 1-26. It is appreciated that in some embodiments, the procedures may be performed in a different order than described in a flow diagram, that some of the described procedures may not be performed, and/or that one or more additional procedures to those described may be performed. Flow diagram 2700 includes some procedures that, in various embodiments, are carried out by one or more processors (e.g., host processor 102 or any processor of device 100 or 2400 or a computer or system to which device 100 or 2400 is communicatively coupled) under the control of computer-readable and computer-executable instructions that are stored on non-transitory computer-readable storage media (e.g., host memory 103, other internal memory of device 100 or 2400, or memory of a computer or system to which device 100 or 2400 is communicatively coupled). It is further appreciated that one or more procedures described in flow diagram 2700 may be implemented in hardware, or a combination of hardware with firmware and/or software.

The method described in FIGS. 27A-27D utilizes a robot, such as robot 2400 with a body 2401, a drive system (106, 402, and selected interchangeable surface interface portions) coupled with the body 401. In some embodiments, the drive system comprises one of auger-based surface interface portions 403 (see e.g., FIGS. 24A and 24B) and continuous tread surface interface portions 2405 (see e.g., FIGS. 24G and 24H). The auger-based surface interface portions 403 and the continuous tread surface interface portions 2405 are interchangeable to adapt the robot 2400 to one of different operating conditions and different uses. In some embodiments, at least one output shaft protrudes from the transmission to rotate either of the auger-based surface interface portions and the continuous tread surface interface portions, depending on which is installed. In some embodiments, the transmissions 402 are adapted to be rotated with respect to the electric motors 106 such that the at least one output shafts can be rotated by 90 degrees with respect to the body. An example of this rotation of the transmission 402 and output shafts 2404 is depicted in FIGS. 24C, 24D, 24E, and 24F.

With reference to FIG. 27A, at procedure 2710 of flow diagram 2700, in various embodiments, in response to the drive system of robot 2400 being configured with the auger-based surface interface portions 403, movement of the robot is controlled, via the drive system (motors 106, transmissions 402, and augers 403, to traverse about atop a first surface, wherein the first surface is a surface of a piled granular material in a bulk store. In some embodiments, the first surface is atop the surface of piled granular material that is more than one foot deep. This can comprise processor 102 providing instructions to motors 106 of the drive system. The piled granular material is typically more than one foot deep. The piled granular material may be grain, in some embodiments. In some embodiments, the piled granular material may be one of: seeds, sand, concrete, cement, rock aggregate, mineral aggregate, sugar, flour, coffee, nuts, a pelletized product, a ground product, and a milled product, among others.

With continued reference to FIG. 27A, at procedure 2720 of flow diagram 2700, in various embodiments, in response to the drive system being configured with the continuous tread surface interface portions 2405, movement of the robot is controlled via the drive system to traverse across a second surface, wherein the second surface is one of a solid or semi-solid surface other than the surface of the piled granular material.

Controlling the movement can comprise processor 102 providing instructions to motors 106 of the drive system. In some embodiments, the second surface may be the floor of a bulk store, such as a bin. The second surface may be metal, ice, packed gravel, poured concrete, asphalt, dirt, or some other relatively smooth surface which is hard packed. In some embodiments, the second surface and may be covered, at least sporadically, with scattered granular material which is of a shallow enough depth (e.g., less than one foot, and often less than an inch) to allow for continuous treads 2405 to gain purchase without bogging down and getting robot 2400 stuck in the granular material. Such a second surface, sporadically covered with granular material, is one example of a semi-solid surface. Some other examples of a semi-solid surface include mud, snow, and sand on a beach (rather than in a pile).

In some embodiments, an implement may be coupled with the robot 2400, and in such embodiments the processor 102 is configured to operate the robot to employ the implement to perform a task such as sweeping, raking, pushing, shoveling, blowing, or vacuuming material, such as granular material in the path of traversal of the robot 2400.

In some embodiments, the implement may be a payload 140 such as a broom 350 for sweeping material in a path of traversal of the robot 2400. In some embodiments, the implement may be a payload 140 such as a shovel 352 for scooping material in a path of traversal of the robot 2400. In some embodiments, the implement may be a payload 140 such as a blade 351 for pushing material in a path of traversal of the robot 2400. These and other payloads 140 and implements may similarly be employed to perform tasks associated with final cleanout of a bulk store, load out of granular material from a bulk store, or other necessary tasks which can be performed by a robot (either within a bulk store or apart from any connection with a bulk store). Further, it should be appreciated that even though payload implements 140 (e.g., broom 350 and shovel 352) have been depicted attached to a robot 2400 which is configured with continuous tread surface interface portions, such payloads and others may similarly be attached to a robot 2400 which is configured with auger-based surface interface portions, wheel-based surface interface portions, etc.

With reference to FIG. 27B, at procedure 2730 of flow diagram 2700, in various embodiments where the robot is configured with the auger-based surface interface portions 403, the robot 2400 obtains a first measurement of an angle of slope of a portion of the piled granular material. In one example, with reference to FIGS. 7A, 7B, and 7C, this can comprise a measure of the angle of slope of portion 720 of grain 710 in bin 700. The angle can be measured and obtained autonomously by robot 2400, in the manner described with respect to robot 100, or can be measured by a device external to robot 2400 and then obtained by being communicated to or accessed by robot 2400. In an embodiment, where the angle of slope is measured by robot 2400, motion sensor(s) 220 may be used to measure the angle of robot 2400 on a slope of portion 720 to approximate the angle of the slope. In some embodiment, procedure 2430 may be skipped and an operator may simply direct robot 2400 to begin traversal of a portion (e.g., portion 720) of piled granular material.

With continued reference to FIG. 27B, at procedure 2740 of flow diagram 2700, in various embodiments where robot 2400 is configured with auger-based surface interface portions, in response to the first measurement satisfying a first condition, the robot 2400 traverses the portion of piled granular material to incite sediment gravity flow in the portion of the piled granular material by disruption of viscosity of the portion of the piled granular material the traversal (e.g., through agitation of the portion of the piled granular material by auger rotation of the augers 403). The traversal may be controlled by host processor 102 via control of the direction of rotation and/or the speed of rotation of augers 403 of robot 2400. Robot 2400 may traverse the portion (e.g., portion 720) of piled granular material (e.g., piled grain 710) in a predetermined pattern, which may be a predetermined pattern of movement stored in host memory 103 of robot 2400. Robot 2400 may traverse the portion (e.g., portion 720) of piled granular material (e.g., piled grain 710) in a patternless or random/chaos manner or by following dictates other than a pattern such as by dynamically seeking out areas of slope above a certain measure. In some embodiments, a pattern may be changed or altered based on information sensed by robot 2400. In some embodiments, the traversal by the robot may be under wireless remote control of an operator located remotely from robot 2400. In some embodiments, the traversal by the robot may be under wireless remote control of a computer system 506 or 604 located remotely from robot 2400.

With continued reference to FIG. 27B, at procedure 2750 of flow diagram 2700, in various embodiments where robot 2400 is configured with auger-based surface interface portions, robot 2400 obtains a second measurement of the angle of slope of the portion of piled granular material. This second measurement is obtained after the robot has traversed the portion (e.g., portion 720) following a pattern or in another manner, for a predetermined period of time, or based on other criteria for re-measurement of the slope. The second angle measurement can be measured and obtained autonomously by robot 2400 or can be measured by a device external to robot 2400 and then obtained by being communicated to or accessed by robot 2400.

With continued reference to FIG. 27B, at procedure 2760 of flow diagram 2700, in various embodiments where robot 2400 is configured with auger-based surface interface portions, in response to the second measurement satisfying a second condition, robot 2400 ceases traversal of the portion of piled granular material. In some embodiments, the first condition is related to a first angle and the second condition is related to a second angle.

In some embodiments, where the first angle is the same as the second angle, the first condition may be met when the first measurement exceeds the angle, and the second measurement may be met when the second measurement falls below the angle. For example, the angle may be 10 degrees, and when the first measurement is 20 degrees, traversal will continue until the angle is adjusted to below 10 degrees.

In some embodiments, where the first angle and the second angle are different, the first angle is larger than the second angle. For example, the first angle may be 10 degrees while the second angle is 5 degrees. In such an embodiment, when the first measurement is 20 degrees, traversal will continue until the angle meets the second condition (e.g., drops below 5 degrees).

Figure 27C:
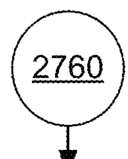

With reference to FIG. 27C, at procedure 2770 of flow diagram 2700, in various embodiments, in response to the second measurement failing to satisfy the second condition, the robot 2400 continues traversal of the portion of piled granular material. For example, if the second condition specifies that the measurement of slope needs to be reduced to below 5 degrees, the robot would continue traversal of the portion of piled granular material in response to the second measurement being 13 degrees.

Figure 27D:
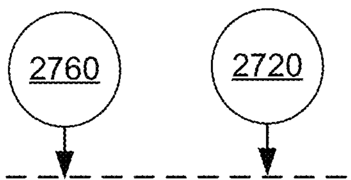

With reference to FIG. 27D, at procedure 2780 of flow diagram 2700, in various embodiments, during traversal of the portion (e.g., 720) of piled granular material (e.g., the first surface) by robot 2400, a sensor 120 of robot 2400 acts under instruction of host processor 102 to capture a measurement of a characteristic of the portion of piled granular. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 2400. In some embodiments, the captured measurement of a characteristic is paired with a location of robot 2400 at the time of capture of the measurement. Such paired data can be used to create a characteristic map of the piled granular material which is traversed by robot 2400. Such measurements may be captured during any operation of robot 2400 with any configuration of surface interface portions (e.g., augers, wheels, continuous treads, floats, etc.) and during operation of robot 2400 on any surface to include solid surfaces, semi-solid surfaces, liquid surfaces, surfaces of piled granular material that are less than or more than one foot deep.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed:

1. A robot comprising:

a body;

a drive system coupled with the body and comprising one of auger-based surface interface portions and continuous tread surface interface portions, wherein the auger-based surface interface portions and the continuous tread surface interface portions are interchangeable to adapt the robot to one of different operating conditions and different uses;

a memory coupled with the body; and a processor coupled with the memory and configured to:

in response to the drive system being configured with the auger-based surface interface portions:

control movement of the robot, via the drive system, to traverse about atop a first surface, wherein the first surface is a surface of a piled granular material in a bulk store;

obtain a first measurement of an angle of slope of a portion of the surface of the piled granular material;

responsive to the first measurement satisfying a first condition, direct the robot to traverse about atop the surface of the portion of the piled granular material to incite sediment gravity flow in the portion of the piled granular material by disruption of viscosity of the portion of the piled granular material through agitation of the portion of the piled granular material by the traversal;

obtain a second measurement of the angle of slope of the portion of the piled granular material; and responsive to the second measurement satisfying a second condition, direct the robot to cease the traversal of the portion of the piled granular material; and in response to the drive system being configured with the continuous tread surface interface portions, control movement of the robot via the drive system to traverse across a second surface, wherein the second surface is one of a solid and a semi-solid surface other than the surface of the piled granular material.

2. The robot of claim 1, further comprising:

an implement coupled with the robot; and the processor is configured to: operate the robot to employ the implement to perform a task.

3. The robot of claim 2, wherein the implement comprises:

a broom for sweeping material in a path of traversal of the robot.

4. The robot of claim 2, wherein the implement comprises:

a shovel for scooping material in a path of traversal of the robot.

5. The robot of claim 2, wherein the implement comprises:

a blade for pushing material in a path of traversal of the robot.

6. The robot of claim 1, wherein the drive system comprises:

an electric motor;

a transmission coupled with the electric motor; and at least one output shaft protruding from the transmission to rotate either of the auger-based surface interface portions and the continuous tread surface interface portions.

7. The robot of claim 6, wherein the transmission is adapted to be rotated laterally with respect to the electric motor such that the at least one output shaft may be rotated along with laterally the transmission by 90 degrees with respect to the body.

8. The robot of claim 1, wherein the processor is further configured to:

direct the robot to continue the traversal, by the robot, about atop the surface of the portion of the piled granular material in response to the second measurement failing to satisfy the second condition.

9. The robot of claim 8, wherein the processor is further configured to: capture, by a sensor of the robot, a measurement of a characteristic of the portion of the piled granular material during the traversal about atop the surface of the portion of the piled granular material.

10. The robot of claim 1, wherein the processor is configured to direct the traversal about atop the surface of the portion of the piled granular material according to a predetermined pattern of movement stored in the memory.

11. The robot of claim 1, wherein the processor is configured to direct the traversal about atop the surface of the portion of the piled granular material in a patternless manner.

12. The robot of claim 1, wherein the processor is configured to direct the traversal about atop the surface of the portion of the piled granular material in a dynamically determined manner.

13. The robot of claim 1, wherein the piled granular material comprises grain.

14. The robot of claim 1, wherein the piled granular material is selected from the list of granular material consisting of: seeds, sand, concrete, cement, rock aggregate, mineral aggregate, sugar, flour, coffee, nuts, a pelletized product, a ground product, and a milled product.

15. The robot of claim 1, wherein the second surface is a floor of a bulk store.

16. A method of operating a robot with an interchangeable drive system, the robot comprising a body, a drive system coupled with the body and comprising one of auger-based surface interface portions and continuous tread surface interface portions, wherein the auger-based surface interface portions and the continuous tread surface interface portions are interchangeable to adapt the robot to one of different operating conditions and different uses, the method comprising:

in response to the drive system being configured with the auger-based surface interface portions:

controlling movement of the robot, via the drive system, to traverse about atop a first surface, wherein the first surface is a surface of a piled granular material in a bulk store;

obtaining, by the robot, a first measurement of an angle of slope of a portion of the piled granular material;

responsive to the first measurement satisfying a first condition, traversing, by the robot, about atop the portion of the piled granular material to incite sediment gravity flow in the portion of the piled granular material by disruption of viscosity of the portion of the piled granular material through agitation of the portion of the piled granular material by the traversal;

obtaining, by the robot, a second measurement of the angle of slope of the portion of the piled granular material; and responsive to the second measurement satisfying a second condition, ceasing the traversal of the portion of the piled granular material; and in response to the drive system being configured with the continuous tread surface interface portions, controlling movement of the robot via the drive system to traverse across a second surface, wherein the second surface is one of a solid and a semi-solid surface other than the surface of the piled granular material.

17. The method as recited in claim 16, further comprising: directing the robot to continue the traversal, by the robot, about atop the portion of the piled granular material in response to the second measurement failing to satisfy the second condition.

18. The method as recited in claim 16, further comprising: capturing, by a sensor of the robot, a measurement of a characteristic of the piled granular material during the traversal about atop the first surface.

* * * * *